US012199371B2

(12) United States Patent
Huang et al.

(10) Patent No.: US 12,199,371 B2
(45) Date of Patent: Jan. 14, 2025

(54) ELECTRICAL CONNECTOR AND METHOD OF MANUFACTURING THE SAME

(71) Applicant: LOTES CO., LTD, Keelung (TW)

(72) Inventors: Chang Wei Huang, Keelung (TW); Zuo Feng Jin, Keelung (TW)

(73) Assignee: LOTES CO., LTD, Keelung (TW)

( * ) Notice: Subject to any disclaimer, the term of this patent is extended or adjusted under 35 U.S.C. 154(b) by 357 days.

(21) Appl. No.: 17/883,696

(22) Filed: Aug. 9, 2022

(65) Prior Publication Data

US 2023/0039986 A1 Feb. 9, 2023

(30) Foreign Application Priority Data

Aug. 9, 2021 (CN) ......................... 202110906405.1

(51) Int. Cl.
*H01R 13/24* (2006.01)
*H01R 43/02* (2006.01)
*H01R 43/16* (2006.01)
*H01R 43/18* (2006.01)

(52) U.S. Cl.
CPC ........... *H01R 13/245* (2013.01); *H01R 43/02* (2013.01); *H01R 43/16* (2013.01); *H01R 43/18* (2013.01)

(58) Field of Classification Search
CPC .............. H01R 13/245; H01R 13/2457; H01R 13/2442; H01R 43/02; H01R 43/16; H01R 43/18; H01R 12/714; H01R 12/716
USPC ...................................................... 439/66, 74
See application file for complete search history.

(56) References Cited

U.S. PATENT DOCUMENTS 4,927,369 A * 5/1990 Grabbe ................ H01R 12/714 439/82
5,173,055 A * 12/1992 Grabbe .............. H01R 13/2492 439/83
5,228,861 A * 7/1993 Grabbe .................. H01R 12/52 439/591
5,434,452 A 7/1995 Higgins, III
(Continued)

FOREIGN PATENT DOCUMENTS

CN 1082265 C 4/2002
CN 202423626 U 9/2012
(Continued)

*Primary Examiner* — Marcus E Harcum
(74) *Attorney, Agent, or Firm* — Locke Lord LLP; Tim Tingkang Xia, Esq.

(57) ABSTRACT

A method of manufacturing an electrical connector includes: providing a metal plate, and cutting the metal plate to form multiple base portions and pre-soldering areas; providing multiple conductive members, and soldering the conductive members to the pre-soldering areas; cutting and forming multiple elastic arms correspondingly according to locations of the conductive members in the pre-soldering areas as references, where a conductive terminal includes a base portion, at least one elastic arm and at least one conductive member; forming an insulating body on the conductive terminals by insert-molding, where the elastic arms and the conductive members are exposed from the insulating body; and forming the conductive terminals by cutting, where at least some of the conductive terminals are separated from each other and are not in contact with each other. The first electronic component and the second electronic component abut the elastic arms and the conductive members to deform and move.

19 Claims, 79 Drawing Sheets

(56) References Cited

U.S. PATENT DOCUMENTS

| | | | | |
|---|---|---|---|---|
| 5,462,440 | A | 10/1995 | Rothenberger | |
| 5,653,598 | A * | 8/1997 | Grabbe | H05K 7/1069 439/74 |
| 5,877,559 | A | 3/1999 | Takayama et al. | |
| 5,913,687 | A * | 6/1999 | Rathburn | H05K 7/1069 439/71 |
| 5,967,797 | A * | 10/1999 | Maldonado | H01R 12/714 439/83 |
| 5,980,335 | A * | 11/1999 | Barbieri | H01R 12/716 439/824 |
| 6,045,367 | A * | 4/2000 | Maldonado | H01R 12/714 439/66 |
| 6,142,789 | A | 11/2000 | Nolan et al. | |
| 6,197,171 | B1 * | 3/2001 | Lopergolo | C25D 7/00 204/286.1 |
| 6,375,474 | B1 * | 4/2002 | Harper, Jr. | H01R 12/714 439/81 |
| 6,441,315 | B1 * | 8/2002 | Eldridge | G01R 1/06727 438/117 |
| 6,474,997 | B1 * | 11/2002 | Ochiai | G01R 1/0483 439/70 |
| 6,672,875 | B1 * | 1/2004 | Mathieu | G01R 3/00 439/83 |
| 6,805,561 | B1 * | 10/2004 | Walkup | H01R 12/714 439/66 |
| 6,926,536 | B2 * | 8/2005 | Ochiai | H01R 43/16 439/91 |
| 6,994,565 | B2 * | 2/2006 | Harper, Jr. | H01R 12/52 439/83 |
| 7,063,541 | B2 * | 6/2006 | Grube | G01R 1/06727 257/E23.068 |
| 7,066,740 | B2 * | 6/2006 | Audet | H01R 12/57 257/E23.068 |
| 7,185,430 | B2 * | 3/2007 | Ochiai | H01R 43/16 29/874 |
| 7,361,064 | B2 * | 4/2008 | Chien | H01R 13/2471 439/824 |
| 7,553,165 | B2 * | 6/2009 | Mathieu | G01R 3/00 439/66 |
| 7,891,984 | B1 * | 2/2011 | Ju | H01R 13/2442 439/66 |
| 8,007,287 | B1 * | 8/2011 | Champion | H05K 1/141 439/66 |
| 8,287,287 | B2 * | 10/2012 | Miwa | H05K 7/1069 439/67 |
| 8,668,529 | B2 | 3/2014 | Park et al. | |
| 8,911,242 | B2 * | 12/2014 | Jeon | H01R 13/2442 439/66 |
| 9,362,687 | B1 * | 6/2016 | Ju | H01R 13/6633 |
| 9,614,313 | B2 * | 4/2017 | Mikawa | H01R 13/2428 |
| 10,079,444 | B2 * | 9/2018 | Tseng | H01R 12/714 |
| 10,535,944 | B2 * | 1/2020 | Lin | H01R 12/73 |
| 2006/0003607 | A1 * | 1/2006 | Shirai | H05K 7/1069 439/66 |
| 2012/0178306 | A1 * | 7/2012 | Ju | H05K 7/1069 439/660 |
| 2017/0222340 | A1 * | 8/2017 | De Crecy | H01R 43/16 |
| 2020/0227850 | A1 * | 7/2020 | Do | H01R 13/2407 |

FOREIGN PATENT DOCUMENTS

| | | | | |
|---|---|---|---|---|
| CN | 109066161 | A | 12/2018 | |
| CN | 111064025 | A * | 4/2020 | H01R 12/7047 |
| CN | 112736520 | A | 4/2021 | |
| CN | 112736617 | A | 4/2021 | |
| CN | 112928519 | A | 6/2021 | |
| CN | 112952428 | A | 6/2021 | |

* cited by examiner

100

A-A

100

100

100

100

C–C

100

100

D-D

100

100

100

E-E

ELECTRICAL CONNECTOR AND METHOD OF MANUFACTURING THE SAME

CROSS-REFERENCE TO RELATED PATENT APPLICATION

This non-provisional application claims priority to and the benefit of, pursuant to 35 U.S.C. § 119(a), patent application Serial No. CN202110906405.1 filed in China on Aug. 9, 2021. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector and a method of manufacturing the same, and particularly to an electrical connector electrically connecting a first electronic component and a second electronic component and a method of manufacturing the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an electrical connector, each terminal receiving hole in a shell accommodates a conductive terminal. The conductive terminal is manufactured as S-shaped by bending a metal plate, and includes a first elastic arm used to be connected to a first electronic component, a second elastic arm used to be connected to a second electronic component, and a base portion connecting the first elastic arm and the second elastic arm. The first elastic arm is provided with a first contact portion bending downward, and the first contact portion is exposed out of the terminal receiving hole to directly abut the first electronic component. The second elastic arm is provided with a second contact portion bending upward, and the second contact portion is exposed out of the terminal receiving hole to directly abut the second electronic component.

The aforementioned structure has the following deficiencies:

1. Generally, in the electrical connector, the conductive terminal is fixed in the terminal receiving hole by the insertion assembly method, and the elastic arms require bending to form the contact portions for abutting the mating components, such that the assembly and the steps of forming of the elastic arms are complicated.

2. To ensure the elastic arms to extend out of the terminal receiving hole and be in contact with the mating components, each elastic arm must be preserved with a certain length, thereby causing an insufficient normal force for each elastic arm to abut the corresponding mating component. For each mating component to better abut the corresponding elastic arm, a greater force must be applied, such that the elastic arms may easily fatigue, thereby reducing the usage life of the electrical connector.

Therefore, a heretofore unaddressed need to design a new electrical connector and a method of manufacturing the same exists in the art to address the aforementioned deficiencies and inadequacies.

SUMMARY

In view of the deficiency of the background, the present invention is directed to an electrical connector and a method of manufacturing the same, in which the conductive posts are soldered on the elastic arms for abutting the electronic components, where the forming process of the elastic arms is simple without the need to be assembled to the insulating body, thus allowing each elastic arm to have a sufficient normal force to abut the corresponding electronic component and achieving reducing the fatigue loss of the elastic arms.

To achieve the foregoing objective, the present invention adopts the following technical solutions.

A method of manufacturing an electrical connector is provided. The electrical connector is configured to electrically connect a first electronic component to a second electronic component. The method includes: step A: providing a metal plate, and cutting the metal plate to form a plurality of base portions and a plurality of pre-soldering areas, wherein each of the base portions is connected to at least one of the pre-soldering areas; step B: after the step A, providing a plurality of conductive members, and soldering at least one of the conductive members to one of the pre-soldering areas; step C: after the step B, cutting and forming a plurality of elastic arms correspondingly according to locations of the conductive members in the pre-soldering areas as references, wherein at least one of the elastic arms is connected to a corresponding one of the base portions, a corresponding one of the conductive members is soldered to an end of the at least one of the elastic arms away from the corresponding one of the base portions, the end of the at least one of the elastic arms away from the corresponding one of the base portions is a free end, and one of a plurality of conductive terminals comprises the corresponding one of the base portions, the at least one of the elastic arms and the at least one of the conductive members; step D: forming an insulating body on the conductive terminals by insert-molding, wherein the corresponding one of the base portions is covered and fixed by the insulating body, and wherein the step D is performed between the step A and the step B, and the pre-soldering areas are exposed out of the insulating body; or the step D is performed between the step B and step C, and the conductive members and the pre-soldering areas are exposed out of the insulating body; or the step D is performed after the step C, and the at least one of the elastic arms and the at least one of the conductive members are exposed out of the insulating body; and step E: after the step D, forming the conductive terminals by cutting, wherein at least some of the conductive terminals are separated from each other and are not in contact with each other, thus completing manufacturing of the electrical connector, wherein each of the conductive members is configured to be electrically connected to the first electronic component, and the first electronic component abuts the conductive members to move and simultaneously drive the elastic arms to deform, thus transmitting signals of the first electronic component to the second electronic component.

In certain embodiments, in the step C, each of the conductive terminals comprises two of the elastic arms and two of the conductive members, the two of the elastic arms formed by cutting comprise a first elastic arm and a second elastic arm, the two of the conductive members comprise a first conductive member and a second conductive member, the first elastic arm and the second elastic arm are connected to the same corresponding one of the base portions and extend respectively along two opposite side directions of the corresponding one of the base portions, the first elastic arm of each of the conductive terminals is soldered and fixed with only the first conductive member, the second elastic arm of each of the conductive terminals is soldered and fixed with only the second conductive member, and the first conductive member and the second conductive member are provided to be staggered in the vertical direction; and in the step E, the first electronic component presses downward on the first conductive member to move and drives the first elastic arm to deform, the second electronic component abuts upward the second conductive member to move and drives the second elastic arm to deform, and moving directions of the first conductive member and the second conductive member are opposite to each other.

In certain embodiments, in the step C, each of the conductive terminals comprises one of the elastic arms and two of the conductive members, the one of the elastic arms formed by cutting is soldered and fixed with the two of the conductive members, the two of the conductive members comprise a first conductive member and a second conductive member, the first conductive member is soldered and fixed to a first surface of the one of the elastic arms, the second conductive member is soldered and fixed to a second surface of the one of the elastic arms, the first surface and the second surface of the one of the elastic arms are arranged opposite to each other in the vertical direction, and the first conductive member and the second conductive member are provided to be staggered in the vertical direction; and in the step E, the second electronic component firstly abuts upward the second conductive member to move and drives the one of the elastic arms to deform, the first electronic component then presses downward on the first conductive member to move and drives the one of the elastic arms to deform, and moving directions of the first conductive member and the second conductive member are opposite to each other.

In certain embodiments, in the step A, the metal plate is cut to further form a plurality of tail portions, and each of the tail portions is formed from an end of the corresponding one of the base portions away from a corresponding one of the pre-soldering area; in the step C, the one of the conductive terminals comprises the corresponding one of the base portions, the at least one of the elastic arms, the at least one of the conductive members and a corresponding one of the tail portions; and in the step D, the tail portions are not covered and fixed by the insulating body.

In certain embodiments, in the step C, the free end of a specific one of the elastic arms and the tail portion connected to an adjacent one of the elastic arms are cut and separated, and the tail portion connected to the adjacent one of the elastic arms is formed with a reserved space to accommodate the free end of the specific one of the elastic arms.

In certain embodiments, a plurality of soldered bodies are provided, and each of the soldered bodies is soldered to each of the tail portions.

In certain embodiments, in the step D, the insulating body is formed with a plurality of reserved spaces during the insert-molding, and the elastic arms and the conductive members are exposed in the reserved spaces running vertical through the insulating body; and in the step E, the first electronic component and the second electronic component abut the elastic arms and the conductive members to deform and move vertically in the reserved spaces.

Another technical solution being adopted is:

A method of manufacturing an electrical connector is provided. The electrical connector is configured to electrically connect a first electronic component to a second electronic component. The method includes: step I: providing a metal plate, and cutting the metal plate to form a plurality of base portions and a plurality of pre-soldering areas, wherein each of the base portions is connected to at least one of the pre-soldering areas; step II: after the step I or simultaneously in the step I, cutting the pre-soldering areas to form a plurality of elastic arms, wherein at least one of the elastic arms is connected to a corresponding one of the base portions, an end of the at least one of the elastic arms away from the corresponding one of the base portions is a free end; step III: after the step II, providing a plurality of conductive posts, and soldering at least one of the conductive posts to the end of the at least one of the elastic arms away from the corresponding one of the base portions, wherein one of a plurality of conductive terminals comprises the corresponding one of the base portions, the at least one of the elastic arms and the at least one of the conductive posts; step IV: forming an insulating body on the conductive terminals by insert-molding, wherein the corresponding one of the base portions is covered and fixed by the insulating body, and wherein the step IV is performed between the step I and the step II, and the pre-soldering areas are exposed out of the insulating body; or the step IV is performed between the step II and step III, and the at least one of the elastic arms are exposed out of the insulating body; or the step IV is performed after the step III, and the at least one of the elastic arms and the at least one of the conductive posts are exposed out of the insulating body; and step V: after the step IV, forming the conductive terminals by cutting, wherein at least some of the conductive terminals are separated from each other and are not in contact with each other, thus completing manufacturing of the electrical connector, wherein each of the conductive posts is configured to be electrically connected to the first electronic component, and the first electronic component abuts the conductive posts to move and simultaneously drive the elastic arms to deform, thus transmitting signals of the first electronic component to the second electronic component.

In certain embodiments, in the step III, each of the conductive terminals comprises two of the elastic arms and two of the conductive posts, the two of the elastic arms comprise a first elastic arm and a second elastic arm, and the first elastic arm and the second elastic arm are connected to the same corresponding one of the base portions and extend respectively along two opposite side directions of the corresponding one of the base portions, the two of the conductive posts comprise a first conductive post and a second conductive post, the first elastic arm is soldered and fixed with only the first conductive post, the second elastic arm is soldered and fixed with only the second conductive post, and the first conductive post and the second conductive post are provided to be staggered in the vertical direction; and in the step V, the first electronic component presses downward on the first conductive post to move and drives the first elastic arm to deform, the second electronic component abuts upward the second conductive post to move and drives the second elastic arm to deform, and moving directions of the first conductive post and the second conductive post are opposite to each other.

In certain embodiments, in the step III, each of the conductive terminals comprises one of the elastic arms and two of the conductive posts, the two of the conductive posts are soldered to a same one of the elastic arms, the two of the conductive posts comprise a first conductive post and a second conductive post, the first conductive post is soldered and fixed to a first surface of the free end of same one of the elastic arms, the second conductive post is soldered and fixed to a second surface of the free end of the same one of the elastic arms, the first surface and the second surface of the same one of the elastic arms are arranged opposite to each other in the vertical direction, and the first conductive post and the second conductive post are provided to be staggered in the vertical direction; and in the step V, the second electronic component firstly abuts upward the second conductive post to move and drives the one of the elastic arms to deform, the first electronic component then presses downward on the first conductive post to move and drives the one of the elastic arms to deform, and moving directions of the first conductive post and the second conductive post are opposite to each other.

In certain embodiments, in the step I, the metal plate is cut to further form a plurality of tail portions, and each of the tail portions is formed from an end of the corresponding one of the base portions away from a corresponding one of the pre-soldering area; in the step III, the one of the conductive terminals comprises the corresponding one of the base portions, the at least one of the elastic arms, the at least one of the conductive posts and a corresponding one of the tail portions; and in the step IV, the tail portions are not covered and fixed by the insulating body.

In certain embodiments, in the step II, the free end of a specific one of the elastic arms and the tail portion connected to an adjacent one of the elastic arms are cut and separated, and the tail portion connected to the adjacent one of the elastic arms is formed with a reserved space to accommodate the free end of the specific one of the elastic arms.

In certain embodiments, a plurality of soldered bodies are provided, and each of the soldered bodies is soldered to each of the tail portions.

In certain embodiments, in the step IV, the insulating body is formed with a plurality of reserved spaces during the insert-molding, and the elastic arms and the conductive posts are exposed in the reserved spaces running vertical through the insulating body; and in the step V, the first electronic component and the second electronic component abut the elastic arms and the conductive posts to deform and move vertically in the reserved spaces.

Another technical solution being adopted is:

An electrical connector is configured to electrically connect a first electronic component to a second electronic component. The electrical connector includes: an insulating body, having a plurality of accommodating slots, wherein each of the accommodating slots has a reserved space therein; and a plurality of conductive terminals, wherein the insulating body and the conductive terminals are formed by insert-molding; wherein each of the conductive terminals has a base portion, at least one elastic arm integrally connected to the base portion and at least one conductive post soldered to an end of the at least one elastic arm away from the base portion, the base portion is fixed in the insulating body, the at least one elastic arm and the at least one conductive post are exposed to the reserved space of a corresponding one of the accommodating slots, and the end of the at least one elastic arm away from the base portion is a free end; wherein each of the at least one conductive post has a soldering portion and a contact portion integrally connected to the soldering portion, the soldering portion is soldered and fixed to the free end, the first electronic component is configured to abut the contact portion to move toward a direction close to the second electronic component and to drive the at least one elastic arm to deform toward the reserved space of the corresponding one of the accommodating slots.

In certain embodiments, each of the conductive terminals comprises two of the elastic arms and two of the conductive posts; the two of the elastic arms comprise a first elastic arm and a second elastic arm, and the first elastic arm and the second elastic arm are connected to the same corresponding one of the base portions and extend respectively along two opposite side directions of the corresponding one of the base portions; the two of the conductive posts comprise a first conductive post and a second conductive post, the first elastic arm is soldered and fixed with only the first conductive post, the second elastic arm is soldered and fixed with only the second conductive post, and the first conductive post and the second conductive post are provided to be staggered in the vertical direction; and the second electronic component firstly abuts upward the second conductive post to move and drives the second elastic arm to deform, the first electronic component then presses downward on the first conductive post to move and drives the first elastic arm to deform, and moving directions of the first conductive post and the second conductive post are opposite to each other.

In certain embodiments, each of the conductive terminals comprises one of the elastic arms and two of the conductive posts, the one of the elastic arms is soldered and fixed with the two of the conductive posts, the two of the conductive posts comprise a first conductive post and a second conductive post, the first conductive post is soldered and fixed to a first surface of the free end of the one of the elastic arms, the second conductive post is soldered and fixed to a second surface of the free end of the one of the elastic arms, the first surface and the second surface of the free end of the one of the elastic arms are arranged opposite to each other in the vertical direction, and the first conductive post and the second conductive post are provided to be staggered in the vertical direction; and the second electronic component firstly abuts upward the second conductive post to move and drives the one of the elastic arms to deform, the first electronic component then presses downward on the first conductive post to move and drives the one of the elastic arms to deform, and moving directions of the first conductive post and the second conductive posts are opposite to each other.

In certain embodiments, the conductive terminals comprise at least one signal terminal and at least one ground terminal adjacent to and separated from each other, an end of the base portion of each of the at least one signal terminal close to the free end of the at least one ground terminal is provided with a reserved space, and the free end of the at least one ground terminal is at least partially located in the reserved space.

In certain embodiments, each of the conductive terminals further has a tail portion extended from the end of the base portion away from the at least one elastic arm, the tail portion of each of the conductive terminals is soldered to a solder body, and the solder body is configured to be directly soldered downward to the second electronic component.

Compared with the related art, certain embodiments of the present invention has the following beneficial effects.

The base portions and the elastic arms of the conductive terminals are formed by cutting the same metal plate, and are insert-molded to form the electrical connector. The forming process of the elastic arms is simple without the need to be assembled to the insulating body. In the case where the forming process of the elastic arms is simple without the need to be assembled to the insulating body, the conductive members are soldered and fixed to the elastic arms, thus abutting the conductive members through the electronic components, and driving the elastic arms to deform. Since the length of each elastic arm is relatively shorter than the length of the first elastic arm having the first contact portion bending in the background, only the elastic arms are deformed, and the conductive members only move and are not deformed, thereby ensuring each elastic arm to have a sufficient normal force to abut the corresponding electronic component, and reducing the fatigue loss of the elastic arms, thus preventing from the permanent deformation thereof and maintaining a stable contact status.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
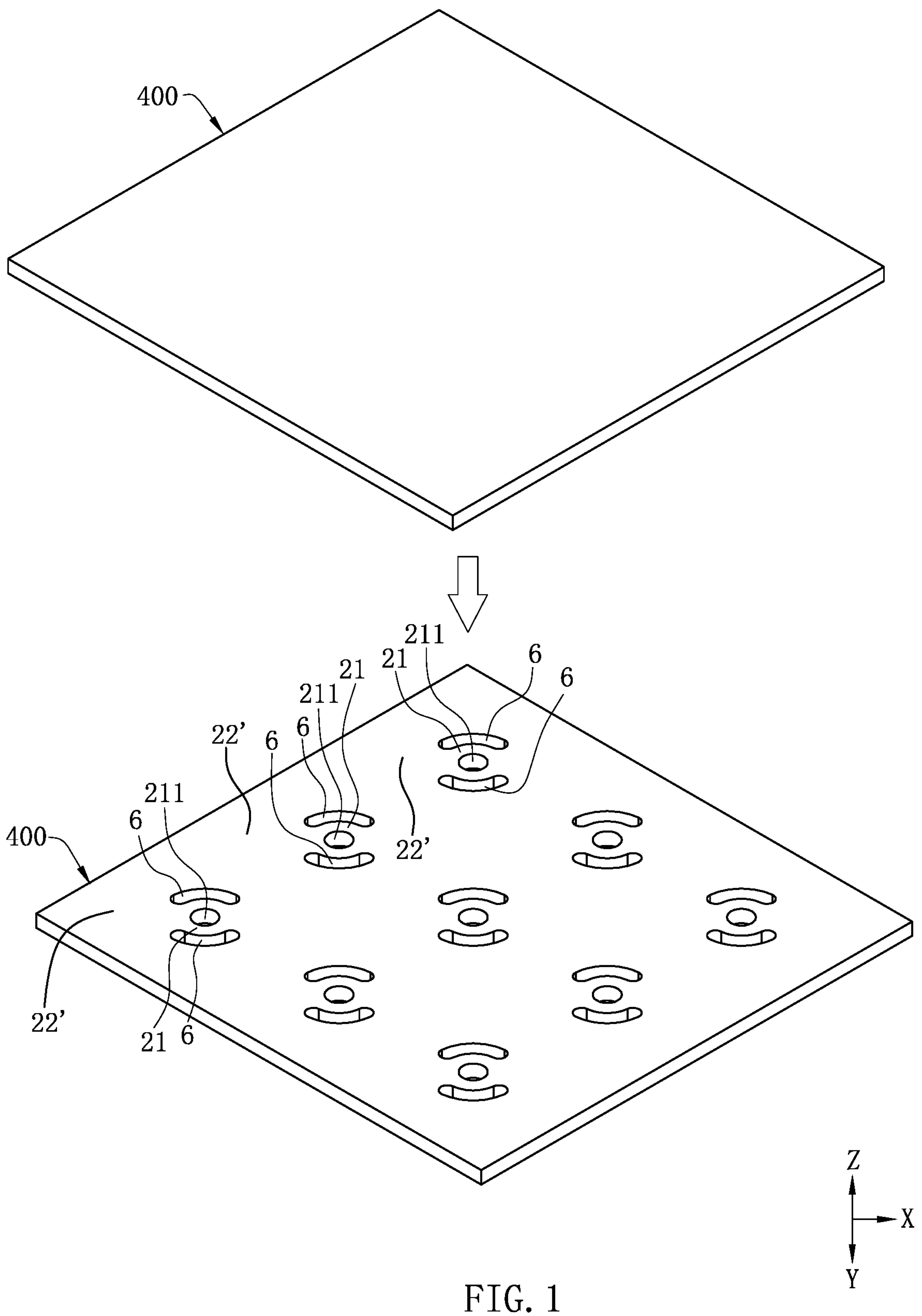
FIG. 1 is a schematic view of cutting a metal plate according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-79F. In accordance with the purposes of this invention, as embodied and broadly described herein, this invention, in one aspect, relates to an electrical connector and a method of manufacturing an electrical connector.

Figure 75:
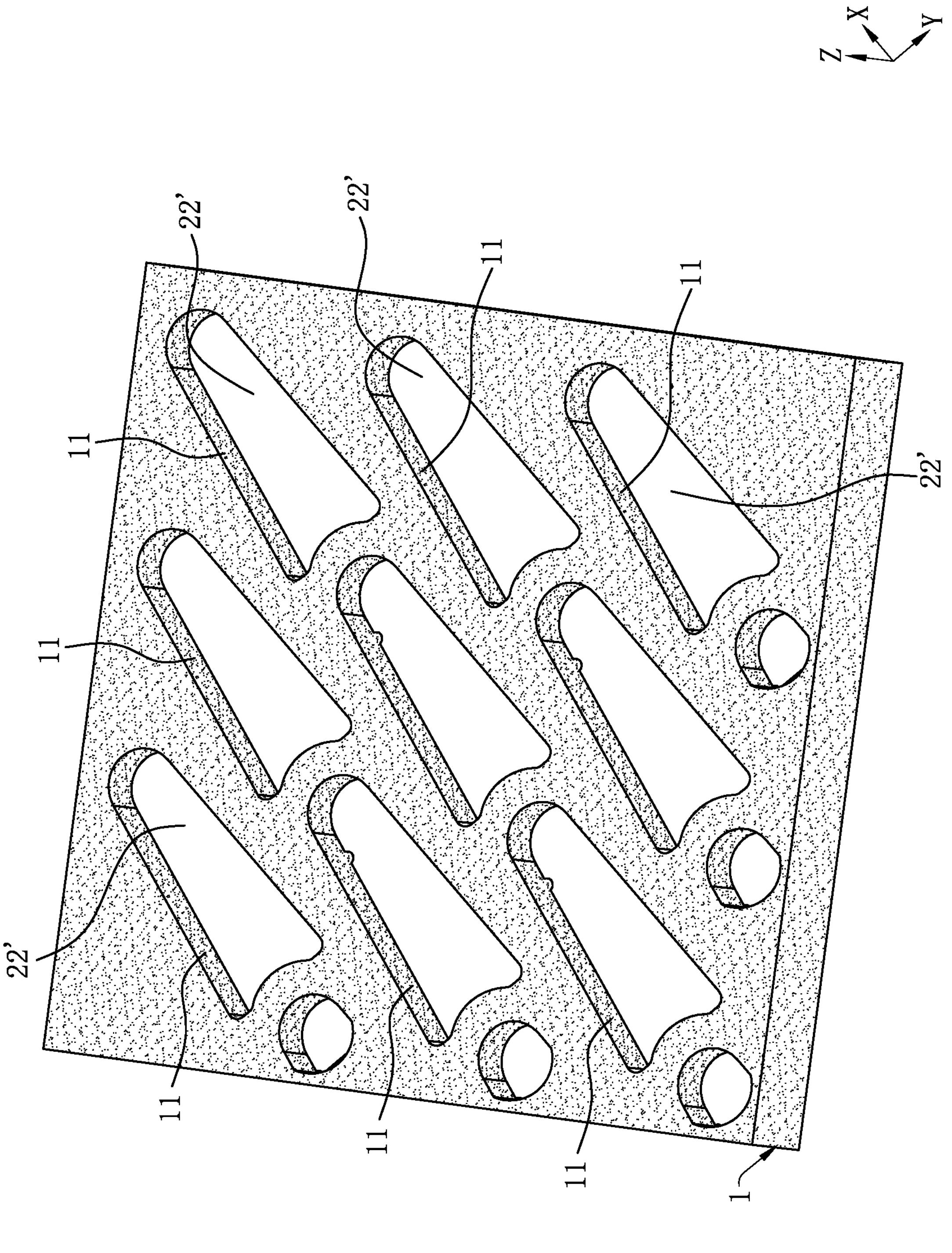
FIG. 75 is a schematic view of obtaining the insulating body through yet another type of insert-molding process according to the fourth embodiment of the present invention.

As shown in FIG. 1 to FIG. 75, in the electrical connector 100 according to certain embodiments of the present invention, a diagonal direction is defined as a front-rear direction, and a direction perpendicular to the diagonal direction and a vertical direction is defined as a left-right direction.

FIG. 1 to FIG. 19 show an electrical connector 100 according to a first embodiment of the present invention. The electrical connector 100 is used to electrically connect a first electronic component 200 and a second electronic component 300. Preferably, the first electronic component 200 is a chip module, and the second electronic component 300 is a circuit board. The electrical connector 100 includes an insulating body 1, and a plurality of conductive terminals 2 provided in the insulating body 1 through insert-molding. The conductive terminals 2 include a plurality of ground terminals 2G and a plurality of signal terminals 2S used to transmit signals. In this embodiment, the conductive terminals 2 and a conductive plate 3 are formed by cutting a same metal plate 400.

Figure 5:
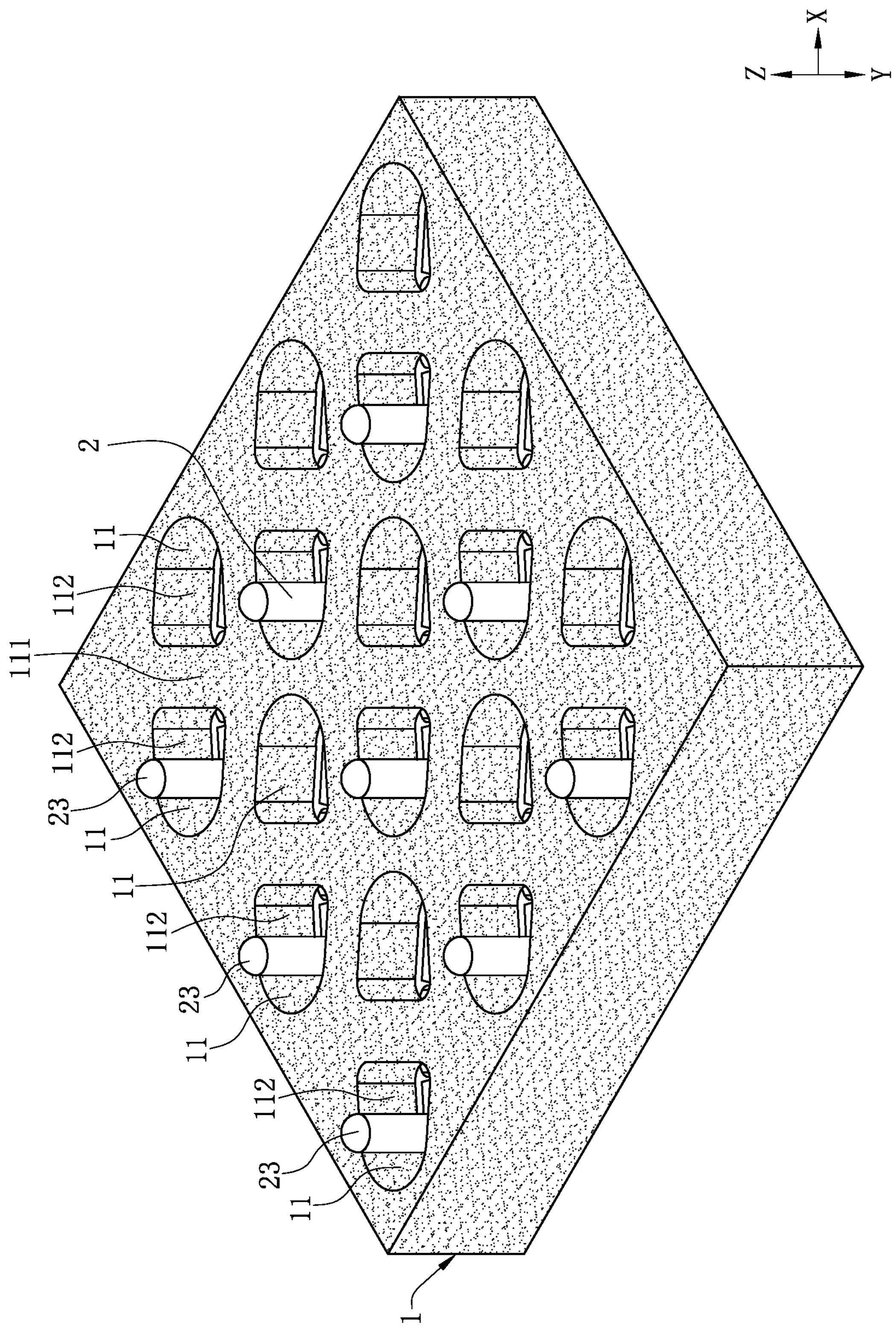
FIG. 5 is a schematic view of obtaining the insulating body through one type of insert-molding process according to the first embodiment of the present invention.

As shown in FIG. 5, the insulating body 1 includes a plurality of accommodating slots 11. Each accommodating slot 11 is provided with a lateral beam portion 111 located in the middle of the accommodating slot 11 and two reserved spaces 112 separated by the lateral beam portion 111. The reserved spaces 112 run through the insulating body 1 in the vertical direction.

As shown in FIG. 3 to FIG. 10, each conductive terminal 2 has a base portion 21, a first elastic arm 221 and a second elastic arm 222 integrally connected to the base portion 21, and two conductive members 23 respectively soldered to the first elastic arm 221 and the second elastic arm 222. In this embodiment, each conductive member 23 is a cylindrical shaped conductive post. The base portion 21 is covered and fixed by the lateral beam portion 111, and the base portion 21 is provided with a through hole 211 running through the base portion 21. The through hole 211 is filled by the plastic material forming the insulating body 1 to enhance fixing the base portion 21. The first elastic arm 221 and the second elastic arm 222 extend along two opposite sides of the base portion 21 and are correspondingly exposed in different reserved spaces 112. The end of the first elastic arm 221 and the end of the second elastic arm 222 respectively away from the base portion 21 are free ends 223. Each conductive member 23 has a soldering portion 231 soldered and fixed to the free end 223 and a contact portion 232 integrally connected to the soldering portion 231. The two contact portions 232 are respectively used to abut the first electronic component 200 and the second electronic component 300. The two conductive members 23 has a first conductive member 233 and a second conductive member 234. The first elastic arm 221 is only soldered and fixed with one first conductive member 233, and the second elastic arm 222 is only soldered and fixed with one second conductive member 234. The first conductive member 233 and the second conductive member 234 are provided to be staggered in the vertical direction. The second electronic component 300 firstly abuts upward the second conductive member 234 to move and drives the second elastic arm 222 to deform upward toward the other of the reserved spaces 112, and the first electronic component 200 then presses downward on the first conductive member 233 to move and drives the first elastic arm 221 to deform downward toward one of the reserved spaces 112. In other embodiments, the conductive members 23 may be conductive blocks, soldering posts or solder balls.

Figure 7:
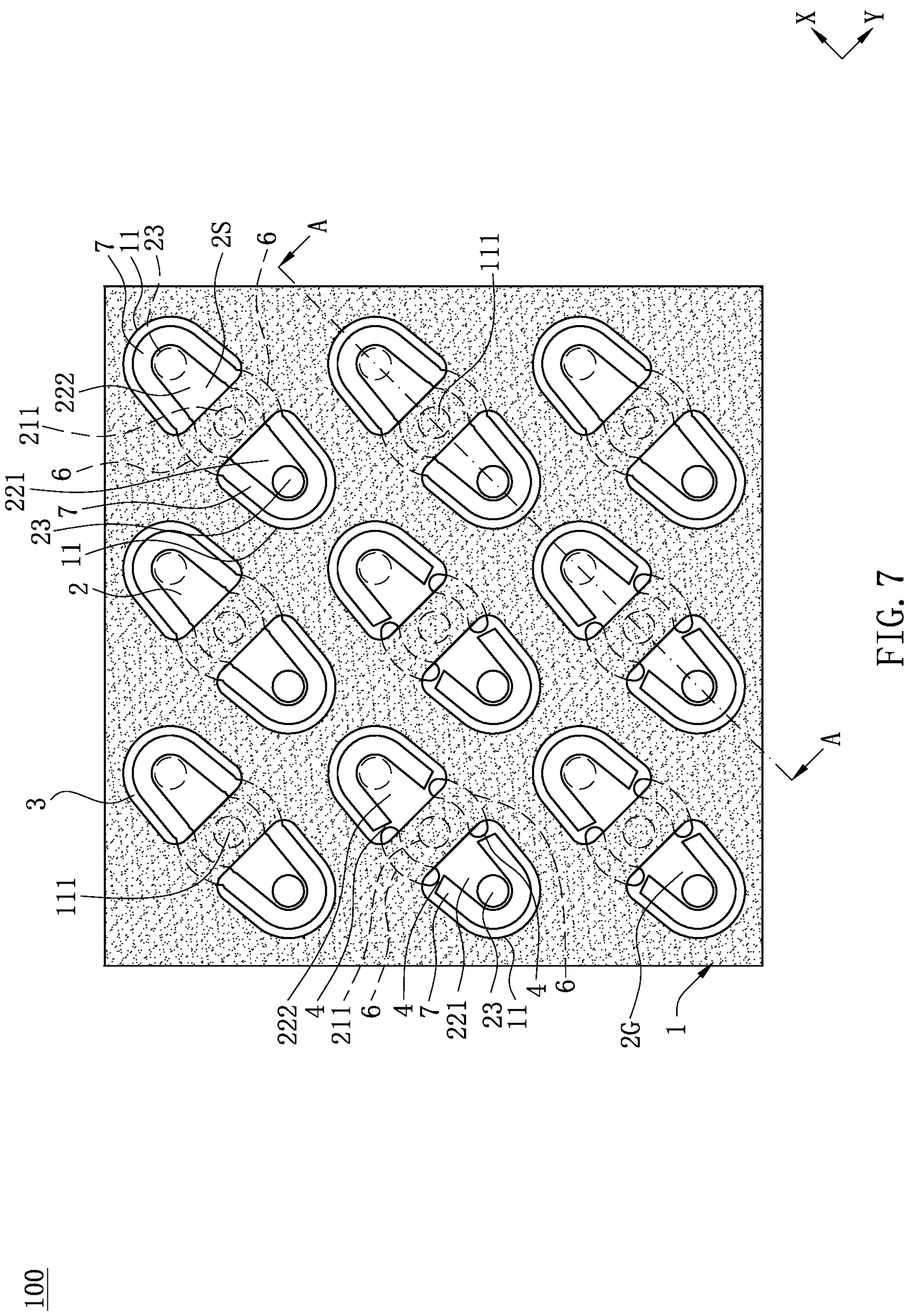
FIG. 7 is a top view of cutting the connecting portions according to the first embodiment of the present invention.
Figure 8:
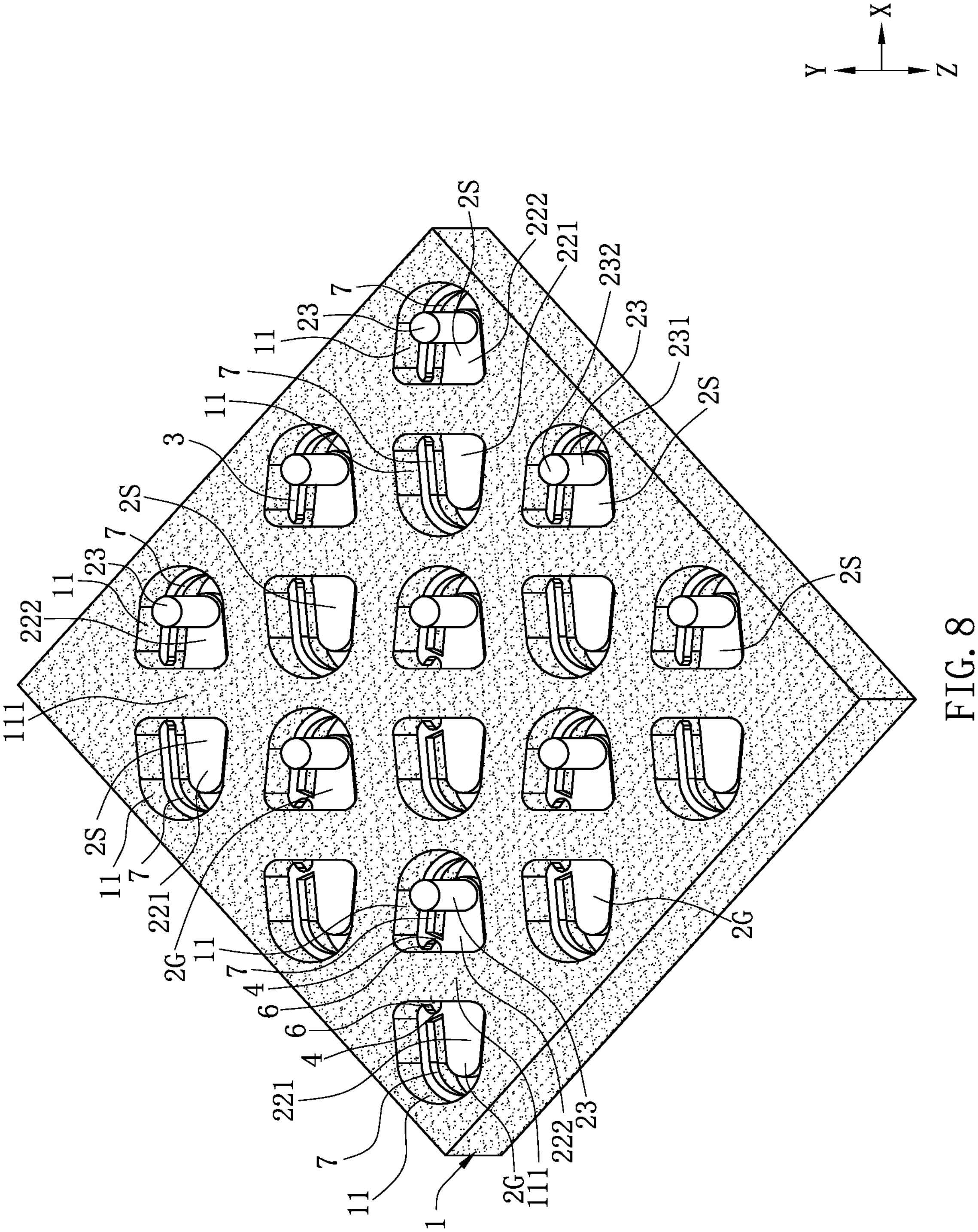
FIG. 8 is a perspective view of FIG. 7.
Figure 9:
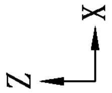
FIG. 9 is a partial sectional view of FIG. 7 along the A-A direction.
Figure 9:
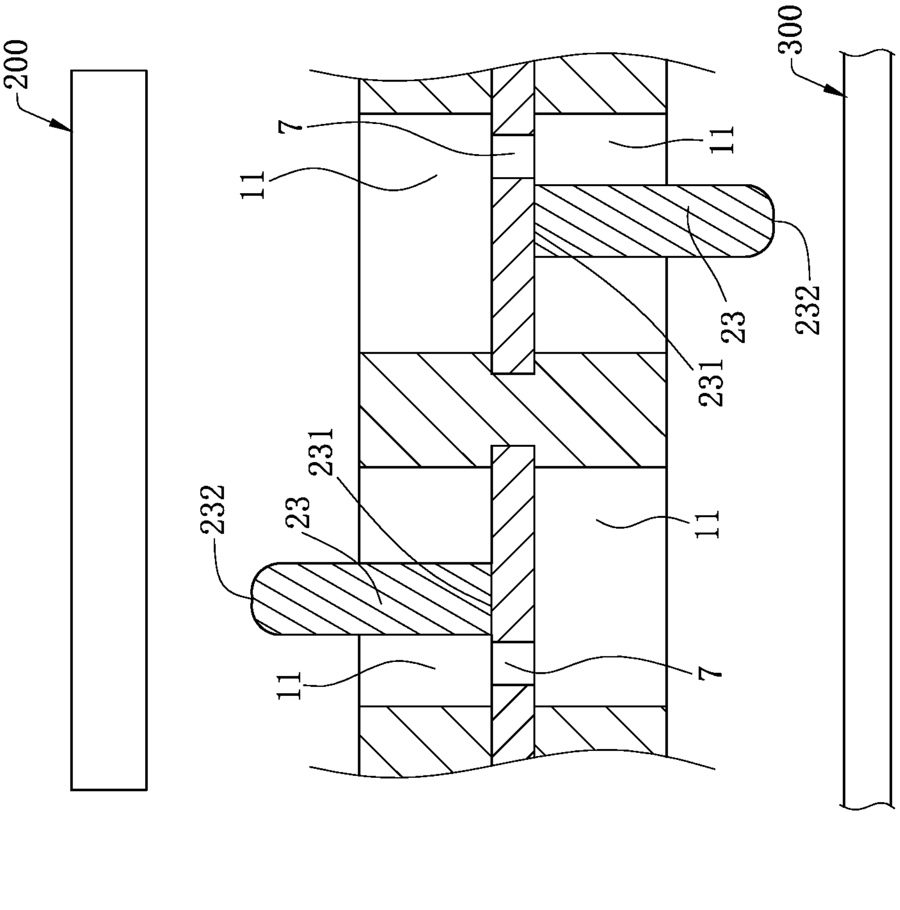
Figure 10:
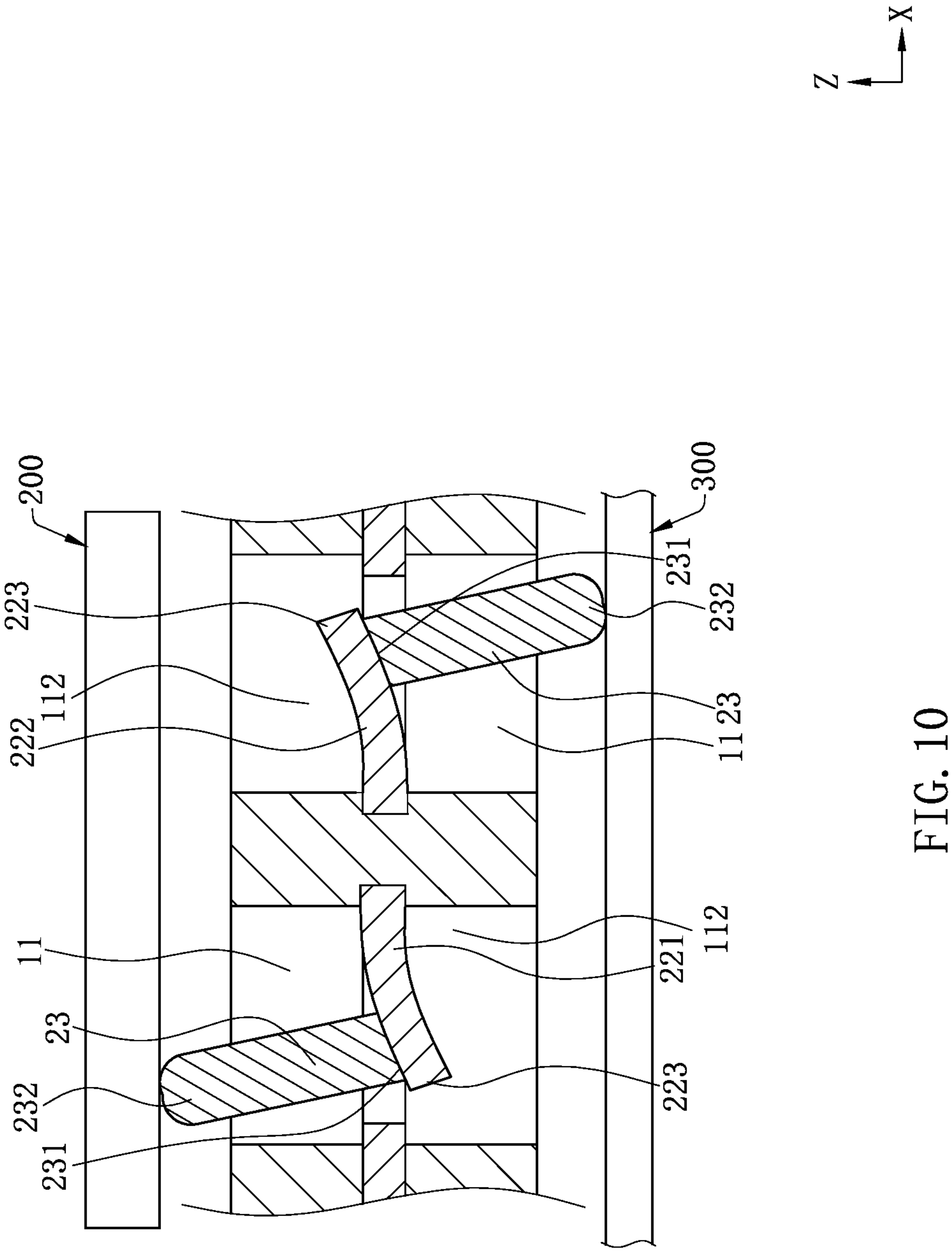
FIG. 10 is a schematic view of FIG. 9 after mating with an electronic component.

As shown in FIG. 7 to FIG. 8, the signal terminals 2S are broken from the conductive plate 3 to form electrical insulation therebetween. The ground terminals 2G are integrally connected with the conductive plate 3 through the connecting portions 4 to form electrical connections therebetween. At the two sides of each base portion 21, two through slots 6 are formed between the conductive plate 3 and the connecting portions 4. Each through slot 6 is partially filled by the plastic material forming the insulating body 1 to enhance fixing the base portion 21. Each of the outer side of the first elastic arm 221 and the outer side of the second elastic arm 222 is provided with a cutting slot 7. The connecting portions 4 separate the through slots 6 and the cutting slots 7. In other embodiments, all of the conductive terminals 2, including the ground terminals 2G, are broken from the conductive plate 3 to maintain electrical insulation therebetween, thus satisfying the required electronic characteristics at different usage scenarios.

FIG. 20 to FIG. 38 show an electrical connector 100 according to a second embodiment of the present invention. The electrical connector 100 is used to electrically connect a first electronic component 200 and a second electronic component 300. Preferably, the first electronic component 200 is a chip module, and the second electronic component 300 is a circuit board. The electrical connector 100 includes an insulating body 1, and a plurality of conductive terminals 2 provided in the insulating body 1 through insert-molding. The conductive terminals 2 include a plurality of ground terminals 2G and a plurality of signal terminals 2S used to transmit signals. In this embodiment, the conductive terminals 2 and a conductive plate 3 are formed by cutting a same metal plate 400.

Figure 25:
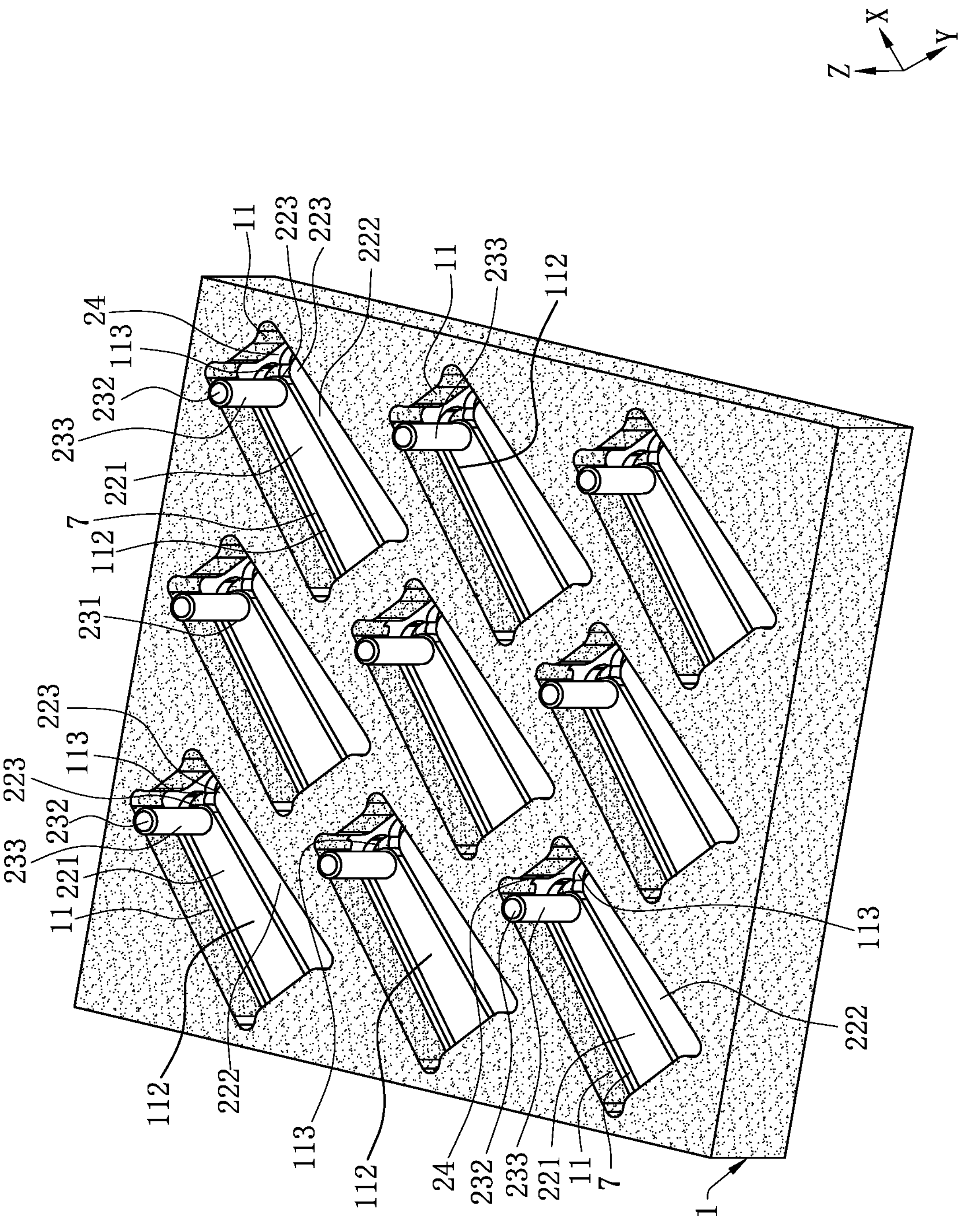
FIG. 25 is a schematic view of obtaining the insulating body through one type of insert-molding process according to the second embodiment of the present invention.

As shown in FIG. 25, the insulating body 1 includes a plurality of accommodating slots 11, and each accommodating slot 11 is provided with a reserved space 112. The reserved space 112 runs through the insulating body 1 in the vertical direction.

As shown in FIG. 22 to FIG. 31, each conductive terminal 2 has a base portion 21, a first elastic arm 221 and a second elastic arm 222 integrally connected to the base portion 21, two conductive members 23 respectively soldered to the first elastic arm 221 and the second elastic arm 222, and a tail portion 24 extending from the base portion 21 away from the first elastic arm 221 and the second elastic arm 222. In this embodiment, each conductive member 23 is a cylindrical shaped conductive post. The base portion 21 is provided with a through hole 211 running through the base portion 21. The through hole 211 is filled by the plastic material forming the insulating body 1 to enhance fixing the base portion 21. The first elastic arm 221 and the second elastic arm 222 extend along a same side of the base portion 21, and are exposed in the reserved space 112. The end of the first elastic arm 221 and the end of the second elastic arm 222 respectively away from the base portion 21 are free ends 223. Each conductive member 23 has a soldering portion 231 soldered and fixed to the free end 223 and a contact portion 232 integrally connected to the soldering portion 231. The two contact portions 232 are respectively used to abut the first electronic component 200 and the second electronic component 300. The two conductive members 23 has a first conductive member 233 and a second conductive member 234. The first elastic arm 221 is only soldered and fixed with one first conductive member 233, and the second elastic arm 222 is only soldered and fixed with one first conductive member 234. The first conductive member 233 and the second conductive member 234 are provided to be staggered in the vertical direction. The tail portion 24 is not covered and fixed by the insulating body 1. The second electronic component 300 firstly abuts upward the second conductive member 234 to move and drives the second elastic arm 222 to deform upward toward the reserved space 112, and the first electronic component 200 then presses downward on the first conductive member 233 to move and drives the first elastic arm 221 to deform downward toward the reserved space 112. In other embodiments, the conductive members 23 may be conductive blocks, soldering posts or solder balls.

Figure 27:
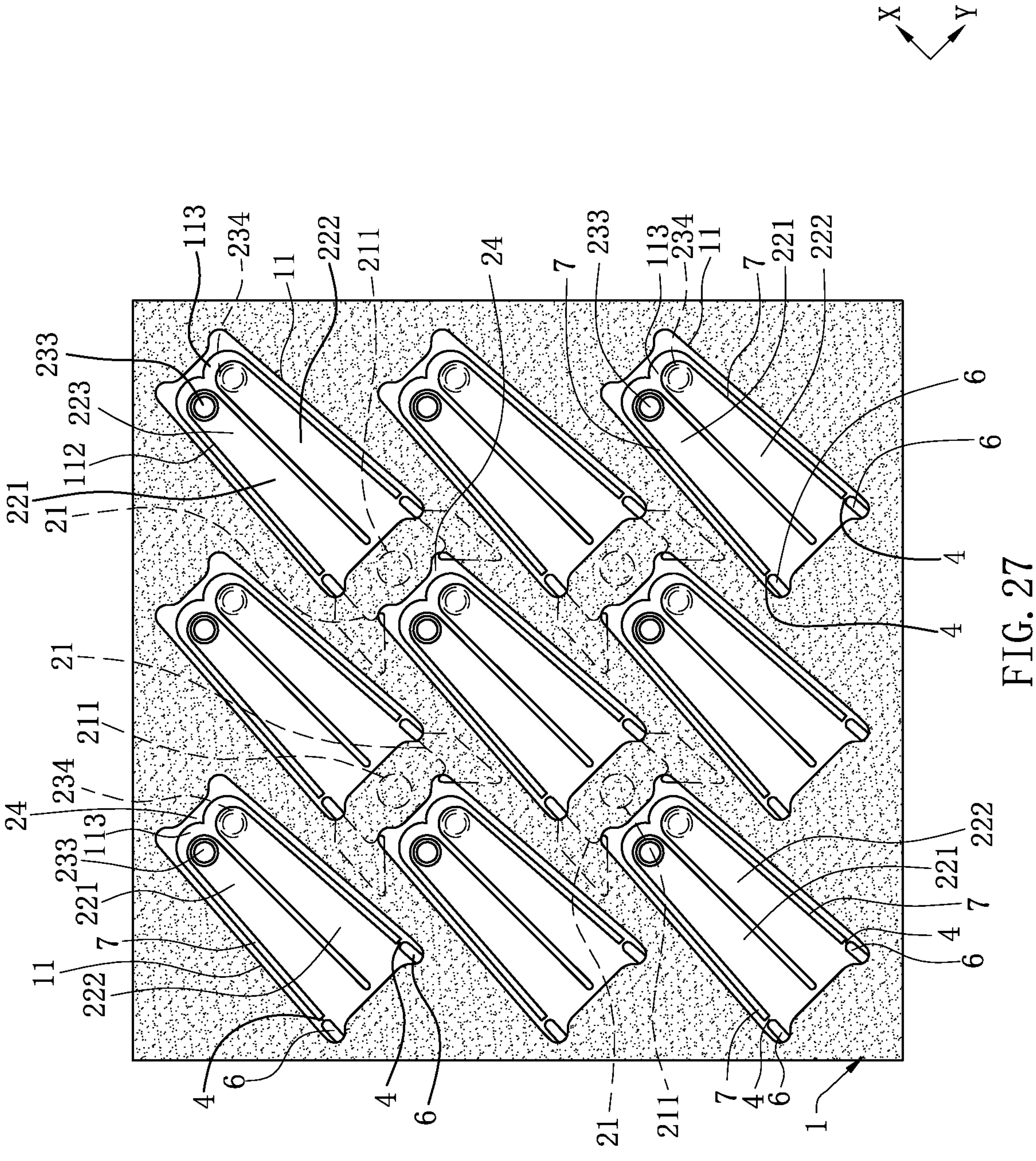
FIG. 27 is a top view of FIG. 25.

As shown in FIG. 27, for a same conductive terminal 2, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction, the tail portion 24 of the conductive terminal 2 located in front thereof and the first elastic arm 221 and the second elastic arm 222 of the conductive terminal 2 located behind are exposed in the same accommodating slot 11. The tail portion 24 of the conductive terminal 2 located in front thereof is provided with a reserved space 113 running vertically through the insulating body 1, and the free ends 223 of the conductive terminal 2 located behind are partially forward located in the reserved space 113 of the conductive terminal 2 located in front thereof, thus reducing the distance between the two adjacent conductive terminals 2.

Figure 28:
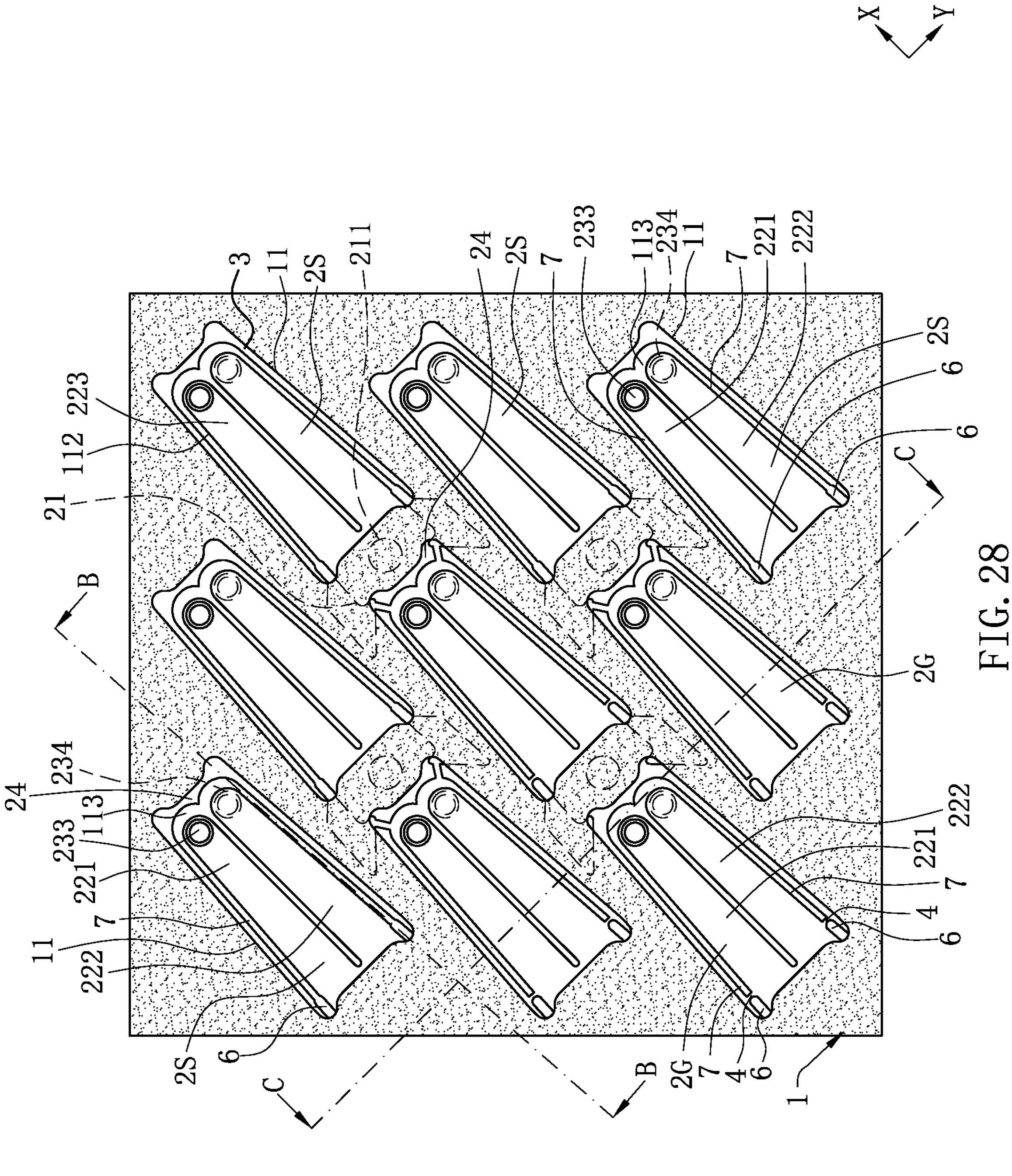
FIG. 28 is a top view of cutting the connecting portions according to the second embodiment of the present invention.
Figure 29:
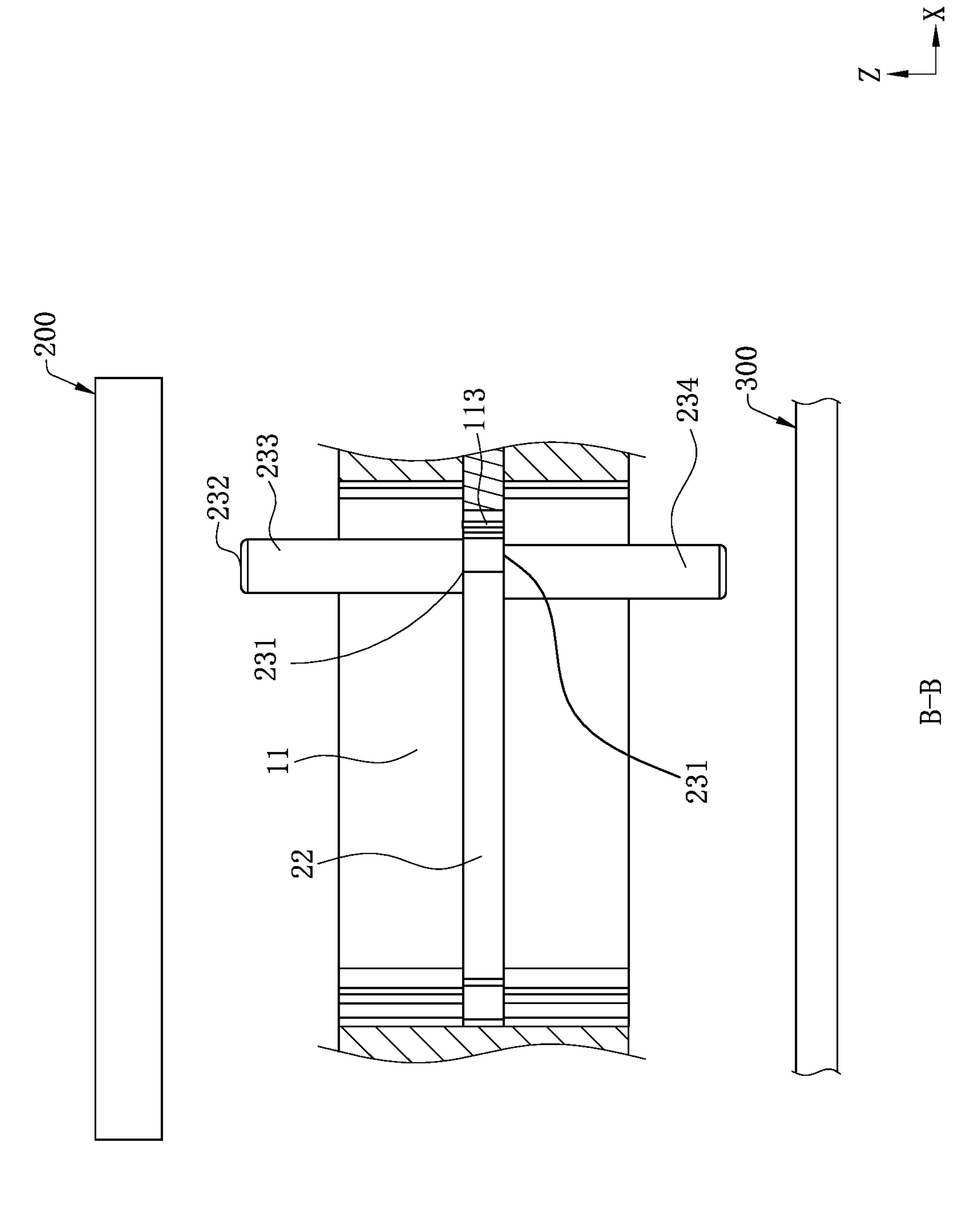
FIG. 29 is a partial sectional view of FIG. 28 along the B-B direction.
Figure 30:
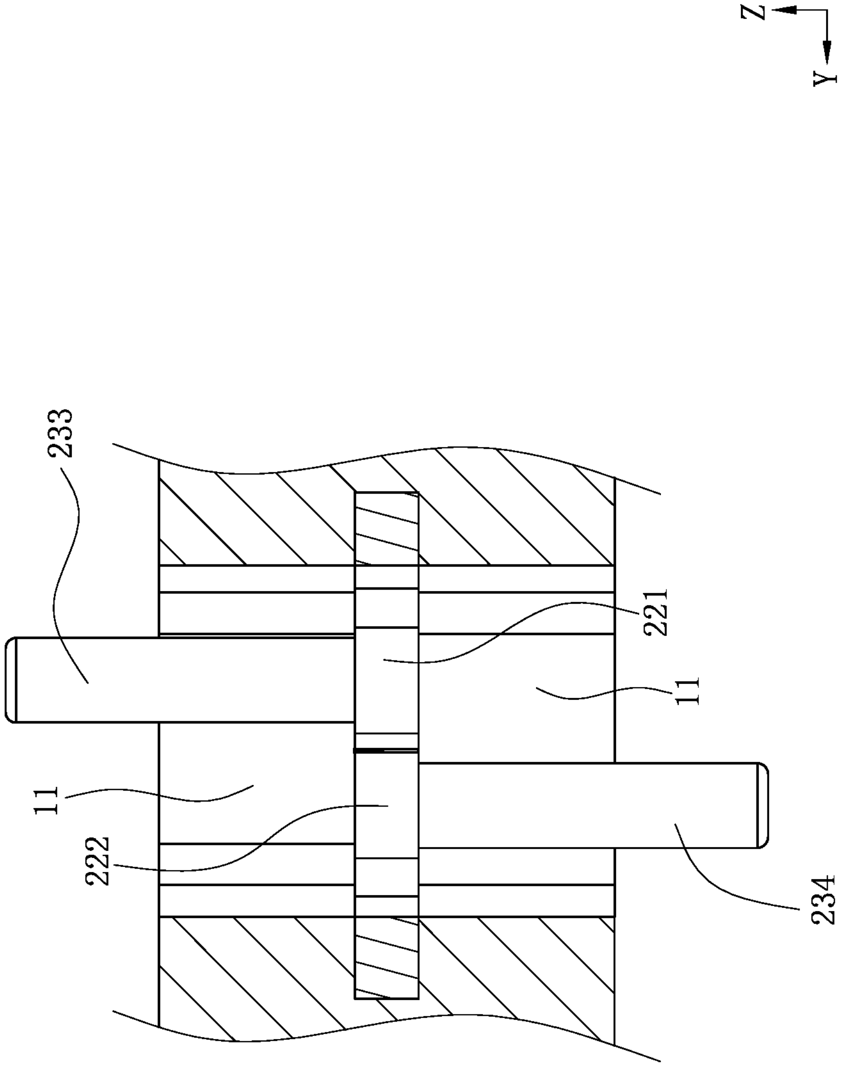
FIG. 30 is a partial sectional view of FIG. 28 along the C-C direction.
Figure 31:
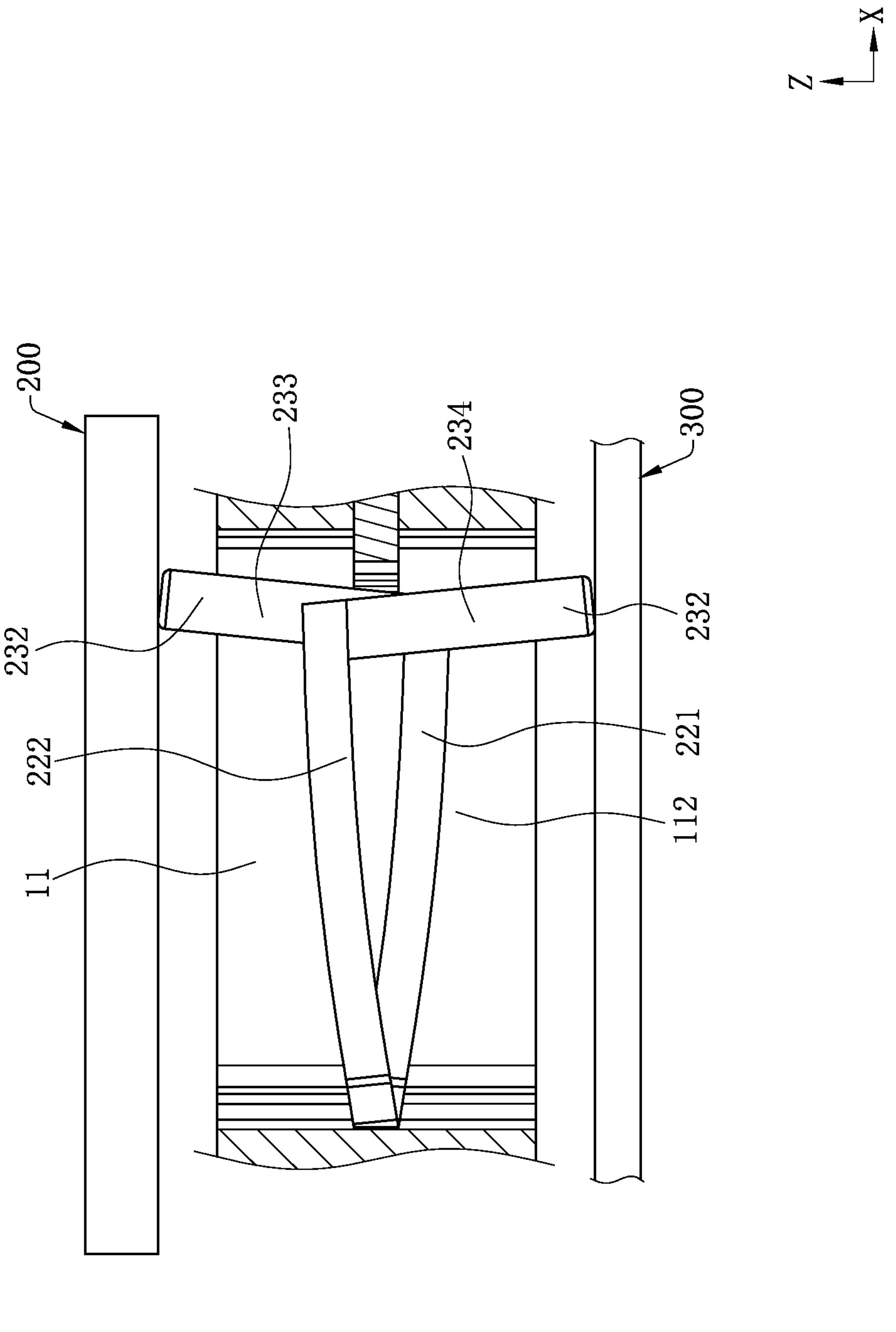
FIG. 31 is a schematic view of FIG. 29 after mating with an electronic component.

As shown in FIG. 28, the signal terminals 2S are broken from the conductive plate 3 to form electrical insulation therebetween. The ground terminals 2G are integrally connected with the conductive plate 3 through the connecting portions 4 to form electrical connections therebetween. At the two sides of each base portion 21, two through slots 6 are formed between the conductive plate 3 and the connecting portions 4. Each through slot 6 is partially filled by the plastic material forming the insulating body 1 to enhance fixing the base portion 21. Each of the outer side of the first elastic arm 221 and the outer side of the second elastic arm 222 is provided with a cutting slot 7. The connecting portions 4 separate the through slots 6 and the cutting slots 7. In other embodiments, all of the conductive terminals 2, including the ground terminals 2G, are broken from the conductive plate 3 to maintain electrical insulation therebetween, thus satisfying the required electronic characteristics at different usage scenarios.

FIG. 39 to FIG. 57 show an electrical connector 100 according to a third embodiment of the present invention. The electrical connector 100 is used to electrically connect a first electronic component 200 and a second electronic component 300. Preferably, the first electronic component 200 is a chip module, and the second electronic component 300 is a circuit board. The electrical connector 100 includes an insulating body 1, and a plurality of conductive terminals 2 provided in the insulating body 1 through insert-molding. The conductive terminals 2 include a plurality of ground terminals 2G and a plurality of signal terminals 2S used to transmit signals. In this embodiment, the conductive terminals 2 and a conductive plate 3 are formed by cutting a same metal plate 400.

Figure 44:
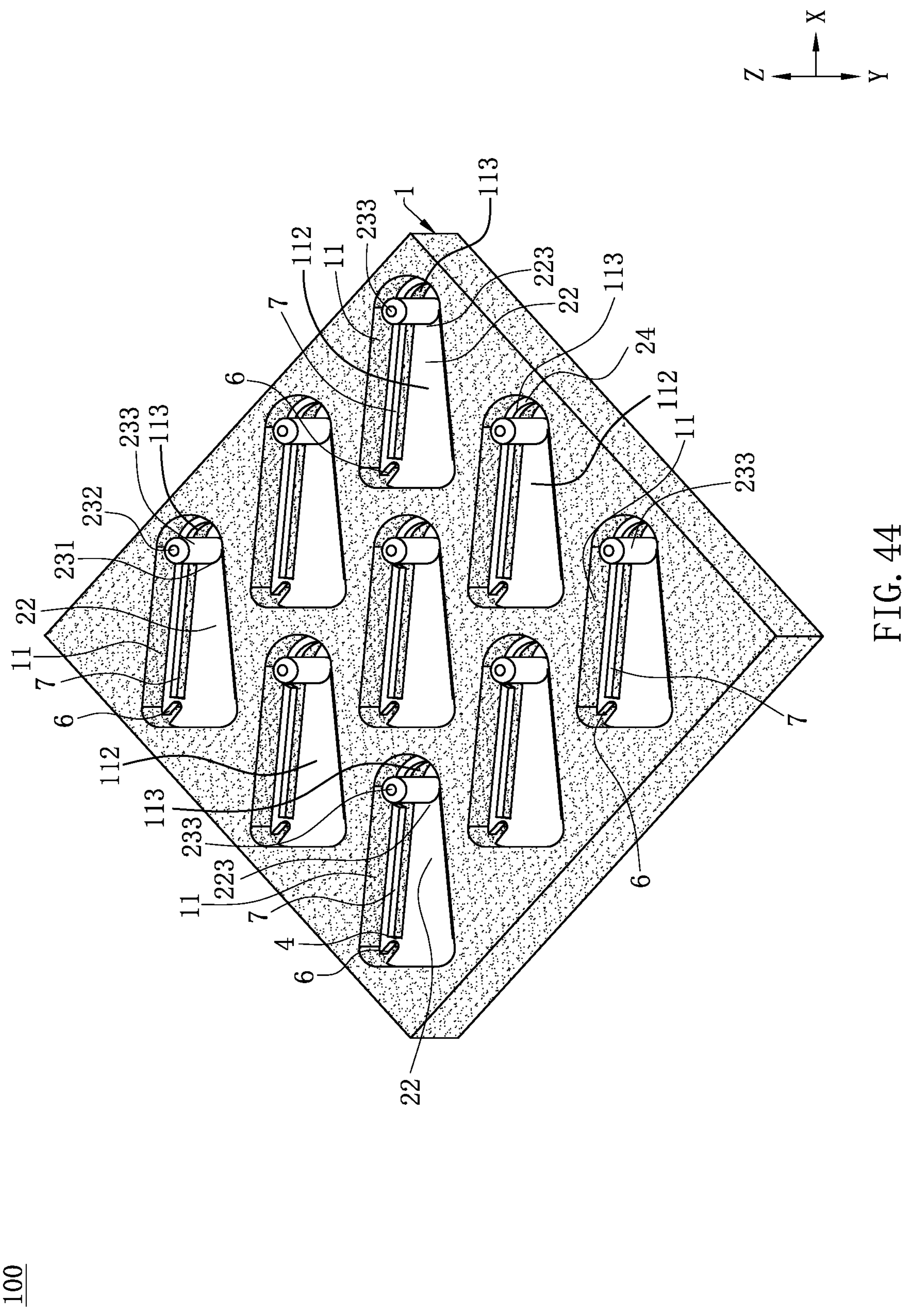
FIG. 44 is a schematic view of obtaining the insulating body through one type of insert-molding process according to the third embodiment of the present invention.

As shown in FIG. 44, the insulating body 1 includes a plurality of accommodating slots 11, and each accommodating slot 11 is provided with a reserved space 112. The reserved space 112 runs through the insulating body 1 in the vertical direction.

As shown in FIG. 41 to FIG. 50, each conductive terminal 2 has a base portion 21, an elastic arm 22 integrally connected to the base portion 21, two conductive members 23 respectively soldered to the elastic arm 22, and a tail portion 24 extending from the base portion 21 away from the elastic arm 22. In this embodiment, each conductive member 23 is a cylindrical shaped conductive post. The base portion 21 is provided with a through hole 211 running through the base portion 21. The through hole 211 is filled by the plastic material forming the insulating body 1 to enhance fixing the base portion 21. The end of the elastic arm 22 away from the base portion 21 is a free end 223. Each conductive member 23 has a soldering portion 231 soldered and fixed to the free end 223 and a contact portion 232 integrally connected to the soldering portion 231. The two contact portions 232 are respectively used to abut the first electronic component 200 and the second electronic component 300. The two conductive members 23 has a first conductive member 233 and a second conductive member 234. The soldering portion 231 of the first conductive member 233 is soldered and fixed to a first surface of the free end 223, and the soldering portion 231 of the second conductive member 234 is soldered and fixed to a second surface of the free end 223. The first surface and the second surface are two surfaces of the free end 223 which are arranged opposite to each other in the vertical direction. The first conductive member 233 and the second conductive member 234 are provided to be staggered in the vertical direction. The tail portion 24 is not covered and fixed by the insulating body 1. The second electronic component 300 firstly abuts upward the second conductive member 234 to move and drives the elastic arm 22 to deform upward toward the reserved space 112, and the first electronic component 200 then presses downward on the first conductive member 233 to move and drives the elastic arm 22 to deform downward toward the reserved space 112. In other embodiments, the conductive members 23 may be conductive blocks, soldering posts or solder balls.

As shown in FIG. 44, for a same conductive terminal 2, the elastic arm 22 thereof and the tail portion 24 thereof are correspondingly exposed in two different accommodating slots 11 adjacent to each other in the front-rear direction. In two conductive terminals 2 adjacent to each other in the front-rear direction, the tail portion 24 of the conductive terminal 2 located in front thereof and the elastic arm 22 of the conductive terminal 2 located behind are exposed in the same accommodating slot 11. The tail portion 24 of the conductive terminal 2 located in front thereof is provided with a reserved space 113 running vertically through the insulating body 1, and the free end 223 of the conductive terminal 2 located behind is partially forward located in the reserved space 113 of the conductive terminal 2 located in front thereof, thus reducing the distance between the two adjacent conductive terminals 2.

Figure 47:
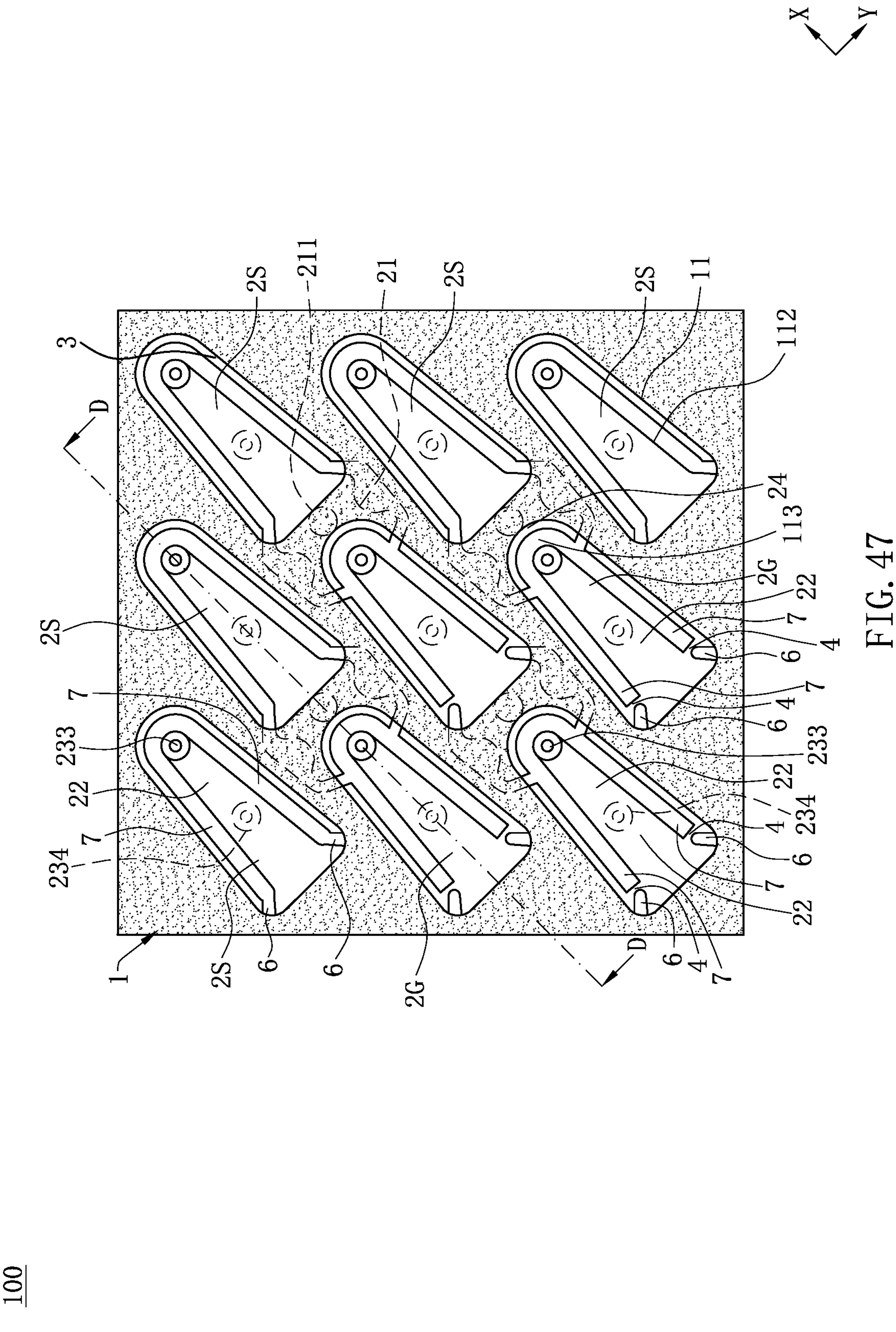
FIG. 47 is a top view of FIG. 46.
Figure 48:
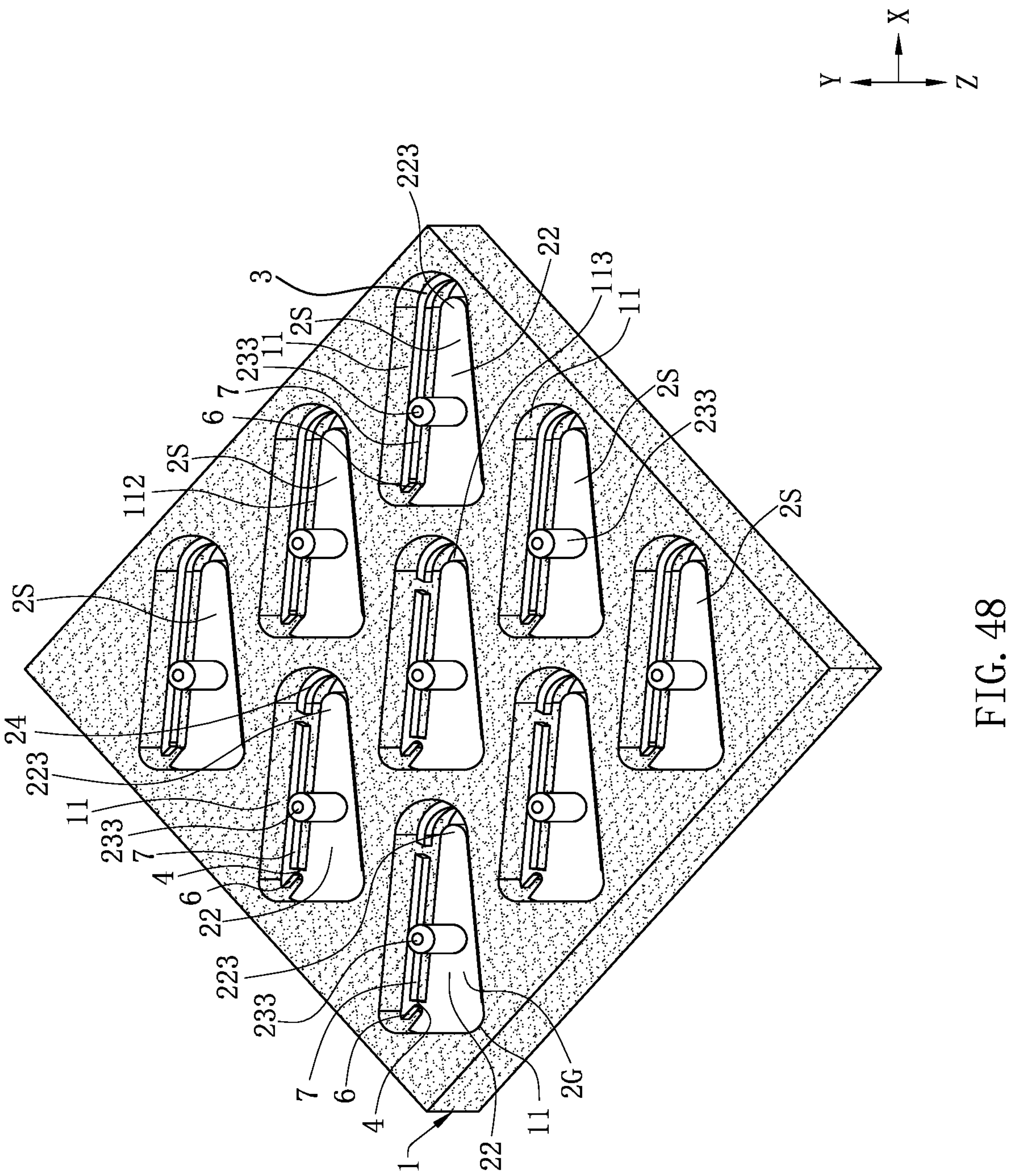
FIG. 48 is a schematic view of FIG. 46 in another angle.
Figure 49:
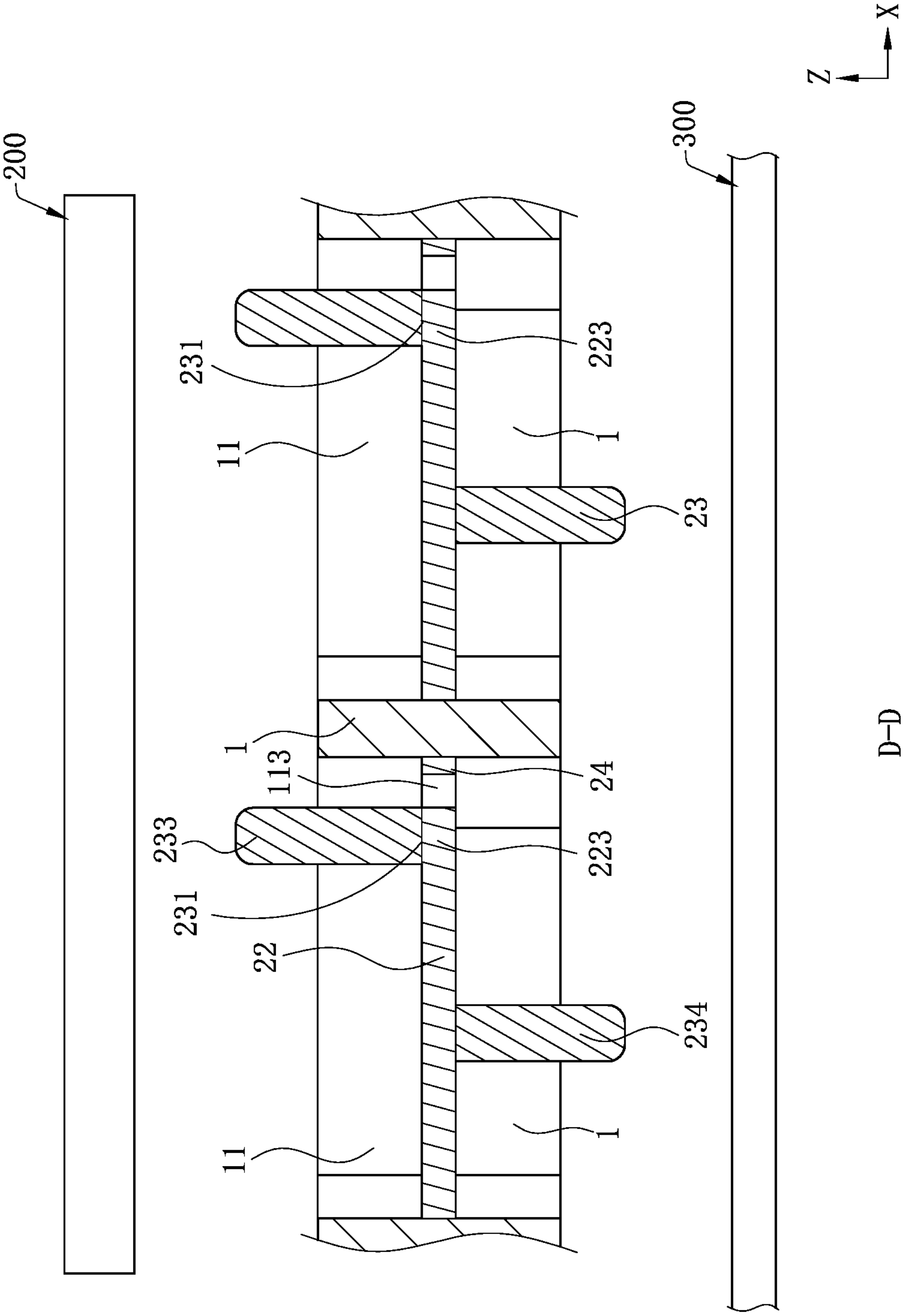
FIG. 49 is a partial sectional view of FIG. 47 along the D-D direction.
Figure 50:
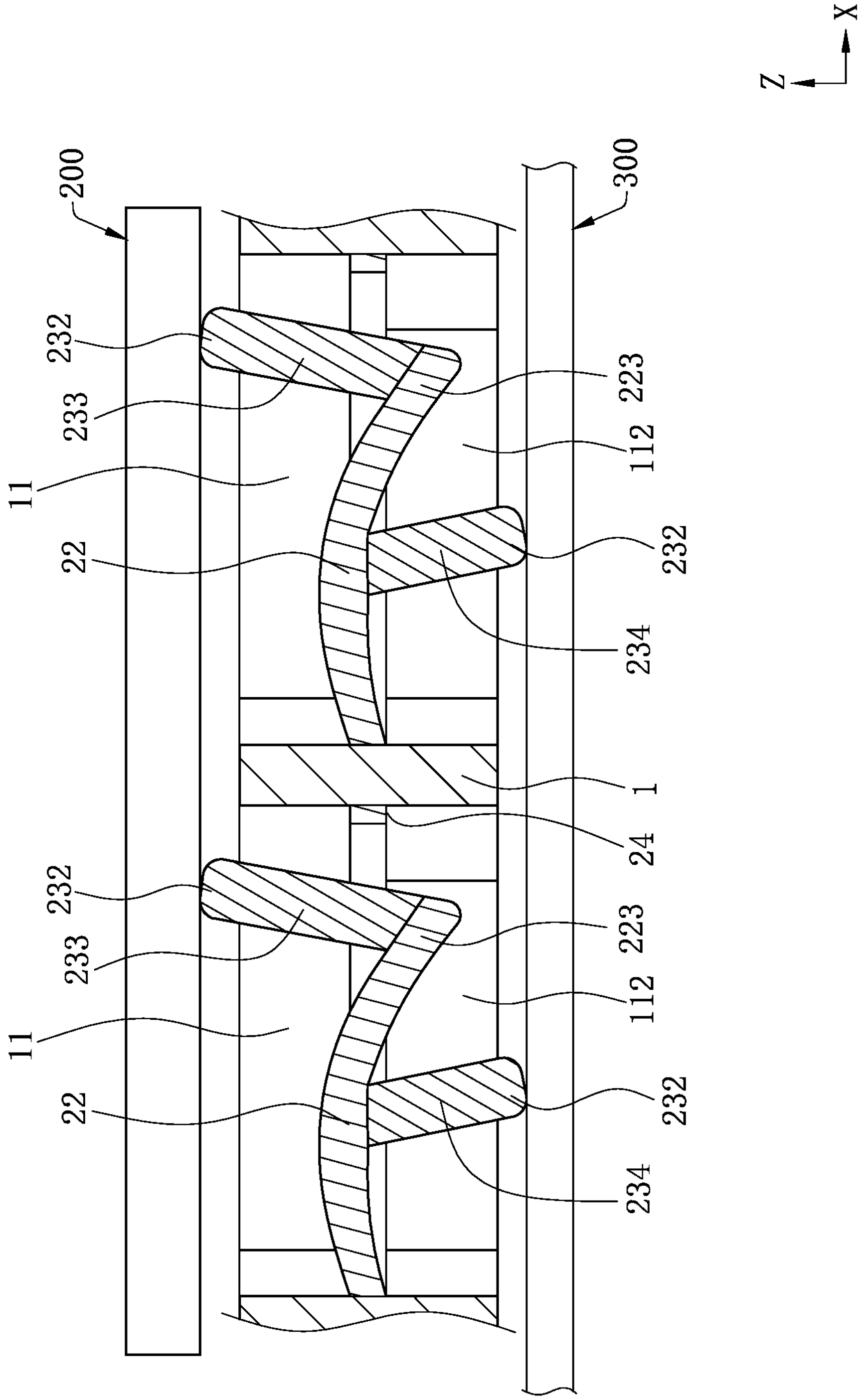
FIG. 50 is a schematic view of FIG. 49 after mating with an electronic component.

As shown in FIG. 47, the signal terminals 2S are broken from the conductive plate 3 to form electrical insulation therebetween. The ground terminals 2G are integrally connected with the conductive plate 3 through the connecting portions 4 to form electrical connections therebetween. At the two sides of each base portion 21, two through slots 6 are formed between the conductive plate 3 and the connecting portions 4. Each through slot 6 is partially filled by the plastic material forming the insulating body 1 to enhance fixing the base portion 21. Each of the outer side of the elastic arm 22 is provided with a cutting slot 7. The connecting portions 4 separate the through slots 6 and the cutting slots 7. In other embodiments, all of the conductive terminals 2, including the ground terminals 2G, are broken from the conductive plate 3 to maintain electrical insulation therebetween, thus satisfying the required electronic characteristics at different usage scenarios.

FIG. 58 to FIG. 75 show an electrical connector 100 according to a fourth embodiment of the present invention. The electrical connector 100 is used to electrically connect a first electronic component 200 and a second electronic component 300. Preferably, the first electronic component 200 is a chip module, and the second electronic component 300 is a circuit board. The electrical connector 100 includes an insulating body 1, and a plurality of conductive terminals 2 provided in the insulating body 1 through insert-molding. The conductive terminals 2 include a plurality of ground terminals 2G and a plurality of signal terminals 2S used to transmit signals. In this embodiment, the conductive terminals 2 and a conductive plate 3 are formed by cutting a same metal plate 400.

Figure 62:
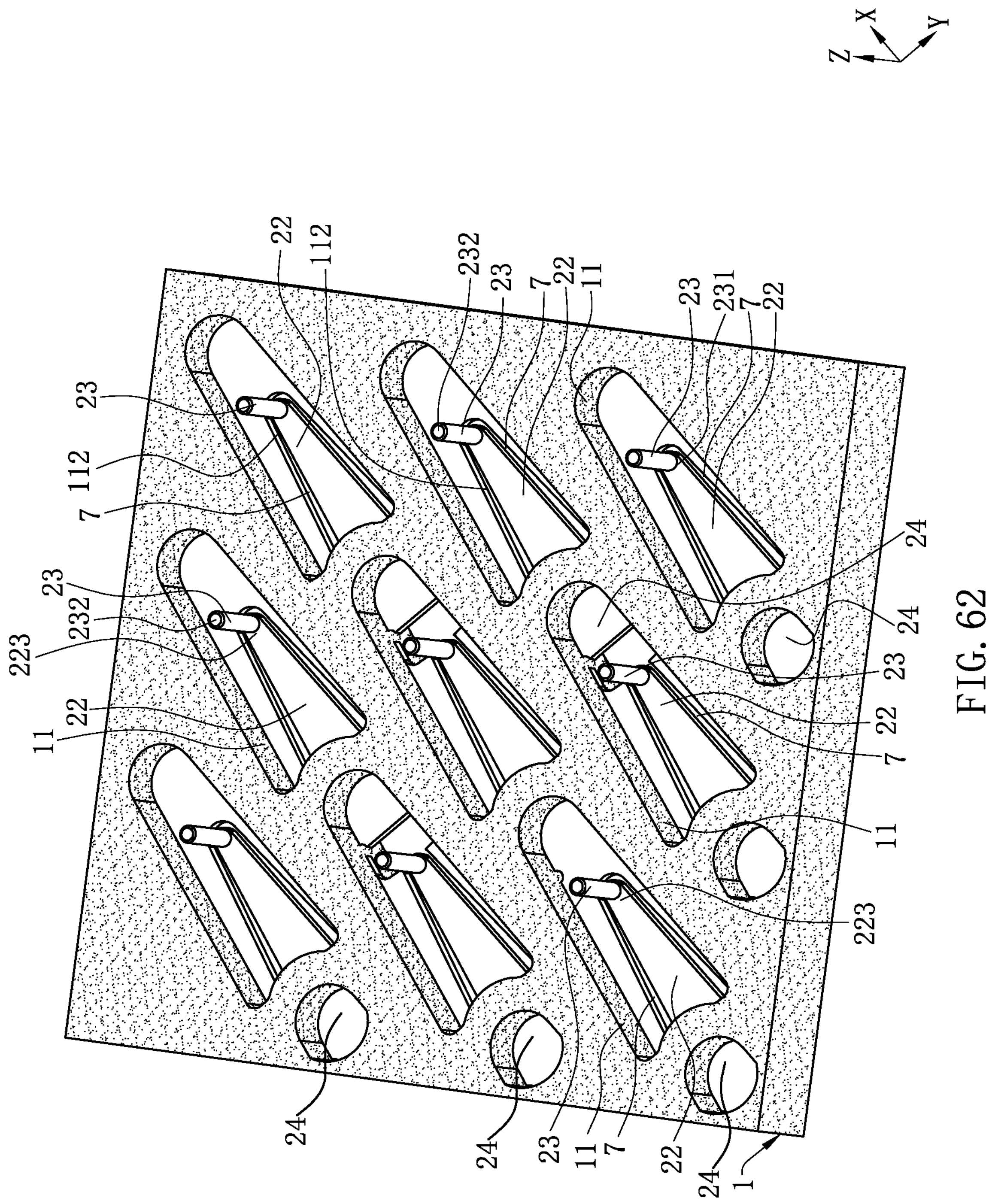
FIG. 62 is a schematic view of obtaining the insulating body through one type of insert-molding process according to the fourth embodiment of the present invention.
Figure 63:
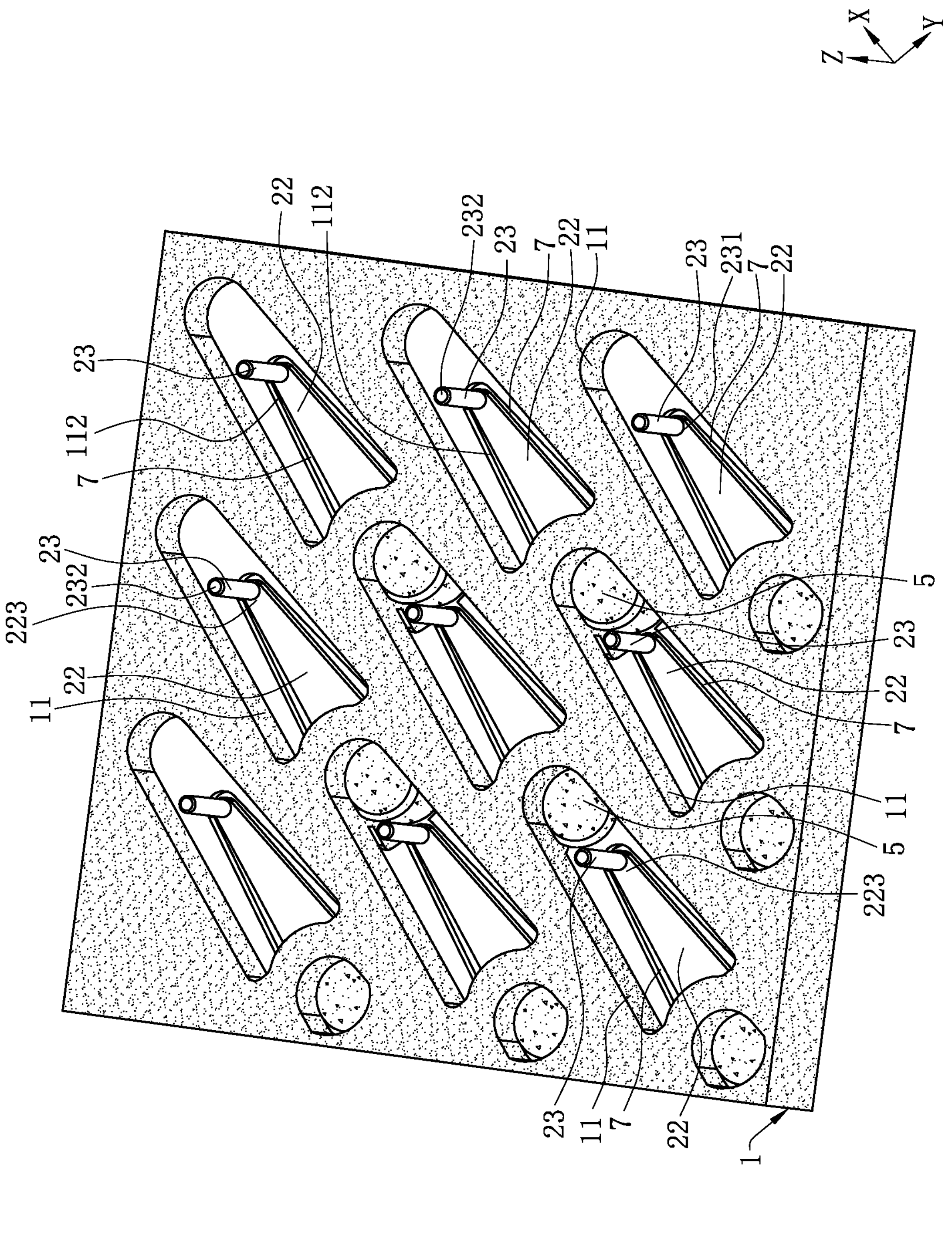
FIG. 63 is a schematic view of soldering the solder body to the tail portion according to the fourth embodiment of the present invention.
Figure 64:
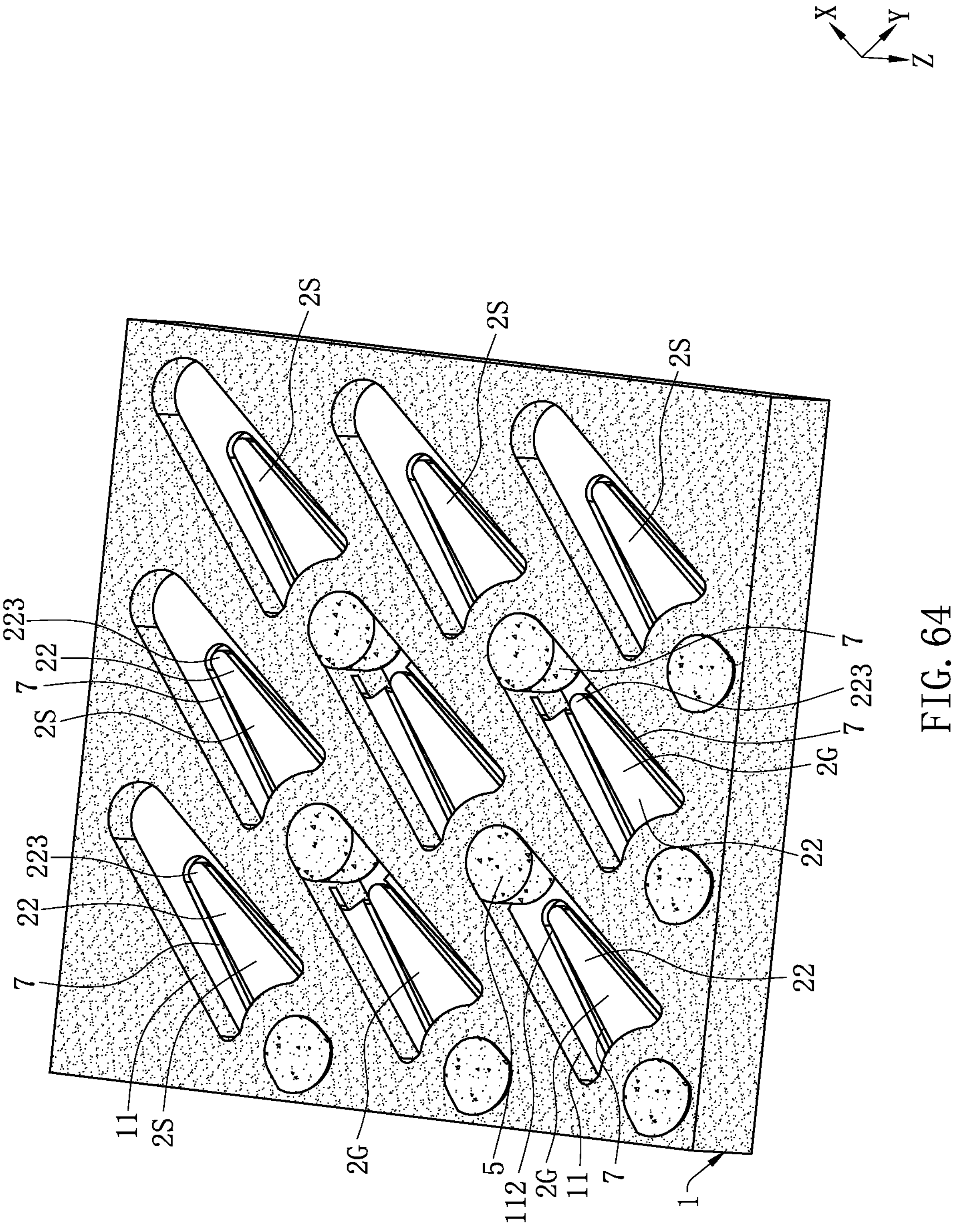
FIG. 64 is a schematic view of FIG. 63 in another angle.

As shown in FIG. 62, the insulating body 1 includes a plurality of accommodating slots 11, and each accommodating slot 11 is provided with a reserved space 112. The reserved space 112 runs through the insulating body 1 in the vertical direction.

As shown in FIG. 60 to FIG. 68, each conductive terminal 2 has a base portion 21, an elastic arm 22 integrally connected to the base portion 21, a conductive member 23 soldered and fixed to the elastic arm 22, and a tail portion 24 extending from the base portion 21 away from the elastic arm 22. In this embodiment, the conductive member 23 is a cylindrical shaped conductive post. The end of the elastic arm 22 away from the base portion 21 is a free end 223. The conductive member 23 is soldered and fixed to the free end 223. Each conductive member 23 has a soldering portion 231 soldered and fixed to the free end 223 and a contact portion 232 integrally connected to the soldering portion 231. The contact portion 232 is used to abut the first electronic component 200. The tail portion 24 is not covered and fixed by the insulating body 1. Each tail portion 24 is soldered to a solder body 5, and the solder body 5 is used to be directly soldered downward to the second electronic component 300. The second electronic component 300 is firstly soldered and fixed to the solder body 5, and the first electronic component 200 then presses downward on the conductive member 23 to move and drives the elastic arm 22 to deform downward toward the reserved space 112. In other embodiments, the conductive members 23 may be conductive blocks, soldering posts or solder balls. As shown in FIG. 62, for a same conductive terminal 2, the elastic arm 22 thereof and the tail portion 24 thereof are correspondingly exposed in two different accommodating slots 11 adjacent to each other in the front-rear direction. In two conductive terminals 2 adjacent to each other in the front-rear direction, the tail portion 24 of the conductive terminal 2 located in front thereof and the elastic arm 22 of the conductive terminal 2 located behind are exposed in the same accommodating slot 11.

Figure 66:
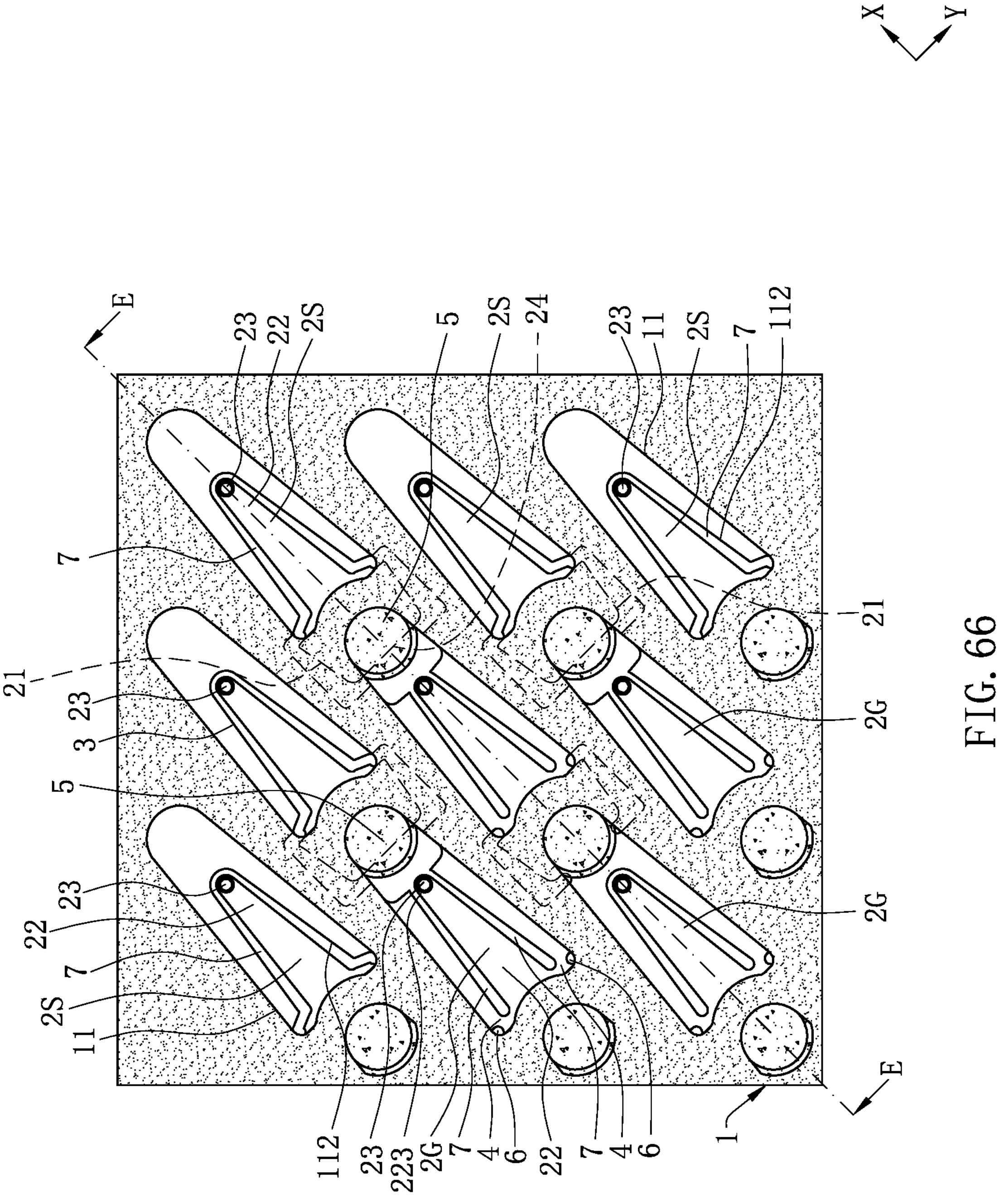
FIG. 66 is a schematic view of cutting the connecting portions according to the fourth embodiment of the present invention.

As shown in FIG. 66, the signal terminals 2S are broken from the conductive plate 3 to form electrical insulation therebetween. The ground terminals 2G are integrally connected with the conductive plate 3 through the connecting portions 4 to form electrical connections therebetween. At the two sides of each base portion 21, two through slots 6 are formed between the conductive plate 3 and the connecting portions 4. Each through slot 6 is partially filled by the plastic material forming the insulating body 1 to enhance fixing the base portion 21. Each of the outer side of the elastic arm 22 is provided with a cutting slot 7. The connecting portions 4 separate the through slots 6 and the cutting slots 7. In other embodiments, all of the conductive terminals 2, including the ground terminals 2G, are broken from the conductive plate 3 to maintain electrical insulation therebetween, thus satisfying the required electronic characteristics at different usage scenarios.

Figure 76A:
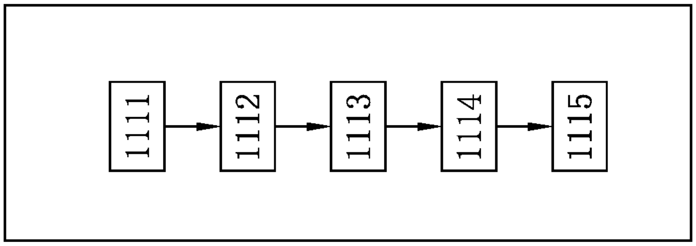
FIG. 76A is a flowchart of a first manufacturing method according to the first embodiment of the present invention.

As shown in FIG. 76A, the steps of a first method of manufacturing the electrical connector 100 according to the first embodiment are as follows:

Step 1111 (corresponding to the step A of claim 1): as shown in FIG. 1, providing a metal plate 400, and cutting the metal plate 400 to form a plurality of base portions 21, a plurality of pre-soldering areas 22' and a plurality of through slots 6. Two sides of each base portion 21 are connected to two of the pre-soldering areas 22' and two of the through slots 6 running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 2:
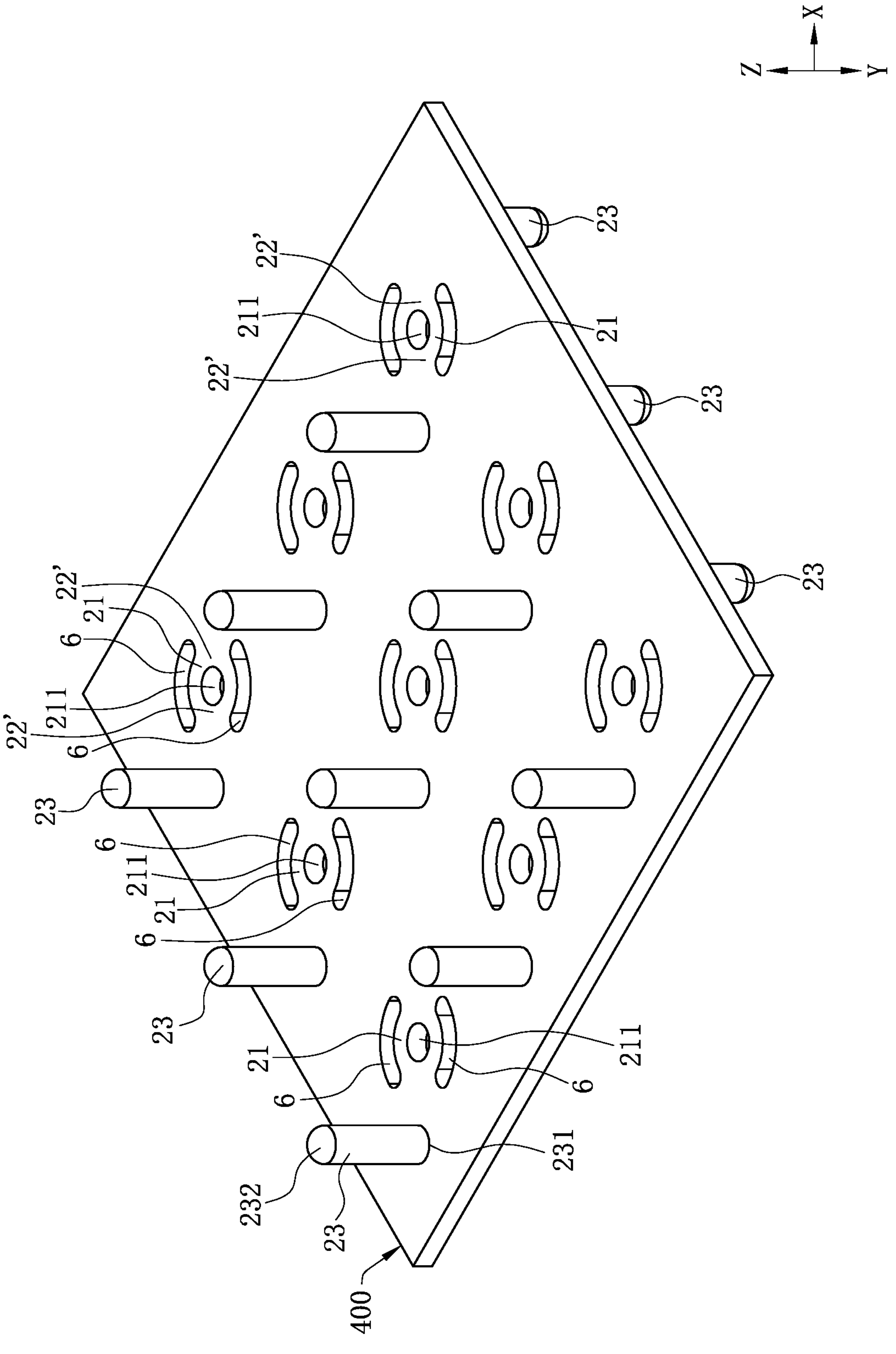
FIG. 2 is a schematic view of soldering the conductive members according to the first embodiment of the present invention.

Step 1112 (corresponding to the step B of claim 1): as shown in FIG. 2, after the step 1111, providing a plurality of conductive members 23, and soldering two of the conductive members 23 to two of the pre-soldering areas 22'. The two conductive members 23 are respectively located on a first surface and a second surface of the metal plate 400. The first surface and the second surface are arranged opposite to each other in the vertical direction. Each conductive member 23 has a soldering portion 231 and a contact portion 232 integrally connected to the soldering portion 231.

Figure 3:
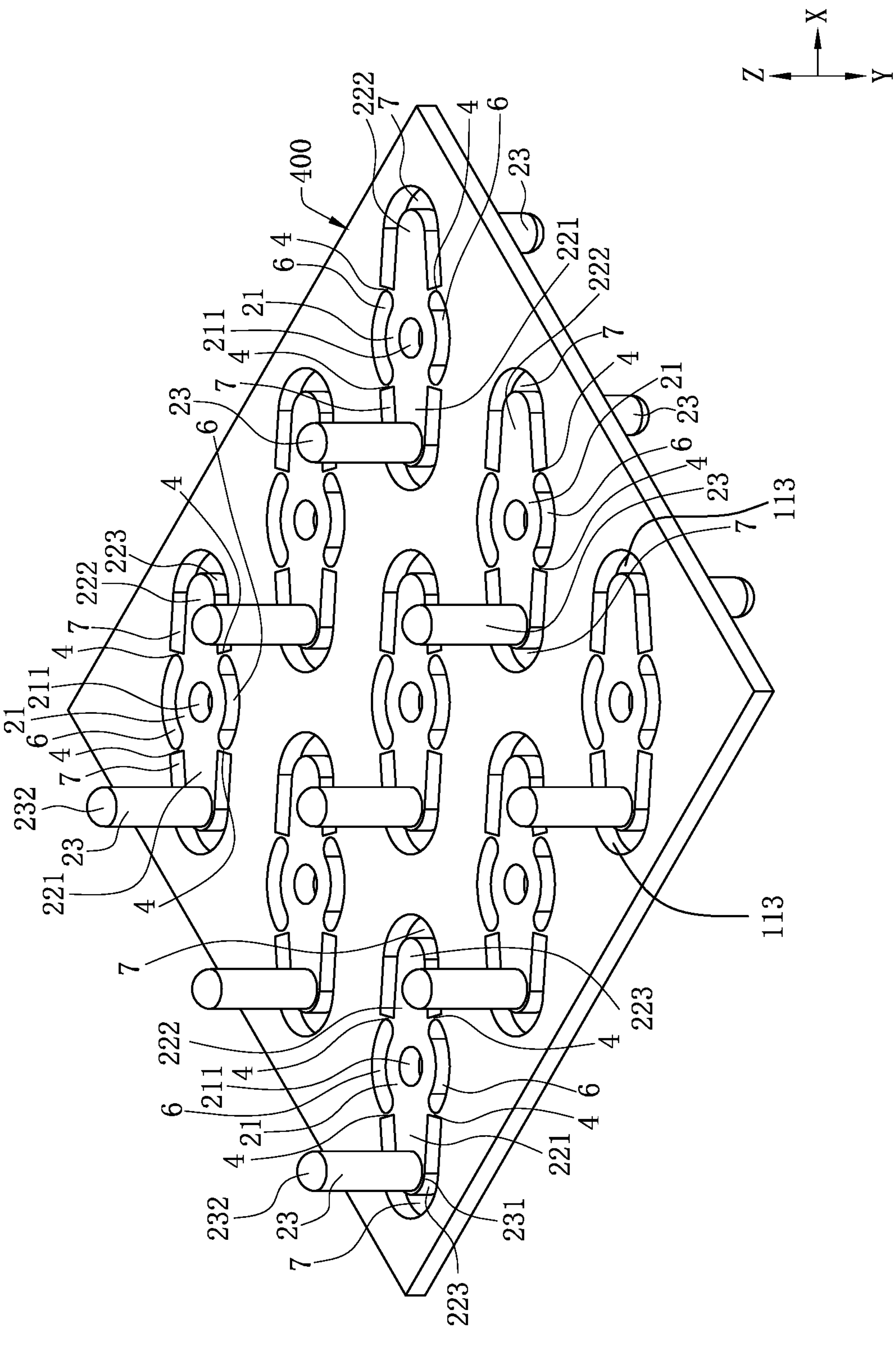
FIG. 3 is a schematic view of one type of cutting the pre-soldering areas to form the elastic arms according to the first embodiment of the present invention.

Step 1113 (corresponding to the step C of claim 1): as shown in FIG. 3, after the step 1112, cutting and forming a plurality of first elastic arms 221 and a plurality of second elastic arms 222 correspondingly according to locations of the conductive members 23 in the pre-soldering areas 22' as references. The first elastic arm 221 and the second elastic arm 222 extend along two opposite sides of the base portion 21. A conductive terminal 2 includes a base portion 21, a first elastic arm 221, a second elastic arm 222 and two conductive members 23. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction. The end of the first elastic arm 221 and the end of the second elastic arm 222 respectively away from the base portion 21 are free ends 223. Each of the two free ends 223 is soldered with a soldering portion 231.

The cutting further forms two cutting slots 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slots 7.

Figure 4:
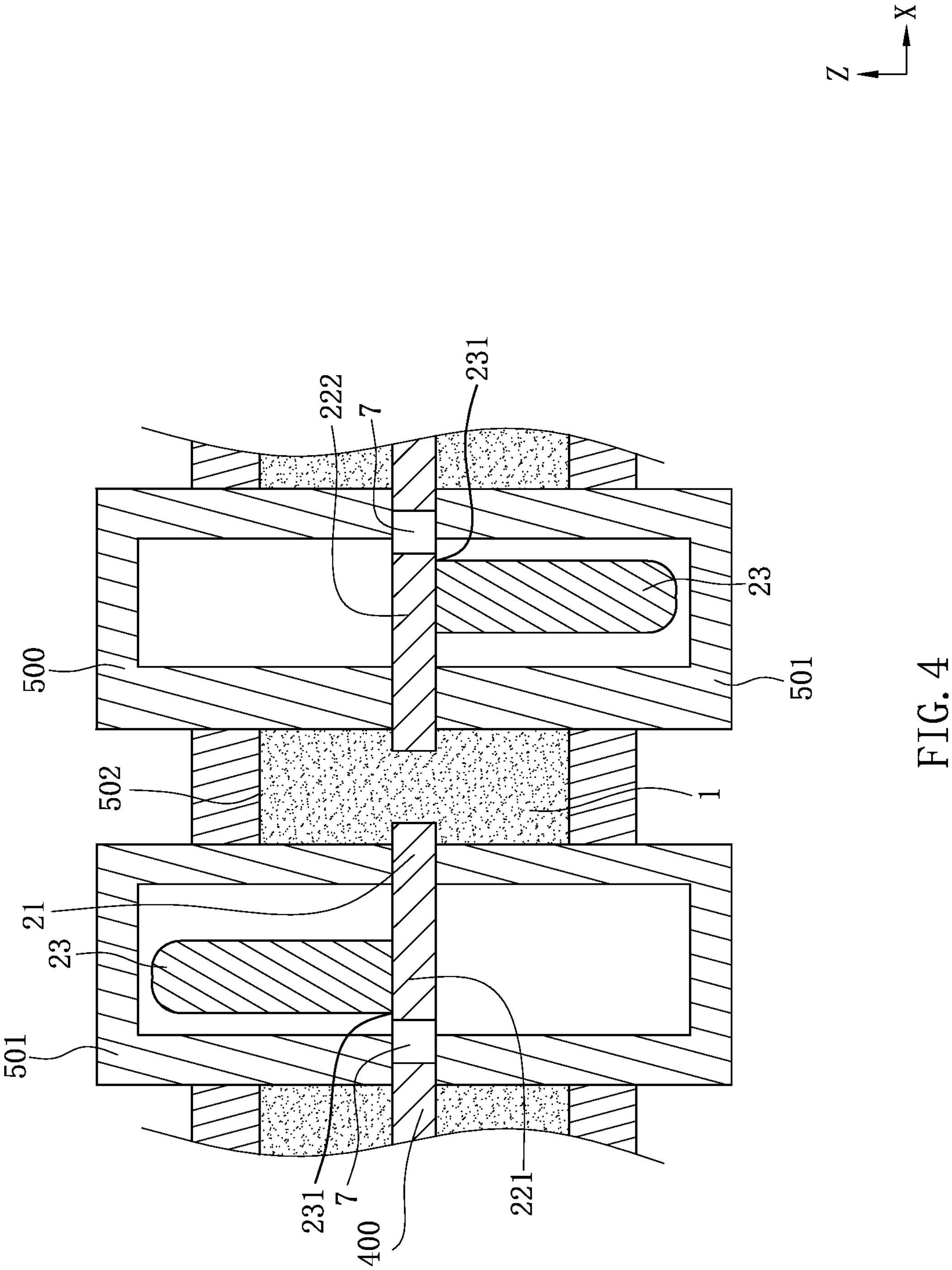
FIG. 4 is a schematic view of one type of insert-molding process according to the first embodiment of the present invention.
Figure 6:
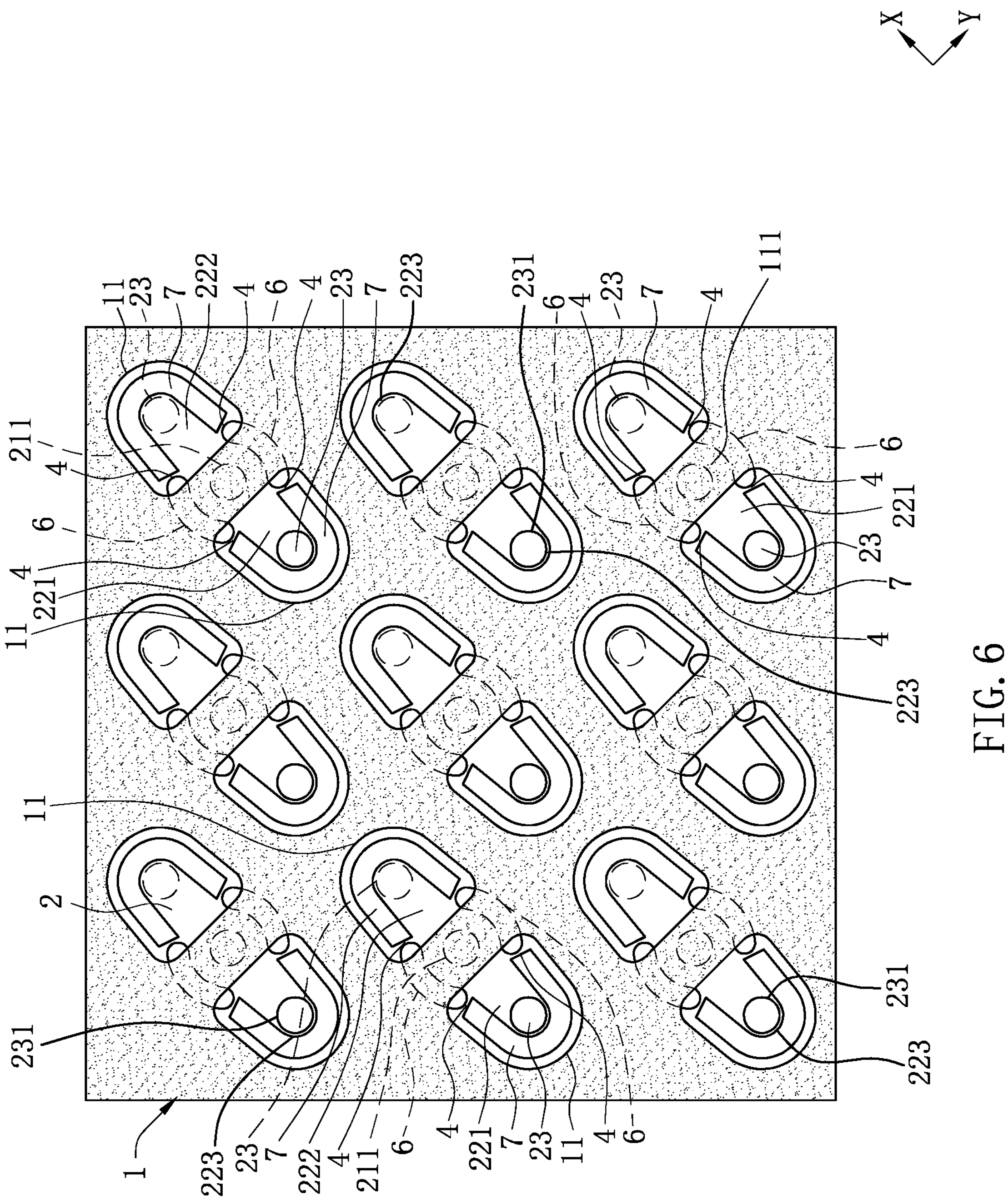
FIG. 6 is a top view of FIG. 5.

Step 1114 (corresponding to the step D of claim 1): as shown in FIG. 4 to FIG. 6, after the step 1113, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the two cutting slots 7, the first elastic arm 221, the second elastic arm 222, the first conductive member 233 and the second conductive member 234. Liquid plastic is injected into the cavities 502 by insert-molding, thus forming an insulating body 1 and a plurality of accommodating slots 11. Each accommodating slot 11 is provided with a lateral beam portion 111 located in the middle of the accommodating slot 11, and the lateral beam portion 111 covers and fixes the base portion 21. After removing the mold cores 501, each accommodating slot 11 is provided with two reserved spaces 112 separated by the lateral beam portion 111, and the reserved spaces 112 run through the insulating body 1 in the vertical direction. The first elastic arm 221 and the second elastic arm 222 are respectively exposed in two different reserved spaces 112. When forming the insulating body 1, the plastic material partially fills the through holes 211 and the through slots 6 to enhance fixing of the base portion 21.

Step 1115 (corresponding to the step E of claim 1): as shown in FIG. 7 to FIG. 10, after the step 1114, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the other of the reserved spaces 112 and drives the second elastic arm 222 to deform upward, and the first electronic component 200 then presses downward on the contact portion 232 of the first conductive member 233 to move in one of the reserved spaces 112 and drives the first elastic arm 221 to deform downward. The moving directions of the first conductive member 233 and the second conductive member 234 are opposite to each other, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 76B:
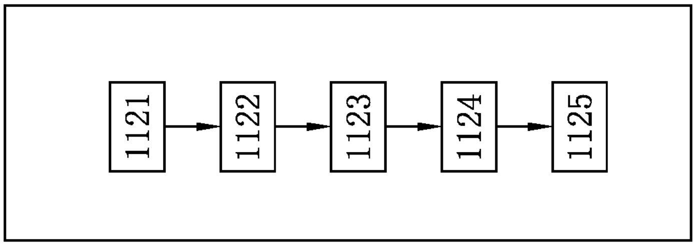
FIG. 76B is a flowchart of a second manufacturing method according to the first embodiment of the present invention.

As shown in FIG. 76B, the steps of a second method of manufacturing the electrical connector 100 according to the first embodiment are as follows:

Step 1121 (corresponding to the step A of claim 1): as shown in FIG. 1, providing a metal plate 400, and cutting the metal plate 400 to form a plurality of base portions 21, a plurality of pre-soldering areas 22' and a plurality of through slots 6. Two sides of each base portion 21 are connected to two of the pre-soldering areas 22' and two of the through slots 6 running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1122 (corresponding to the step B of claim 1): as shown in FIG. 2, after the step 1121, providing a plurality of conductive members 23, and soldering two of the conductive members 23 to two of the pre-soldering areas 22'. The two conductive members 23 are respectively located on a first surface and a second surface of the metal plate 400. The first surface and the second surface are two surfaces of the metal plate 400 which are arranged opposite to each other in the vertical direction. Each conductive member 23 has a soldering portion 231 and a contact portion 232 integrally connected to the soldering portion 231.

Figure 11:
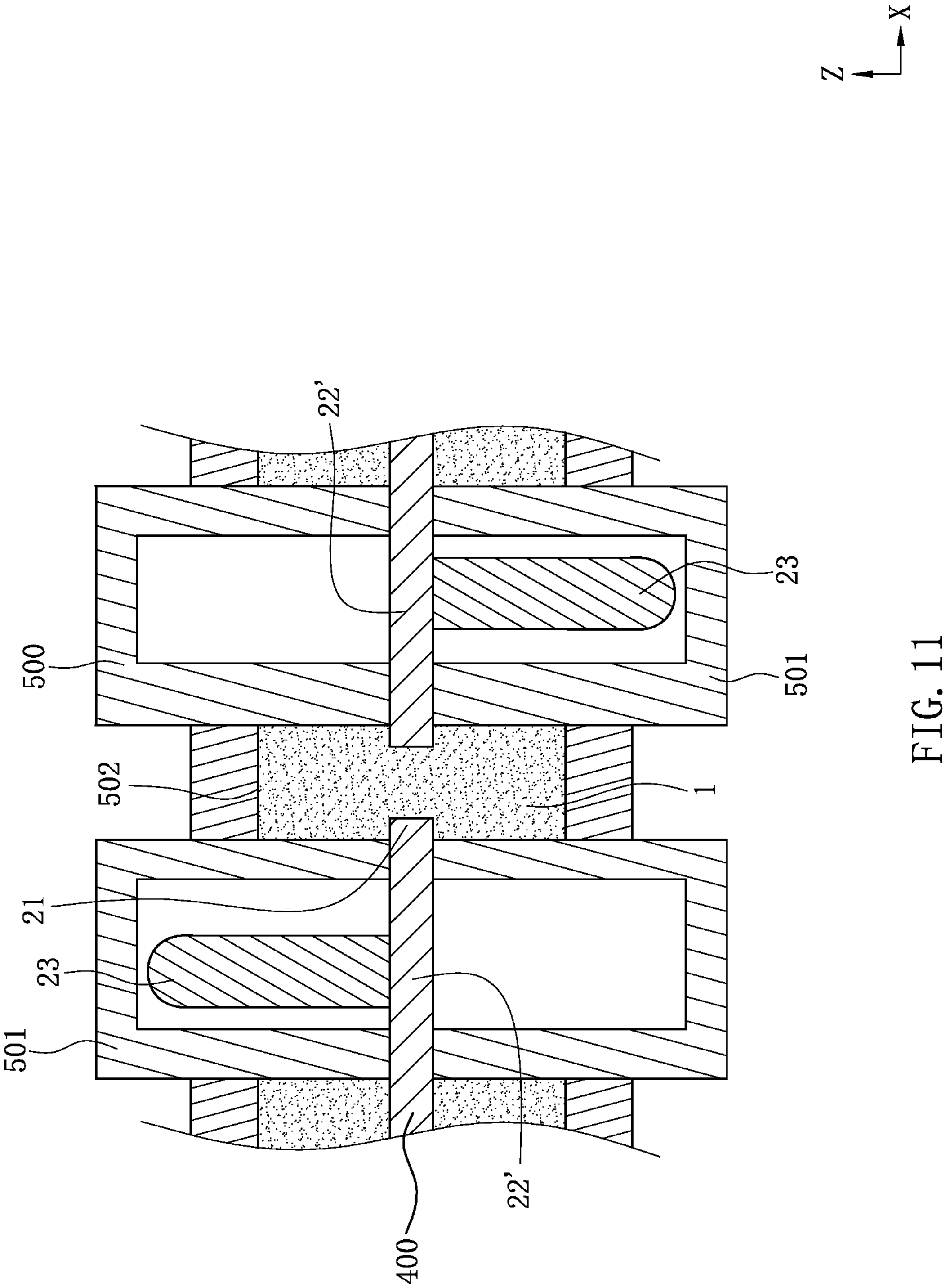
FIG. 11 is a schematic view of another type of insert-molding process according to the first embodiment of the present invention.
Figure 12:
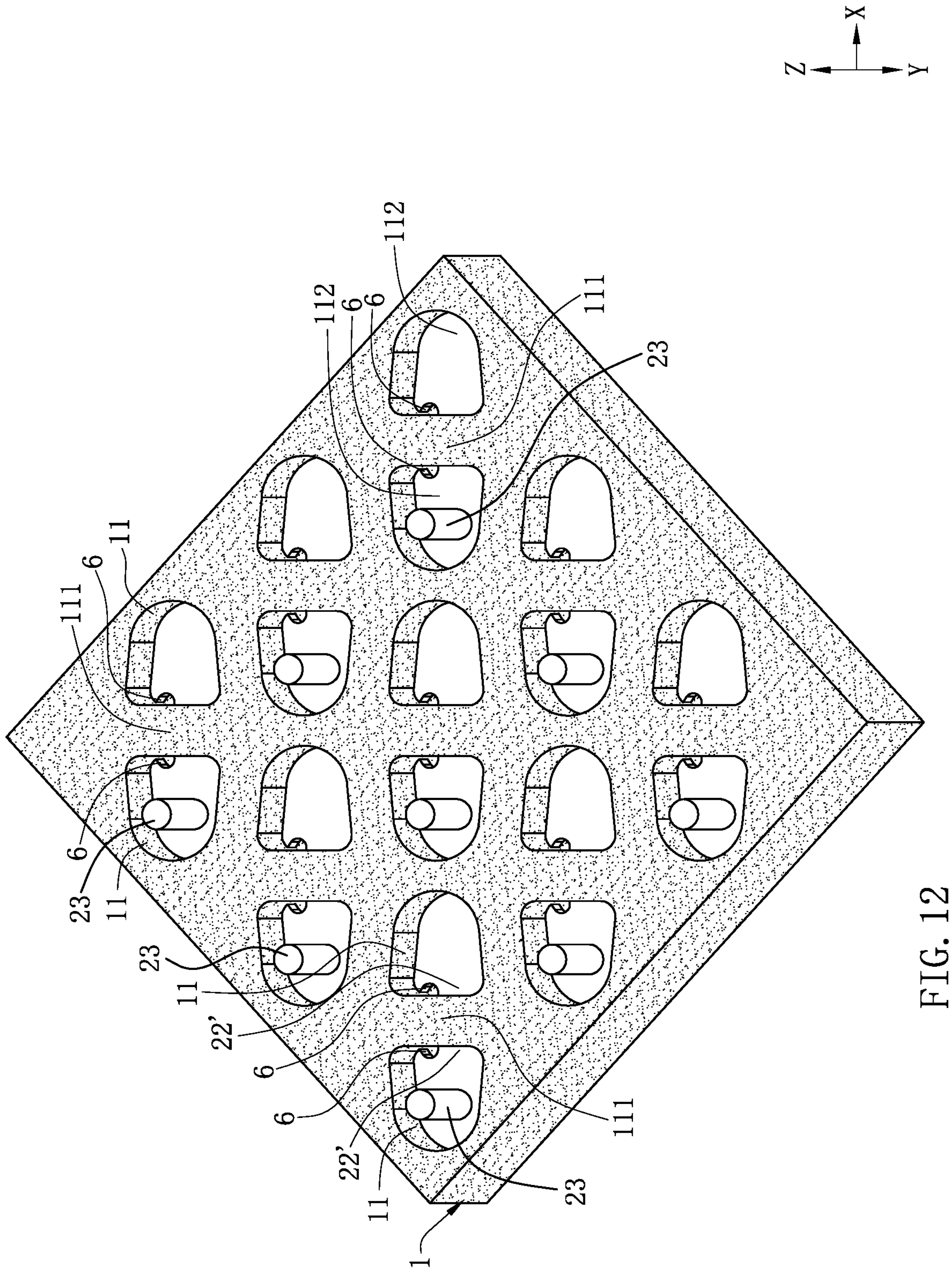
FIG. 12 is a schematic view of obtaining the insulating body through another type of insert-molding process according to the first embodiment of the present invention.
Figure 13:
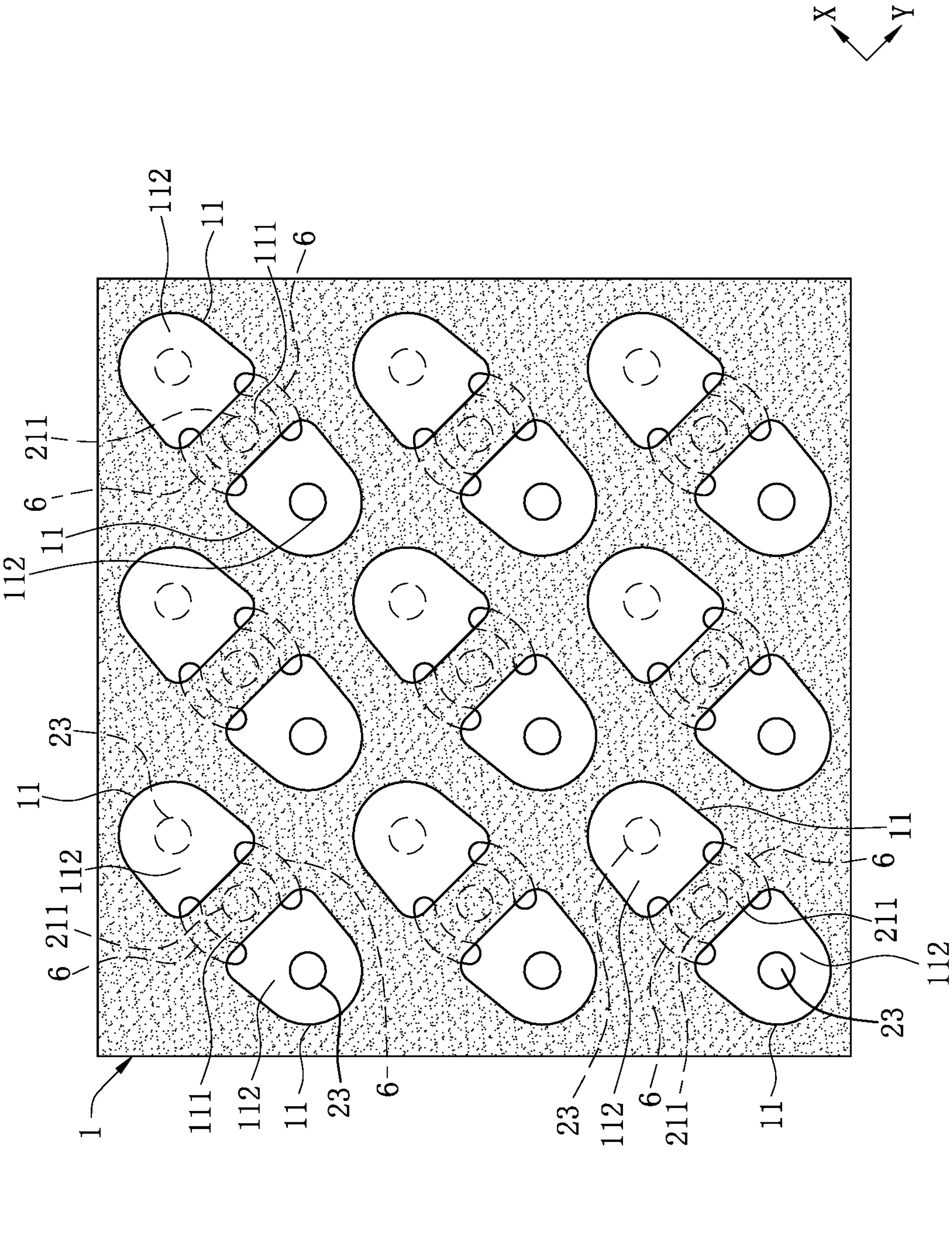
FIG. 13 is a top view of FIG. 12.

Step 1123 (corresponding to the step D of claim 1): as shown in FIG. 11 to FIG. 13, after the step 1122, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the two pre-soldering areas 22' and the two conductive members 23. Liquid plastic is injected into the cavities 502 by insert-molding, thus forming an insulating body 1 and a plurality of accommodating slots 11. Each accommodating slot 11 is provided with a lateral beam portion 111 located in the middle of the accommodating slot 11, and the lateral beam portion 111 covers and fixes the base portion 21. After removing the mold cores 501, each accommodating slot 11 is provided with two reserved spaces 112 separated by the lateral beam portion 111. The two conductive members 23 are respectively exposed in the two different reserved spaces 112. When forming the insulating body 1, the plastic material partially fills the through holes 211 and the through slots 6 to enhance fixing of the base portion 21.

Step 1124 (corresponding to the step C of claim 1): as shown in FIG. 6, after the step 1123, cutting and forming a plurality of first elastic arms 221 and a plurality of second elastic arms 222 correspondingly according to locations of the conductive members 23 in the pre-soldering areas 22' as references. The first elastic arm 221 and the second elastic arm 222 extend along two opposite sides of the base portion 21. A conductive terminal 2 includes a base portion 21, a first elastic arm 221, a second elastic arm 222 and two conductive members 23. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction. The end of the first elastic arm 221 and the end of the second elastic arm 222 respectively away from the base portion 21 are free ends 223. Each of the two free ends 223 is soldered with a soldering portion 231. The reserved spaces 112 run through the insulating body 1 in the vertical direction. The first elastic arm 221 and the second elastic arm 222 are respectively exposed in two different reserved spaces 112.

The cutting further forms two cutting slots 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slots 7.

Step 1125 (corresponding to the step E of claim 1): as shown in FIG. 7 to FIG. 10, after the step 1124, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the other of the reserved spaces 112 and drives the second elastic arm 222 to deform upward, and the first electronic component 200 then presses downward on the contact portion 232 of the first conductive member 233 to move in one of the reserved spaces 112 and drives the first elastic arm 221 to deform downward. The moving directions of the first conductive member 233 and the second conductive member 234 are opposite to each other, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 76C:
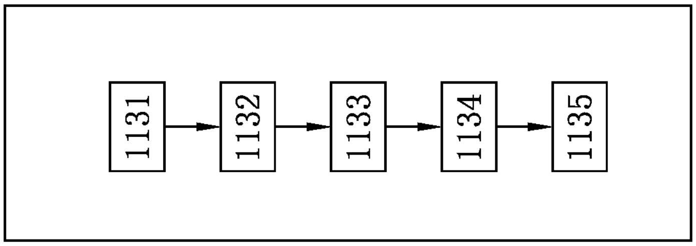
FIG. 76C is a flowchart of a third manufacturing method according to the first embodiment of the present invention.

As shown in FIG. 76C, the steps of a third method of manufacturing the electrical connector 100 according to the first embodiment are as follows:

Step 1131 (corresponding to the step I of claim 7): as shown in FIG. 1, providing a metal plate 400, and cutting the metal plate 400 to form a plurality of base portions 21, a plurality of pre-soldering areas 22' and a plurality of through slots 6. Two sides of each base portion 21 are connected to two of the pre-soldering areas 22' and two of the through slots 6 running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 14:
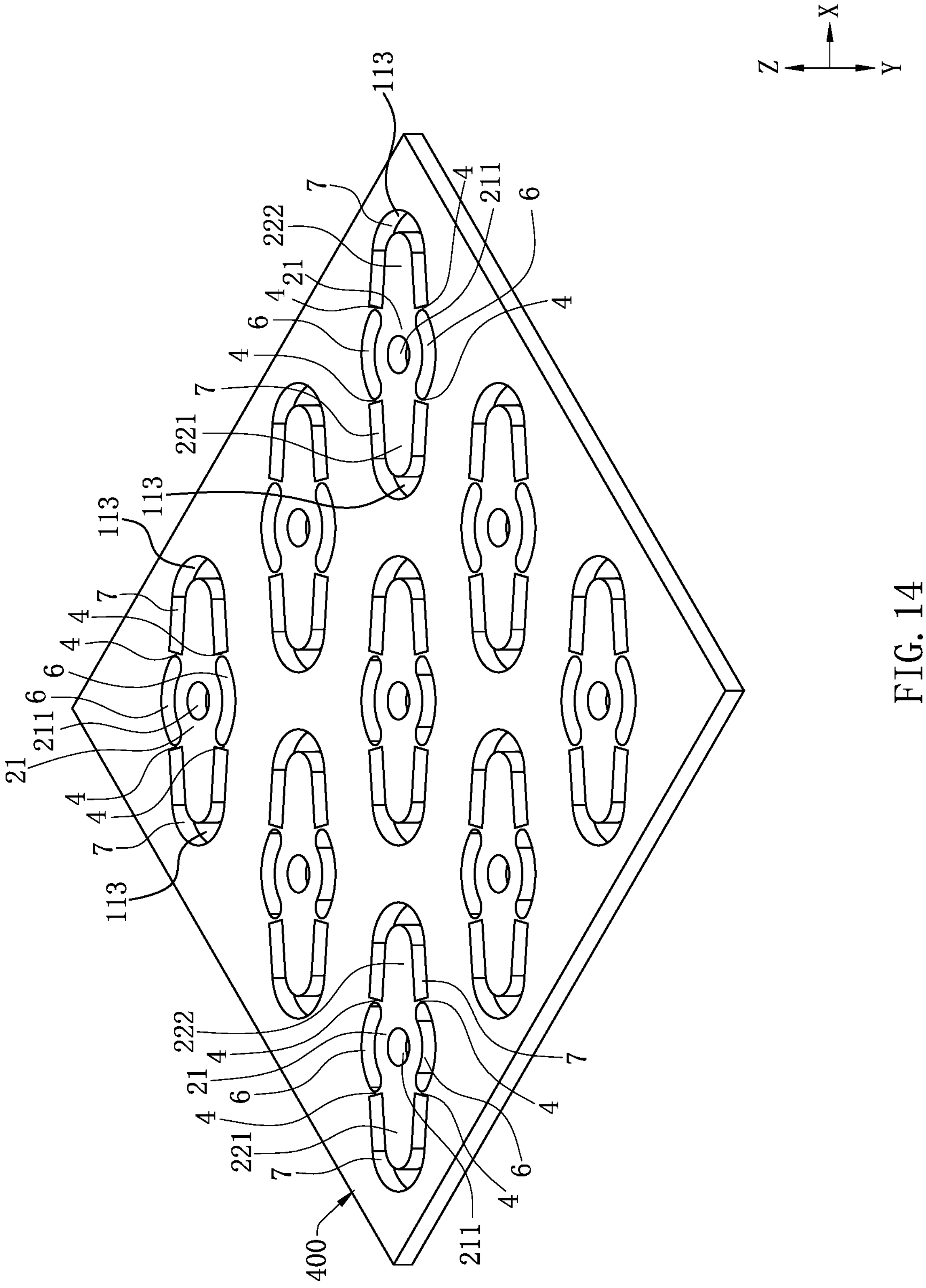
FIG. 14 is a schematic view of another type of cutting the pre-soldering areas to form the elastic arms according to the first embodiment of the present invention.

Step 1132 (corresponding to the step II of claim 7): as shown in FIG. 14, after the step 1131, cutting the pre-soldering areas 22' to form a plurality of first elastic arms 221 and a plurality of second elastic arms 222. The first elastic arm 221 and the second elastic arm 222 extend along two opposite sides of the base portion 21. The end of the first elastic arm 221 and the end of the second elastic arm 222 respectively away from the base portion 21 are free ends 223.

The cutting further forms two cutting slots 7 running through the metal plate 400 and located at outer sides of the first elastic arm 221 and the second elastic arm 222 and a plurality of connecting portions 4 connected to the same base portion 21. The connecting portions 4 are used to separate the through slots 6 and the cutting slots 7. In other embodiments, the step 1142 may be located in the step 1141 to perform simultaneous cutting.

Step 1133 (corresponding to the step III of claim 7): as shown in FIG. 3, after the step 1132, providing a plurality of conductive members 23, and soldering two of the conductive members 23 respectively to the first elastic arm 221 and the second elastic arm 222. The two conductive members 23 are respectively located on a first surface and a second surface of the metal plate 400 arranged opposite to each other in the vertical direction. A conductive terminal 2 includes a base portion 21, a first elastic arm 221, a second elastic arm 222 and two conductive members 23. Each conductive member 23 has a soldering portion 231 and a contact portion 232 integrally connected to the soldering portion 231. Each of the two free ends 223 is soldered with a soldering portion 231. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction.

Step 1134 (corresponding to the step IV of claim 7): as shown in FIG. 4 to FIG. 6, after the step 1133, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the two cutting slots 7, the first elastic arm 221, the second elastic arm 222, the first conductive member 233 and the second conductive member 234. Liquid plastic is injected into the cavities 502 by insert-molding, thus forming an insulating body 1 and a plurality of accommodating slots 11. Each accommodating slot 11 is provided with a lateral beam portion 111 located in the middle of the accommodating slot 11, and the lateral beam portion 111 covers and fixes the base portion 21. After removing the mold cores 501, each accommodating slot 11 is provided with two reserved spaces 112 separated by the lateral beam portion 111, and the reserved spaces 112 run through the insulating body 1 in the vertical direction. The first elastic arm 221 and the second elastic arm 222 are respectively exposed in two different reserved spaces 112. When forming the insulating body 1, the plastic material partially fills the through holes 211 and the through slots 6 to enhance fixing of the base portion 21.

Step 1135 (corresponding to the step V of claim 7): as shown in FIG. 7 to FIG. 10, after the step 1134, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the other of the reserved spaces 112 and drives the second elastic arm 222 to deform upward, and the first electronic component 200 then presses downward on the contact portion 232 of the first conductive member 233 to move in one of the reserved spaces 112 and drives the first elastic arm 221 to deform downward. The moving directions of the first conductive member 233 and the second conductive member 234 are opposite to each other, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 76D:
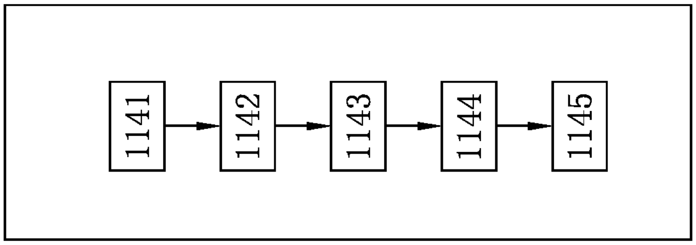
FIG. 76D is a flowchart of a fourth manufacturing method according to the first embodiment of the present invention.

As shown in FIG. 76D, the steps of a fourth method of manufacturing the electrical connector 100 according to the first embodiment are as follows:

Step 1141 (corresponding to the step I of claim 7): as shown in FIG. 1, providing a metal plate 400, and cutting the metal plate 400 to form a plurality of base portions 21, a plurality of pre-soldering areas 22' and a plurality of through slots 6. Two sides of each base portion 21 are connected to two of the pre-soldering areas 22' and two of the through slots 6 running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1142 (corresponding to the step II of claim 7): as shown in FIG. 14, after the step 1141, cutting the pre-soldering areas 22' to form a plurality of first elastic arms 221 and a plurality of second elastic arms 222. The first elastic arm 221 and the second elastic arm 222 extend along two opposite sides of the base portion 21. The end of the first elastic arm 221 and the end of the second elastic arm 222 respectively away from the base portion 21 are free ends 223.

The cutting further forms two cutting slots 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slots 7. In other embodiments, the step 1142 may be in the step 1141 to perform simultaneous cutting.

Figure 15:
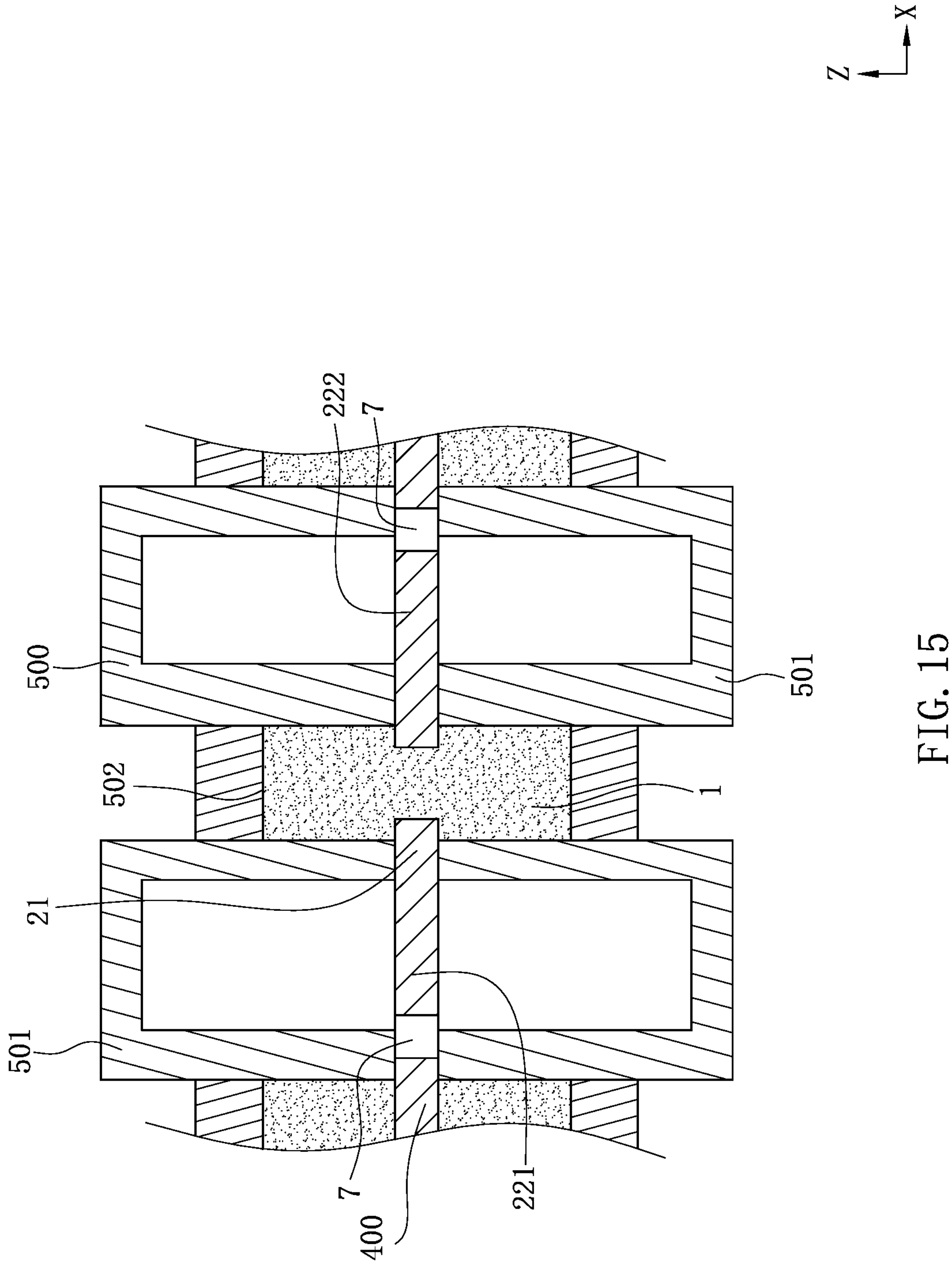
FIG. 15 is a schematic view of a further type of insert-molding process according to the first embodiment of the present invention.
Figure 16:
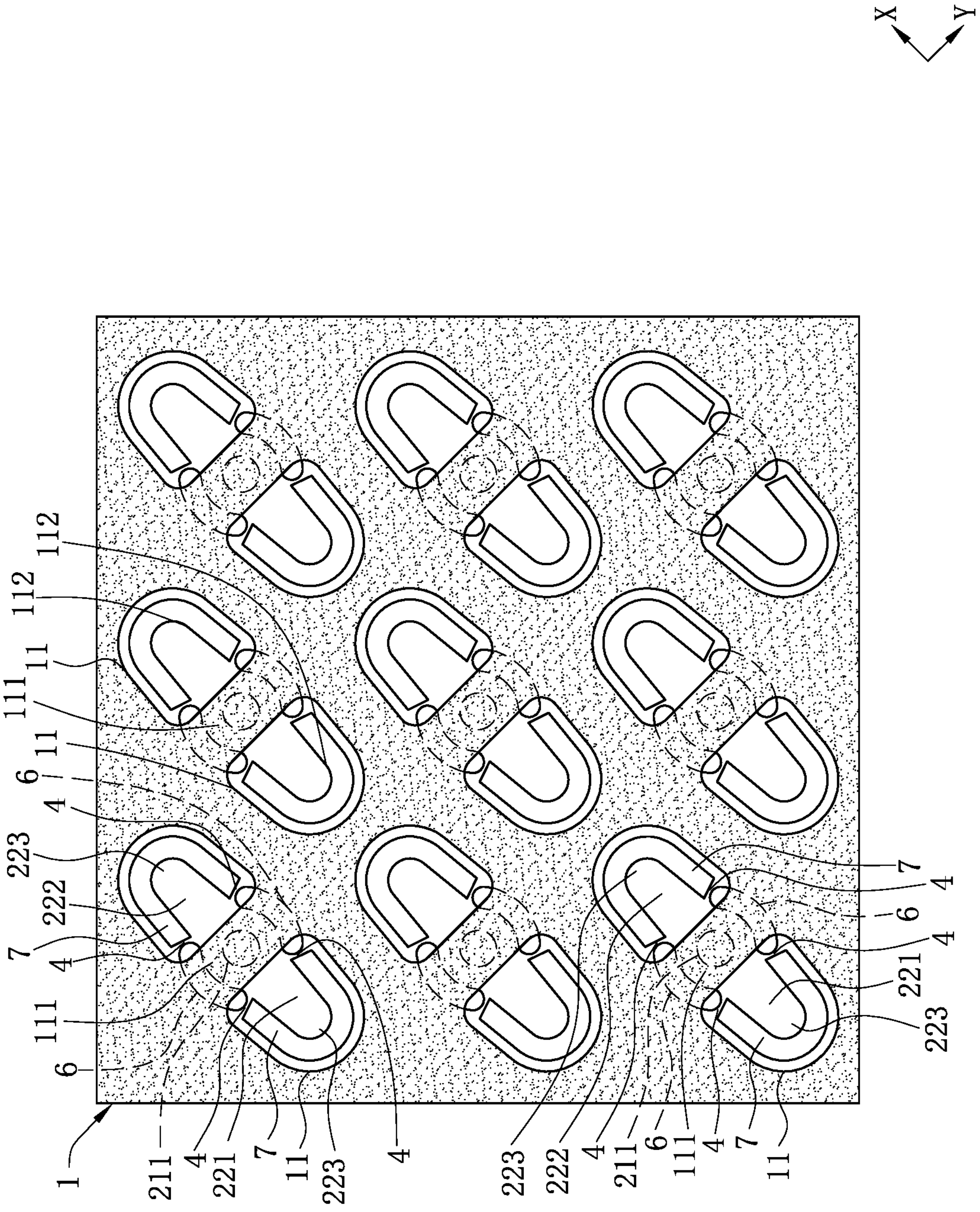
FIG. 16 is a top view of obtaining the insulating body through a further type of insert-molding process according to the first embodiment of the present invention.

Step 1143 (corresponding to the step IV of claim 7): as shown in FIG. 15 to FIG. 16, after the step 1142, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the two cutting slots 7, the first elastic arm 221 and the second elastic arm 222. Liquid plastic is injected into the cavities 502 by insert-molding, thus forming an insulating body 1 and a plurality of accommodating slots 11. Each accommodating slot 11 is provided with a lateral beam portion 111 located in the middle of the accommodating slot 11, and the lateral beam portion 111 covers and fixes the base portion 21. After removing the mold cores 501, each accommodating slot 11 is provided with two reserved spaces 112 separated by the lateral beam portion 111, and the reserved spaces 112 run through the insulating body 1 in the vertical direction. The first elastic arm 221 and the second elastic arm 222 are respectively exposed in two different reserved spaces 112. When forming the insulating body 1, the plastic material partially fills the through holes 211 and the through slots 6 to enhance fixing of the base portion 21.

Step 1144 (corresponding to the step III of claim 7): as shown in FIG. 5 and FIG. 6, after the step 1143, providing a plurality of conductive members 23, and soldering two of the conductive members 23 respectively to the first elastic arm 221 and the second elastic arm 222. The two conductive members 23 are respectively located on a first surface and a second surface of the metal plate 400. The first surface and the second surface are two surfaces arranged opposite to each other in the vertical direction of the metal plate 400. A conductive terminal 2 includes a base portion 21, a first elastic arm 221, a second elastic arm 222 and two conductive members 23. Each conductive member 23 has a soldering portion 231 and a contact portion 232 integrally connected to the soldering portion 231. Each of the two free ends 223 is soldered with a soldering portion 231. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction, and are respectively exposed in two different reserved spaces 112.

Step 1145 (corresponding to the step V of claim 7): as shown in FIG. 7 to FIG. 10, after the step 1144, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the other of the reserved spaces 112 and drives the second elastic arm 222 to deform upward, and the first electronic component 200 then presses downward on the contact portion 232 of the first conductive member 233 to move in one of the reserved spaces 112 and drives the first elastic arm 221 to deform downward. The moving directions of the first conductive member 233 and the second conductive member 234 are opposite to each other, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 76E:
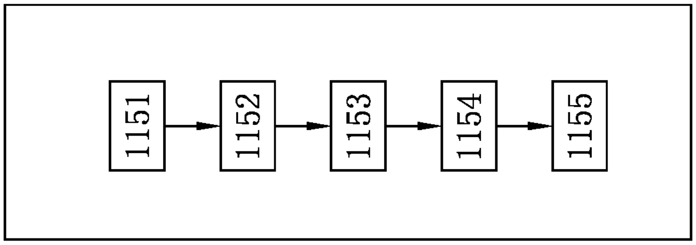
FIG. 76E is a flowchart of a fifth manufacturing method according to the first embodiment of the present invention.

As shown in FIG. 76E, the steps of a fifth method of manufacturing the electrical connector 100 according to the first embodiment are as follows:

Step 1151 (corresponding to the step I of claim 7): as shown in FIG. 1, providing a metal plate 400, and cutting the metal plate 400 to form a plurality of base portions 21, a plurality of pre-soldering areas 22' and a plurality of through slots 6. Two sides of each base portion 21 are connected to two of the pre-soldering areas 22' and two of the through slots 6 running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 17:
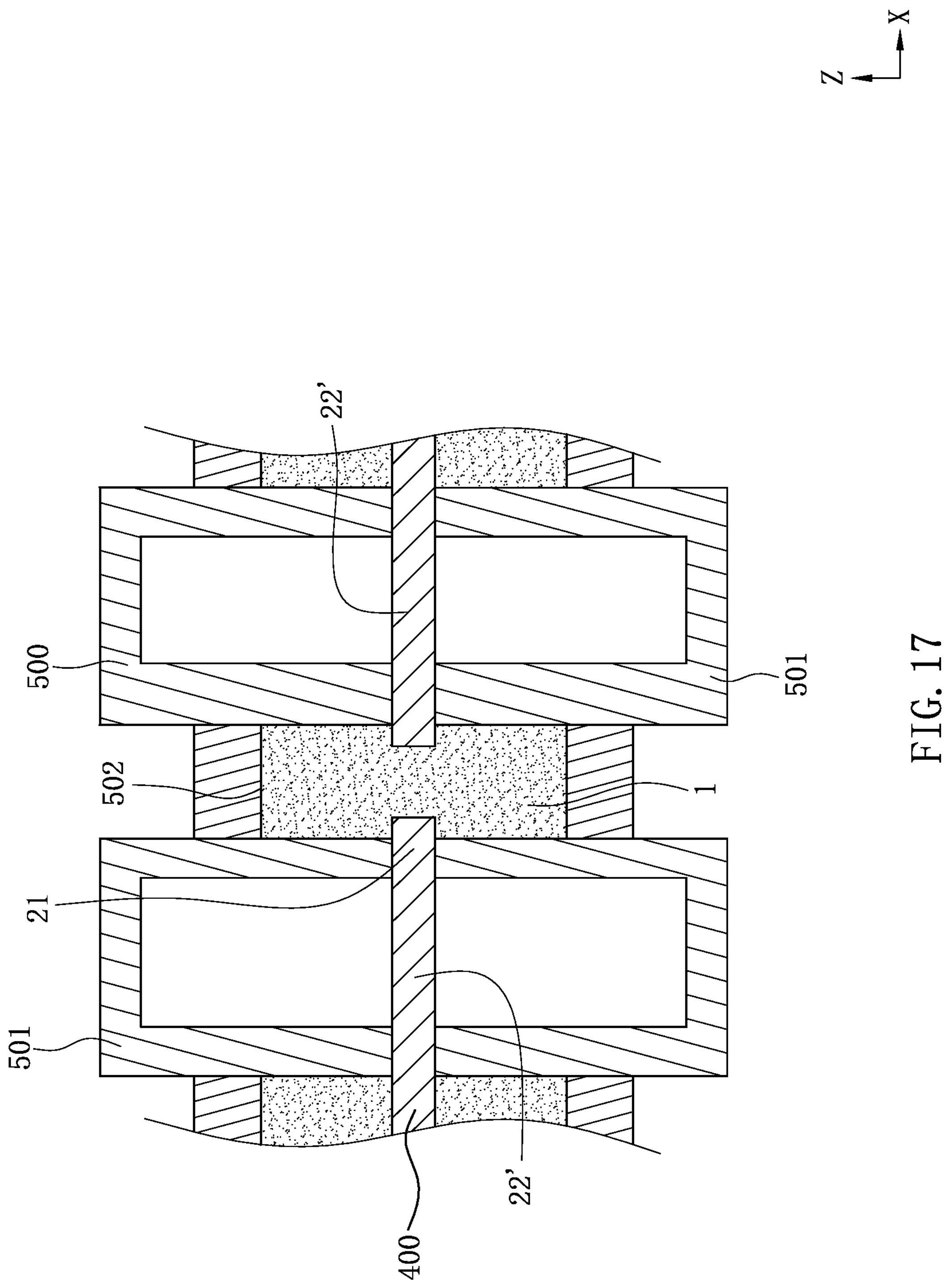
FIG. 17 is a schematic view of yet another type of insert-molding process according to the first embodiment of the present invention.
Figure 18:
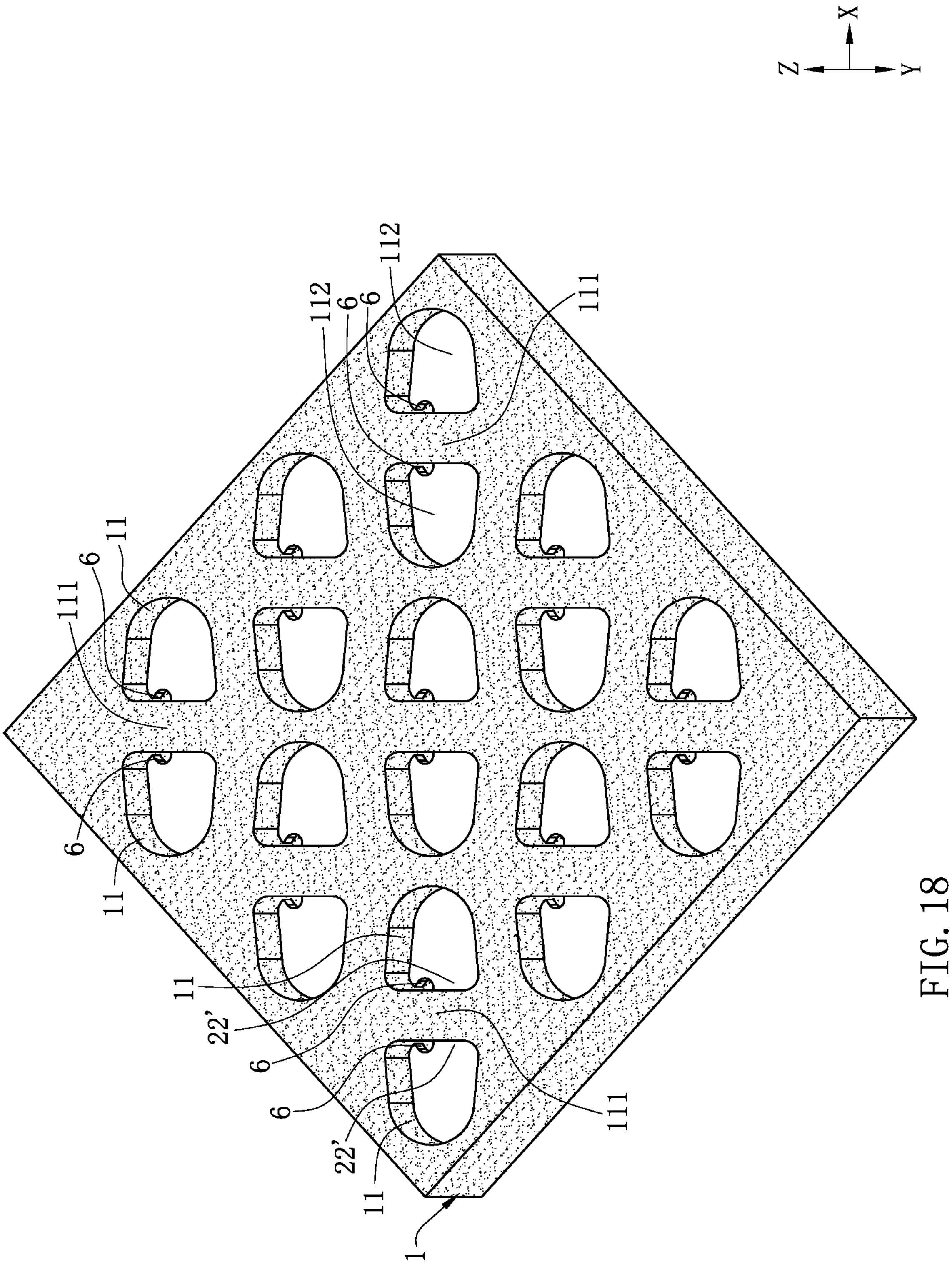
FIG. 18 is a schematic view of obtaining the insulating body through yet another type of insert-molding process according to the first embodiment of the present invention.
Figure 19:
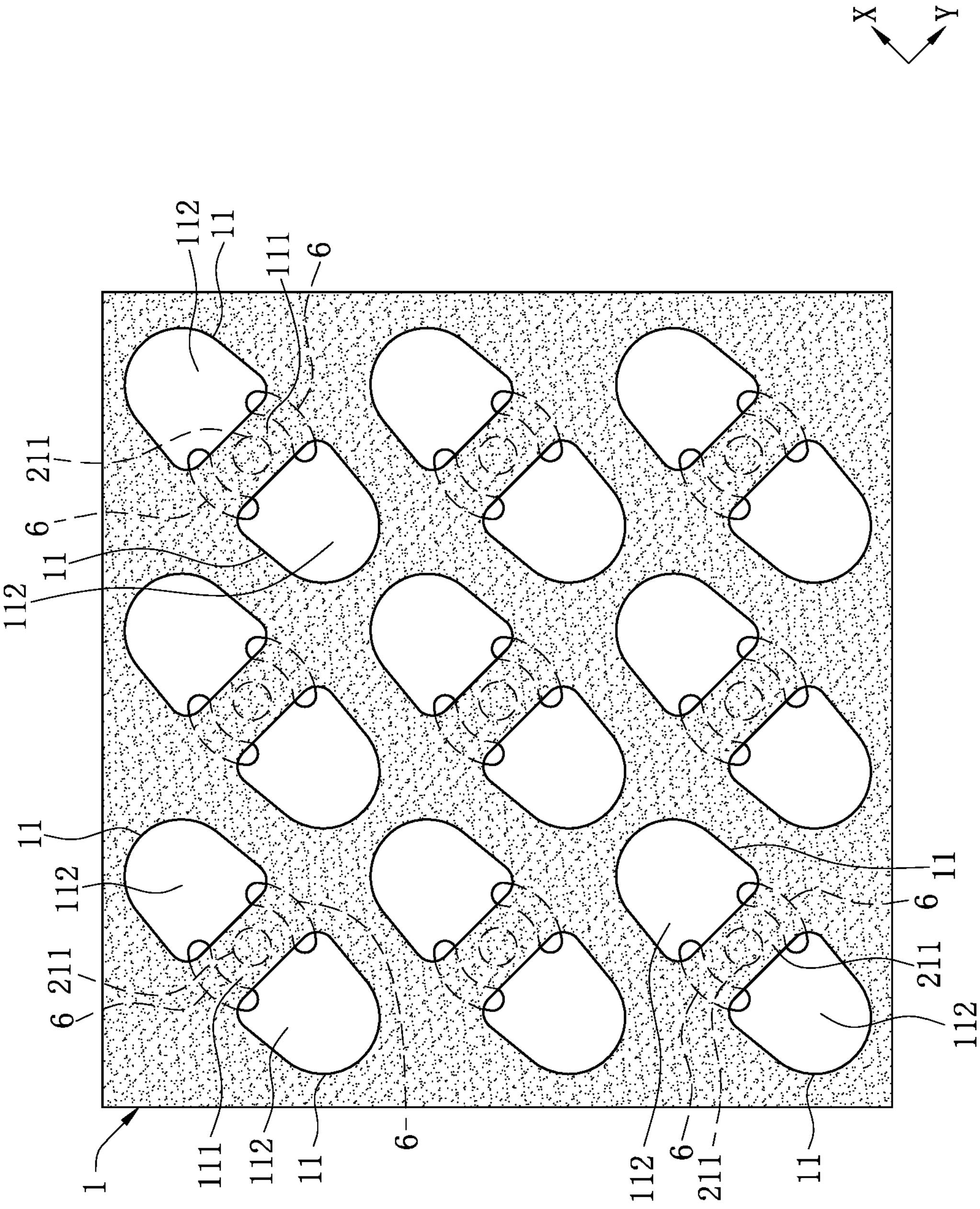
FIG. 19 is a top view of FIG. 18.

Step 1152 (corresponding to the step IV of claim 7): as shown in FIG. 17 and FIG. 19, after the step 1151, the mold 500 has a plurality of mold core 501 and a plurality of cavities 502. Each mold core 501 simultaneously correspondingly abuts and positions a portion of the metal plate 400, and correspondingly shields the two pre-soldering areas 22'. Liquid plastic is injected into the cavities 502 by insert-molding, thus forming an insulating body 1 and a plurality of accommodating slots 11. Each accommodating slot 11 is provided with a lateral beam portion 111 located in the middle of the accommodating slot 11, and the lateral beam portion 111 covers and fixes the base portion 21. After removing the mold cores 501, each accommodating slot 11 is provided with two reserved spaces 112 separated by the lateral beam portion 111. The two pre-soldering areas 22' are respectively exposed in the two different reserved spaces 112. When forming the insulating body 1, the plastic material partially fills the through holes 211 and the through slots 6 to enhance fixing of the base portion 21.

Step 1153 (corresponding to the step II of claim 7): as shown in FIG. 16, after the step 1152, cutting the pre-soldering areas 22' to form a plurality of first elastic arms 221 and a plurality of second elastic arms 222. The first elastic arm 221 and the second elastic arm 222 extend along two opposite sides of the base portion 21. The end of the first elastic arm 221 and the end of the second elastic arm 222 respectively away from the base portion 21 are free ends 223. The reserved spaces 112 run through the insulating body 1 in the vertical direction. The first elastic arm 221 and the second elastic arm 222 are respectively exposed in two different reserved spaces 112.

The cutting further forms two cutting slots 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slots 7.

Step 1154 (corresponding to the step III of claim 7): as shown in FIG. 5 and FIG. 6, after the step 1153, providing a plurality of conductive members 23, and soldering two of the conductive members 23 respectively to the first elastic arm 221 and the second elastic arm 222. The two conductive members 23 are respectively located on a first surface and a second surface of the metal plate 400. The first surface and the second surface are two surfaces of the metal plate 400 which are arranged opposite to each other in the vertical direction. A conductive terminal 2 includes a base portion 21, a first elastic arm 221, a second elastic arm 222 and two conductive members 23. Each conductive member 23 has a soldering portion 231 and a contact portion 232 integrally connected to the soldering portion 231. Each of the two free ends 223 is soldered with a soldering portion 231. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction, and are respectively exposed in two different reserved spaces 112.

Step 1155 (corresponding to the step V of claim 7): as shown in FIG. 7 to FIG. 10, after the step 1154, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the other of the reserved spaces 112 and drives the second elastic arm 222 to deform upward, and the first electronic component 200 then presses downward on the contact portion 232 of the first conductive member 233 to move in one of the reserved spaces 112 and drives the first elastic arm 221 to deform downward. The moving directions of the first conductive member 233 and the second conductive member 234 are opposite to each other, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 76F:
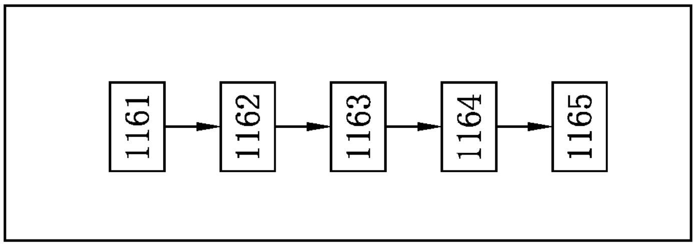
FIG. 76F is a flowchart of a sixth manufacturing method according to the first embodiment of the present invention.

As shown in FIG. 76F, the steps of a sixth method of manufacturing the electrical connector 100 according to the first embodiment are as follows:

Step 1161 (corresponding to the step A of claim 1): as shown in FIG. 1, providing a metal plate 400, and cutting the metal plate 400 to form a plurality of base portions 21, a plurality of pre-soldering areas 22' and a plurality of through slots 6. Two sides of each base portion 21 are connected to two of the pre-soldering areas 22' and two of the through slots 6 running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1162 (corresponding to the step D of claim 1): as shown in FIG. 17 and FIG. 19, after the step 1161, the mold 500 has a plurality of mold core 501 and a plurality of cavities 502. Each mold core 501 simultaneously correspondingly abuts and positions a portion of the metal plate 400, and correspondingly shields the two pre-soldering areas 22'. Liquid plastic is injected into the cavities 502 by insert-molding, thus forming an insulating body 1 and a plurality of accommodating slots 11. Each accommodating slot 11 is provided with a lateral beam portion 111 located in the middle of the accommodating slot 11, and the lateral beam portion 111 covers and fixes the base portion 21. After removing the mold cores 501, each accommodating slot 11 is provided with two reserved spaces 112 separated by the lateral beam portion 111. The two pre-soldering areas 22' are respectively exposed in the two different reserved spaces 112. When forming the insulating body 1, the plastic material partially fills the through holes 211 and the through slots 6 to enhance fixing of the base portion 21.

Step 1163 (corresponding to the step B of claim 1): as shown in FIG. 12 to FIG. 13, after the step 1162, providing a plurality of conductive members 23, and soldering two of the conductive members 23 to two of the pre-soldering areas 22'. Each conductive member 23 has a soldering portion 231 and a contact portion 232 integrally connected to the soldering portion 231. The two conductive members 23 are respectively located on a first surface and a second surface of the metal plate 400, and are respectively exposed in two different reserved spaces 112. The first surface and the second surface are two surfaces of the metal plate 400 arranged opposite to each other in the vertical direction.

Step 1164 (corresponding to the step C of claim 1): as shown in FIG. 6, after the step 1163, cutting and forming a plurality of first elastic arms 221 and a plurality of second elastic arms 222 correspondingly according to locations of the conductive members 23 in the pre-soldering areas 22' as references. The first elastic arm 221 and the second elastic arm 222 extend along two opposite sides of the base portion 21. A conductive terminal 2 includes a base portion 21, a first elastic arm 221, a second elastic arm 222 and two conductive members 23. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction. The end of the first elastic arm 221 and the end of the second elastic arm 222 respectively away from the base portion 21 are free ends 223. Each of the two free ends 223 is soldered with a soldering portion 231. The reserved spaces 112 run through the insulating body 1 in the vertical direction. The first elastic arm 221 and the second elastic arm 222 are respectively exposed in two different reserved spaces 112.

The cutting further forms two cutting slots 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slots 7.

Step 1165 (corresponding to the step E of claim 1): as shown in FIG. 7 to FIG. 10, after the step 1164, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the other of the reserved spaces 112 and drives the second elastic arm 222 to deform upward, and the first electronic component 200 then presses downward on the contact portion 232 of the first conductive member 233 to move in one of the reserved spaces 112 and drives the first elastic arm 221 to deform downward. The moving directions of the first conductive member 233 and the second conductive member 234 are opposite to each other, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 20:
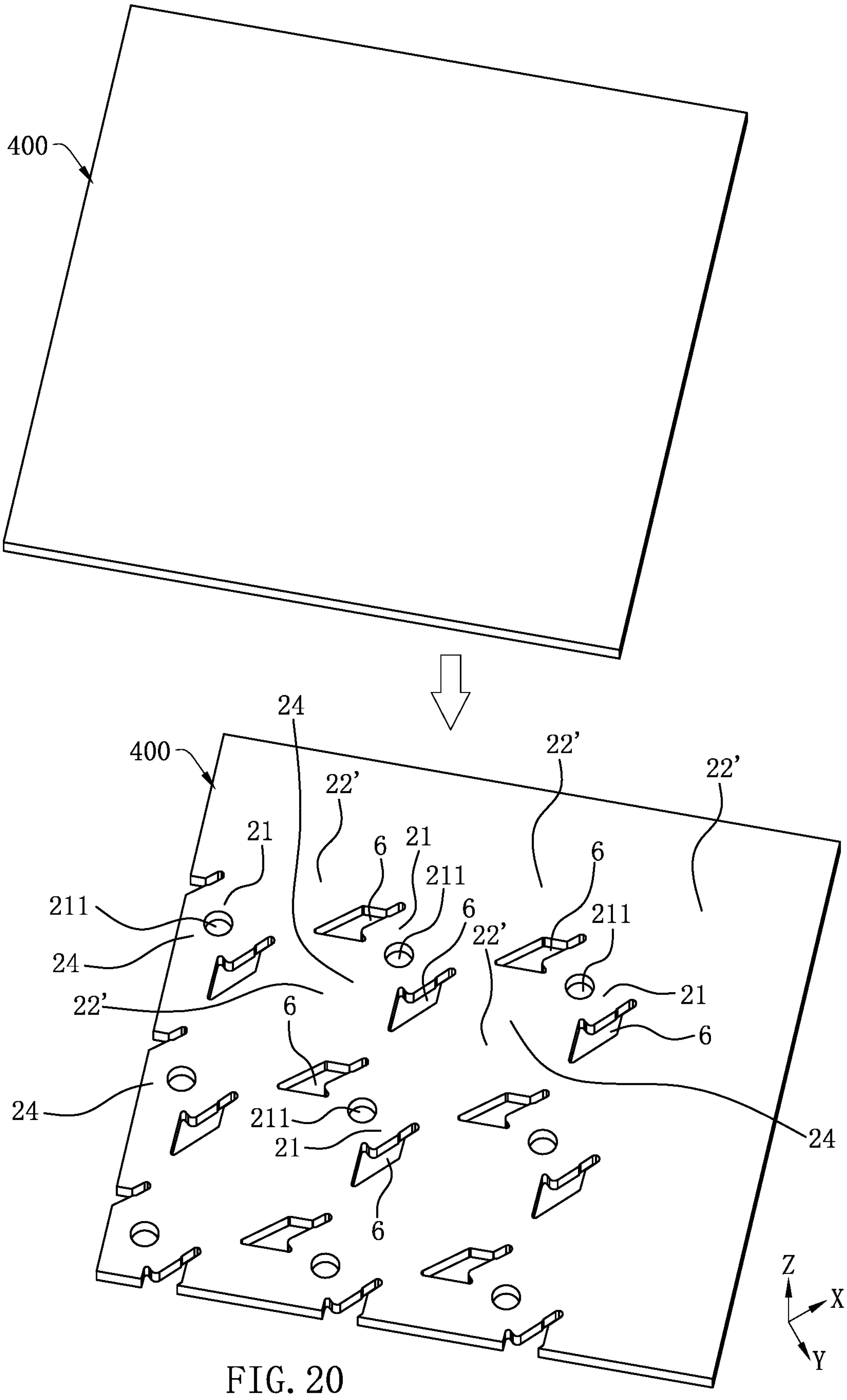
FIG. 20 is a schematic view of cutting a metal plate according to a second embodiment of the present invention.
Figure 77A:
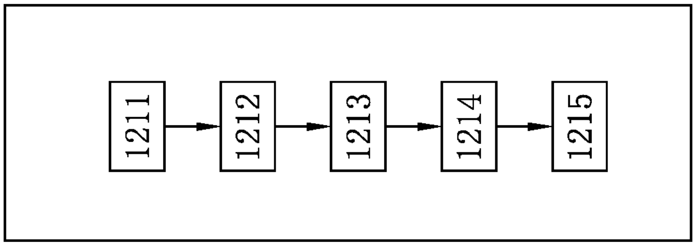
FIG. 77A is a flowchart of a first manufacturing method according to the second embodiment of the present invention.

As shown in FIG. 77A, the steps of a first method of manufacturing the electrical connector 100 according to the second embodiment are as follows:

Step 1211 (corresponding to the step A of claim 1): as shown in FIG. 20, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 21:
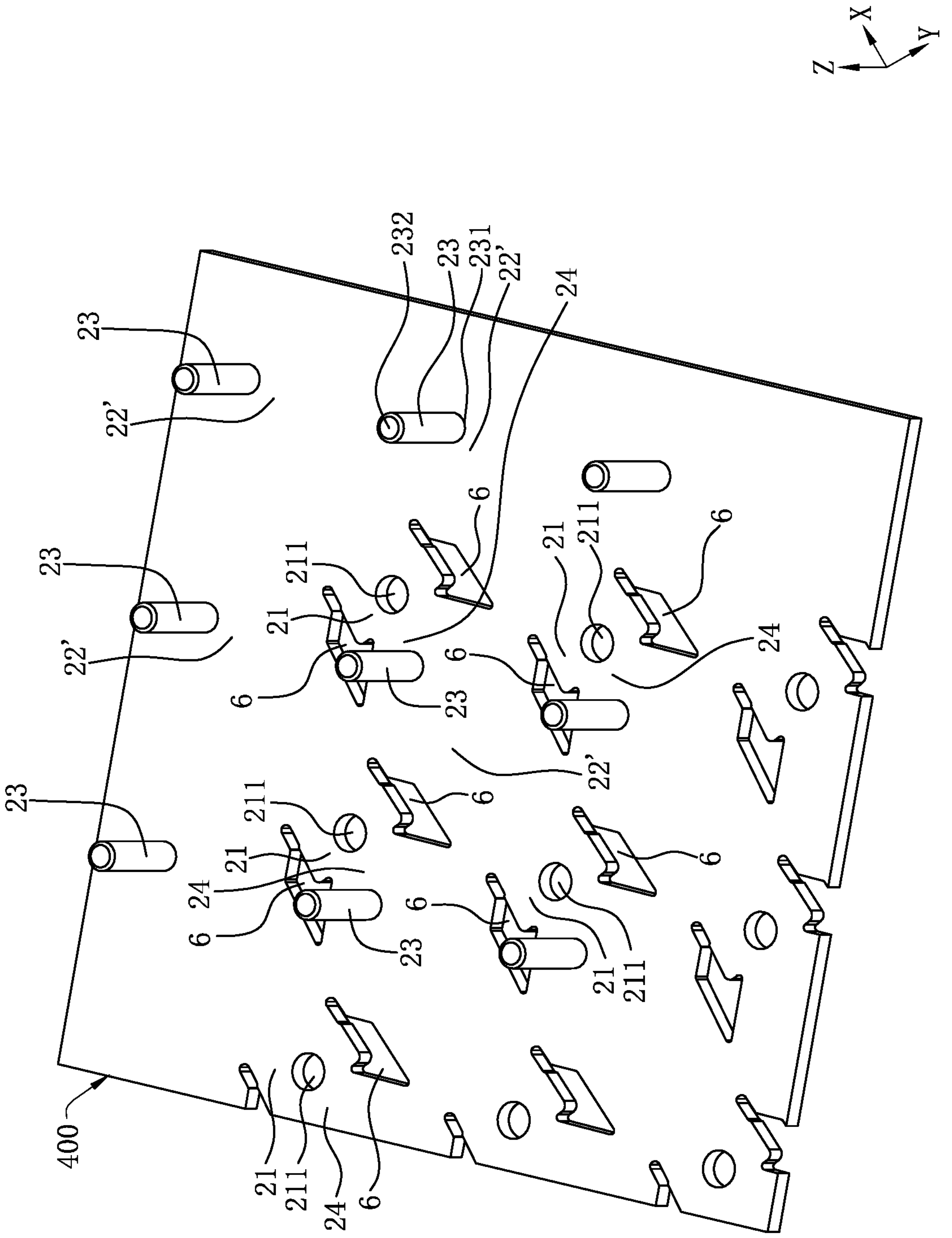
FIG. 21 is a schematic view of soldering conductive members according to the second embodiment of the present invention.

Step 1212 (corresponding to the step B of claim 1): as shown in FIG. 21, after the step 1211, providing a plurality of conductive members 23, and soldering two of the conductive members 23 to one of the pre-soldering areas 22'. The two conductive members 23 are respectively located on a first surface and a second surface of the metal plate 400. The first surface and the second surface are two surfaces of the metal plate 400 arranged opposite to each other in the vertical direction. Each conductive member 23 has a soldering portion 231 and a contact portion 232 integrally connected to the soldering portion 231.

Figure 22:
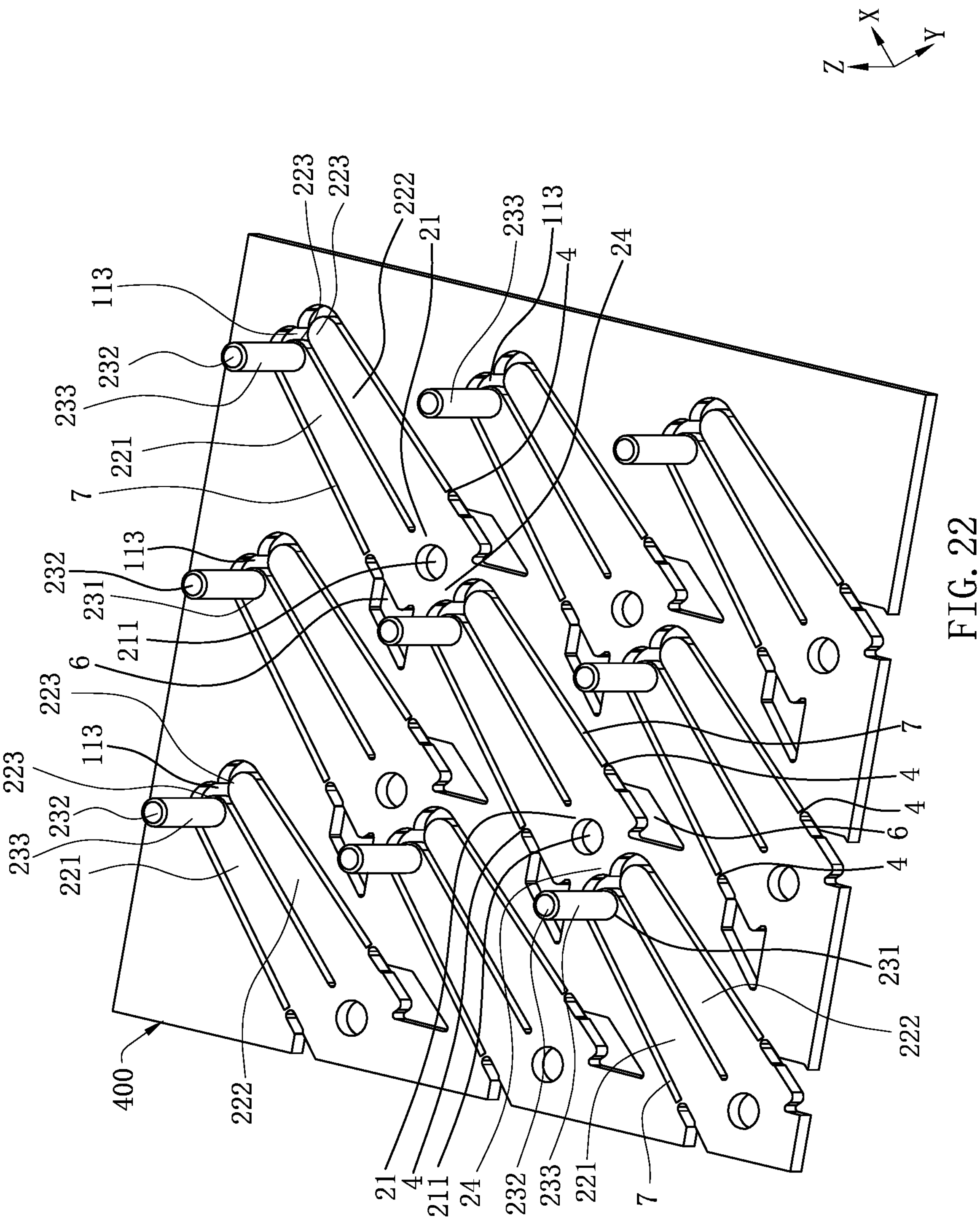
FIG. 22 is a schematic view of one type of cutting the pre-soldering areas to form the elastic arms according to the second embodiment of the present invention.
Figure 23:
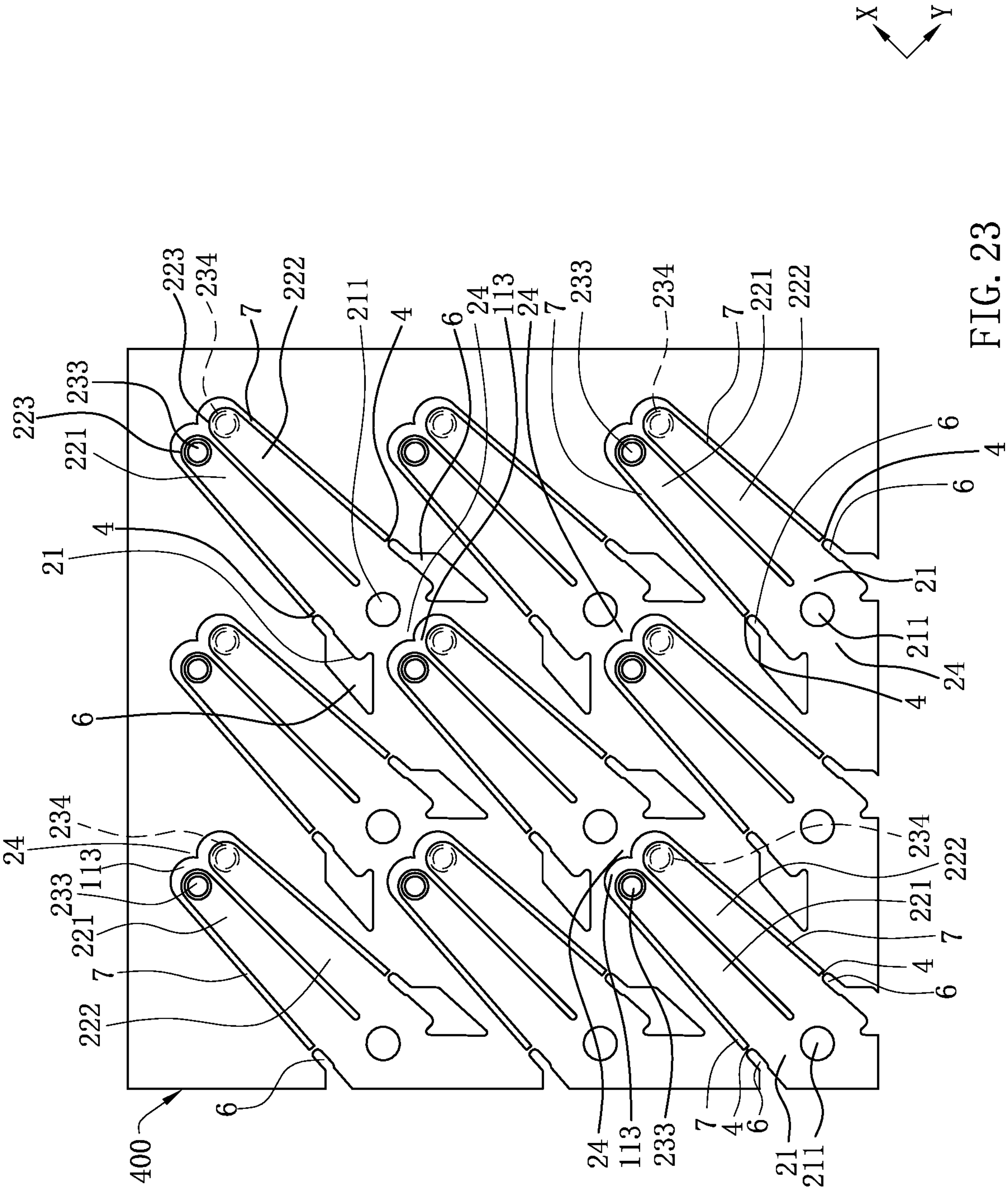
FIG. 23 is a top view of FIG. 22.
Figure 24:
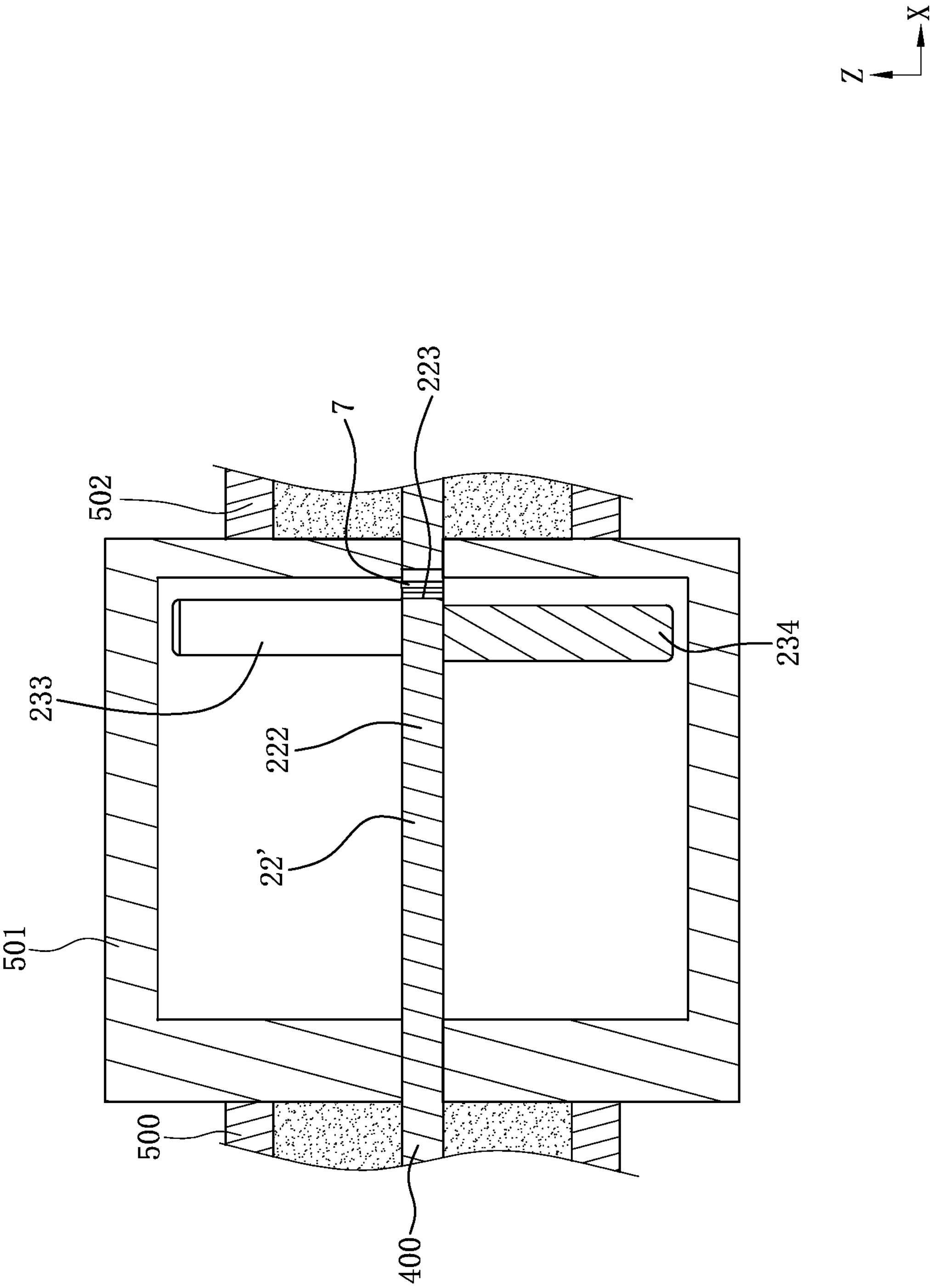
FIG. 24 is a schematic view of one type of insert-molding process according to the second embodiment of the present invention.

Step 1213 (corresponding to the step C of claim 1): as shown in FIG. 22 to FIG. 23, after the step 1212, cutting and forming a plurality of first elastic arms 221 and a plurality of second elastic arms 222 correspondingly according to locations of the conductive members 23 in the pre-soldering areas 22' as references. The first elastic arm 221 and the second elastic arm 222 extend along a same side of the base portion 21. A conductive terminal 2 includes a base portion 21, a first elastic arm 221, a second elastic arm 222, two conductive members 23 and a tail portion 24. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction. The end of the first elastic arm 221 and the end of the second elastic arm 222 respectively away from the base portion 21 are free ends 223. Each of the two free ends 223 is soldered with a soldering portion 231.

When cutting and forming the first elastic arm 221 and the second elastic arm 222, the tail portion 24 connected to the first elastic arm 221 and the second elastic arm 222 located in front thereof and the free ends 223 of the first elastic arm 221 and the second elastic arm 222 located behind are cut and broken, and a reserved space 113 is formed in the tail portion 24 located in front thereof. The free ends 223 located behind are partially located forward in the reserved space 113 of the tail portion 24 located in front thereof.

The cutting further forms a cutting slot 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slot 7.

Step 1214 (corresponding to the step D of claim 1): as shown in FIG. 24 to FIG. 27, after the step 1213, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the first elastic arm 221, the second elastic arm 222, the first conductive member 233 and the second conductive member 234. Liquid plastic is injected into the cavities 502 by insert-molding, thus forming an insulating body 1 and a plurality of accommodating slots 11. After removing the mold cores 501, each accommodating slot 11 is provided with a reserved space 112, and the first elastic arm 221 and the second elastic arm 222 are exposed in the reserved space 112 running through the insulating body 1 in the vertical direction. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1. For a same conductive terminal 2 formed by cutting and soldering, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the first elastic arm 221 and the second elastic arm 222 of the conductive terminal 2 located behind are exposed in the same accommodating slot 11.

Step 1215 (corresponding to the step E of claim 1): as shown in FIG. 28 to FIG. 31, after the step 1214, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the second elastic arm 222 to deform upward, and the first electronic component 200 then presses downward on the contact portion 232 of the first conductive member 233 to move in the reserved space 112 and drives the first elastic arm 221 to deform downward. The moving directions of the first conductive member 233 and the second conductive member 234 are opposite to each other, thus transmitting the signals of the first electronic component 200 to the second electronic component 300.

In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 77B:
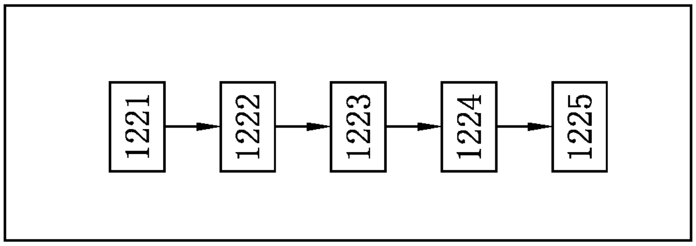
FIG. 77B is a flowchart of a second manufacturing method according to the second embodiment of the present invention.

As shown in FIG. 77B, the steps of a second method of manufacturing the electrical connector 100 according to the second embodiment are as follows:

Step 1221 (corresponding to the step A of claim 1): as shown in FIG. 20, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1222 (corresponding to the step B of claim 1): as shown in FIG. 21, after the step 1221, providing a plurality of conductive members 23, and soldering two of the conductive members 23 to one of the pre-soldering areas 22'. The two conductive members 23 are respectively located on a first surface and a second surface of the metal plate 400. The first surface and the second surface are two surfaces of the metal plate 400 arranged opposite to each other in the vertical direction. Each conductive member 23 has a soldering portion 231 and a contact portion 232 integrally connected to the soldering portion 231.

Figure 32:
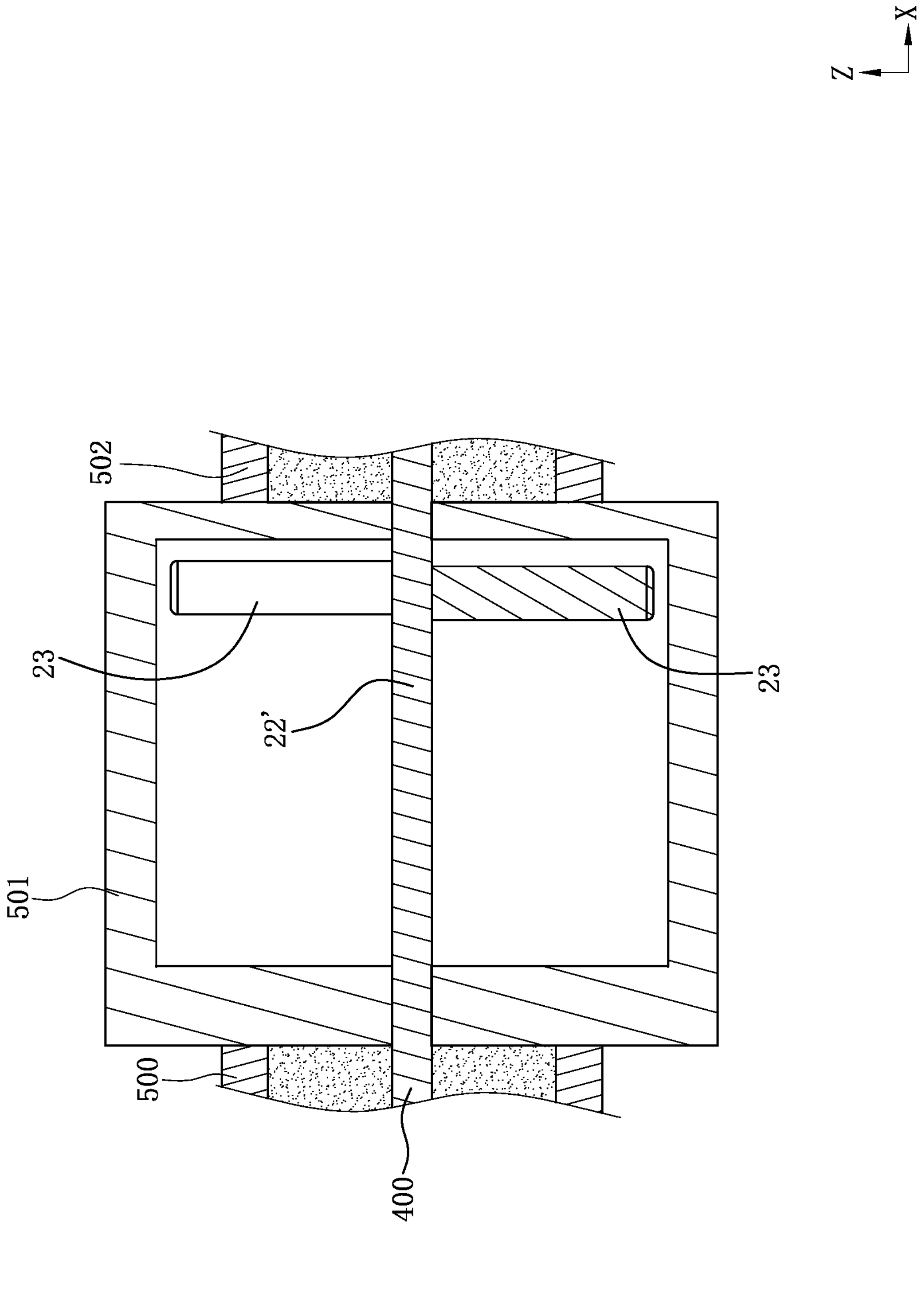
FIG. 32 is a schematic view of another type of insert-molding process according to the second embodiment of the present invention.
Figure 33:
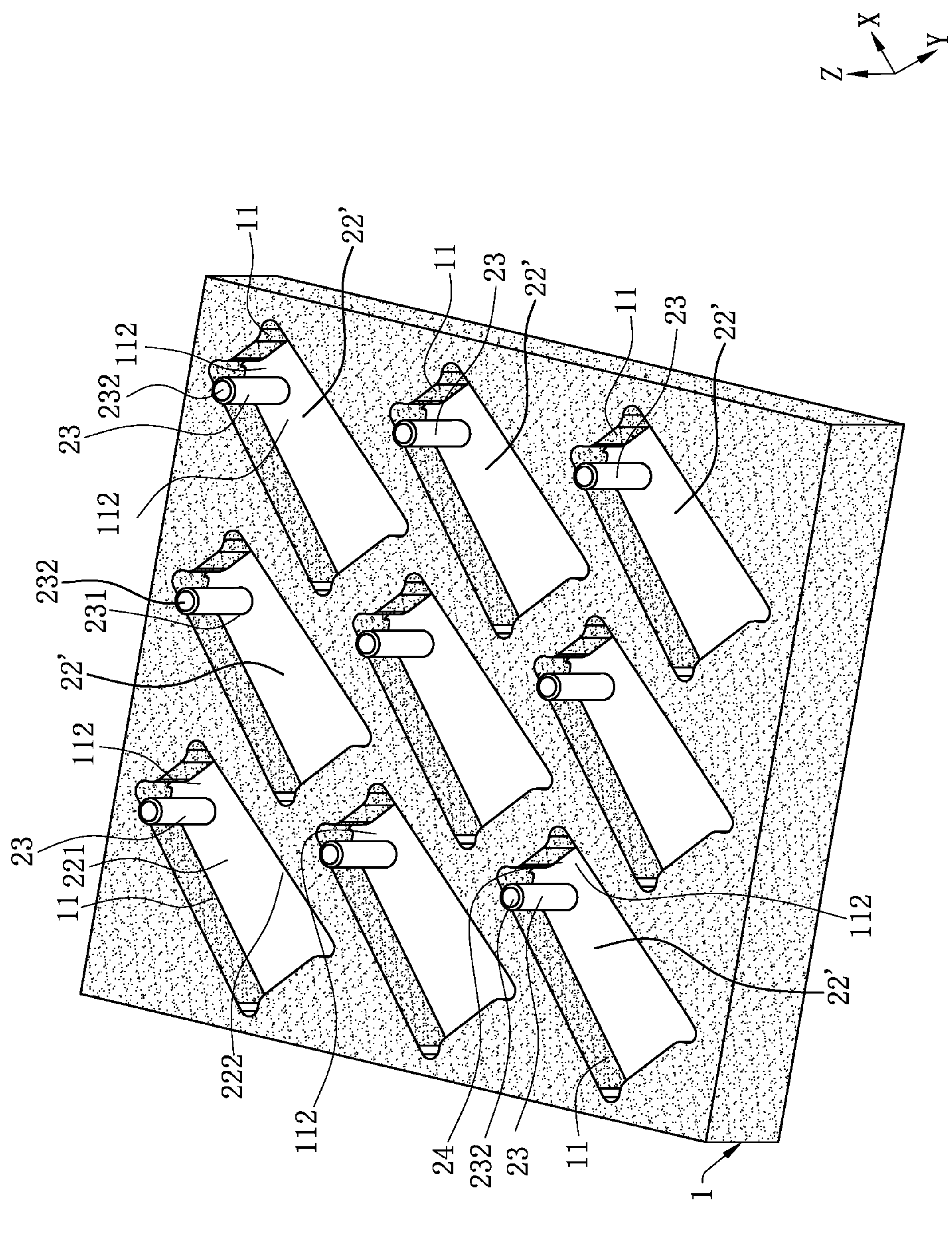
FIG. 33 is a schematic view of obtaining the insulating body through another type of insert-molding process according to the second embodiment of the present invention.

Step 1223 (corresponding to the step D of claim 1): as shown in FIG. 32 to FIG. 33, after the step 1222, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields a pre-soldering area 22' and the two conductive members 23. Liquid plastic is injected into the cavities 502 by insert-molding, thus forming an insulating body 1 and a plurality of accommodating slots 11. After removing the mold cores 501, each accommodating slot 11 is provided with a reserved space 112, and the two conductive members 23 are exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Figure 26:
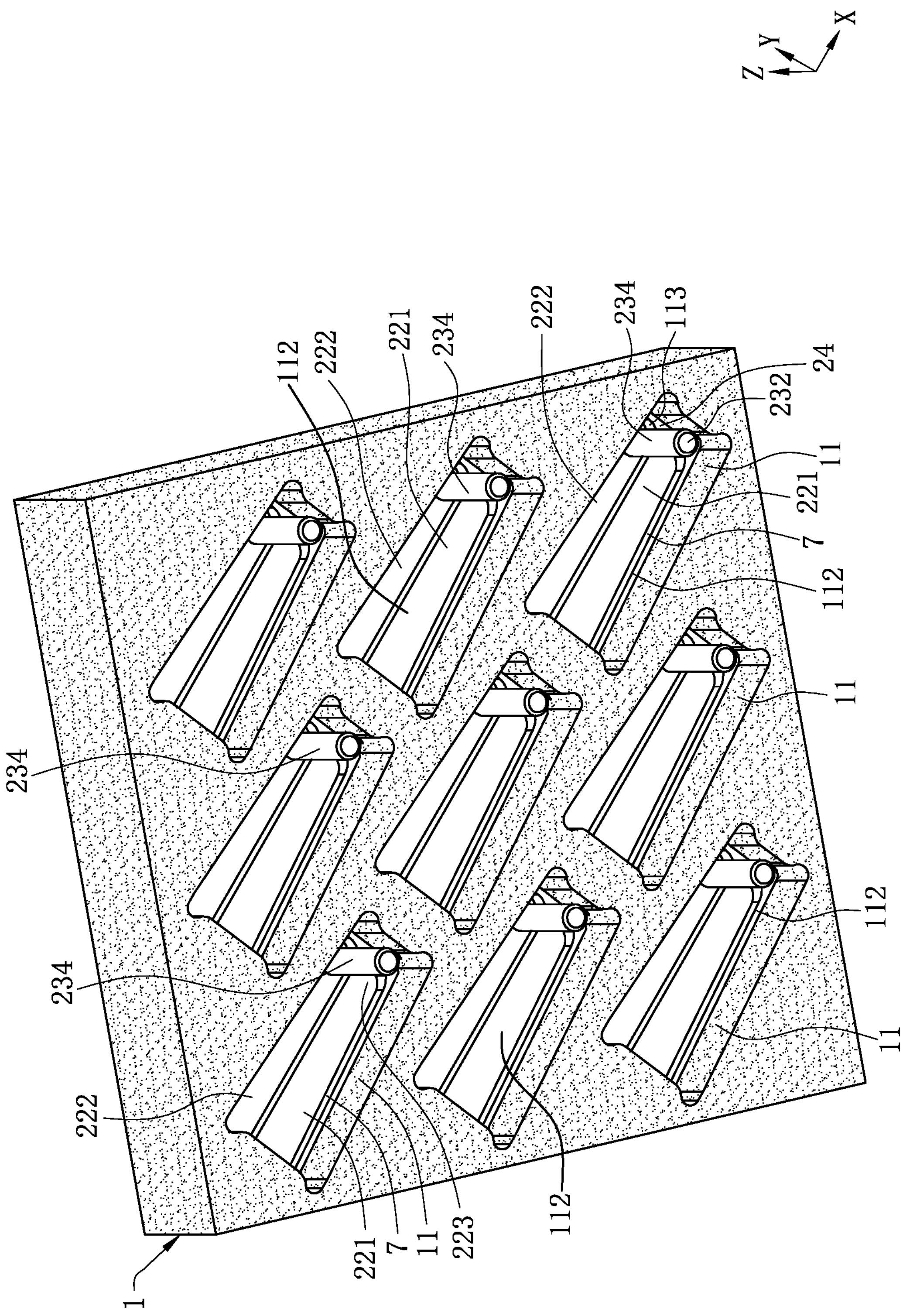
FIG. 26 is a schematic view of FIG. 25 in another angle.

Step 1224 (corresponding to the step C of claim 1): as shown in FIG. 25 to FIG. 27, after the step 1223, cutting and forming a plurality of first elastic arms 221 and a plurality of second elastic arms 222 correspondingly according to locations of the conductive members 23 in the pre-soldering areas 22' as references. The first elastic arm 221 and the second elastic arm 222 extend along a same side of the base portion 21. A conductive terminal 2 includes a base portion 21, a first elastic arm 221, a second elastic arm 222, two conductive members 23 and a tail portion 24. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction. The end of the first elastic arm 221 and the end of the second elastic arm 222 respectively away from the base portion 21 are free ends 223. Each of the two free ends 223 is soldered with a soldering portion 231. The first elastic arm 221 and the second elastic arm 222 are exposed in the reserved spaces 112 running through the insulating body 1 in the vertical direction.

When cutting and forming the first elastic arm 221 and the second elastic arm 222, the tail portion 24 of the conductive terminal 2 located in front thereof and the free ends 223 of the conductive terminal 2 located behind are cut and broken, and a reserved space 113 is formed in the tail portion 24 of the conductive terminal 2 located in front thereof. The free ends 223 of the conductive terminal 2 located behind are partially located forward in the reserved space 113 of the conductive terminal 2 located in front thereof, thus reducing the distance between the two adjacent conductive terminals 2.

For a same conductive terminal 2 formed by cutting and soldering, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the first elastic arm 221 and the second elastic arm 222 of the conductive terminal 2 located behind are exposed in the same accommodating slot 11.

The cutting further forms a cutting slot 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slot 7.

Step 1225 (corresponding to the step E of claim 1): as shown in FIG. 28 to FIG. 31, after the step 1224, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the second elastic arm 222 to deform upward, and the first electronic component 200 then presses downward on the contact portion 232 of the first conductive member 233 to move in the reserved space 112 and drives the first elastic arm 221 to deform downward. The moving directions of the first conductive member 233 and the second conductive member 234 are opposite to each other, thus transmitting the signals of the first electronic component 200 to the second electronic component 300.

Figure 77C:
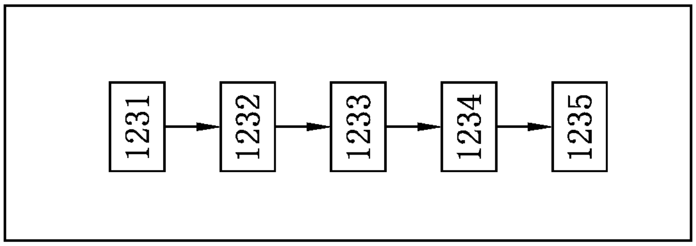
FIG. 77C is a flowchart of a third manufacturing method according to the second embodiment of the present invention.

As shown in FIG. 77C, the steps of a third method of manufacturing the electrical connector 100 according to the second embodiment are as follows:

Step 1231 (corresponding to the step I of claim 7): as shown in FIG. 20, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 34:
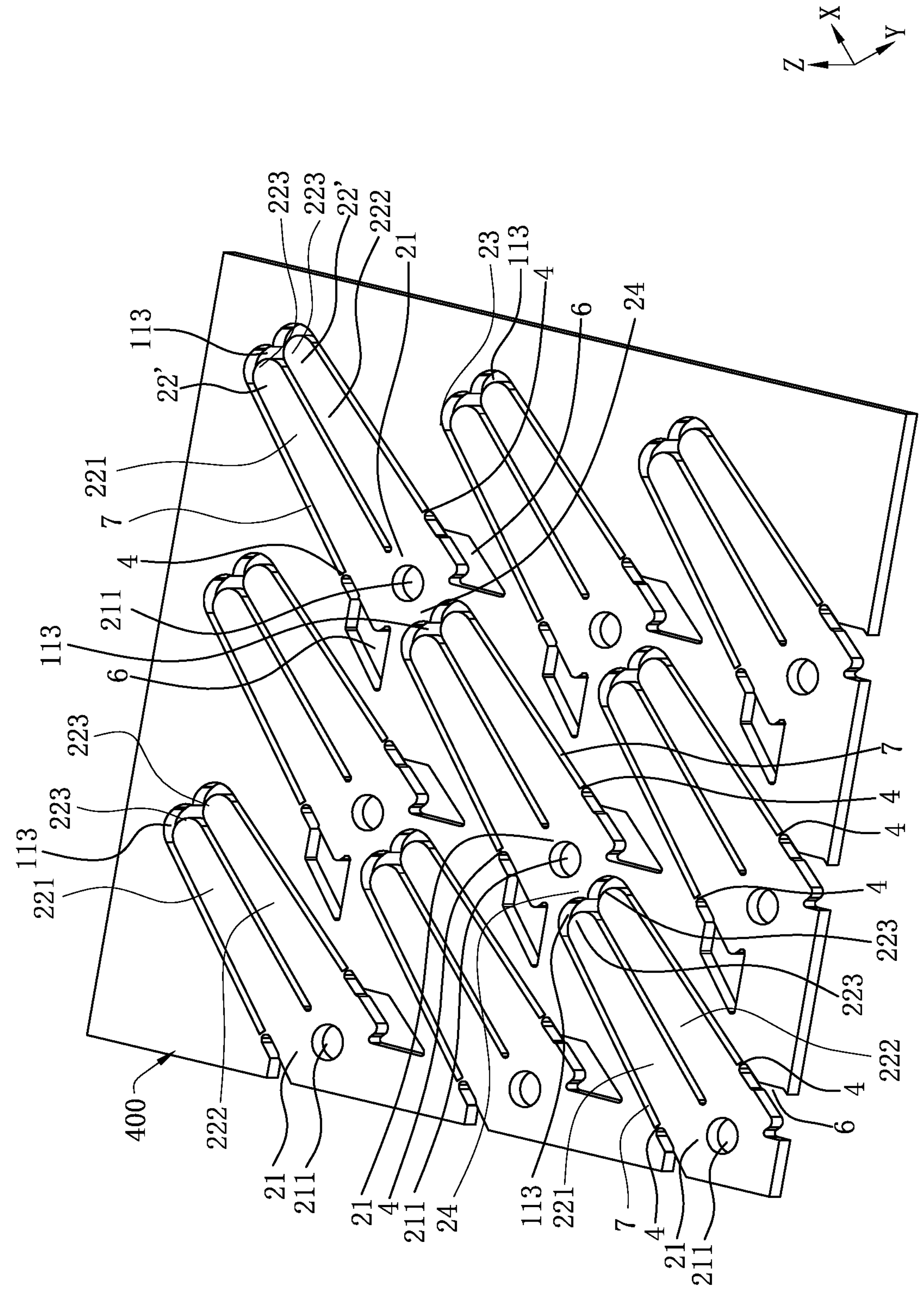
FIG. 34 is a schematic view of another type of cutting the pre-soldering areas to form the elastic arms according to the second embodiment of the present invention.

Step 1232 (corresponding to the step II of claim 7): as shown in FIG. 34, after the step 1231, cutting the pre-soldering areas 22' to form a plurality of first elastic arms 221 and a plurality of second elastic arms 222. The first elastic arm 221 and the second elastic arm 222 extend along a same side of the base portion 21. The end of the first elastic arm 221 and the end of the second elastic arm 222 respectively away from the base portion 21 are free ends 223. In other embodiments, the step 1232 may be in the step 1231 to perform simultaneous cutting.

When cutting and forming the first elastic arm 221 and the second elastic arm 222, the tail portion 24 connected to the first elastic arm 221 and the second elastic arm 222 located in front thereof and the free ends 223 of the first elastic arm 221 and the second elastic arm 222 located behind are cut and broken, and a reserved space 113 is formed in the tail portion 24 located in front thereof. The free ends 223 located behind are partially located forward in the reserved space 113 of the tail portion 24 located in front thereof.

The cutting further forms a cutting slot 7 running through the metal plate 400 and located at outer sides of the first elastic arm 221 and the second elastic arm 222 and a plurality of connecting portions 4 connected to the same base portion 21. The connecting portions 4 are used to separate the through slots 6 and the cutting slot 7.

Step 1233 (corresponding to the step III of claim 7): as shown in FIG. 22 to FIG. 23, after the step 1232, providing a plurality of conductive members 23, and soldering two of the conductive members 23 respectively to the first elastic arm 221 and the second elastic arm 222. The two conductive members 23 are respectively located on a first surface and a second surface of the metal plate 400. The first surface and the second surface are two surfaces of the metal plate 400 arranged opposite to each other in the vertical direction. A conductive terminal 2 includes a base portion 21, a first elastic arm 221, a second elastic arm 222, two conductive members 23 and a tail portion 24. Each conductive member 23 has a soldering portion 231 and a contact portion 232 integrally connected to the soldering portion 231. Each of the two free ends 223 is soldered with a soldering portion 231. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction.

Step 1234 (corresponding to the step IV of claim 7): as shown in FIG. 24 to FIG. 27, after the step 1233, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the first elastic arm 221, the second elastic arm 222, the first conductive member 233 and the second conductive member 234. Liquid plastic is injected into the cavities 502 by insert-molding, thus forming an insulating body 1 and a plurality of accommodating slots 11. After removing the mold cores 501, each accommodating slot 11 is provided with a reserved space 112, and the first elastic arm 221 and the second elastic arm 222 are exposed in the reserved space 112 running through the insulating body 1 in the vertical direction. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1. For a same conductive terminal 2 formed by cutting and soldering, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the first elastic arm 221 and the second elastic arm 222 of the conductive terminal 2 located behind are exposed in the same accommodating slot 11.

Step 1235 (corresponding to the step V of claim 7): as shown in FIG. 28 to FIG. 31, after the step 1234, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the second elastic arm 222 to deform upward, and the first electronic component 200 then presses downward on the contact portion 232 of the first conductive member 233 to move in the reserved space 112 and drives the first elastic arm 221 to deform downward. The moving directions of the first conductive member 233 and the second conductive member 234 are opposite to each other, thus transmitting the signals of the first electronic component 200 to the second electronic component 300.

Figure 77D:
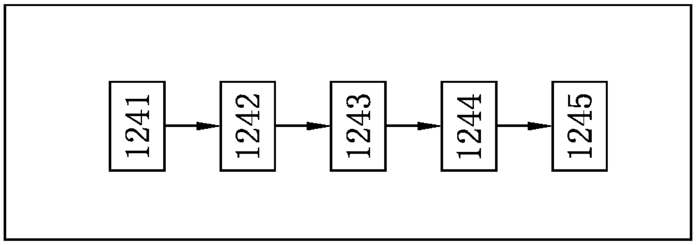
FIG. 77D is a flowchart of a fourth manufacturing method according to the second embodiment of the present invention.

As shown in FIG. 77D, the steps of a fourth method of manufacturing the electrical connector 100 according to the second embodiment are as follows:

Step 1241 (corresponding to the step I of claim 7): as shown in FIG. 20, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1242 (corresponding to the step II of claim 7): as shown in FIG. 34, after the step 1241, cutting the pre-soldering areas 22' to form a plurality of first elastic arms 221 and a plurality of second elastic arms 222. The first elastic arm 221 and the second elastic arm 222 extend along a same side of the base portion 21. The end of the first elastic arm 221 and the end of the second elastic arm 222 respectively away from the base portion 21 are free ends 223. In other embodiments, the step 1242 may be in the step 1241 to perform simultaneous cutting.

When cutting and forming the first elastic arm 221 and the second elastic arm 222, the tail portion 24 connected to the first elastic arm 221 and the second elastic arm 222 located in front thereof and the free ends 223 of the first elastic arm 221 and the second elastic arm 222 located behind are cut and broken, and a reserved space 113 is formed in the tail portion 24 located in front thereof. The free ends 223 located behind are partially located forward in the reserved space 113 of the tail portion 24 located in front thereof.

The cutting further forms a cutting slot 7 running through the metal plate 400 and located at outer sides of the first elastic arm 221 and the second elastic arm 222 and a plurality of connecting portions 4 connected to the same base portion 21. The connecting portions 4 are used to separate the through slots 6 and the cutting slot 7.

Figure 35:
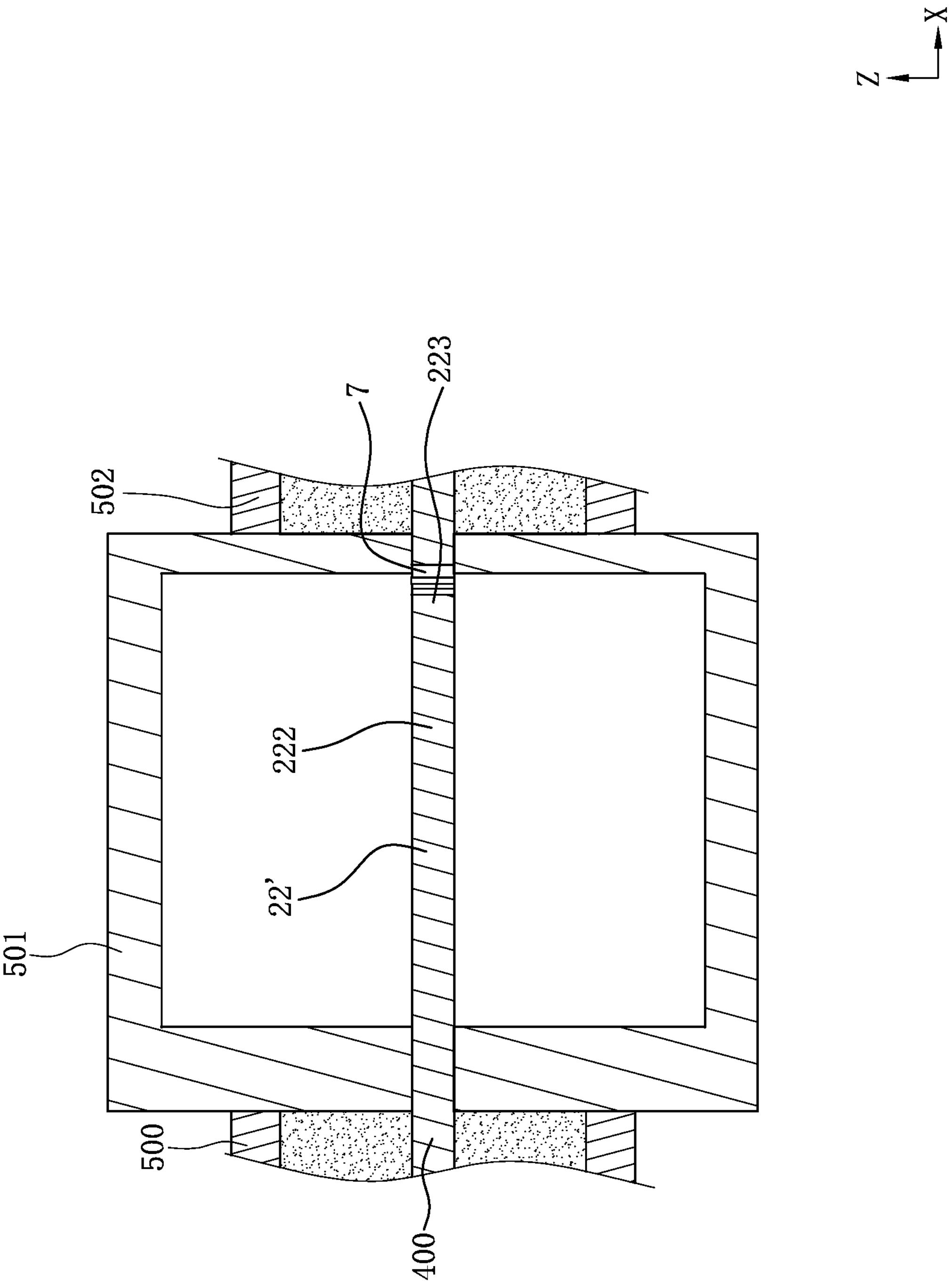
FIG. 35 is a schematic view of a further type of insert-molding process according to the second embodiment of the present invention.
Figure 36:
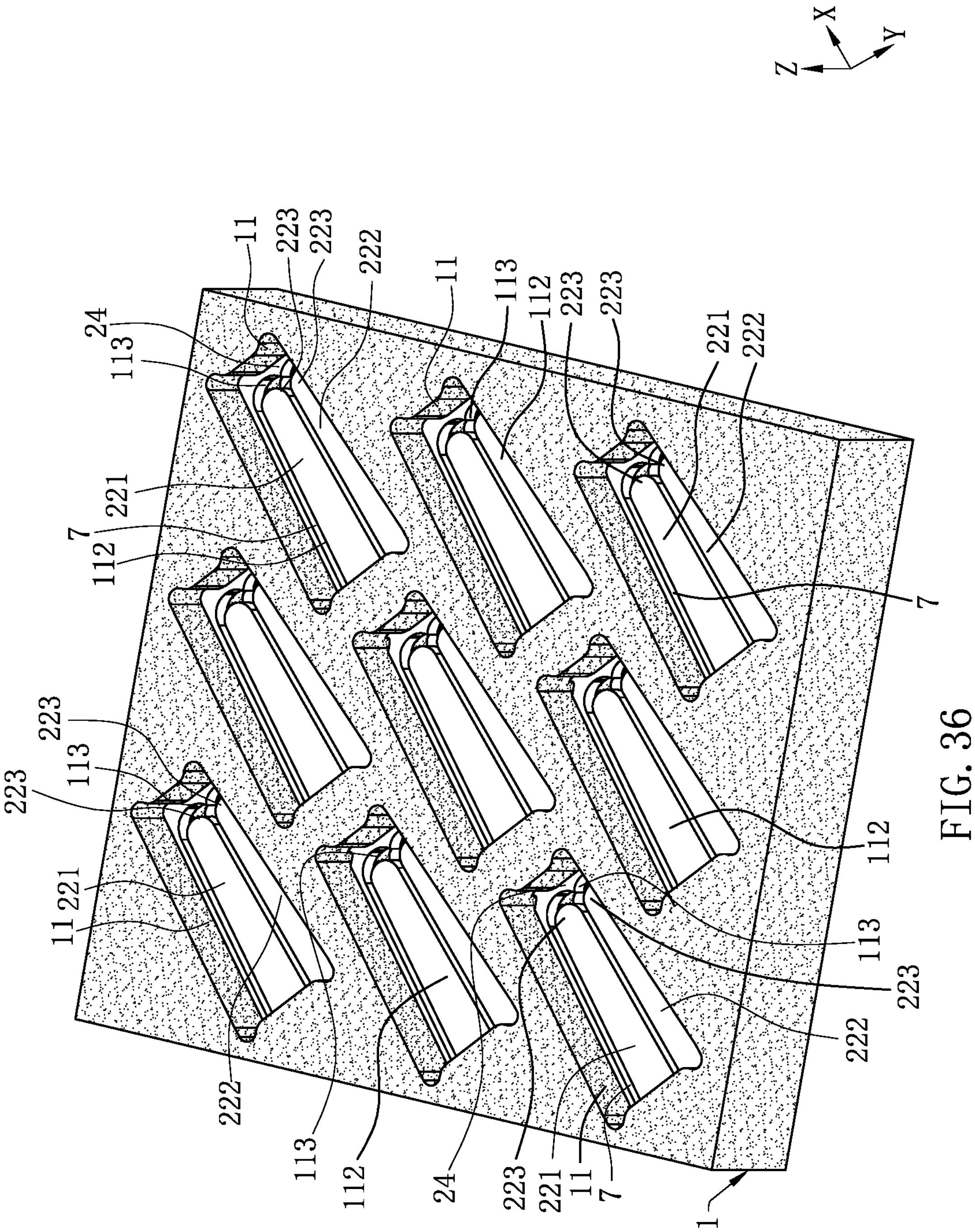
FIG. 36 is a schematic view of obtaining the insulating body through a further type of insert-molding process according to the second embodiment of the present invention.

Step 1243 (corresponding to the step IV of claim 7): as shown in FIG. 35 to FIG. 36, after the step 1242, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the first elastic arm 221 and the second elastic arm 222. Liquid plastic is injected into the cavities 502 by insert-molding, thus forming an insulating body 1 and a plurality of accommodating slots 11. After removing the mold cores 501, each accommodating slot 11 is provided with a reserved space 112, and the first elastic arm 221 and the second elastic arm 222 are exposed in the reserved space 112 running through the insulating body 1 in the vertical direction. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1244 (corresponding to the step III of claim 7): as shown in FIG. 25 to FIG. 27, after the step 1243, providing a plurality of conductive members 23, and soldering two of the conductive members 23 respectively to the first elastic arm 221 and the second elastic arm 222. The two conductive members 23 are respectively located on a first surface and a second surface of the metal plate 400. The first surface and the second surface are two surfaces of the metal plate 400 arranged opposite to each other in the vertical direction. A conductive terminal 2 includes a base portion 21, a first elastic arm 221, a second elastic arm 222, two conductive members 23 and a tail portion 24. Each conductive member 23 has a soldering portion 231 and a contact portion 232 integrally connected to the soldering portion 231. Each of the two free ends 223 is soldered with a soldering portion 231. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction, and are exposed in the reserved space 112.

For a same conductive terminal 2 formed by cutting and soldering, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the first elastic arm 221 and the second elastic arm 222 of the conductive terminal 2 located behind are exposed in the same accommodating slot 11.

Step 1245 (corresponding to the step V of claim 7): as shown in FIG. 28 to FIG. 31, after the step 1244, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the other of the conductive members 23 to move in the reserved space 112 and drives the second elastic arm 222 to deform upward, and the first electronic component 200 then presses downward on the contact portion 232 of one of the conductive members 23 to move in the reserved space 112 and drives the first elastic arm 221 to deform downward. The moving directions of the two conductive members 23 are opposite to each other, thus transmitting the signals of the first electronic component 200 to the second electronic component 300.

Figure 77E:
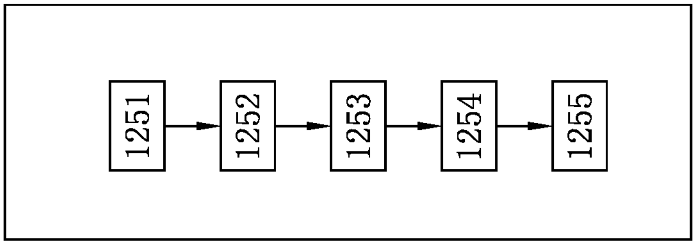
FIG. 77E is a flowchart of a fifth manufacturing method according to the second embodiment of the present invention.

As shown in FIG. 77E, the steps of a fifth method of manufacturing the electrical connector 100 according to the second embodiment are as follows:

Step 1251 (corresponding to the step I of claim 7): as shown in FIG. 20, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 37:
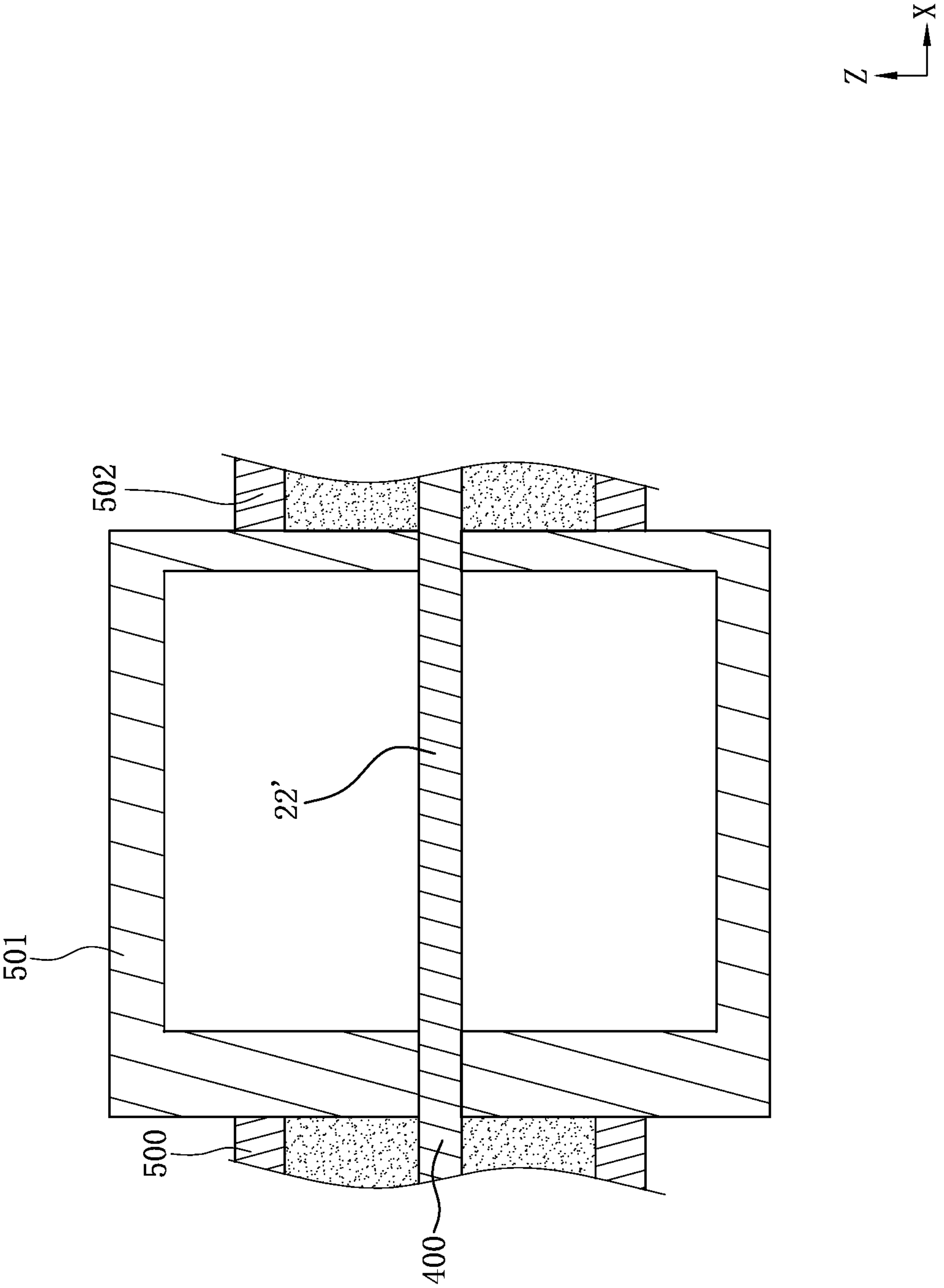
FIG. 37 is a schematic view of yet another type of insert-molding process according to the second embodiment of the present invention.
Figure 38:
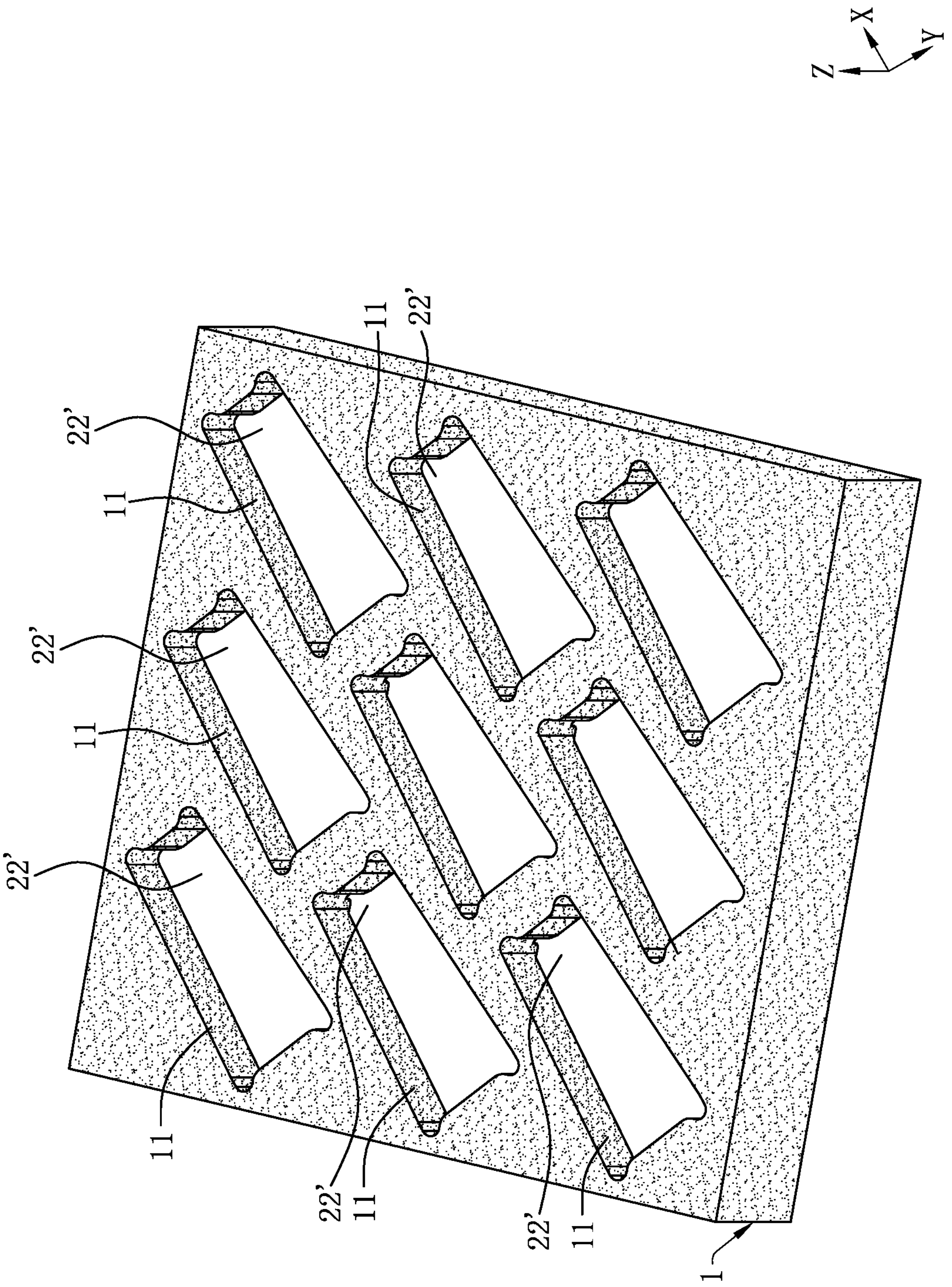
FIG. 38 is a schematic view of obtaining the insulating body through yet another type of insert-molding process according to the second embodiment of the present invention.

Step 1252 (corresponding to the step IV of claim 7): as shown in FIG. 37 to FIG. 38, after the step 1251, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields a pre-soldering area 22'. Liquid plastic is injected into the cavities 502 by insert-molding, thus forming an insulating body 1 and a plurality of accommodating slots 11. After removing the mold cores 501, each accommodating slot 11 is provided with a reserved space 112, and the pre-soldering area 22' is exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1253 (corresponding to the step II of claim 7): as shown in FIG. 36, after the step 1252, cutting the pre-soldering areas 22' to form a plurality of first elastic arms 221 and a plurality of second elastic arms 222. The first elastic arm 221 and the second elastic arm 222 extend along a same side of the base portion 21. The end of the first elastic arm 221 and the end of the second elastic arm 222 respectively away from the base portion 21 are free ends 223. The first elastic arm 221 and the second elastic arm 222 are exposed in the reserved space 112 running through the insulating body 1 in the vertical direction.

When cutting and forming the first elastic arm 221 and the second elastic arm 222, the tail portion 24 connected to the first elastic arm 221 and the second elastic arm 222 located in front thereof and the free ends 223 of the first elastic arm 221 and the second elastic arm 222 located behind are cut and broken, and a reserved space 113 is formed in the tail portion 24 located in front thereof. The free ends 223 located behind are partially located forward in the reserved space 113 of the tail portion 24 located in front thereof.

The cutting further forms a cutting slot 7 running through the metal plate 400 and located at outer sides of the first elastic arm 221 and the second elastic arm 222 and a plurality of connecting portions 4 connected to the same base portion 21. The connecting portions 4 are used to separate the through slots 6 and the cutting slot 7.

Step 1254 (corresponding to the step III of claim 7): as shown in FIG. 25 to FIG. 27, after the step 1253, providing a plurality of conductive members 23, and soldering two of the conductive members 23 respectively to the first elastic arm 221 and the second elastic arm 222. The two conductive members 23 are respectively located on a first surface and a second surface of the metal plate 400. The first surface and the second surface are two surfaces of the metal plate 400 arranged opposite to each other in the vertical direction. A conductive terminal 2 includes a base portion 21, a first elastic arm 221, a second elastic arm 222, two conductive members 23 and a tail portion 24. Each conductive member 23 has a soldering portion 231 and a contact portion 232 integrally connected to the soldering portion 231. Each of the two free ends 223 is soldered with a soldering portion 231. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction, and are exposed in the reserved space 112.

For a same conductive terminal 2 formed by cutting and soldering, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the first elastic arm 221 and the second elastic arm 222 of the conductive terminal 2 located behind are exposed in the same accommodating slot 11.

Step 1255 (corresponding to the step V of claim 7): as shown in FIG. 28 to FIG. 31, after the step 1254, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the second elastic arm 222 to deform upward, and the first electronic component 200 then presses downward on the contact portion 232 of the first conductive member 233 to move in the reserved space 112 and drives the first elastic arm 221 to deform downward. The moving directions of the first conductive member 233 and the second conductive member 234 are opposite to each other, thus transmitting the signals of the first electronic component 200 to the second electronic component 300.

Figure 77F:
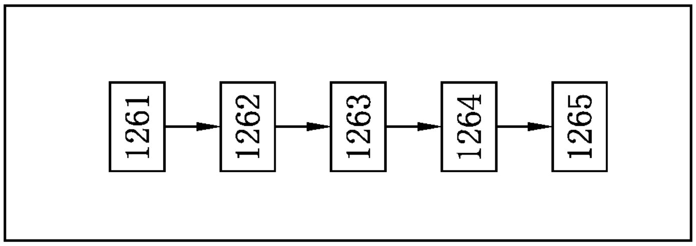
FIG. 77F is a flowchart of a sixth manufacturing method according to the second embodiment of the present invention.

As shown in FIG. 77F, the steps of a sixth method of manufacturing the electrical connector 100 according to the second embodiment are as follows:

Step 1261 (corresponding to the step A of claim 1): as shown in FIG. 20, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1262 (corresponding to the step D of claim 1): as shown in FIG. 37 and FIG. 38, after the step 1261, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields a pre-soldering area 22'. Liquid plastic is injected into the cavities 502 by insert-molding, thus forming an insulating body 1 and a plurality of accommodating slots 11. After removing the mold cores 501, each accommodating slot 11 is provided with a reserved space 112, and the pre-soldering area 22' is exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1263 (corresponding to the step B of claim 1): as shown in FIG. 33, after the step 1262, providing a plurality of conductive members 23, and soldering two of the conductive members 23 respectively to one of the pre-soldering areas 22'. Each conductive member 23 has a soldering portion 231 and a contact portion 232 integrally connected to the soldering portion 231. The two conductive members 23 are respectively located on a first surface and a second surface of the metal plate 400, and are exposed in the reserved space 112. The first surface and the second surface are two surfaces of the metal plate 400 arranged opposite to each other in the vertical direction.

Step 1264 (corresponding to the step C of claim 1): as shown in FIG. 25 to FIG. 27, after the step 1263, cutting and forming a plurality of first elastic arms 221 and a plurality of second elastic arms 222 correspondingly according to locations of the conductive members 23 in the pre-soldering areas 22' as references. The first elastic arm 221 and the second elastic arm 222 extend along a same side of the base portion 21. A conductive terminal 2 includes a base portion 21, a first elastic arm 221, a second elastic arm 222, two conductive members 23 and a tail portion 24. The two conductive members 23 include a first conductive member 233 and a second conductive member 234. Each first elastic arm 221 is only soldered and fixed with a first conductive member 233, and each second elastic arm 222 is only soldered and fixed with a second conductive member 234. The first conductive member 233 and the second conductive member 234 are provided to be staggered in the vertical direction. The end of the first elastic arm 221 and the end of the second elastic arm 222 respectively away from the base portion 21 are free ends 223. Each of the two free ends 223 is soldered with a soldering portion 231. The first elastic arm 221 and the second elastic arm 222 are respectively exposed in the reserved spaces 112 running through the insulating body 1 in the vertical direction.

When cutting and forming the first elastic arm 221 and the second elastic arm 222, the tail portion 24 of the conductive terminal 2 located in front thereof and the free ends 223 of the conductive terminal 2 located behind are cut and broken, and a reserved space 113 is formed in the tail portion 24 of the conductive terminal 2 located in front thereof. The free ends 223 of the conductive terminal 2 located behind are partially located forward in the reserved space 113 of the conductive terminal 2 located in front thereof, thus reducing the distance between the two adjacent conductive terminals 2.

For a same conductive terminal 2 formed by cutting and soldering, the first elastic arm 221 and the second elastic arm 222 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the first elastic arm 221 and the second elastic arm 222 of the conductive terminal 2 located behind are exposed in the same accommodating slot 11.

The cutting further forms a cutting slot 7 running through the metal plate 400 and located at outer sides of the first elastic arm 221 and the second elastic arm 222 and a plurality of connecting portions 4 connected to the same conductive terminal 2. The connecting portions 4 are used to separate the through slots 6 and the cutting slot 7.

Step 1265 (corresponding to the step E of claim 1): as shown in FIG. 28 to FIG. 31, after the step 1264, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the second elastic arm 222 to deform upward, and the first electronic component 200 then presses downward on the contact portion 232 of the first conductive member 233 to move in the reserved space 112 and drives the first elastic arm 221 to deform downward. The moving directions of the first conductive member 233 and the second conductive member 234 are opposite to each other, thus transmitting the signals of the first electronic component 200 to the second electronic component 300.

Figure 39:
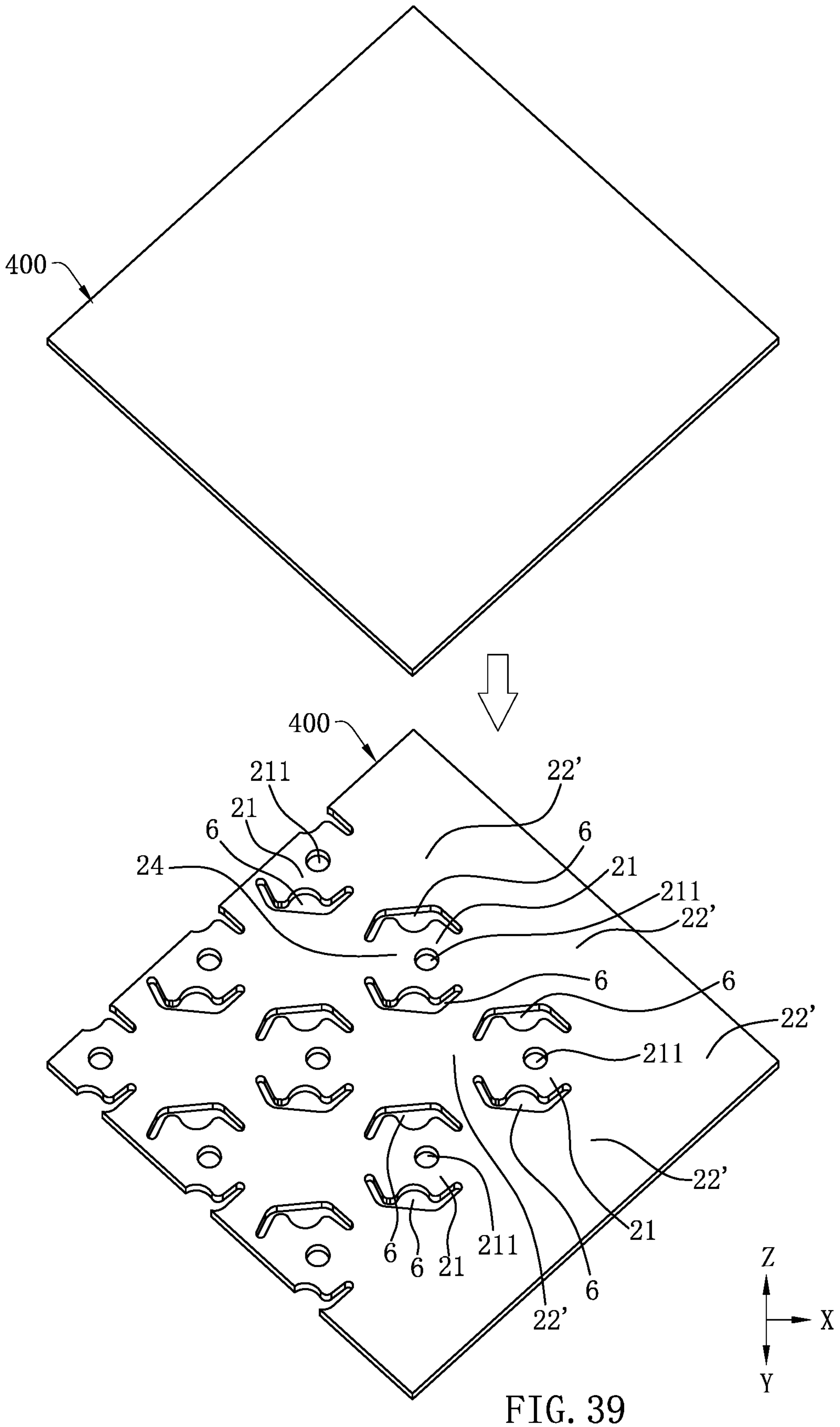
FIG. 39 is a schematic view of cutting a metal plate according to a third embodiment of the present invention.
Figure 78A:
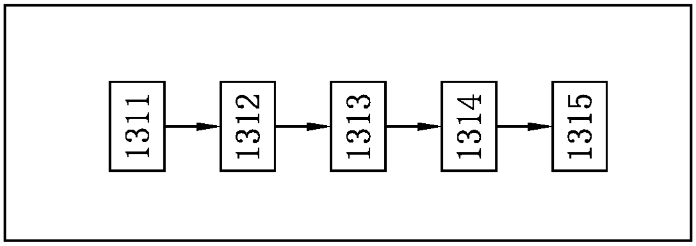
FIG. 78A is a flowchart of a first manufacturing method according to the third embodiment of the present invention.

As shown in FIG. 78A, the steps of a first method of manufacturing the electrical connector 100 according to the third embodiment are as follows:

Step 1311 (corresponding to the step A of claim 1): as shown in FIG. 39, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 40:
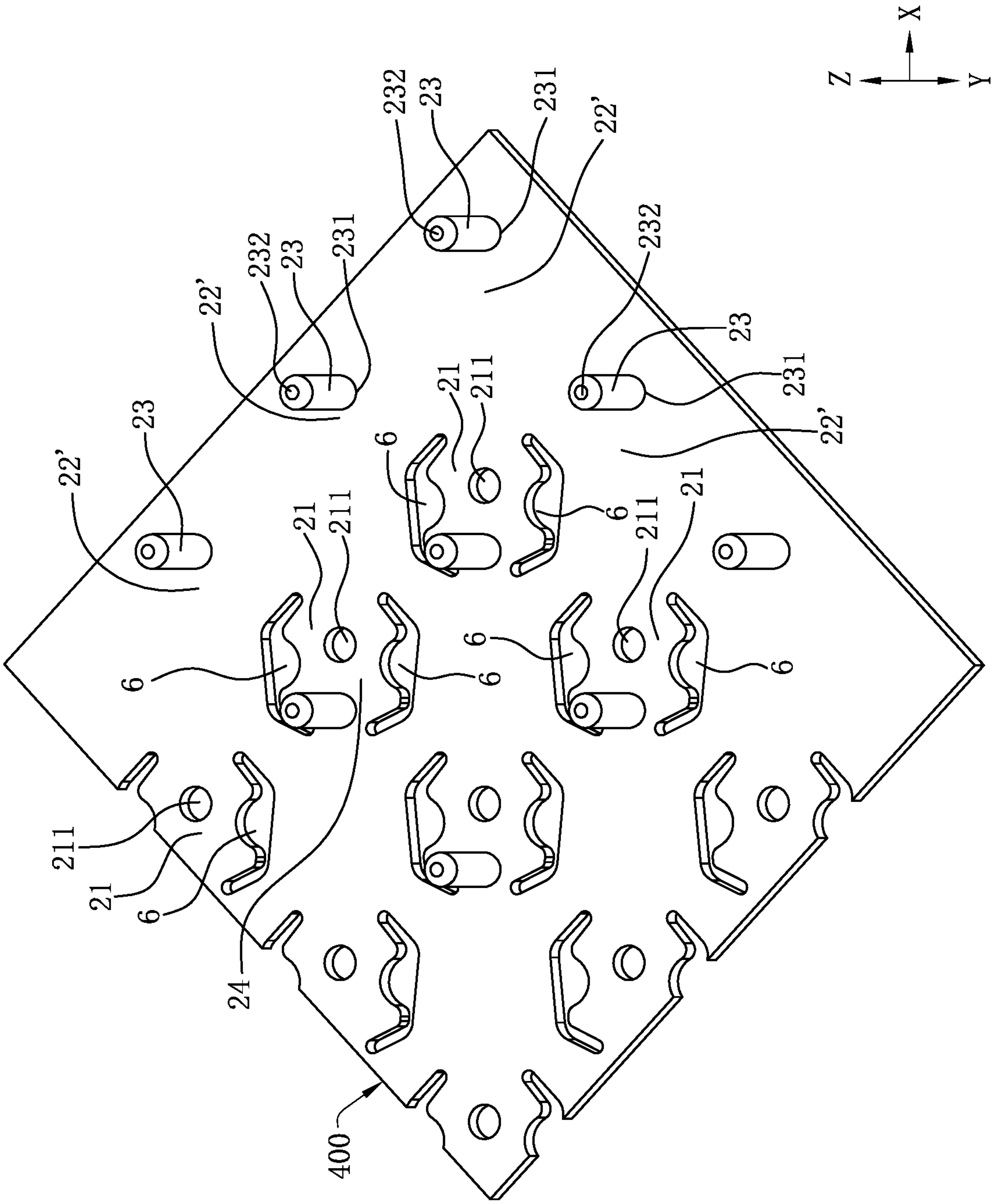
FIG. 40 is a schematic view of soldering conductive members according to the third embodiment of the present invention.

Step 1312 (corresponding to the step B of claim 1): as shown in FIG. 40, after the step 1311, providing a plurality of conductive members 23, and soldering two of the conductive members 23 to one of the pre-soldering areas 22'. The two conductive members 23 are respectively located on a first surface and a second surface of the metal plate 400 arranged opposite to each other in the vertical direction. Each conductive member 23 has a soldering portion 231 and a contact portion 232 integrally connected to the soldering portion 231.

Figure 41:
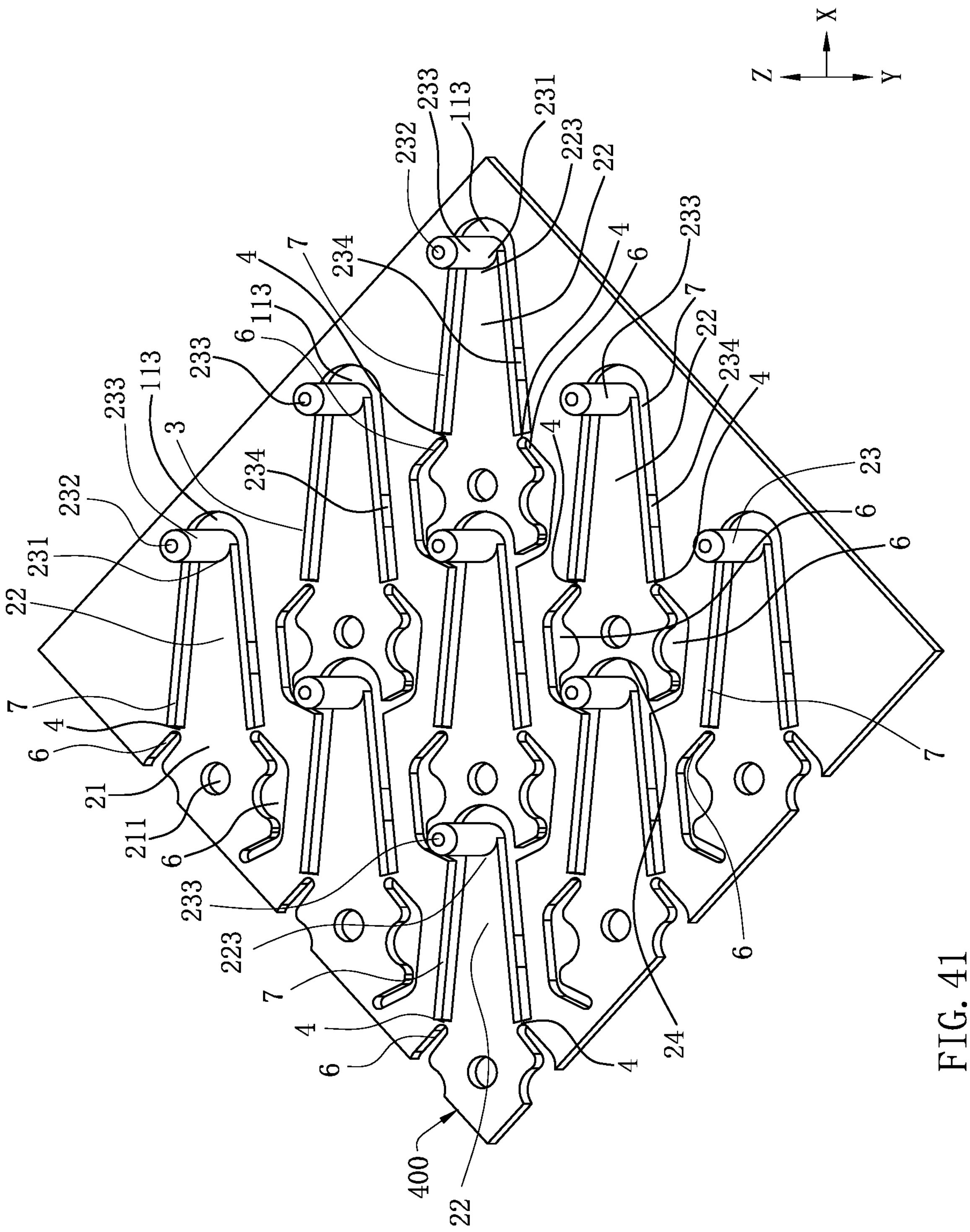
FIG. 41 is a schematic view of one type of cutting the pre-soldering areas to form the elastic arms according to the third embodiment of the present invention.
Figure 42:
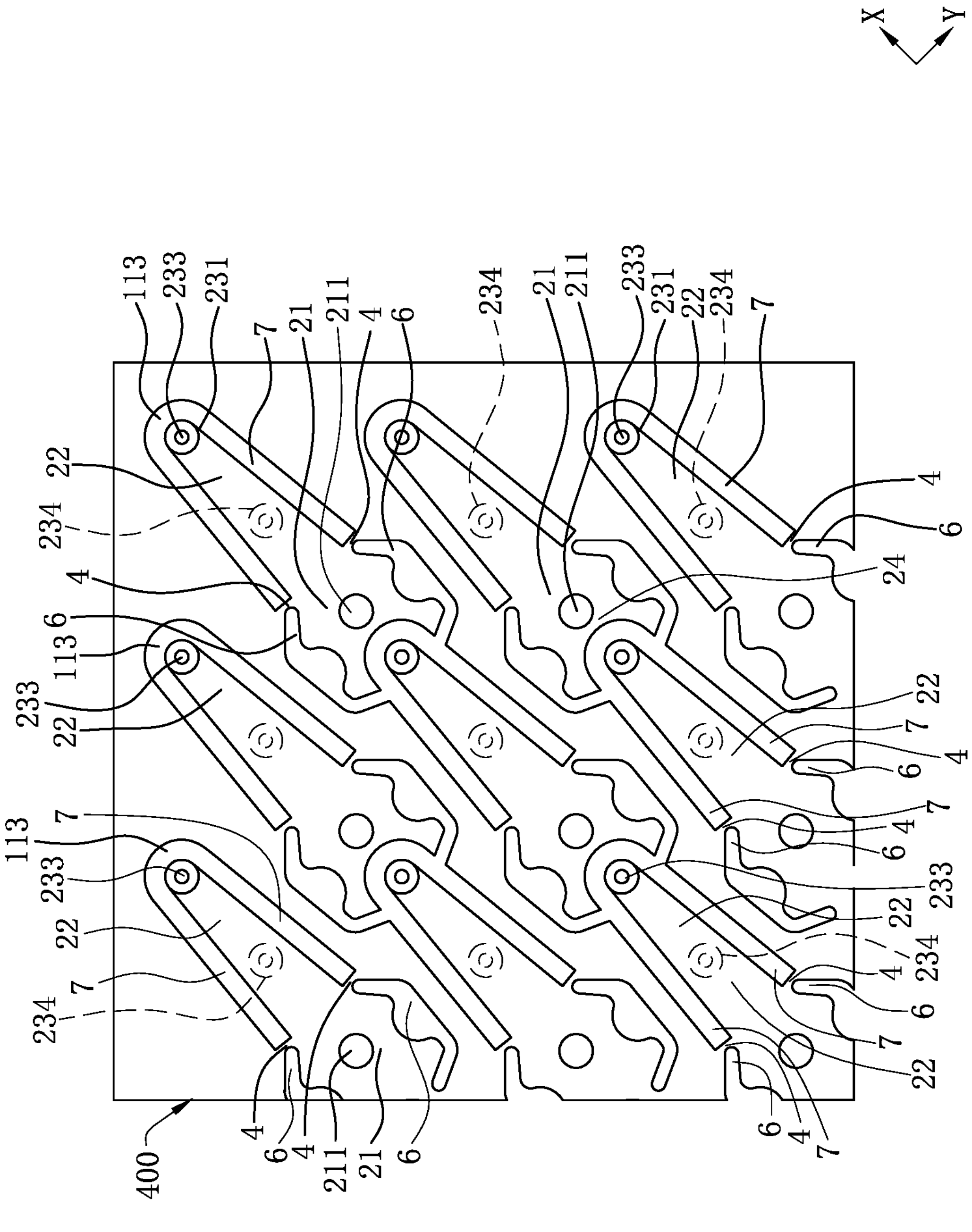
FIG. 42 is a top view of FIG. 41.

Step 1313 (corresponding to the step C of claim 1): as shown in FIG. 41 to FIG. 42, after the step 1312, cutting and forming a plurality of elastic arms 22 correspondingly according to locations of the conductive members 23 in the pre-soldering areas 22' as references. The elastic arms 22 extend along a same side of the base portion 21. Each elastic arm 22 formed by cutting is soldered and fixed with two conductive members 23. A conductive terminal 2 includes a base portion 21, an elastic arm 22, two conductive members 23 and a tail portion 24. The end of the elastic arm 22 away from the base portion 21 is a free end 223. The two conductive members 23 include a first conductive member 233 and a second conductive member 234. The soldering portion 231 of the first conductive member 233 is soldered and fixed to a first surface of the free end 223, and the soldering portion 231 of the second conductive member 234 is soldered and fixed to a second surface of the free end 223. The first conductive member 233 and the second conductive member 234 are provided to be staggered in the vertical direction.

When cutting and forming the elastic arm 22, the tail portion 24 connected to the elastic arm 22 located in front thereof and the free end 223 of the elastic arm 22 located behind are cut and broken, and a reserved space 113 is formed in the tail portion 24 located in front thereof. The free end 223 located behind is partially located forward in the reserved space 113 of the tail portion 24 located in front thereof.

The cutting further forms a cutting slot 7 running through the metal plate 400 and located at an outer side of the elastic arm 22 and a plurality of connecting portions 4 connected to the same conductive terminal 2. The connecting portions 4 are used to separate the through slots 6 and the cutting slot 7.

Figure 43:
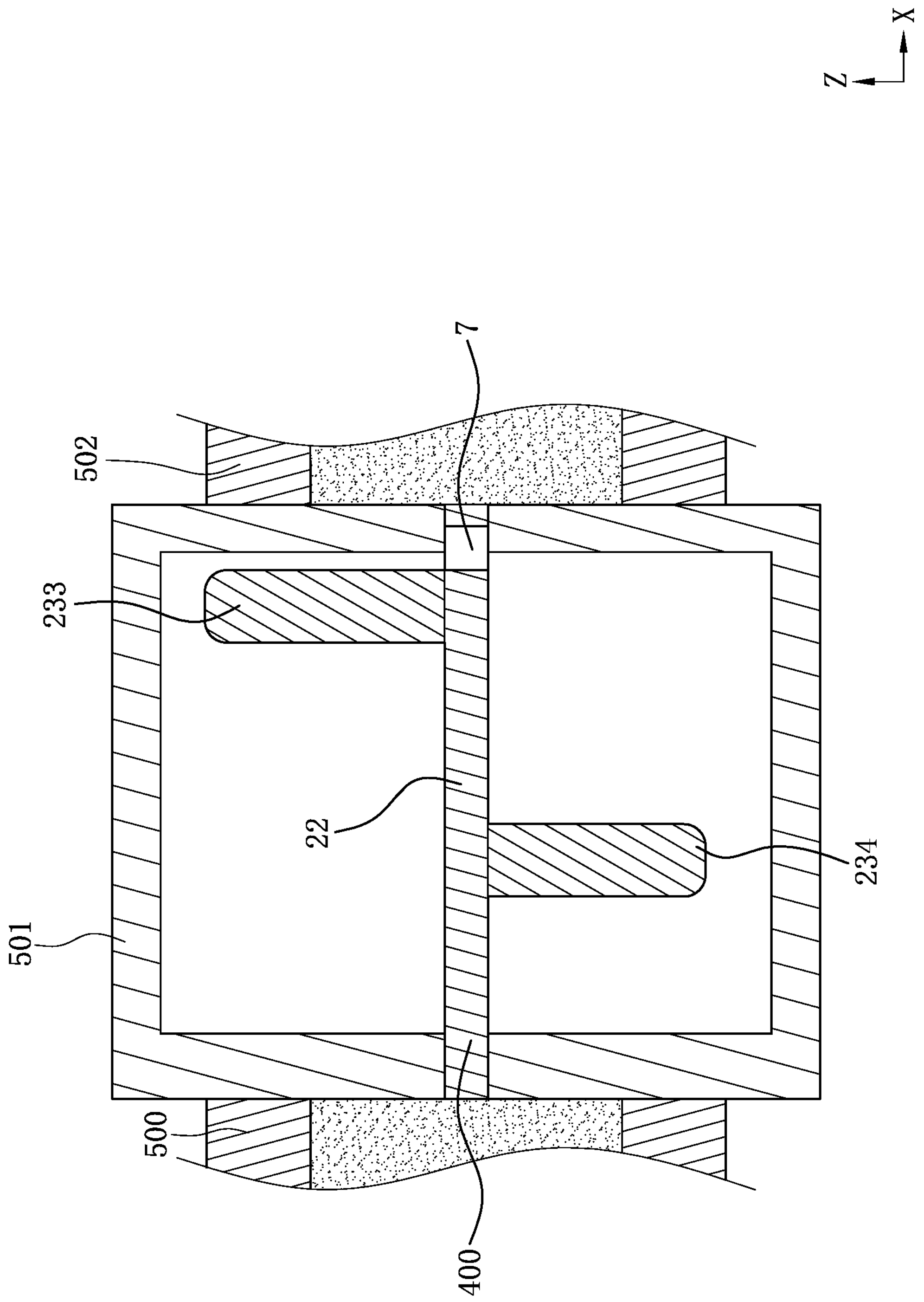
FIG. 43 is a schematic view of one type of insert-molding process according to the third embodiment of the present invention.
Figure 45:
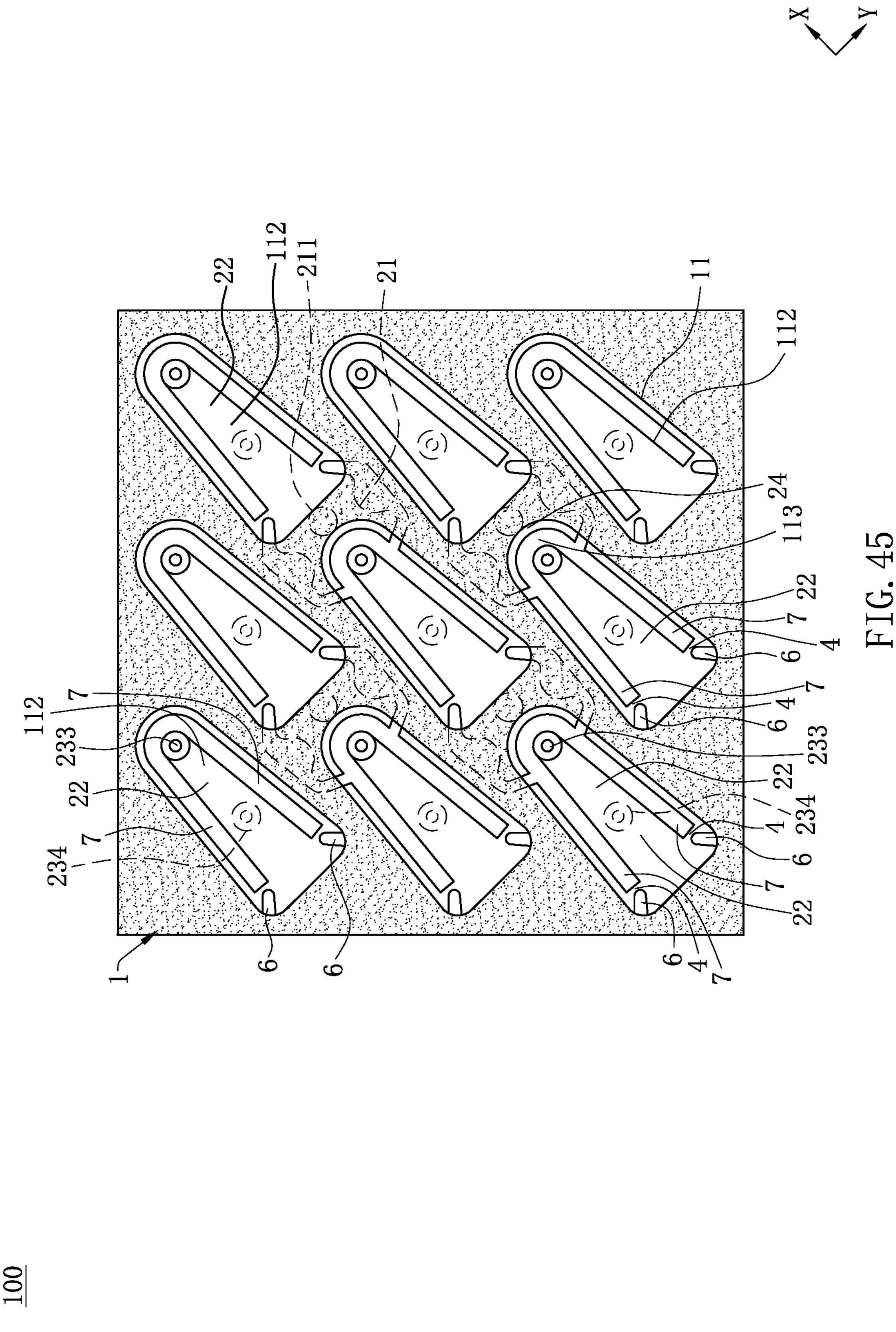
FIG. 45 is a top view of FIG. 44.
Figure 46:
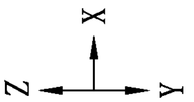
FIG. 46 is a schematic view of cutting the connecting portions according to the third embodiment of the present invention.
Figure 46:
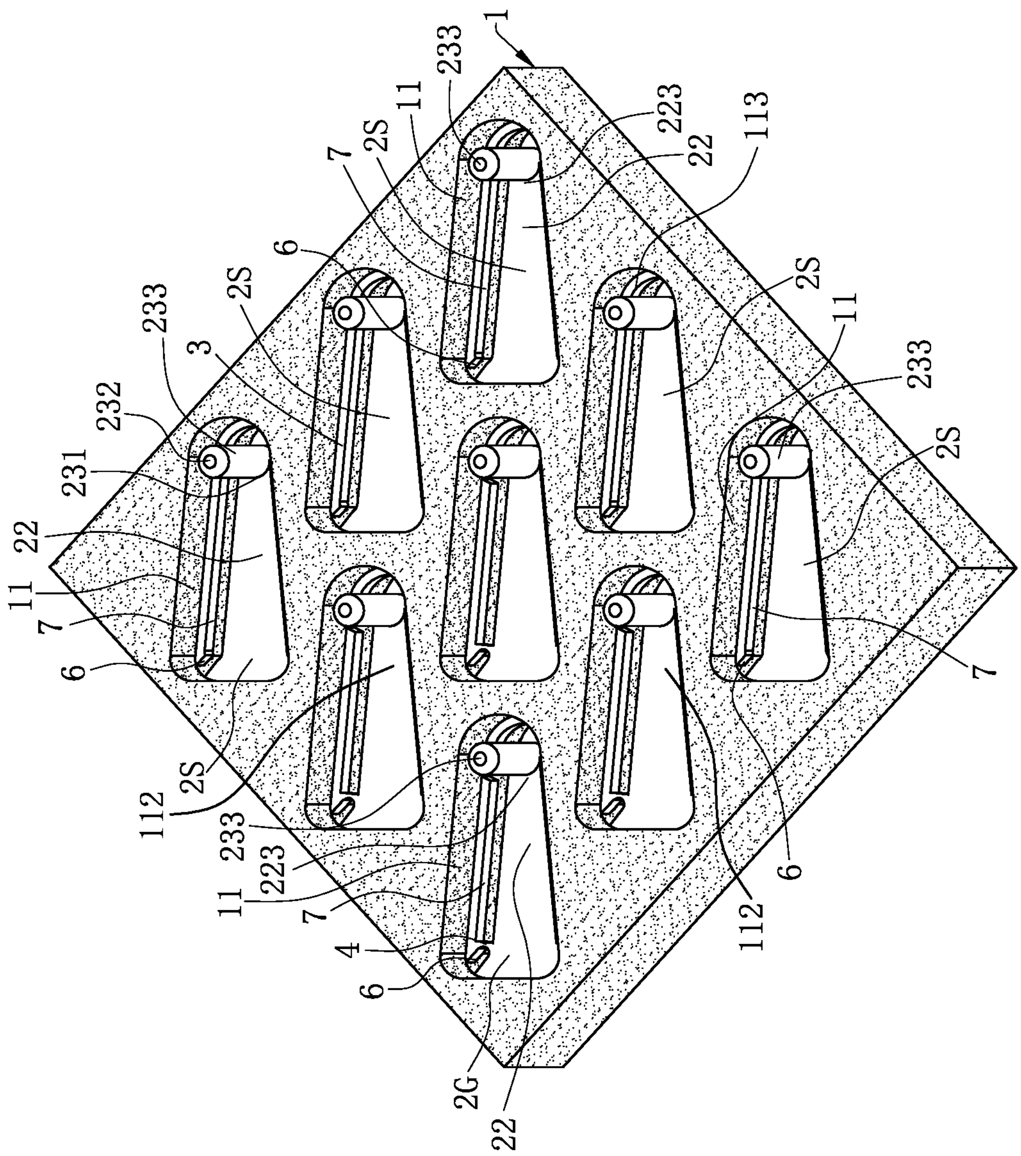

Step 1314 (corresponding to the step D of claim 1): as shown in FIG. 43 to FIG. 45, after the step 1313, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the elastic arm 22, the first conductive member 233 and the second conductive member 234. Liquid plastic is injected into the cavities 502 by insert-molding, thus forming an insulating body 1 and a plurality of accommodating slots 11. After removing the mold cores 501, each accommodating slot 11 is provided with a reserved space 112, and the elastic arm 22 and the two conductive members 23 are exposed in the reserved space 112 running through the insulating body 1 in the vertical direction. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

Step 1315 (corresponding to the step E of claim 1): as shown in FIG. 46 to FIG. 50, after the step 1314, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the elastic arm 22 to deform upward, and the first electronic component 200 then presses downward on the contact portion 232 of the first conductive member 233 to move in the reserved space 112 and drives the elastic arm 22 to deform downward. The moving directions of the first conductive member 233 and the second conductive member 234 are opposite to each other, thus transmitting the signals of the first electronic component 200 to the second electronic component 300.

In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

Figure 78B:
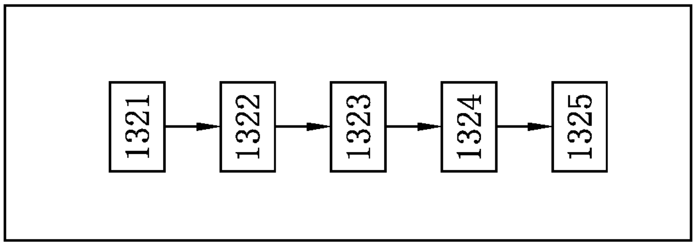
FIG. 78B is a flowchart of a second manufacturing method according to the third embodiment of the present invention.

As shown in FIG. 78B, the steps of a second method of manufacturing the electrical connector 100 according to the third embodiment are as follows:

Step 1321 (corresponding to the step A of claim 1): as shown in FIG. 39, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1322 (corresponding to the step B of claim 1): as shown in FIG. 40, after the step 1321, providing a plurality of conductive members 23, and soldering two of the conductive members 23 to one of the pre-soldering areas 22'. The two conductive members 23 are respectively located on a first surface and a second surface of the metal plate 400. The first surface and the second surface are two surfaces of the metal plate 400 arranged opposite to each other in the vertical direction. Each conductive member 23 has a soldering portion 231 and a contact portion 232 integrally connected to the soldering portion 231.

Figure 51:
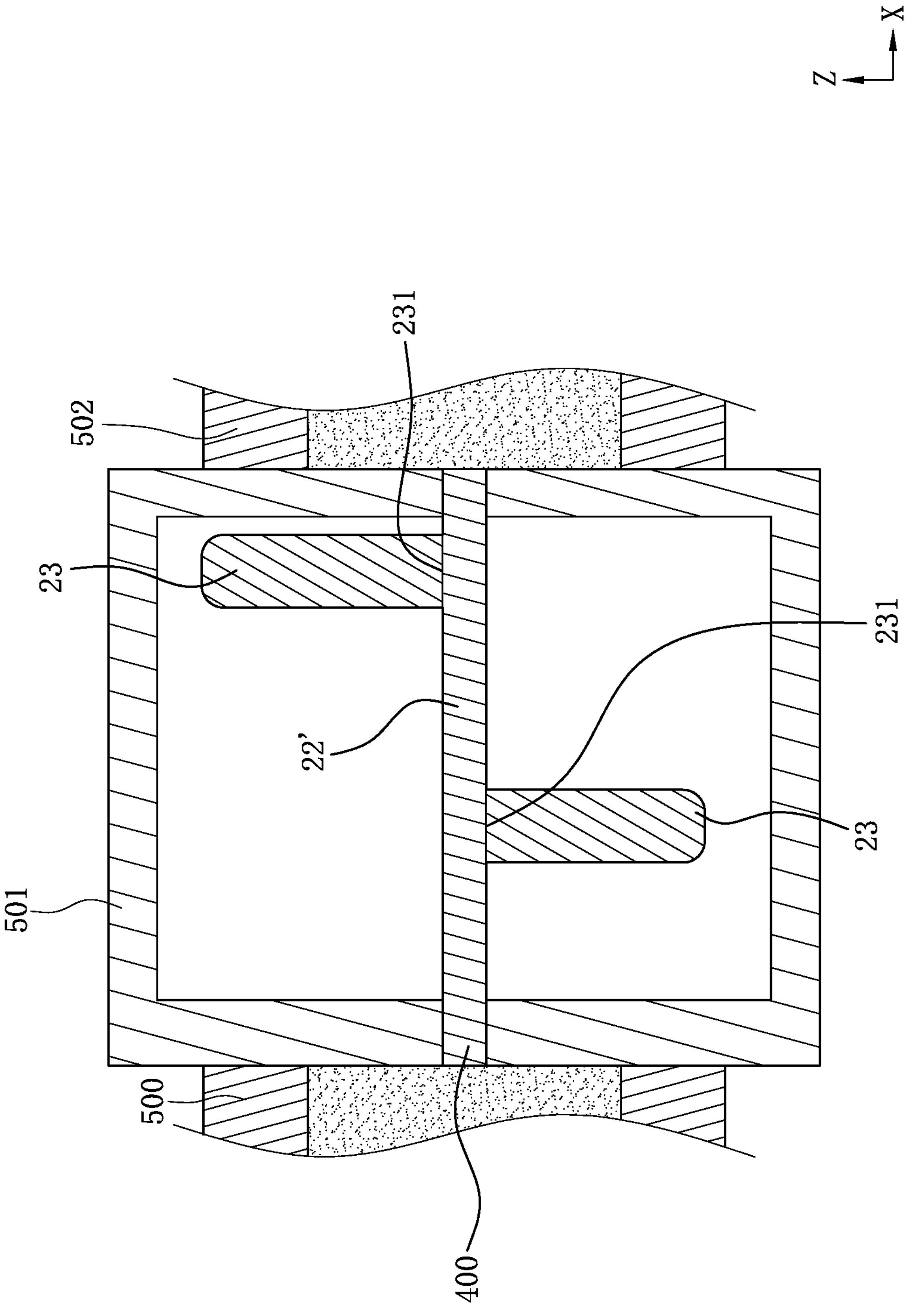
FIG. 51 is a schematic view of another type of insert-molding process according to the third embodiment of the present invention.
Figure 52:
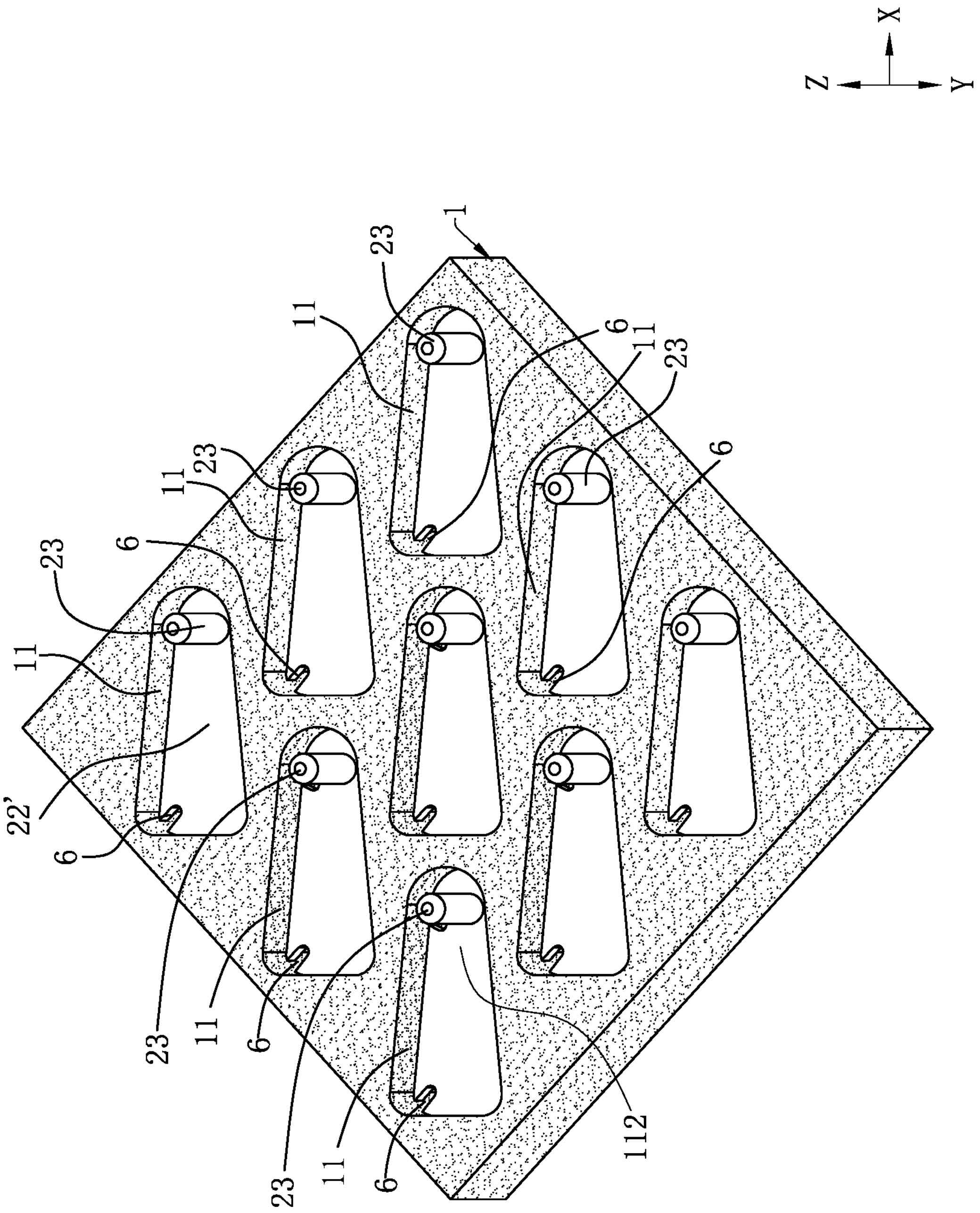
FIG. 52 is a schematic view of obtaining the insulating body through another type of insert-molding process according to the third embodiment of the present invention.

Step 1323 (corresponding to the step D of claim 1): as shown in FIG. 51 to FIG. 52, after the step 1322, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields a pre-soldering area 22' and the two conductive members 23. Liquid plastic is injected into the cavities 502 by insert-molding, thus forming an insulating body 1 and a plurality of accommodating slots 11. After removing the mold cores 501, each accommodating slot 11 is provided with a reserved space 112, and the two conductive members 23 are exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1324 (corresponding to the step C of claim 1): as shown in FIG. 44 to FIG. 45, after the step 1323, cutting and forming a plurality of elastic arms 22 correspondingly according to locations of the conductive members 23 in the pre-soldering areas 22' as references. Each elastic arm 22 is exposed in the reserved space 112 running through the insulating body 1 in the vertical direction. Each elastic arm 22 extends along a side of the base portion 21. Each elastic arm 22 formed by cutting is soldered and fixed with two conductive members 23. A conductive terminal 2 includes a base portion 21, an elastic arm 22, two conductive members 23 and a tail portion 24. The end of the elastic arm 22 away from the base portion 21 is a free end 223. The two conductive members 23 include a first conductive member 233 and a second conductive member 234. The soldering portion 231 of the first conductive member 233 is soldered and fixed to a first surface of the free end 223, and the soldering portion 231 of the second conductive member 234 is soldered and fixed to a second surface of the free end 223. The first surface and the second surface are two surfaces of the free end 223 arranged opposite to each other in the vertical direction. The first conductive member 233 and the second conductive member 234 are provided to be staggered in the vertical direction and are exposed in the reserved space 112.

When cutting and forming the elastic arm 22, the tail portion 24 of the conductive terminal 2 located in front thereof and the free end 223 of the conductive terminal 2 located behind are cut and broken, and a reserved space 113 is formed in the tail portion 24 of the conductive terminal 2 located in front thereof. The free end 223 of the conductive terminal 2 located behind is partially located forward in the reserved space 113 of the conductive terminal 2 located in front thereof, thus reducing the distance between the two adjacent conductive terminals 2.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

The cutting further forms a cutting slot 7 running through the metal plate 400 and located at an outer side of the elastic arm 22 and a plurality of connecting portions 4 connected to the same conductive terminal 2. The connecting portions 4 are used to separate the through slots 6 and the cutting slot 7.

Step 1325 (corresponding to the step E of claim 1): as shown in FIG. 46 to FIG. 50, after the step 1324, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the elastic arm 22 to deform upward, and the first electronic component 200 then presses downward on the contact portion 232 of the first conductive member 233 to move in the reserved space 112 and drives the elastic arm 22 to deform downward. The moving directions of the first conductive member 233 and the second conductive member 234 are opposite to each other, thus transmitting the signals of the first electronic component 200 to the second electronic component 300.

Figure 78C:
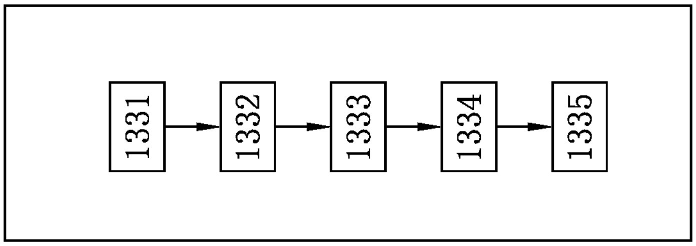
FIG. 78C is a flowchart of a third manufacturing method according to the third embodiment of the present invention.

As shown in FIG. 78C, the steps of a third method of manufacturing the electrical connector 100 according to the third embodiment are as follows:

Step 1331 (corresponding to the step I of claim 7): as shown in FIG. 39, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 53:
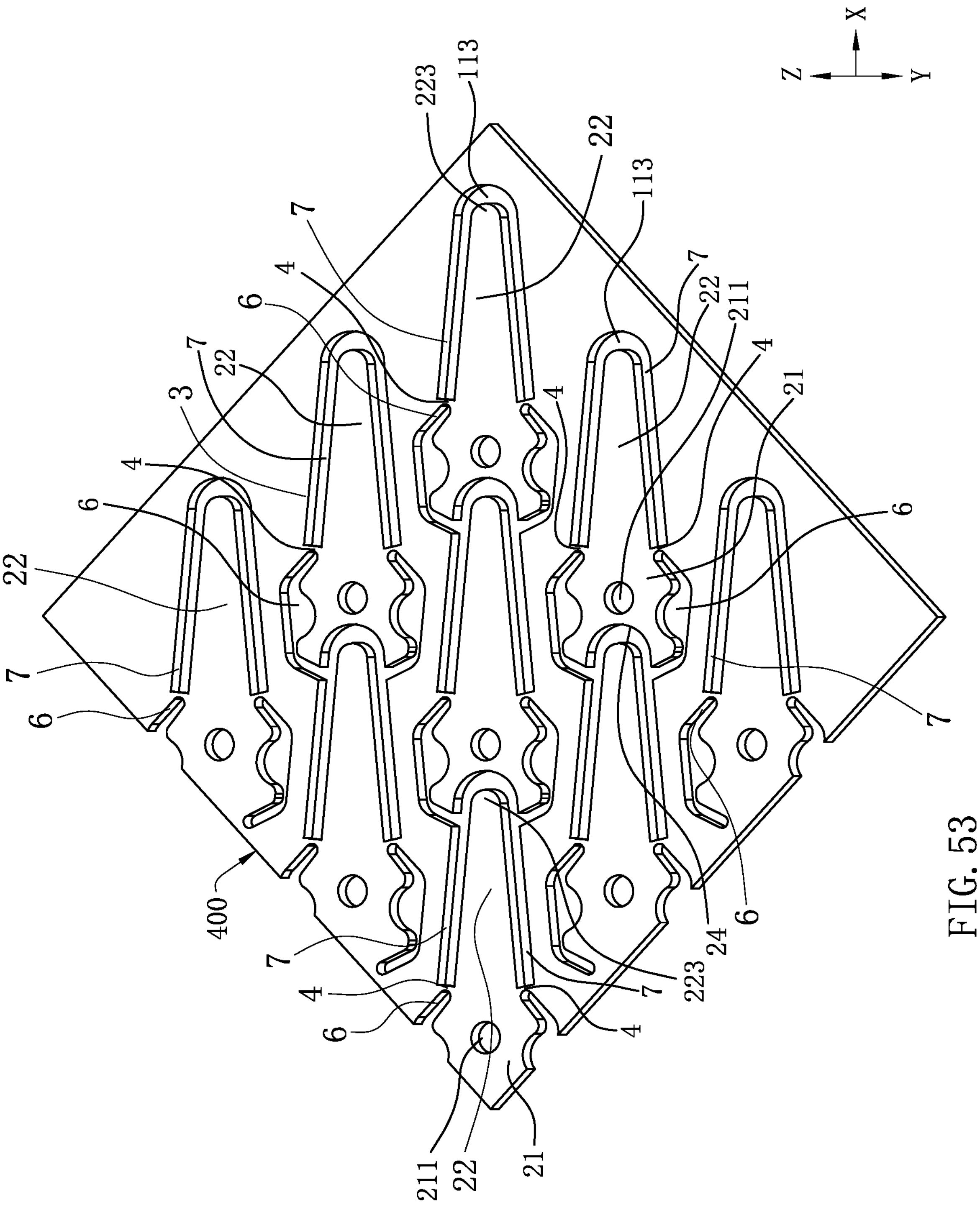
FIG. 53 is a schematic view of another type of cutting the pre-soldering areas to form the elastic arms according to the third embodiment of the present invention.

Step 1332 (corresponding to the step II of claim 7): as shown in FIG. 53, after the step 1331, cutting the pre-soldering areas 22' to form a plurality of elastic arms 22. Each elastic arm 22 extends along a side of the base portion 21, and the end of the elastic arm 22 away from the base portion 21 is a free end 223.

When cutting and forming the elastic arm 22, the tail portion 24 connected to the elastic arm 22 located in front thereof and the free end 223 of the elastic arm 22 located behind are cut and broken, and a reserved space 113 is formed in the tail portion 24 located in front thereof. The free end 223 located behind is partially located forward in the reserved space 113 of the tail portion 24 located in front thereof.

The cutting further forms a cutting slot 7 running through the metal plate 400 and located at an outer side of the elastic arm 22 and a plurality of connecting portions 4 connected to the same base portion 21. The connecting portions 4 are used to separate the through slots 6 and the cutting slot 7. In other embodiments, the step 1332 may be located in the step 1331 to perform simultaneous cutting.

Step 1333 (corresponding to the step III of claim 7): as shown in FIG. 41 to FIG. 42, after the step 1332, providing a plurality of conductive members 23, and soldering each two of the conductive members 23 to a same elastic arm 22. The two conductive members 23 are respectively located on a first surface and a second surface arranged opposite to each other in the vertical direction of the metal plate 400. A conductive terminal 2 includes a base portion 21, an elastic arm 22, two conductive members 23 and a tail portion 24. Each conductive member 23 has a soldering portion 231 and a contact portion 232 integrally connected to the soldering portion 231. The two conductive members 23 include a first conductive member 233 and a second conductive member

234. The soldering portion 231 of the first conductive member 233 is soldered and fixed to a first surface of the free end 223, and the soldering portion 231 of the second conductive member 234 is soldered and fixed to a second surface of the free end 223 arranged opposite to the first surface of the free end 223 in the vertical direction. The first conductive member 233 and the second conductive member 234 are provided to be staggered in the vertical direction.

Step 1334 (corresponding to the step IV of claim 7): as shown in FIG. 43 to FIG. 45, after the step 1333, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the elastic arm 22, the first conductive member 233 and the second conductive member 234. Liquid plastic is injected into the cavities 502 by insert-molding, thus forming an insulating body 1 and a plurality of accommodating slots 11. After removing the mold cores 501, each accommodating slot 11 is provided with a reserved space 112, and the elastic arm 22 and the two conductive members 23 are exposed in the reserved space 112 running through the insulating body 1 in the vertical direction. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

Step 1335 (corresponding to the step V of claim 7): as shown in FIG. 46 to FIG. 50, after the step 1334, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the elastic arm 22 to deform upward, and the first electronic component 200 then presses downward on the contact portion 232 of the first conductive member 233 to move in the reserved space 112 and drives the elastic arm 22 to deform downward. The moving directions of the first conductive member 233 and the second conductive member 234 are opposite to each other, thus transmitting the signals of the first electronic component 200 to the second electronic component 300.

Figure 78D:
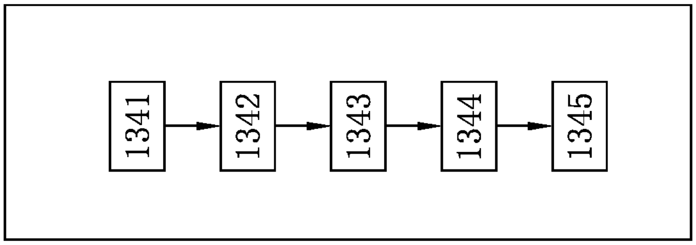
FIG. 78D is a flowchart of a fourth manufacturing method according to the third embodiment of the present invention.

As shown in FIG. 78D, the steps of a fourth method of manufacturing the electrical connector 100 according to the third embodiment are as follows:

Step 1341 (corresponding to the step I of claim 7): as shown in FIG. 39, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1342 (corresponding to the step II of claim 7): as shown in FIG. 53, after the step 1341, cutting the pre-soldering areas 22' to form a plurality of elastic arms 22. Each elastic arm 22 extends along a side of the base portion 21, and the end of the elastic arm 22 away from the base portion 21 is a free end 223.

When cutting and forming the elastic arm 22, the tail portion 24 connected to the elastic arm 22 located in front thereof and the free end 223 of the elastic arm 22 located behind are cut and broken, and a reserved space 113 is formed in the tail portion 24 located in front thereof. The free end 223 located behind is partially located forward in the reserved space 113 of the tail portion 24 located in front thereof.

The cutting further forms a cutting slot 7 running through the metal plate 400 and located at an outer side of the elastic arm 22 and a plurality of connecting portions 4 connected to the same base portion 21. The connecting portions 4 are used to separate the through slots 6 and the cutting slot 7.

Figure 54:
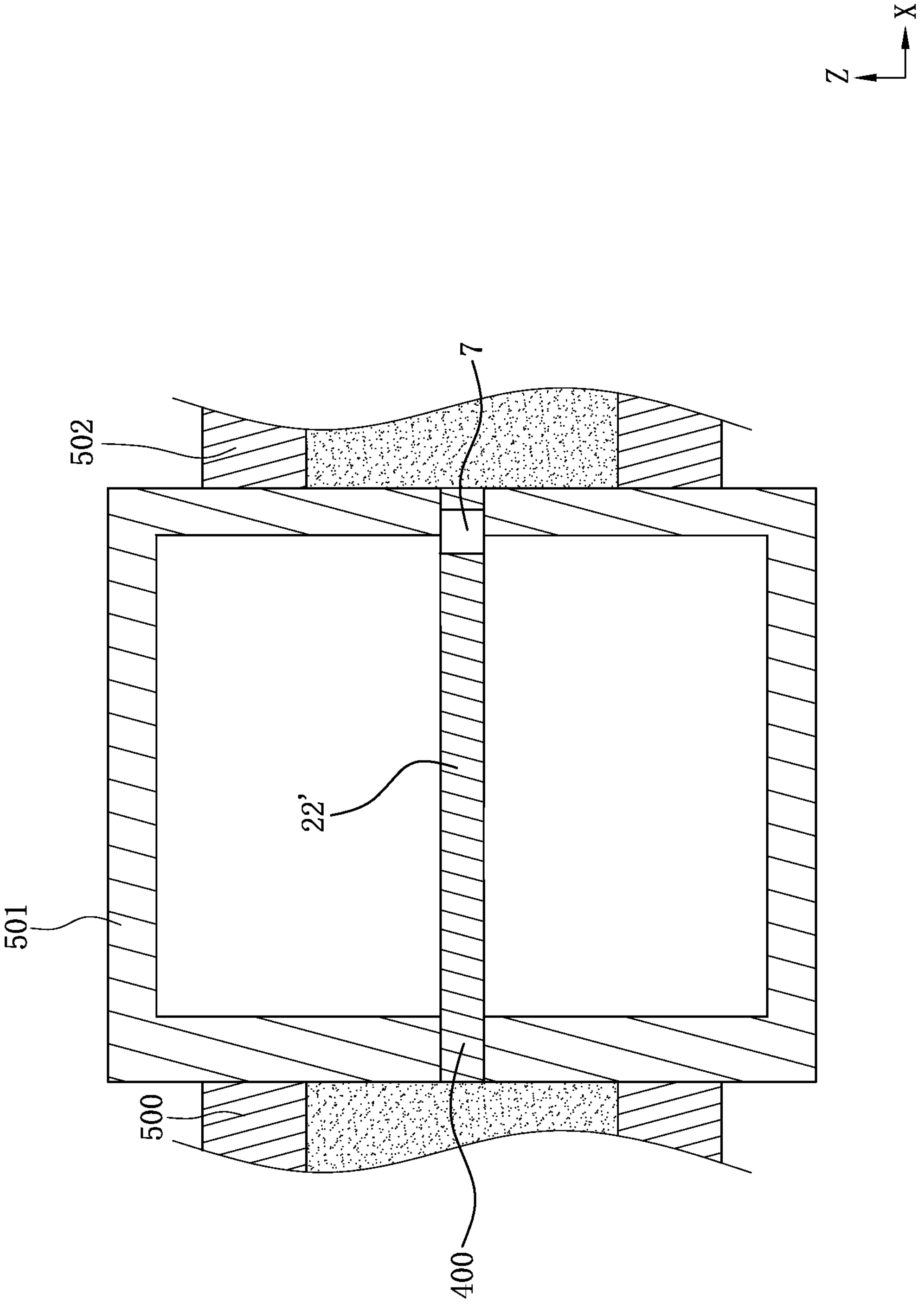
FIG. 54 is a schematic view of a further type of insert-molding process according to the third embodiment of the present invention.
Figure 55:
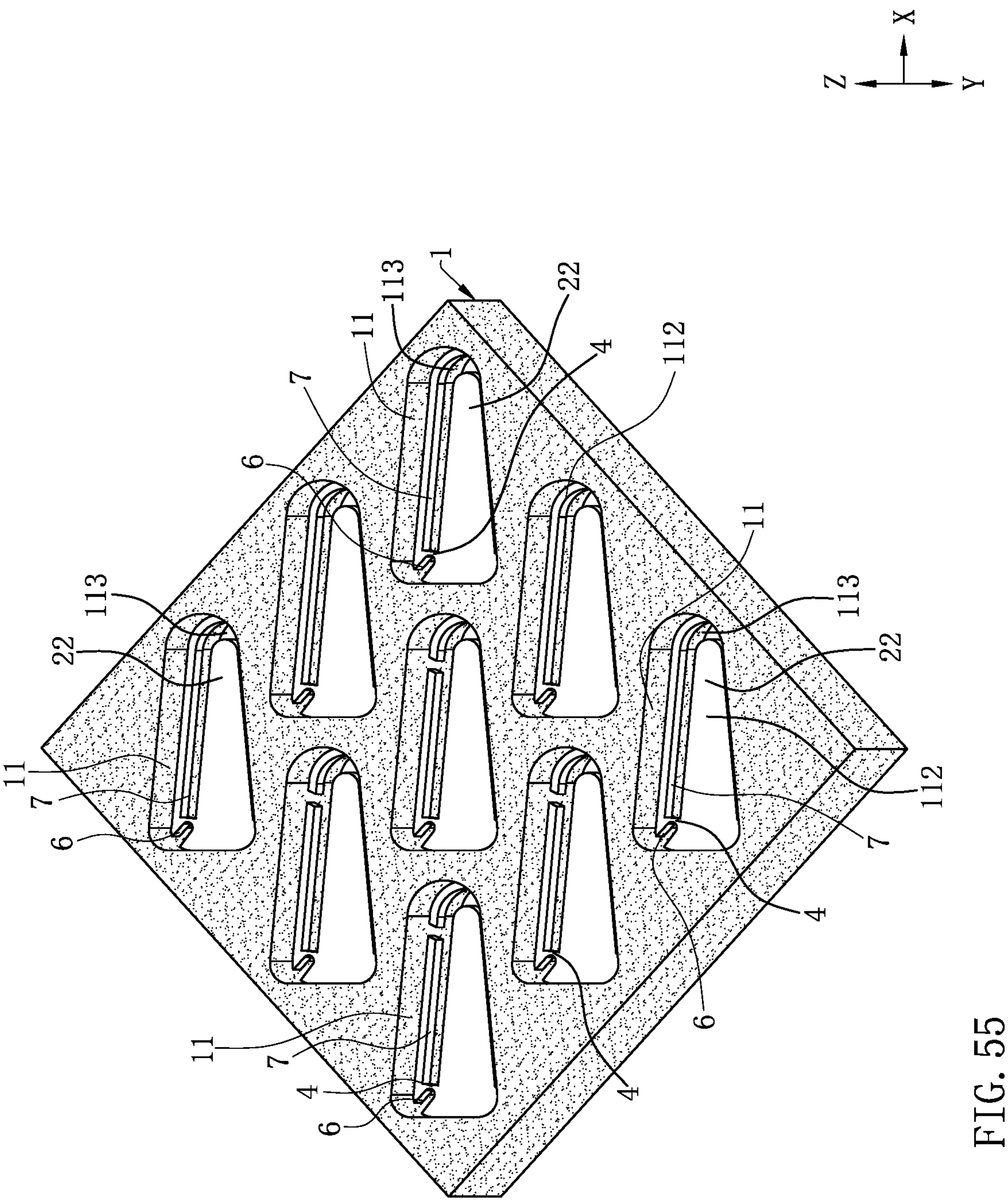
FIG. 55 is a schematic view of obtaining the insulating body through a further type of insert-molding process according to the third embodiment of the present invention.

Step 1343 (corresponding to the step IV of claim 7): as shown in FIG. 54 to FIG. 55, after the step 1342, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7 and the elastic arm 22. Liquid plastic is injected into the cavities 502 by insert-molding, thus forming an insulating body 1 and a plurality of accommodating slots 11. After removing the mold cores 501, each accommodating slot 11 is provided with a reserved space 112, and the elastic arm 22 is exposed in the reserved space 112 running through the insulating body 1 in the vertical direction. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1344 (corresponding to the step III of claim 7): as shown in FIG. 44 and FIG. 45, after the step 1343, providing a plurality of conductive members 23, and soldering each two of the conductive members 23 to a same elastic arm 22. The two conductive members 23 are respectively located on a first surface and a second surface of the metal plate 400. The first surface and the second surface are arranged opposite to each other in the vertical direction. A conductive terminal 2 includes a base portion 21, an elastic arm 22, two conductive members 23 and a tail portion 24. Each conductive member 23 has a soldering portion 231 and a contact portion 232 integrally connected to the soldering portion 231. The two conductive members 23 include a first conductive member 233 and a second conductive member 234. The soldering portion 231 of the first conductive member 233 is soldered and fixed to a first surface of the free end 223, and the soldering portion 231 of the second conductive member 234 is soldered and fixed to a second surface of the free end 223 arranged opposite to the first surface of the free end 223 in the vertical direction. The first conductive member 233 and the second conductive member 234 are provided to be staggered in the vertical direction and are exposed in the reserved space 112.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

Step 1345 (corresponding to the step V of claim 7): as shown in FIG. 46 to FIG. 50, after the step 1344, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the elastic arm 22 to deform upward, and the first electronic component 200 then presses downward on the contact portion 232 of the first conductive member 233 to move in the reserved space 112 and drives the elastic arm 22 to deform downward. The moving directions of the first conductive member 233 and the second conductive member 234 are opposite to each other, thus transmitting the signals of the first electronic component 200 to the second electronic component 300.

Figure 78E:
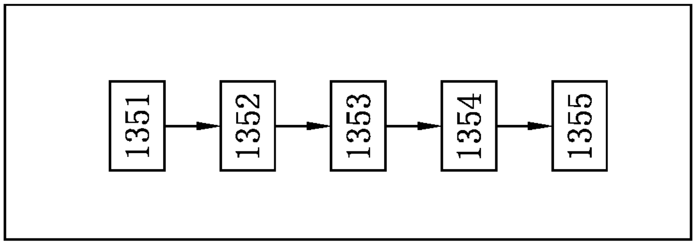
FIG. 78E is a flowchart of a fifth manufacturing method according to the third embodiment of the present invention.

As shown in FIG. 78E, the steps of a fifth method of manufacturing the electrical connector 100 according to the third embodiment are as follows:

Step 1351 (corresponding to the step I of claim 7): as shown in FIG. 39, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. Each base portion 21 formed by cutting is provided with a through hole 211 running through the base portion 21. The specific cutting method may adopt the industrial standard punching process, and may adopt precise cutting methods such as laser cutting.

Figure 56:
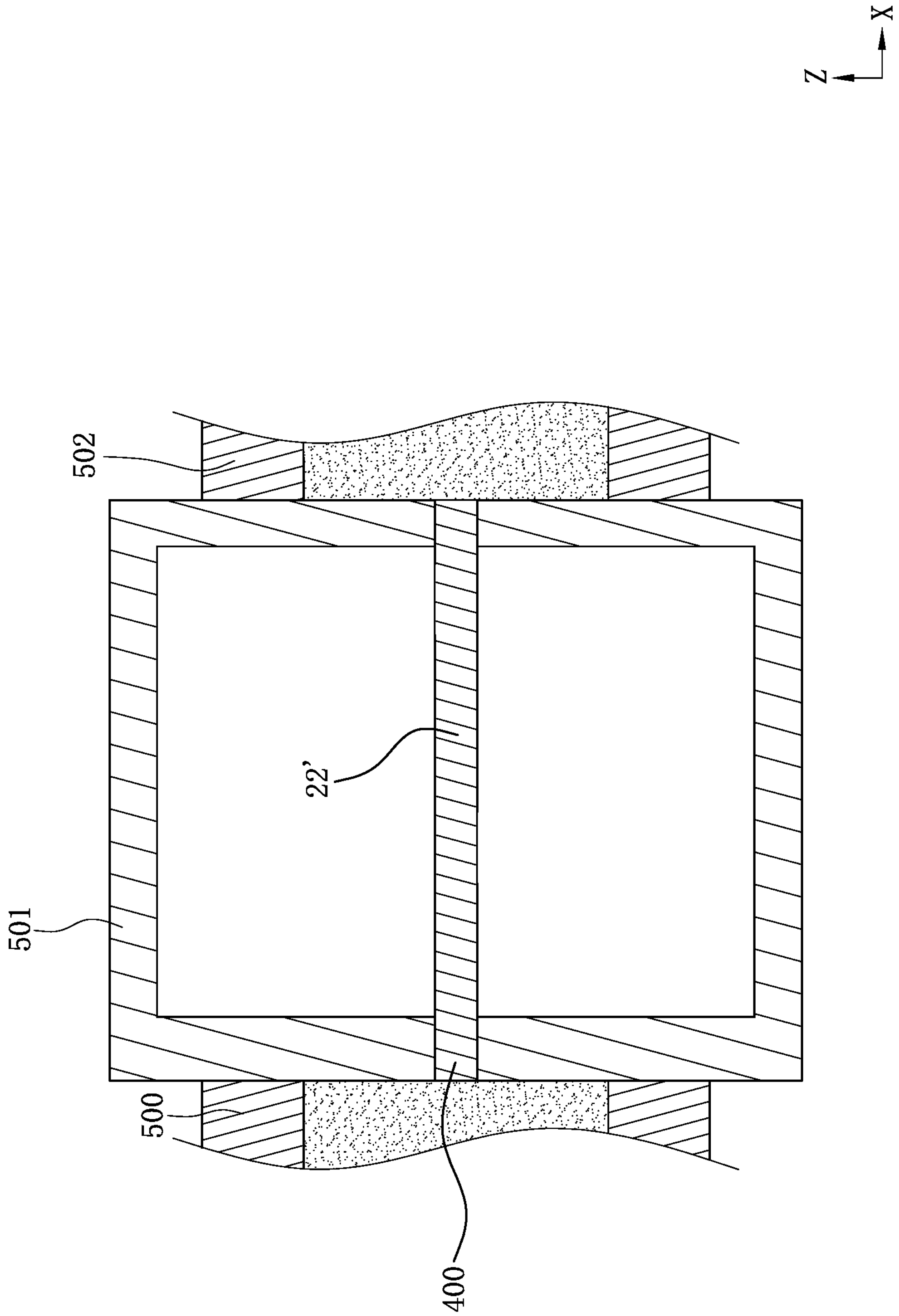
FIG. 56 is a schematic view of yet another type of insert-molding process according to the third embodiment of the present invention.
Figure 57:
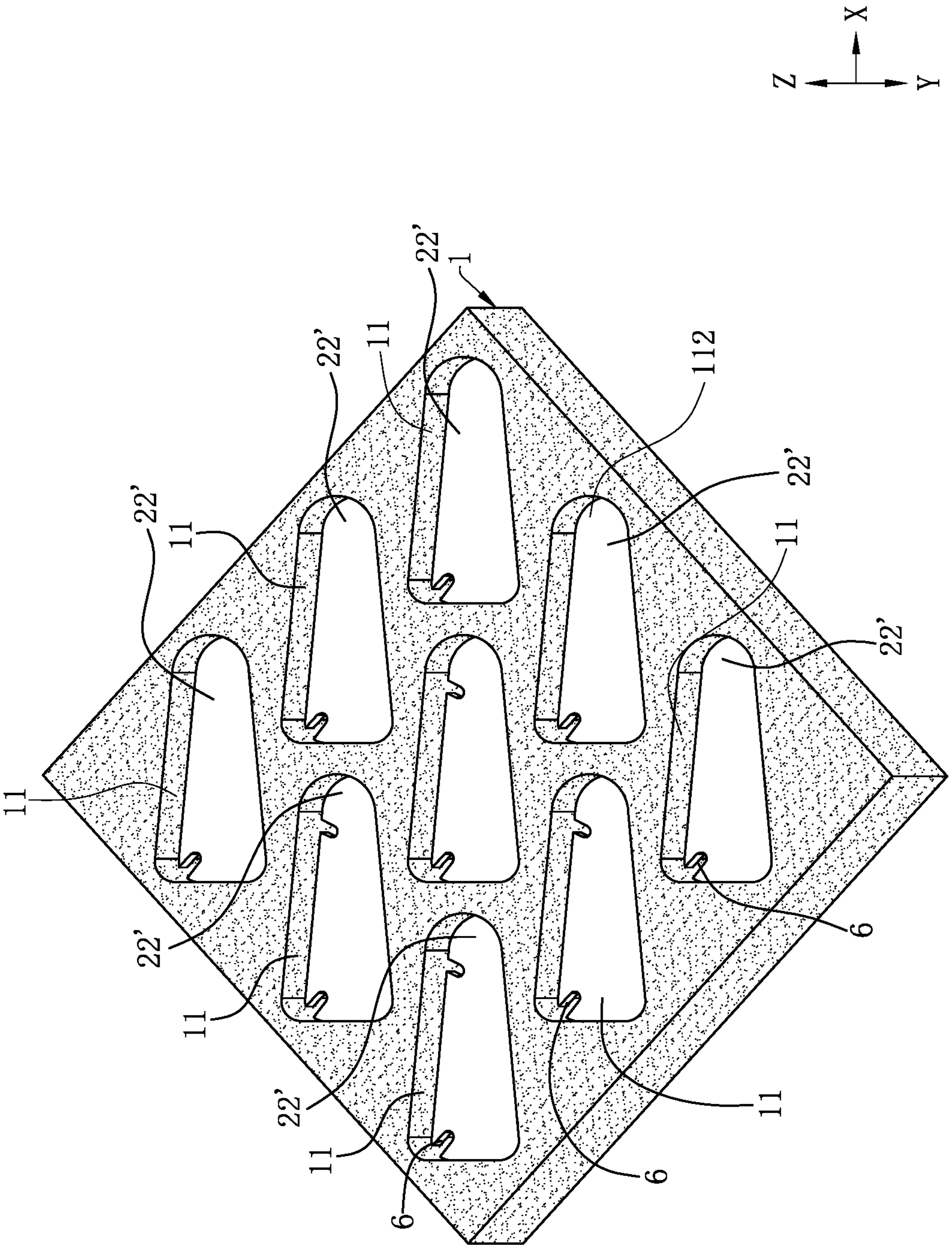
FIG. 57 is a schematic view of obtaining the insulating body through yet another type of insert-molding according to the third embodiment of the present invention.

Step 1352 (corresponding to the step IV of claim 7): as shown in FIG. 56 to FIG. 57, after the step 1351, the mold 500 has a plurality of mold core 501 and a plurality of cavities 502. Each mold core 501 simultaneously correspondingly abuts and positions a portion of the metal plate 400, and correspondingly shields a pre-soldering area 22'. Liquid plastic is injected into the cavities 502 by insert-molding, thus forming an insulating body 1 and a plurality of accommodating slots 11. After removing the mold cores 501, each accommodating slot 11 is provided with a reserved space 112, and the pre-soldering area 22' is exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1353 (corresponding to the step II of claim 7): as shown in FIG. 55, after the step 1352, cutting the pre-soldering areas 22' to form a plurality of elastic arms 22. Each elastic arm 22 extends along a side of the base portion 21, and the end of the elastic arm 22 away from the base portion 21 is a free end 223. The elastic arm 22 is exposed in the reserved space 112 running through the insulating body 1 in the vertical direction.

When cutting and forming the elastic arm 22, the tail portion 24 connected to the elastic arm 22 located in front thereof and the free end 223 of the elastic arm 22 located behind are cut and broken, and a reserved space 113 is formed in the tail portion 24 located in front thereof. The free end 223 located behind is partially located forward in the reserved space 113 of the tail portion 24 located in front thereof.

The cutting further forms a cutting slot 7 running through the metal plate 400 and located at an outer side of the elastic arm 22 and a plurality of connecting portions 4 connected to the same base portion 21. The connecting portions 4 are used to separate the through slots 6 and the cutting slot 7.

Step 1354 (corresponding to the step III of claim 7): as shown in FIG. 44 and FIG. 45, after the step 1353, providing a plurality of conductive members 23, and soldering each two of the conductive members 23 to a same elastic arm 22. The two conductive members 23 are respectively located on a first surface and a second surface of the metal plate 400. The first surface and the second surface are two surfaces of the metal plate 400 arranged opposite to each other in the vertical direction. A conductive terminal 2 includes a base portion 21, an elastic arm 22, two conductive members 23 and a tail portion 24. Each conductive member 23 has a soldering portion 231 and a contact portion 232 integrally connected to the soldering portion 231. The two conductive members 23 include a first conductive member 233 and a second conductive member 234. The soldering portion 231 of the first conductive member 233 is soldered and fixed to a first surface of the free end 223, and the soldering portion 231 of the second conductive member 234 is soldered and fixed to a second surface of the free end 223 arranged opposite to the first surface of the free end 223 in the vertical direction. The first conductive member 233 and the second conductive member 234 are provided to be staggered in the vertical direction and are exposed in the reserved space 112.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

Step 1355 (corresponding to the step V of claim 7): as shown in FIG. 46 to FIG. 50, after the step 1354, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the elastic arm 22 to deform upward, and the first electronic component 200 then presses downward on the contact portion 232 of the first conductive member 233 to move in the reserved space 112 and drives the elastic arm 22 to deform downward. The moving directions of the first conductive member 233 and the second conductive member 234 are opposite to each other, thus transmitting the signals of the first electronic component 200 to the second electronic component 300.

Figure 78F:
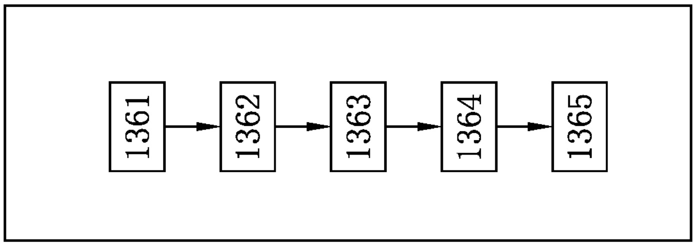
FIG. 78F is a flowchart of a sixth manufacturing method according to the third embodiment of the present invention.

As shown in FIG. 78F, the steps of a sixth method of manufacturing the electrical connector 100 according to the third embodiment are as follows:

Step 1361 (corresponding to the step A of claim 1): as shown in FIG. 39, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. Each base portion 21 formed by cutting is provided with a through hole 211 running through the base portion 21. The specific cutting method may adopt the industrial standard punching process, and may adopt precise cutting methods such as laser cutting.

Step 1362 (corresponding to the step D of claim 1): as shown in FIG. 56 and FIG. 57, after the step 1361, the mold 500 has a plurality of mold core 501 and a plurality of cavities 502. Each mold core 501 simultaneously correspondingly abuts and positions a portion of the metal plate 400, and correspondingly shields a pre-soldering area 22'. Liquid plastic is injected into the cavities 502 by insert-molding, thus forming an insulating body 1 and a plurality of accommodating slots 11. After removing the mold cores 501, each accommodating slot 11 is provided with a reserved space 112, and the pre-soldering area 22' is exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1363 (corresponding to the step B of claim 1): as shown in FIG. 52, after the step 1362, providing a plurality of conductive members 23, and soldering each two of the conductive members 23 to a same pre-soldering area 22'. Each conductive member 23 has a soldering portion 231 and a contact portion 232 integrally connected to the soldering portion 231. The two conductive members 23 are respectively located on a first surface and a second surface of the metal plate 400, and are exposed in the reserved space 112. The first surface and a second surface are two surfaces of the metal plate 400 arranged opposite to each other in the vertical direction.

Step 1364 (corresponding to the step C of claim 1): as shown in FIG. 44 to FIG. 45, after the step 1363, cutting and forming a plurality of elastic arms 22 correspondingly according to locations of the conductive members 23 in the pre-soldering areas 22' as references. Each elastic arm 22 is exposed in the reserved space 112 running through the insulating body 1 in the vertical direction. Each elastic arm 22 extends along a side of the base portion 21. Each elastic arm 22 formed by cutting is soldered and fixed with two conductive members 23. A conductive terminal 2 includes a base portion 21, an elastic arm 22, two conductive members 23 and a tail portion 24. The end of the elastic arm 22 away from the base portion 21 is a free end 223. The two conductive members 23 include a first conductive member 233 and a second conductive member 234. The soldering portion 231 of the first conductive member 233 is soldered and fixed to a first surface of the free end 223, and the soldering portion 231 of the second conductive member 234 is soldered and fixed to a second surface of the free end 223 arranged opposite to the first surface of the free end 223 in the vertical direction. The first conductive member 233 and the second conductive member 234 are provided to be staggered in the vertical direction.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

When cutting and forming the elastic arm 22, the tail portion 24 of the conductive terminal 2 located in front thereof and the free end 223 of the conductive terminal 2 located behind are cut and broken, and a reserved space 113 is formed in the tail portion 24 of the conductive terminal 2 located in front thereof. The free end 223 of the conductive terminal 2 located behind is partially located forward in the reserved space 113 of the conductive terminal 2 located in front thereof, thus reducing the distance between the two adjacent conductive terminals 2.

The cutting further forms a cutting slot 7 running through the metal plate 400 and located at an outer side of the elastic arm 22 and a plurality of connecting portions 4 connected to the same conductive terminal 2. The connecting portions 4 are used to separate the through slots 6 and the cutting slot 7.

Step 1365 (corresponding to the step E of claim 1): as shown in FIG. 46 to FIG. 50, after the step 1364, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 firstly abuts upward the contact portion 232 of the second conductive member 234 to move in the reserved space 112 and drives the elastic arm 22 to deform upward, and the first electronic component 200 then presses downward on the contact portion 232 of the first conductive member 233 to move in the reserved space 112 and drives the elastic arm 22 to deform downward. The moving directions of the first conductive member 233 and the second conductive member 234 are opposite to each other, thus transmitting the signals of the first electronic component 200 to the second electronic component 300.

Figure 58:
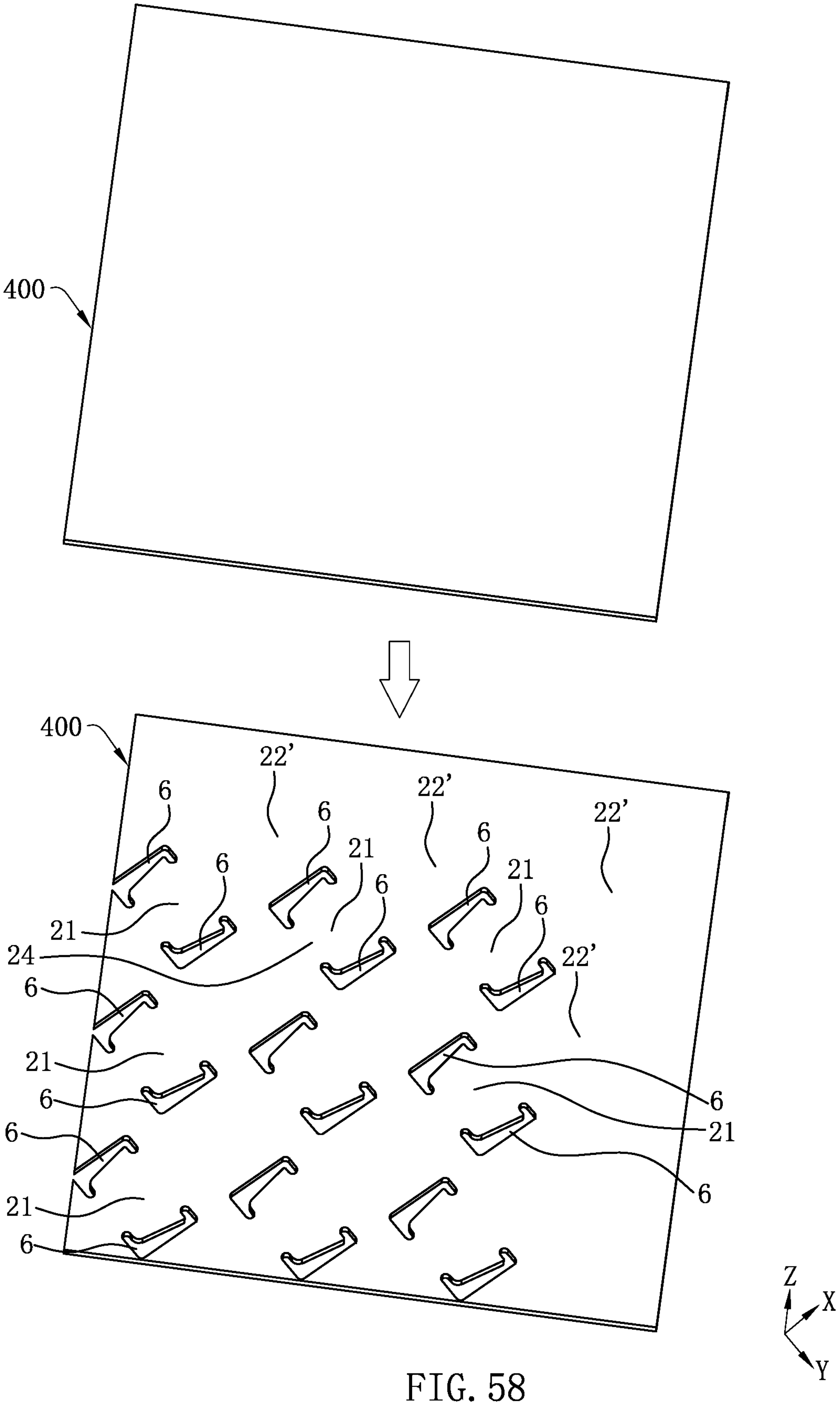
FIG. 58 is a schematic view of cutting a metal plate according to a fourth embodiment of the present invention.
Figure 79A:
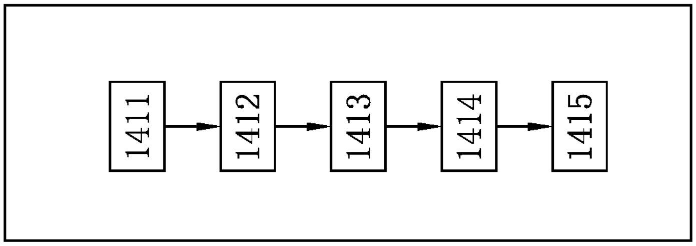
FIG. 79A is a flowchart of a first manufacturing method according to the fourth embodiment of the present invention.

As shown in FIG. 79A, the steps of a first method of manufacturing the electrical connector 100 according to the fourth embodiment are as follows:

Step 1411 (corresponding to the step A of claim 1): as shown in FIG. 58, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. The specific cutting method may adopt the industrial standard punching process, and may adopt precise cutting methods such as laser cutting.

Figure 59:
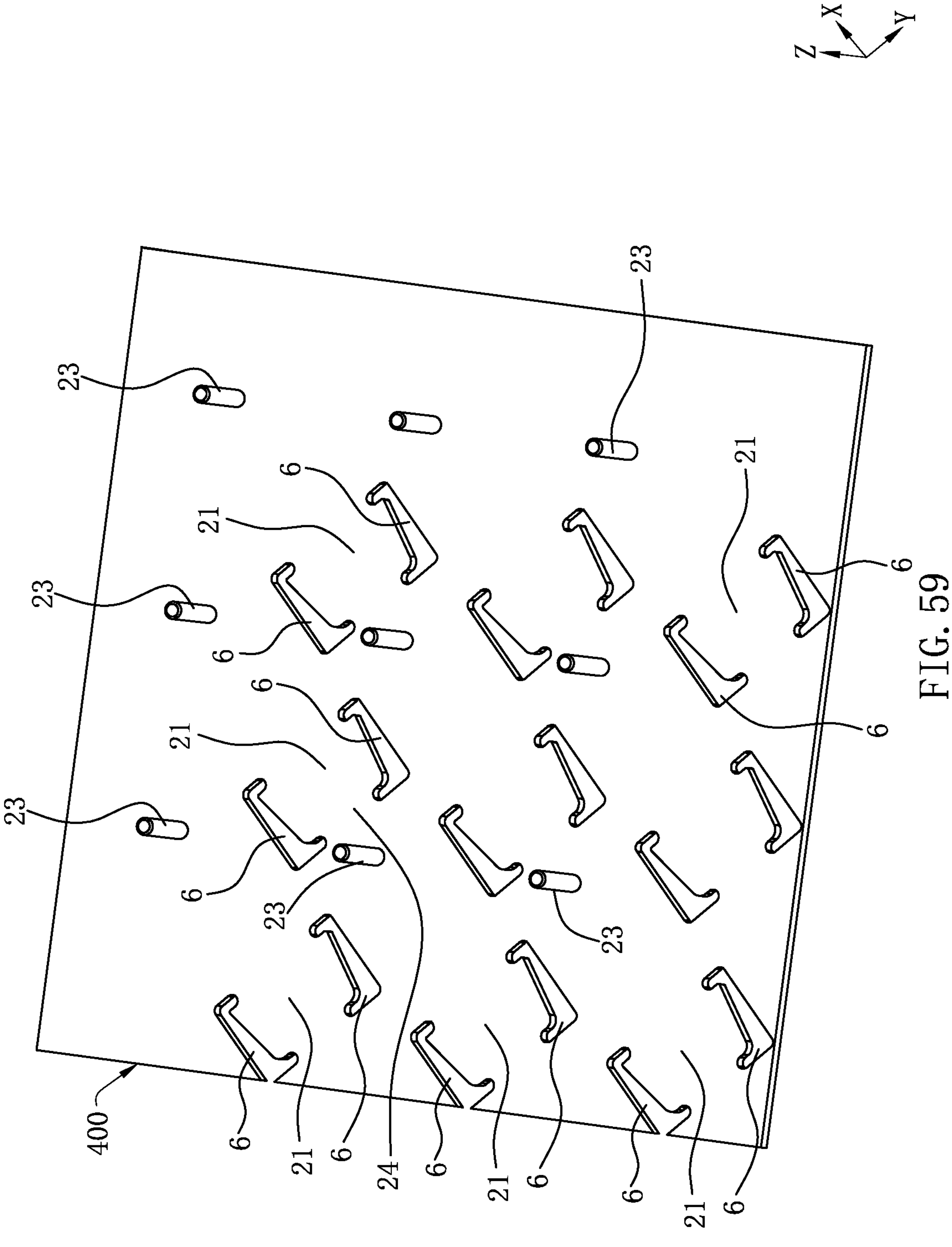
FIG. 59 is a schematic view of soldering conductive members according to the fourth embodiment of the present invention.

Step 1412 (corresponding to the step B of claim 1): as shown in FIG. 59, after the step 1411, providing a plurality of conductive members 23, and soldering one of the conductive members 23 to one of the pre-soldering areas 22'. Each conductive member 23 has a soldering portion 231 and a contact portion 232 integrally connected to the soldering portion 231.

Figure 60:
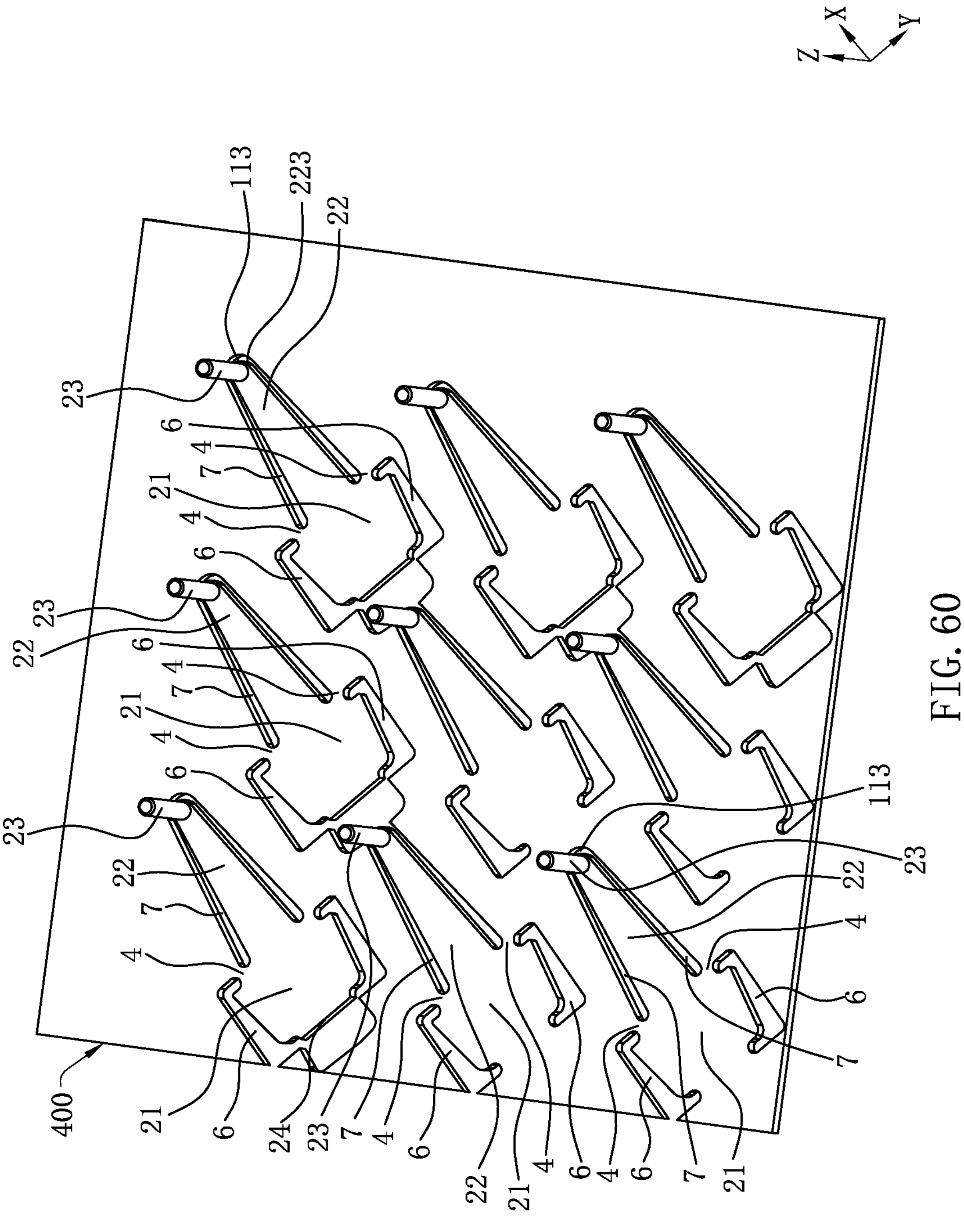
FIG. 60 is a schematic view of one type of cutting the pre-soldering areas to form the elastic arms according to the fourth embodiment of the present invention.
Figure 61:
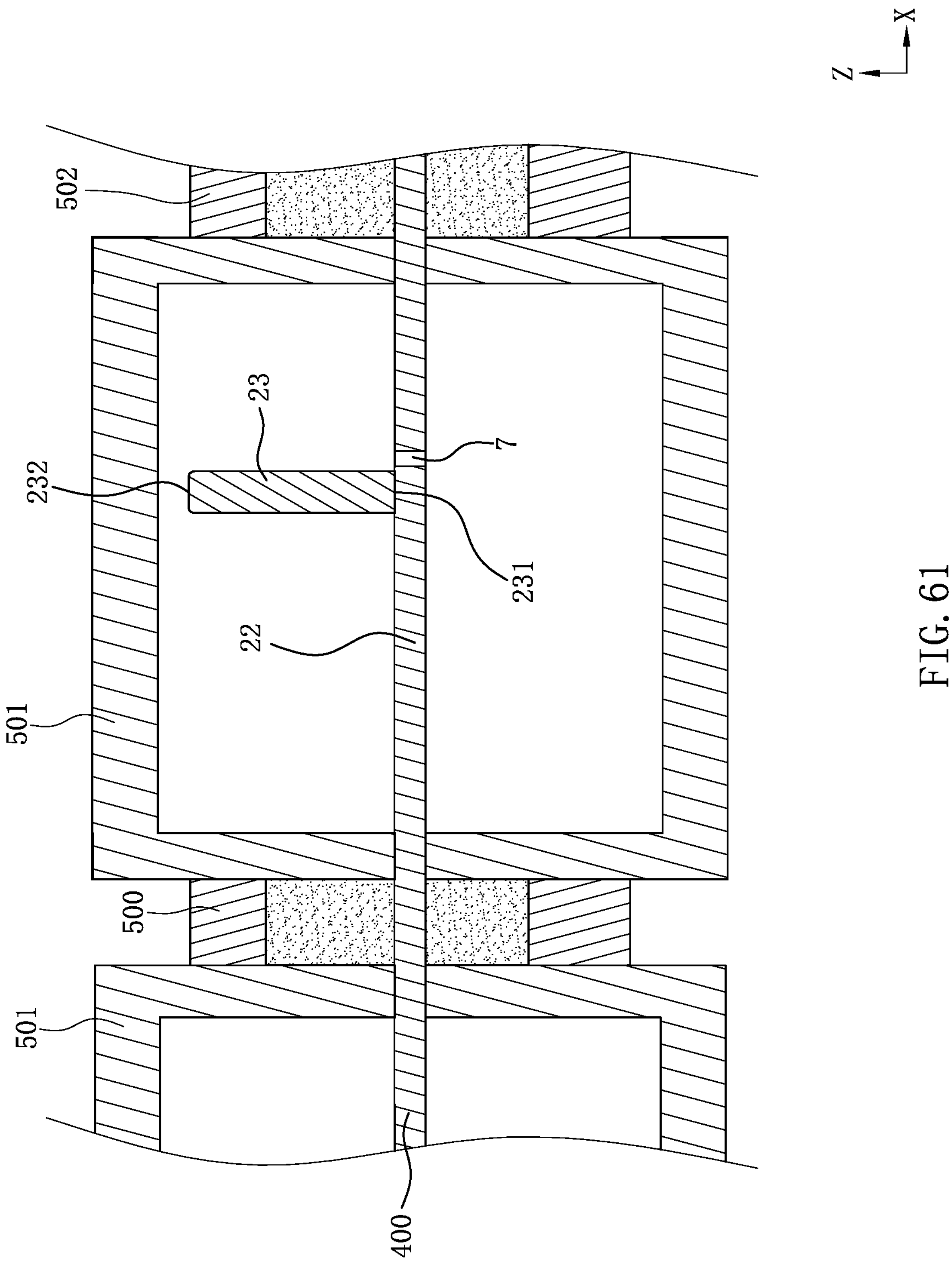
FIG. 61 is a schematic view of one type of insert-molding process according to the fourth embodiment of the present invention.

Step 1413 (corresponding to the step C of claim 1): as shown in FIG. 60, after the step 1412, cutting and forming a plurality of elastic arms 22 correspondingly according to locations of the conductive members 23 in the pre-soldering areas 22' as references. Each elastic arm 22 extends along a side of the base portion 21, and each elastic arm 22 formed by cutting is soldered and fixed to one of the conductive members 23. A conductive terminal 2 includes a base portion 21, an elastic arm 22, a conductive member 23 and a tail portion 24. The end of the elastic arm 22 away from the base portion 21 is a free end 223, and the free end 223 is soldered to a soldering portion 231.

The cutting further forms a cutting slot 7 running through the metal plate 400 and located at an outer side of the elastic arm 22 and a plurality of connecting portions 4 connected to the same conductive terminal 2. The connecting portions 4 are used to separate the through slots 6 and the cutting slot 7.

Step 1414 (corresponding to the step D of claim 1): as shown in FIG. 61 to FIG. 65, after the step 1413, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the elastic arm 22 and the conductive member 23. Liquid plastic is injected into the cavities 502 by insert-molding, thus forming an insulating body 1 and a plurality of accommodating slots 11. After removing the mold cores 501, each accommodating slot 11 is provided with a reserved space 112, and the elastic arm 22 and the conductive member 23 are exposed in the reserved space 112 running through the insulating body 1 in the vertical direction. When forming the insulating body 1, the plastic material partially fills the through slots 6 to enhance fixing of the base portion 21. The base portion 21 is covered and fixed by the insulating body 1, and the tail portion 24 is not covered and fixed by the insulating body 1.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

In this embodiment, a plurality of solder bodies 5 are provided. Each solder body 5 is soldered and fixed to the tail portion 24. The conductive member 23 and the solder body 5 are respectively located on a first surface and a second surface of the metal plate 400, and are provided to be staggered in the vertical direction. The first surface and a second surface are two surfaces of the metal plate 400 arranged opposite to each other in the vertical direction.

Figure 67:
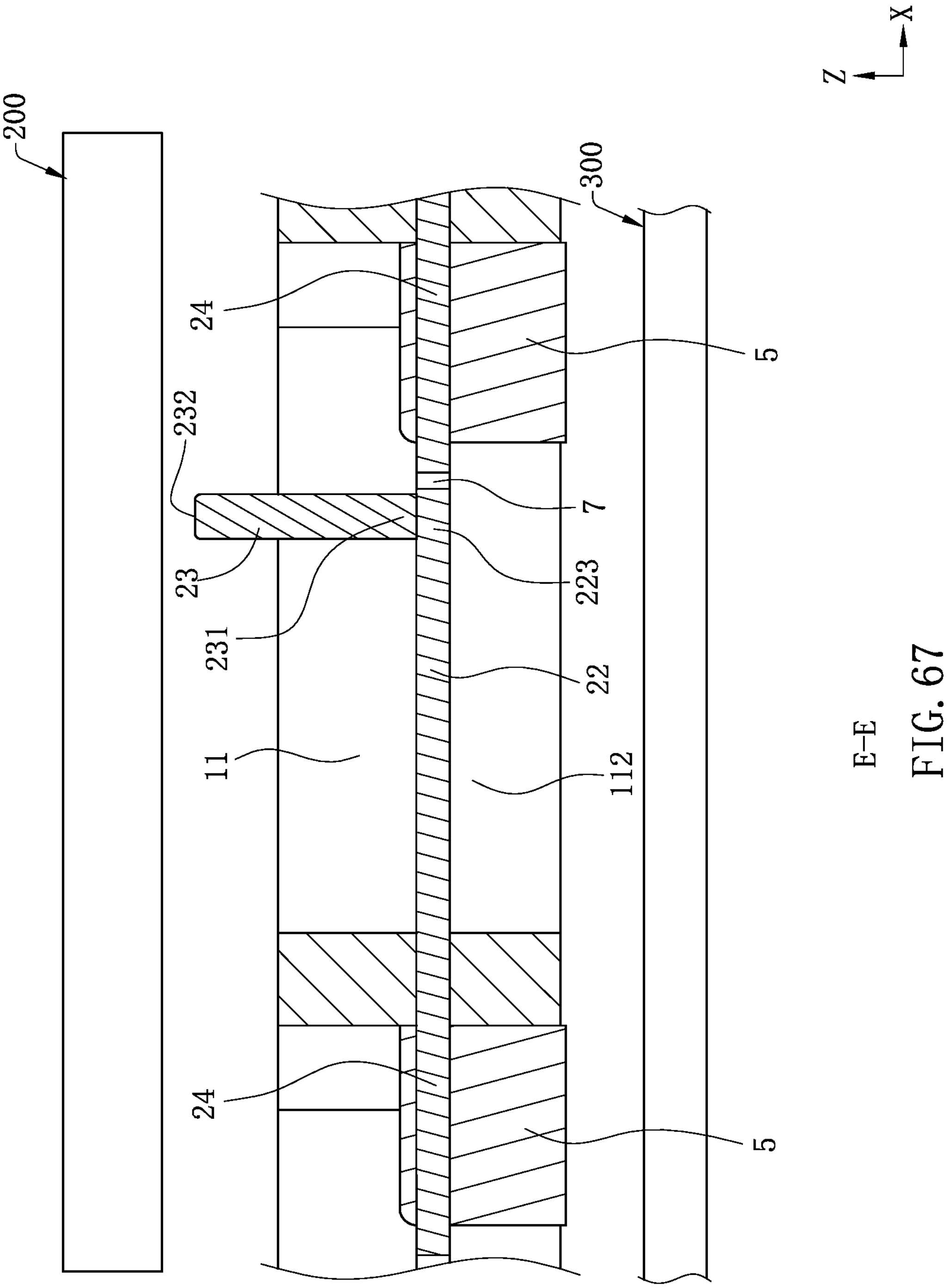
FIG. 67 is a partial sectional view of FIG. 66 along the E-E direction.
Figure 68:
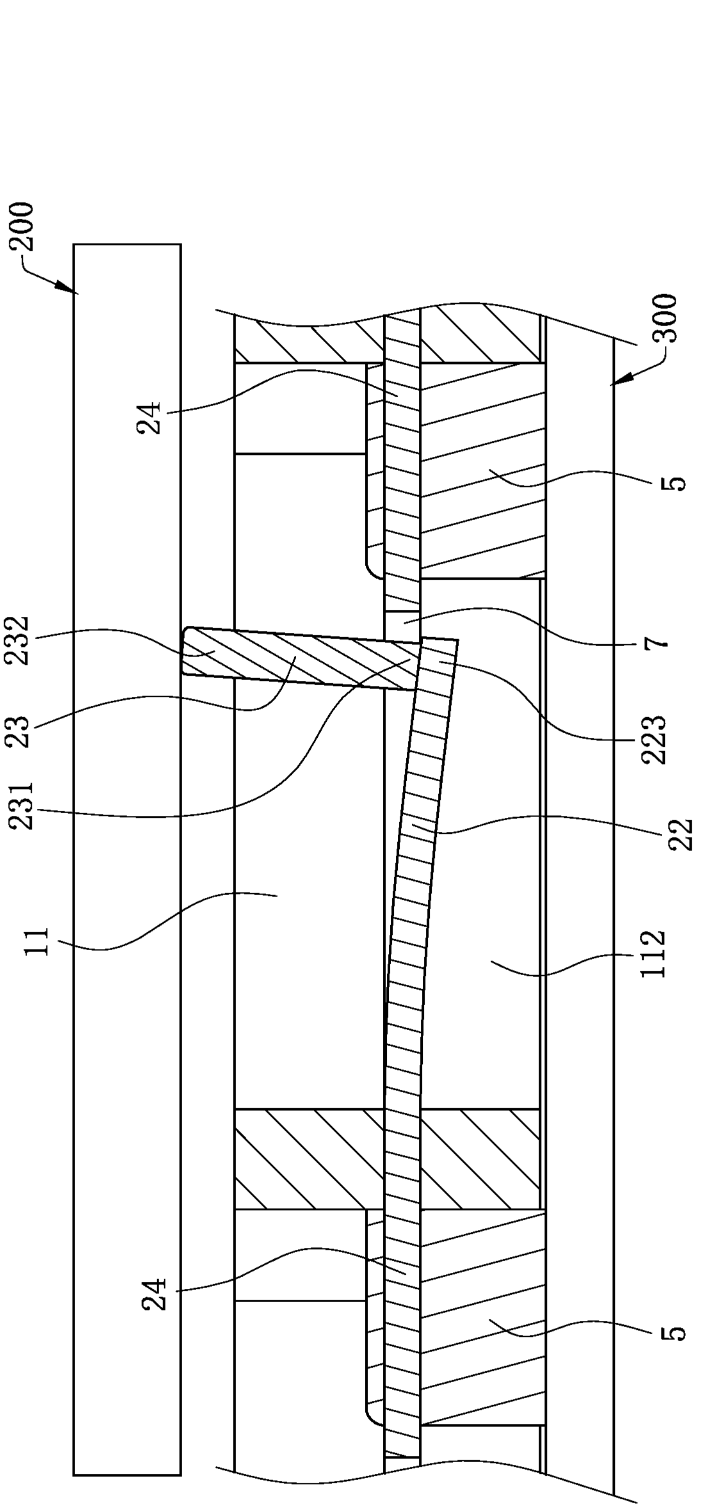
FIG. 68 is a schematic view of FIG. 67 after mating with an electronic component.

Step 1415 (corresponding to the step E of claim 1): as shown in FIG. 66 to FIG. 68, after the step 1414, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 is firstly soldered and fixed to the solder body 5, and the first electronic component 200 then presses downward on the conductive member 23 to move and drives the elastic arm 22 to deform downward toward the reserved space 112, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

In other embodiments, each solder body 5 being soldered and fixed to the tail portion 24 may be in the step 1415. The conductive member 23 and the solder body 5 are provided to be staggered in the vertical direction.

Figure 79B:
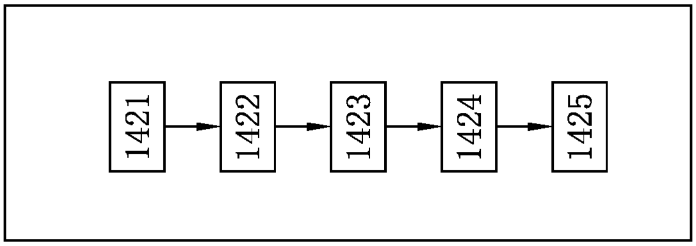
FIG. 79B is a flowchart of a second manufacturing method according to the fourth embodiment of the present invention.

As shown in FIG. 79B, the steps of a second method of manufacturing the electrical connector 100 according to the fourth embodiment are as follows:

Step 1421 (corresponding to the step A of claim 1): as shown in FIG. 58, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. The specific cutting method may adopt the industrial standard punching process, and may adopt precise cutting methods such as laser cutting.

Step 1422 (corresponding to the step B of claim 1): as shown in FIG. 59, after the step 1421, providing a plurality of conductive members 23, and soldering one of the conductive members 23 to one of the pre-soldering areas 22'. Each conductive member 23 has a soldering portion 231 and a contact portion 232 integrally connected to the soldering portion 231.

Figure 69:
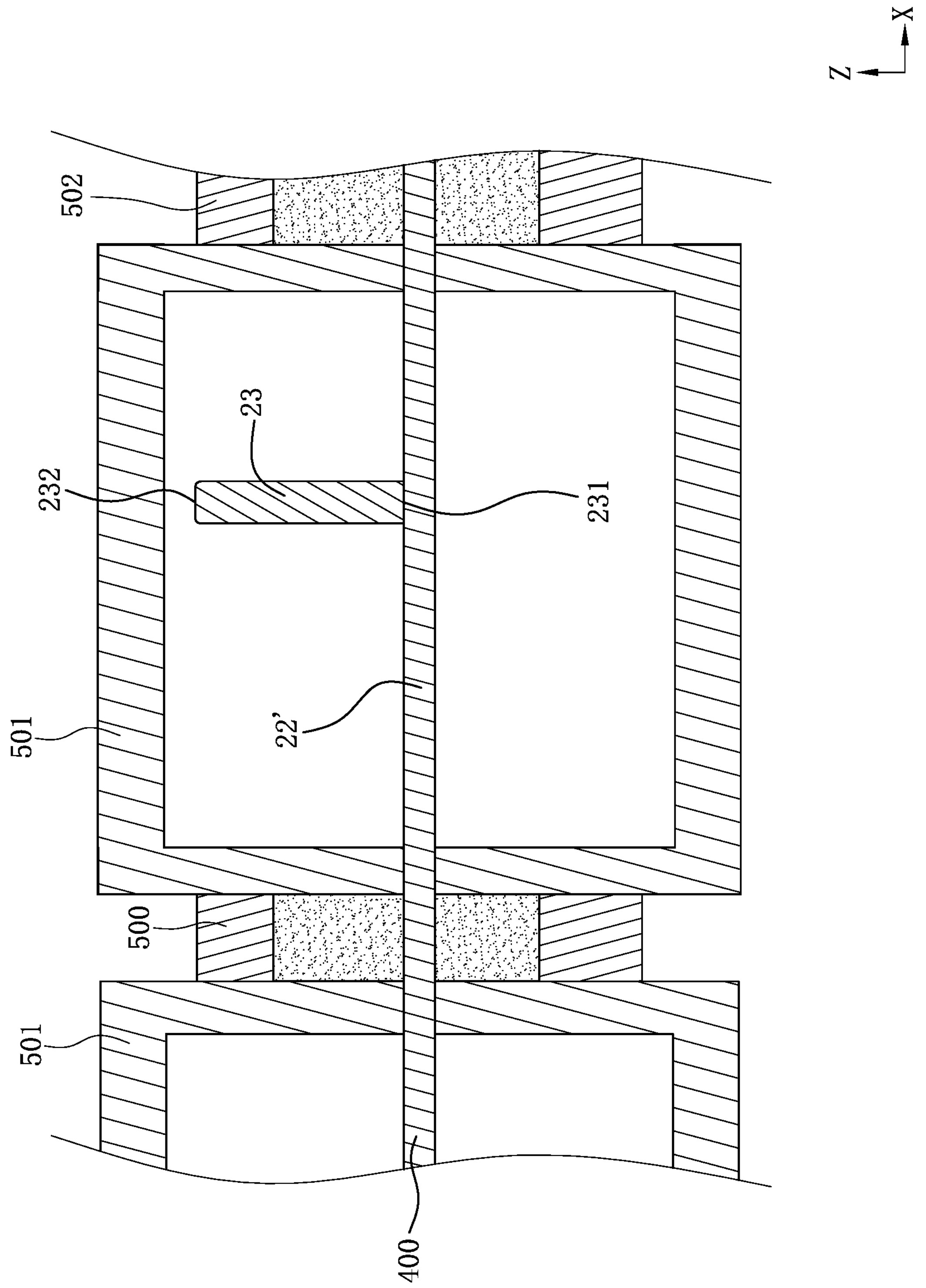
FIG. 69 is a schematic view of another type of insert-molding process according to the fourth embodiment of the present invention.
Figure 70:
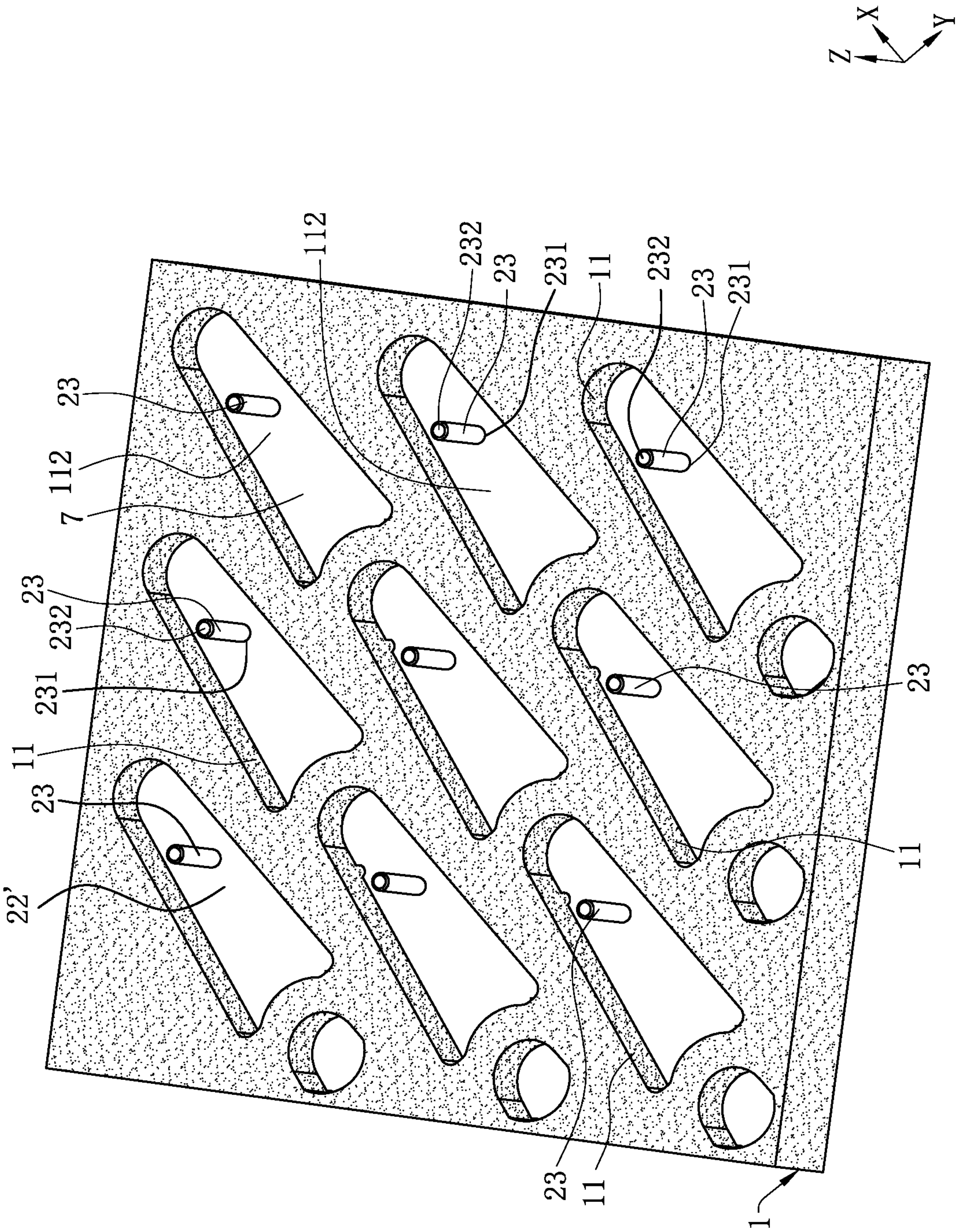
FIG. 70 is a schematic view of obtaining the insulating body through another type of insert-molding process according to the fourth embodiment of the present invention.

Step 1423 (corresponding to the step D of claim 1): as shown in FIG. 69 to FIG. 70, after the step 1422, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields a pre-soldering area 22' and the conductive member 23. Liquid plastic is injected into the cavities 502 by insert-molding, thus forming an insulating body 1 and a plurality of accommodating slots 11. After removing the mold cores 501, each accommodating slot 11 is provided with a reserved space 112, and the conductive member 23 is exposed in the reserved space 112 running through the insulating body 1 in the vertical direction. When forming the insulating body 1, the plastic material partially fills the through slots 6 to enhance fixing of the base portion 21. The base portion 21 is covered and fixed by the insulating body 1, and the tail portion 24 is not covered and fixed by the insulating body 1.

Step 1424 (corresponding to the step C of claim 1): as shown in FIG. 62 to FIG. 65, after the step 1423, cutting and forming a plurality of elastic arms 22 correspondingly according to locations of the conductive members 23 in the pre-soldering areas 22' as references. Each elastic arm 22 extends along a side of the base portion 21, and each elastic arm 22 formed by cutting is soldered and fixed to one of the conductive members 23. A conductive terminal 2 includes a base portion 21, an elastic arm 22, a conductive member 23 and a tail portion 24. The end of the elastic arm 22 away from the base portion 21 is a free end 223, and the free end 223 is soldered to a soldering portion 231. The elastic arm 22 is exposed in the reserved space 112 running through the insulating body 1 in the vertical direction.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

The cutting further forms a cutting slot 7 running through the metal plate 400 and located at an outer side of the elastic arm 22 and a plurality of connecting portions 4 connected to the same conductive terminal 2. The connecting portions 4 are used to separate the through slots 6 and the cutting slot 7.

In this embodiment, a plurality of solder bodies 5 are provided. Each solder body 5 is soldered and fixed to the tail portion 24. The conductive member 23 and the solder body 5 are respectively located on a first surface and a second surface of the metal plate 400, and are provided to be staggered in the vertical direction. The first surface and a second surface are two surfaces of the metal plate 400 arranged opposite to each other in the vertical direction.

Step 1425 (corresponding to the step E of claim 1): as shown in FIG. 66 to FIG. 68, after the step 1424, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 is firstly soldered and fixed to the solder body 5, and the first electronic component 200 then presses downward on the conductive member 23 to move and drives the elastic arm 22 to deform downward toward the reserved space 112, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

In other embodiments, each solder body 5 being soldered and fixed to the tail portion 24 may be in the step 1425. The conductive member 23 and the solder body 5 are provided to be staggered in the vertical direction.

Figure 79C:
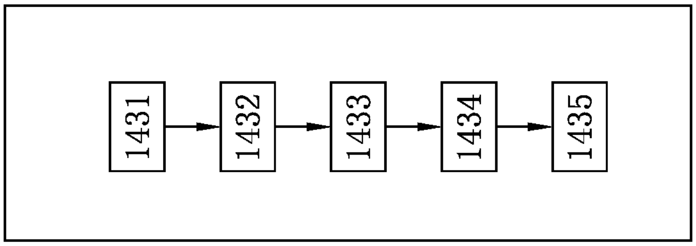
FIG. 79C is a flowchart of a third manufacturing method according to the fourth embodiment of the present invention.

As shown in FIG. 79C, the steps of a third method of manufacturing the electrical connector 100 according to the fourth embodiment are as follows:

Step 1431 (corresponding to the step I of claim 7): as shown in FIG. 58, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. The specific cutting method may adopt the industrial standard punching process, and may adopt precise cutting methods such as laser cutting.

Figure 71:
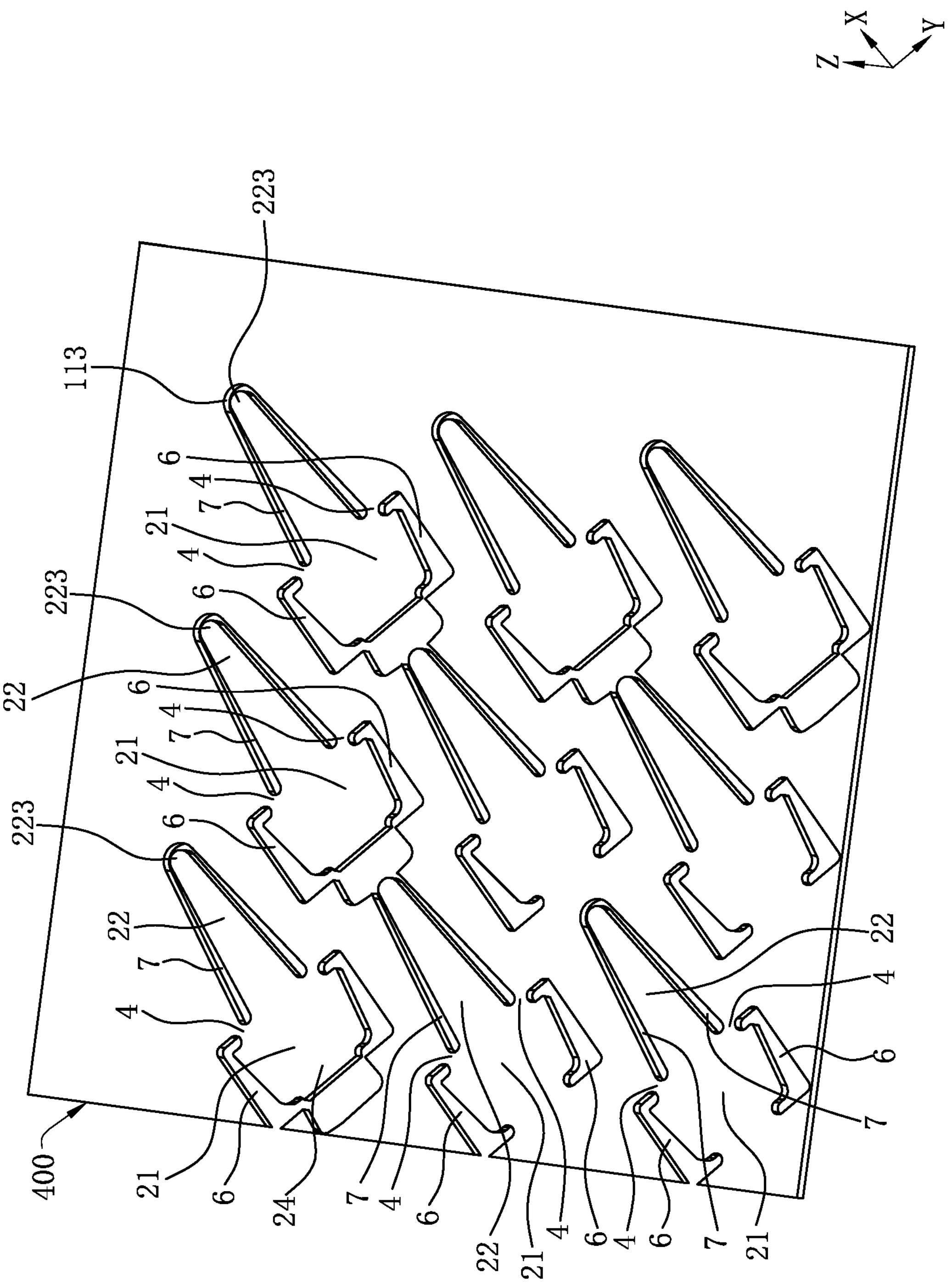
FIG. 71 is a schematic view of another type of cutting the pre-soldering areas to form the elastic arms according to the fourth embodiment of the present invention.

Step 1432 (corresponding to the step II of claim 7): as shown in FIG. 71, after the step 1431, cutting the pre-soldering areas 22' to form a plurality of elastic arms 22. Each elastic arm 22 extends along a side of the base portion 21, and the end of the elastic arm 22 away from the base portion 21 is a free end 223.

The cutting further forms a cutting slot 7 running through the metal plate 400 and located at an outer side of the elastic arm 22 and a plurality of connecting portions 4 connected to the same base portion 21. The connecting portions 4 are used to separate the through slots 6 and the cutting slot 7. In other embodiments, the step 1432 may be located in the step 1431 to perform simultaneous cutting.

Step 1433 (corresponding to the step III of claim 7): as shown in FIG. 60, after the step 1432, providing a plurality of conductive members 23, and soldering one of the conductive members 23 to one of the elastic arms 22. A conductive terminal 2 includes a base portion 21, an elastic arm 22, a conductive member 23 and a tail portion 24. Each conductive member 23 has a soldering portion 231 and a contact portion 232 integrally connected to the soldering portion 231. The free end 223 is soldered to a soldering portion 231.

Step 1434 (corresponding to the step IV of claim 7): as shown in FIG. 61 to FIG. 65, after the step 1433, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7, the elastic arm 22 and the conductive member 23. Liquid plastic is injected into the cavities 502 by insert-molding, thus forming an insulating body 1 and a plurality of accommodating slots 11. After removing the mold cores 501, each accommodating slot 11 is provided with a reserved space 112, and the elastic arm 22 and the conductive member 23 are exposed in the reserved space 112 running through the insulating body 1 in the vertical direction. When forming the insulating body 1, the plastic material partially fills the through slots 6 to enhance fixing of the base portion 21. The base portion 21 is covered and fixed by the insulating body 1, and the tail portion 24 is not covered and fixed by the insulating body 1.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

In this embodiment, a plurality of solder bodies 5 are provided. Each solder body 5 is soldered and fixed to the tail portion 24. The conductive member 23 and the solder body 5 are respectively located on a first surface and a second surface of the metal plate 400, and are provided to be staggered in the vertical direction. The first surface and a second surface are two surfaces of the metal plate 400 arranged opposite to each other in the vertical direction Step 1435 (corresponding to the step V of claim 7): as shown in FIG. 66 to FIG. 68, after the step 1434, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 is firstly soldered and fixed to the solder body 5, and the first electronic component 200 then presses downward on the conductive member 23 to move and drives the elastic arm 22 to deform downward toward the reserved space 112, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

In other embodiments, each solder body 5 being soldered and fixed to the tail portion 24 may be in the step 1435. The conductive member 23 and the solder body 5 are provided to be staggered in the vertical direction.

Figure 79D:
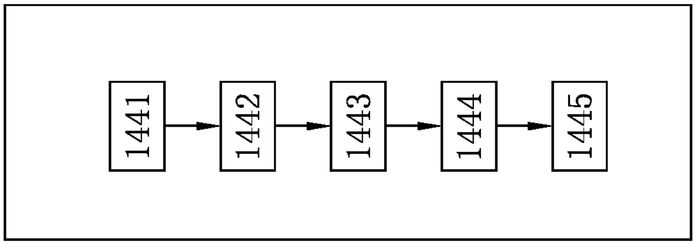
FIG. 79D is a flowchart of a fourth manufacturing method according to the fourth embodiment of the present invention.

As shown in FIG. 79D, the steps of a fourth method of manufacturing the electrical connector 100 according to the fourth embodiment are as follows:

Step 1441 (corresponding to the step I of claim 7): as shown in FIG. 58, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. The specific cutting method may adopt the industrial standard punching process, and may adopt precise cutting methods such as laser cutting.

Step 1442 (corresponding to the step II of claim 7): as shown in FIG. 71, after the step 1441, cutting the pre-soldering areas 22' to form a plurality of elastic arms 22. Each elastic arm 22 extends along a side of the base portion 21, and the end of the elastic arm 22 away from the base portion 21 is a free end 223.

Figure 72:
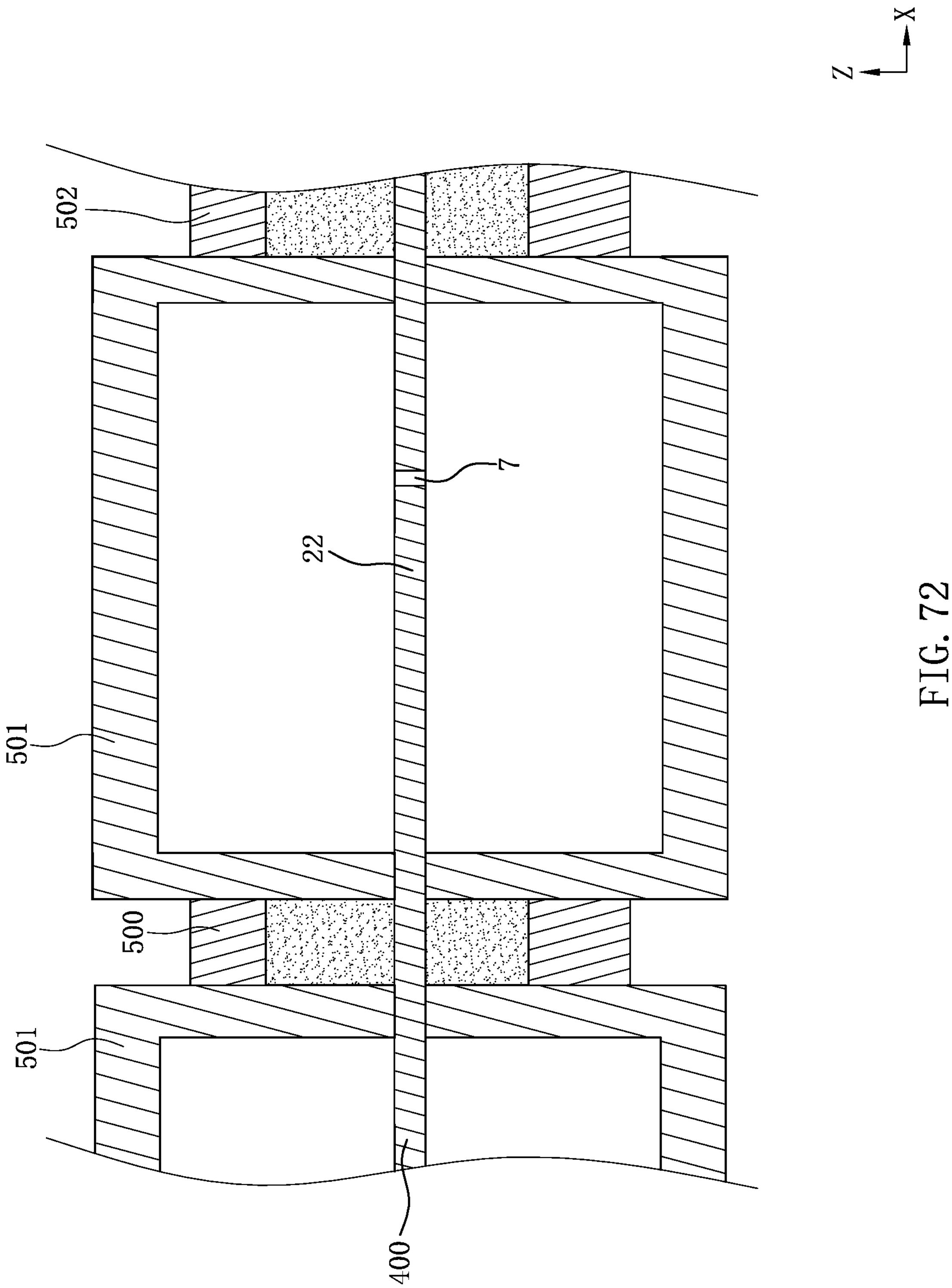
FIG. 72 is a schematic view of a further type of insert-molding process according to the fourth embodiment of the present invention.
Figure 73:
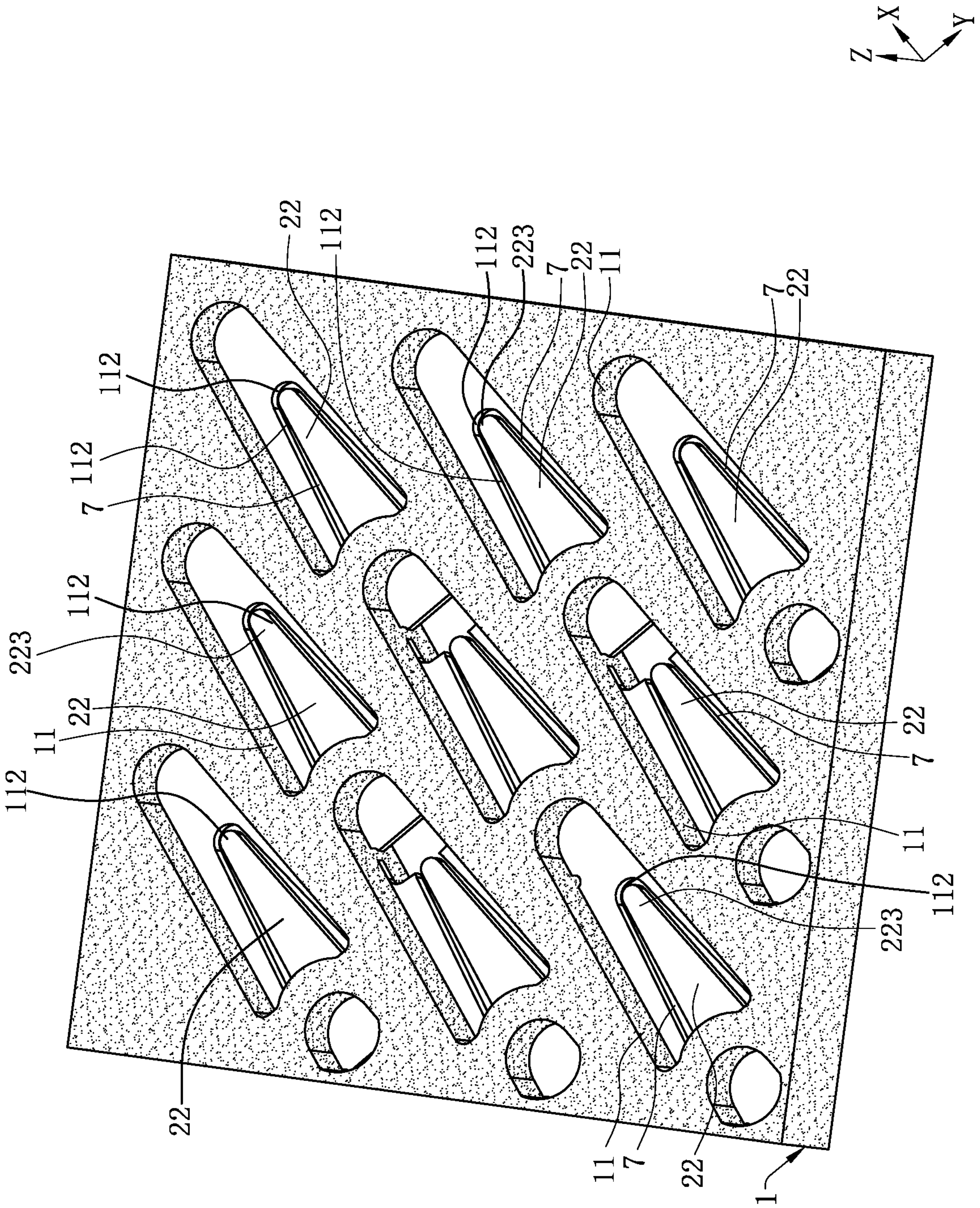
FIG. 73 is a schematic view of obtaining the insulating body through a further type of insert-molding process according to the fourth embodiment of the present invention.

Step 1443 (corresponding to the step IV of claim 7): as shown in FIG. 72 to FIG. 73, after the step 1442, disposing the metal plate 400 being cut in a mold 500. The mold 500 has a plurality of mold core 501 and a plurality of cavities 502. Each mold core 501 simultaneously correspondingly abuts and positions a portion of the metal plate 400, and correspondingly shields the cutting slot 7 and the elastic arm 22. Liquid plastic is injected into the cavities 502 by insert-molding, thus forming an insulating body 1 and a plurality of accommodating slots 11. After removing the mold cores 501, each accommodating slot 11 is provided with a reserved space 112, and the elastic arm 22 is exposed in the reserved space 112 running through the insulating body 1 in the vertical direction. The base portion 21 is covered and fixed by the insulating body 1, and the tail portion 24 is not covered and fixed by the insulating body 1.

In other embodiments, each solder body 5 being soldered and fixed to the tail portion 24 may be in the step 1443.

Figure 65:
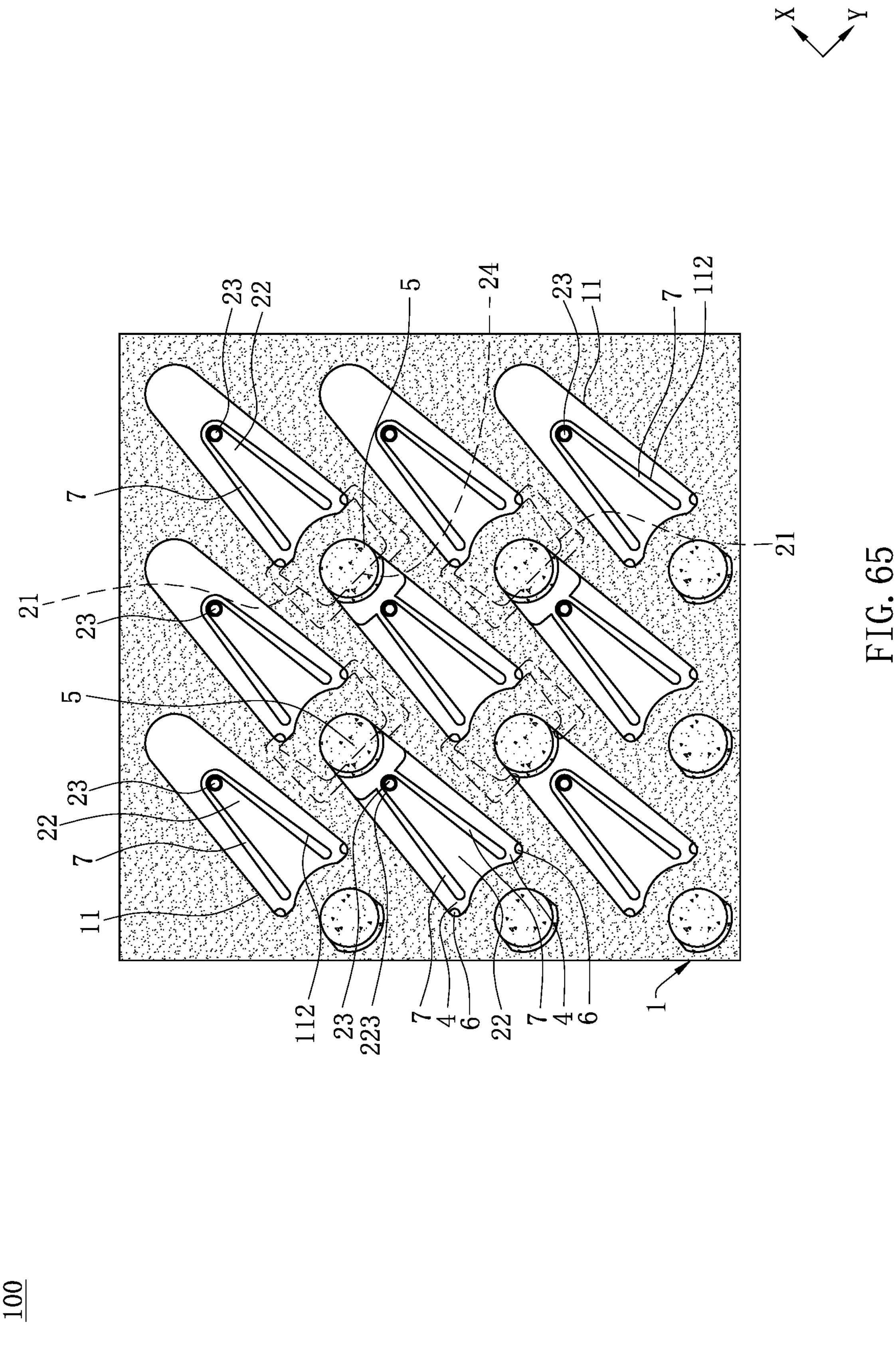
FIG. 65 is a top view of FIG. 63.

Step 1444 (corresponding to the step III of claim 7): as shown in FIG. 62 and FIG. 65, after the step 1443, providing a plurality of conductive members 23, and soldering one of the conductive members 23 to one of the elastic arms 22. The conductive member 23 and the solder body 5 are respectively located on a first surface and a second surface of the metal plate 400, and are provided to be staggered in the vertical direction. The first surface and a second surface are two surfaces of the metal plate 400 arranged opposite to each other in the vertical direction. The conductive member 23 is exposed in the reserved space 112 running through the insulating body 1 in the vertical direction. A conductive terminal 2 includes a base portion 21, an elastic arm 22, a conductive member 23 and a tail portion 24. Each conductive member 23 has a soldering portion 231 and a contact portion 232 integrally connected to the soldering portion 231. The free end 223 is soldered to a soldering portion 231.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

In this embodiment, a plurality of solder bodies 5 are provided. Each solder body 5 is soldered and fixed to the tail portion 24. The conductive member 23 and the solder body 5 are provided to be staggered in the vertical direction.

Step 1445 (corresponding to the step V of claim 7): as shown in FIG. 66 to FIG. 68, after the step 1444, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 is firstly soldered and fixed to the solder body 5, and the first electronic component 200 then presses downward on the conductive member 23 to move and drives the elastic arm 22 to deform downward toward the reserved space 112, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

In other embodiments, each solder body 5 being soldered and fixed to the tail portion 24 may be in the step 1445. The conductive member 23 and the solder body 5 are provided to be staggered in the vertical direction.

Figure 79E:
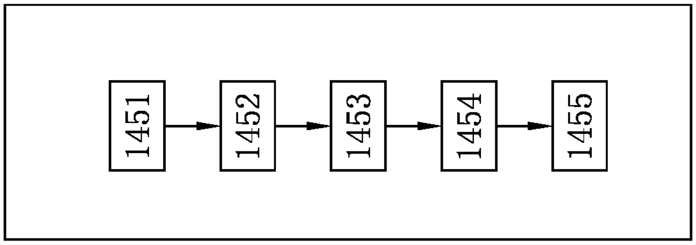
FIG. 79E is a flowchart of a fifth manufacturing method according to the fourth embodiment of the present invention.

As shown in FIG. 79E, the steps of a fifth method of manufacturing the electrical connector 100 according to the fourth embodiment are as follows:

Step 1451 (corresponding to the step I of claim 7): as shown in FIG. 58, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion 21 and running through the metal plate 400. The specific cutting method may adopt the industrial standard punching process, and may adopt precise cutting methods such as laser cutting.

Figure 74:
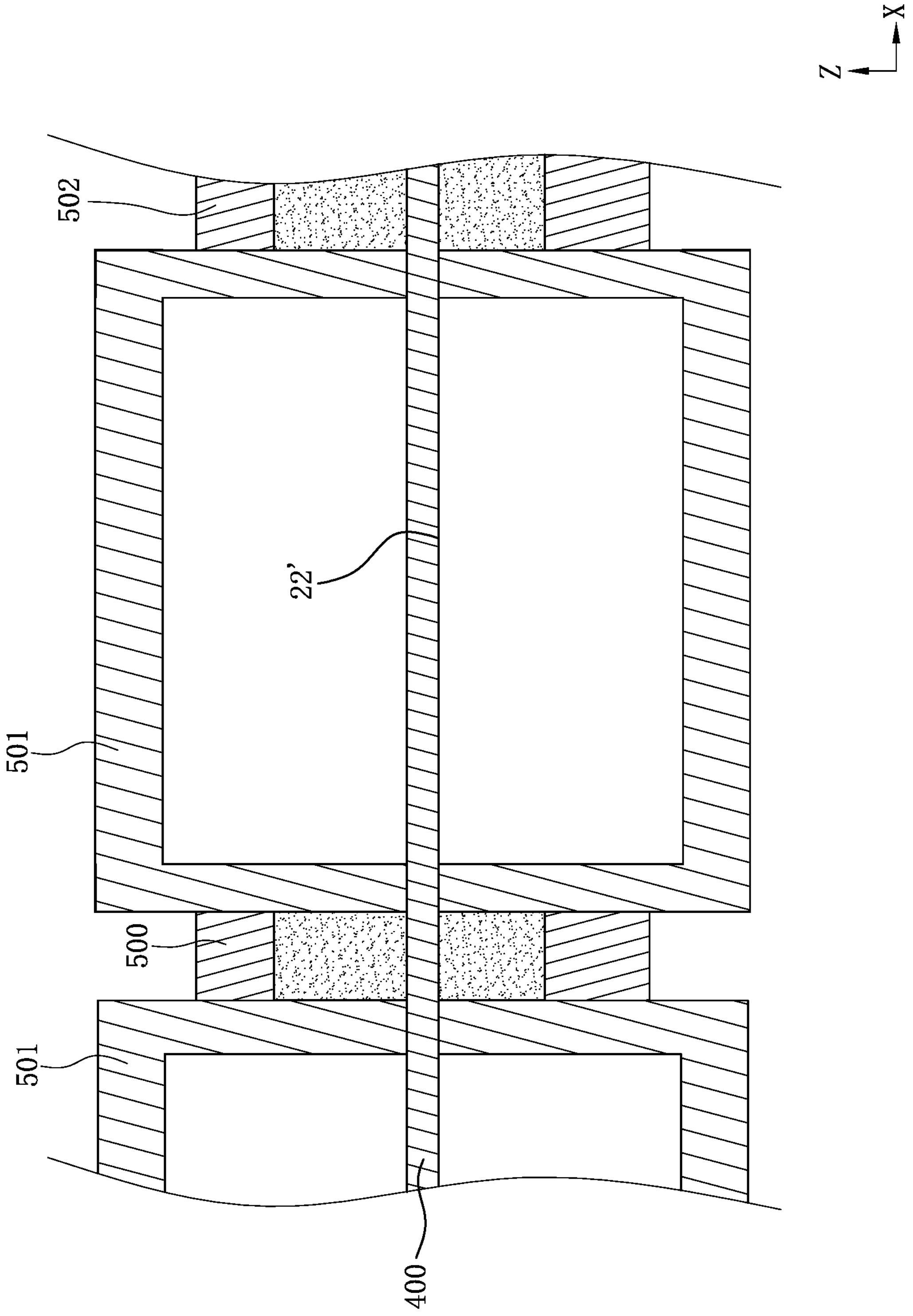
FIG. 74 is a schematic view of yet another type of insert-molding process according to the fourth embodiment of the present invention.

Step 1452 (corresponding to the step IV of claim 7): as shown in FIG. 74 to FIG. 75, after the step 1451, the mold 500 has a plurality of mold core 501 and a plurality of cavities 502. Each mold core 501 simultaneously correspondingly abuts and positions a portion of the metal plate 400, and correspondingly shields a pre-soldering area 22'. Liquid plastic is injected into the cavities 502 by insert-molding, thus forming an insulating body 1 and a plurality of accommodating slots 11. After removing the mold cores 501, each accommodating slot 11 is provided with a reserved space 112, and the pre-soldering area 22' is exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1453 (corresponding to the step II of claim 7): as shown in FIG. 73, after the step 1452, cutting the pre-soldering areas 22' to form a plurality of elastic arms 22. Each elastic arm 22 extends along a side of the base portion 21, and the end of the elastic arm 22 away from the base portion 21 is a free end 223. The elastic arm 22 is exposed in the reserved space 112 running through the insulating body 1 in the vertical direction.

The cutting further forms a cutting slot 7 running through the metal plate 400 and located at an outer side of the elastic arm 22 and a plurality of connecting portions 4 connected to the same base portion 21. The connecting portions 4 are used to separate the through slots 6 and the cutting slot 7.

In other embodiments, each solder body 5 being soldered and fixed to the tail portion 24 may be in the step 1453.

Step 1454 (corresponding to the step III of claim 7): as shown in FIG. 62 and FIG. 65, after the step 1453, providing a plurality of conductive members 23, and soldering one of the conductive members 23 to one of the elastic arms 22. The conductive member 23 and the solder body 5 are respectively located on a first surface and a second surface of the metal plate 400, and are provided to be staggered in the vertical direction. The first surface and a second surface are two surfaces of the metal plate 400 arranged opposite to each other in the vertical direction. The conductive member 23 is exposed in the reserved space 112 running through the insulating body 1 in the vertical direction. A conductive terminal 2 includes a base portion 21, an elastic arm 22, a conductive member 23 and a tail portion 24. Each conductive member 23 has a soldering portion 231 and a contact portion 232 integrally connected to the soldering portion 231. The free end 223 is soldered to a soldering portion 231.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

In this embodiment, a plurality of solder bodies 5 are provided. Each solder body 5 is soldered and fixed to the tail portion 24. The conductive member 23 and the solder body 5 are provided to be staggered in the vertical direction.

Step 1455 (corresponding to the step V of claim 7): as shown in FIG. 66 to FIG. 68, after the step 1454, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 is firstly soldered and fixed to the solder body 5, and the first electronic component 200 then presses downward on the conductive member 23 to move and drives the elastic arm 22 to deform downward toward the reserved space 112, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

In other embodiments, each solder body 5 being soldered and fixed to the tail portion 24 may be in the step 1455, and the conductive member 23 and the solder body 5 are provided to be staggered in the vertical direction.

Figure 79F:
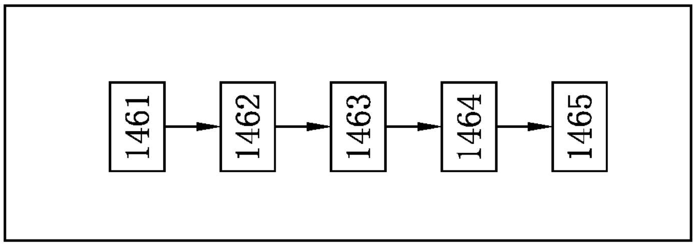
FIG. 79F is a flowchart of a sixth manufacturing method according to the fourth embodiment of the present invention.

As shown in FIG. 79F, the steps of a sixth method of manufacturing the electrical connector 100 according to the fourth embodiment are as follows:

Step 1461 (corresponding to the step A of claim 1): as shown in FIG. 58, providing a metal plate 400, and cutting the metal plate 400 to form a plurality of base portions 21, a plurality of pre-soldering areas 22', a plurality of tail portions 24 and a plurality of through slots 6. Each base portion 21 is integrally connected to a pre-soldering area 22', a tail portion 24 from an end of the base portion 21 away from the pre-soldering area 22', and two of the through slots 6 located at two sides of the base portion and running through the metal plate 400. The specific cutting method may adopt the industrial standard punching process, and may adopt precise cutting methods such as laser cutting.

Step 1462 (corresponding to the step D of claim 1): as shown in FIG. 74 to FIG. 75, after the step 1461, the mold 500 has a plurality of mold core 501 and a plurality of cavities 502. Each mold core 501 simultaneously correspondingly abuts and positions a portion of the metal plate 400, and correspondingly shields a pre-soldering area 22'. Liquid plastic is injected into the cavities 502 by insert-molding, thus forming an insulating body 1 and a plurality of accommodating slots 11. After removing the mold cores 501, each accommodating slot 11 is provided with a reserved space 112, and the pre-soldering area 22' is exposed in the reserved space 112. When forming the insulating body 1, the plastic material partially fills the through holes 211 and the through slots 6 to enhance fixing of the base portion 21. The base portion 21 is covered and fixed by the insulating body 1, and the tail portion 24 is not covered and fixed by the insulating body 1.

Step 1463 (corresponding to the step B of claim 1): as shown in FIG. 70, after the step 1462, providing a plurality of conductive members 23, and soldering a conductive member 23 to a pre-soldering area 22'. Each conductive member 23 has a soldering portion 231 and a contact portion 232 integrally connected to the soldering portion 231. The conductive member 23 is located in the reserved space 112. The conductive member 23 and the solder body 5 are provided to be staggered in the vertical direction.

Step 1464 (corresponding to the step C of claim 1): as shown in FIG. 62 to FIG. 65, after the step 1463, cutting and forming a plurality of elastic arms 22 correspondingly according to locations of the conductive members 23 in the pre-soldering areas 22' as references. Each elastic arm 22 extends along a side of the base portion 21. A conductive terminal 2 includes a base portion 21, an elastic arm 22, a conductive member 23 and a tail portion 24. The end of the elastic arm 22 away from the base portion 21 is a free end 223, and the free end 223 is soldered to a soldering portion 231. The elastic arm 22 is exposed in the reserved space 112 running through the insulating body 1 in the vertical direction.

For a same conductive terminal 2 formed by cutting and soldering, the elastic arm 22 thereof and the tail portion 24 thereof are correspondingly exposed in two different accommodating slots 11 adjacent to each other in the front-rear direction. In two conductive terminals 2 adjacent to each other in the front-rear direction and formed by cutting and soldering, the tail portion 24 of the conductive terminal 2 located in front thereof and the elastic arm 22 of the conductive terminal 2 located behind are exposed in the same accommodating slot 11.

The cutting further forms a cutting slot 7 running through the metal plate 400 and located at an outer side of the elastic arm 22 and a plurality of connecting portions 4 connected to the same conductive terminal 2. The connecting portions 4 are used to separate the through slots 6 and the cutting slot 7.

In this embodiment, a plurality of solder bodies 5 are provided. Each solder body 5 is soldered and fixed to the tail portion 24. The conductive member 23 and the solder body 5 are provided to be staggered in the vertical direction.

Step 1465 (corresponding to the step E of claim 1): as shown in FIG. 66 to FIG. 68, after the step 1464, selecting some of the conductive terminals 2 based on the predetermined functions thereof, and cutting all of the connecting portions 4 connected to the selected conductive terminals 2, thus forming a conductive plate 3. The selected conductive terminals 2 are broken from the conductive plate 3 to form electrical insulation, thus completing manufacturing of the electrical connector 100. The second electronic component 300 is firstly soldered and fixed to the solder body 5, and the first electronic component 200 then presses downward on the conductive member 23 to move and drives the elastic arm 22 to deform downward toward the reserved space 112, thus transmitting the signals of the first electronic component 200 to the second electronic component 300. In this embodiments, the selected conductive terminals 2 only include the signal terminals 2S. In other embodiments, the connecting portions 4 of all of the conductive terminals 2, including the ground terminals 2G, are cut to break the connection and maintain the electrical insulation.

In other embodiments, a plurality of solder bodies 5 are provided. Each solder body 5 being soldered and fixed to the tail portion 24 may be in the step 1465, and the conductive member 23 and the solder body 5 are provided to be staggered in the vertical direction.

In sum, the electrical connector 100 and the manufacturing method thereof according to certain embodiments of the present invention have the following beneficial effects:

(1) The base portions 21 and the elastic arms 22 of the conductive terminals 2 are formed by cutting the same metal plate. The elastic arms 22 are formed by one punching without the need of further bending, and the manufacturing process is simple. Further, the electrical connector 100 is formed by the insert-molding process, and compared to the background art, there is no need for assembly, thus saving the manufacturing cost. In the case where the manufacturing process is simple without the need of assembly, the conductive member 23 is soldered and fixed to the elastic arm 22, and each of the first electronic component 200 and the second electronic component 300 respectively abuts a corresponding conductive member 23 to move and drives the elastic arm 22 to deform in the reserved space 112, thus ensuring the two conductive members 23 to have sufficient normal forces to abut the first electronic component 200 and the second electronic component 300, reducing the fatigue loss of the elastic arm 22, and simultaneously preventing from permanent deformation thereof and maintaining the stable contact status.

(2) The first elastic arm 221 and the second elastic arm 222 are connected to the same base portion 21, and extend along two opposite sides of the base portion 21. The first conductive member 233 and the second conductive member 234 are respectively soldered and fixed to the first elastic arm 221 and the second elastic arm 222. The second electronic component 300 firstly abuts upward the second conductive member 234 to move and drives the second elastic arm 222 to deform upward toward the other of the reserved spaces 112, and the first electronic component 200 then presses downward on the first conductive member 233 to move and drives the first elastic arm 221 to deform downward toward one of the reserved spaces 112. Since the first elastic arm 221 and the second elastic arm 222 are given symmetrical and equal forces, the base portion 21 is not easily loosened, such that the usage life of each conductive terminal 2 is longer, and the contacts between each conductive terminal 2, the first electronic component 200 and the second electronic component 300 are stable.

(3) Each elastic arm 22 is soldered and fixed with two conductive members 23. The first conductive member 233 is located on a first surface of the free end 223, and the second conductive member 234 is located on a second surface of the free end 223 arranged opposite to the first surface of the free end 223 in the vertical direction. The first conductive member 233 and the second conductive member 234 back on the same elastic arm 22, thus generating greater normal forces for abutting the first electronic component 200 and the second electronic component 300, further reducing the fatigue loss of the elastic arm 22, and simultaneously preventing from permanent deformation thereof and maintaining the stable contact status. The space of the accommodating slot 11 being occupied by the conductive terminal 2 is small, thus fully utilizing the space of the accommodating slot 11, facilitating the dense arrangement of the terminals.

(4) In each of the conductive terminals 2 provided in the insulating body 1 by insert-molding, the base portion 21 is provided with a through hole 211 running through the base portion 21 and two through slots 6 located at two sides of the base portion 21 and running through the base portion 21. The through holes 211 and the through slots 6 are filled by the plastic material forming the insulating body 1 to enhance fixing the base portion 21, such that the conductive terminal 2 is fixed more firmly, allowing the conductive member 23 to be soldered to the free ends 223 to facilitate the elastic deformation more stably.

(5) The tail portion 24 of one of the conductive terminals 2 is disposed and exposed in the accommodating slot 11 of the elastic arm 22 of another one of the conductive terminals 2. By utilizing the existing structure of the accommodating slots 11, the distance between two adjacent ones of the conductive terminals 2 is reduced relative to the existing technology, thus saving the space being occupied by the conductive terminals 2 in the horizontal direction, and facilitating the dense distribution of the conductive terminals 2.

(6) Another opposite side of the base portion 21 has a reserved space 113 running therethrough. The free end 223 of one of the conductive terminals 2 is located in the reserved space 113 of another one of the conductive terminals 2, further reducing the distance between two adjacent ones of the conductive terminals 2 relative to the existing technology, which is conducive to the developing trend of the dense arrangement of the terminals. Further, the reserved space 113 may prevent the elastic arm 22 of one of the conductive terminals 2 from being in contact with another one of the conductive terminals 2 and short-circuiting when being elastically deformed.

(7) A tail portion 24 extends from the end of the base portion 21 away from the elastic arm 22. Each tail portion 24 is soldered to a solder body 5, and the solder body 5 is used to be directly soldered downward to the second electronic component 300, such that the operation is simple and convenient, and the electrical contact between the conductive terminals 2 and the second electronic component 300 is more stable.

(8) A conductive member 23 is soldered to a pre-soldering area 22', such that the contact surface is stable, and then the elastic arms 22 are cut from the pre-soldering areas 22' according to locations of the conductive members 23, thus better controlling the edge distance between the conductive member 23 and the elastic arm 22, ensuring the accuracy for the conductive member 23 to be located on the elastic arm 22, allowing the elastic arm 22 to be given a more equal force, and further ensuring the conductive member 23 to accurately and stably abut the first electronic component 200 and the second electronic component 300.

(9) The metal plate 400 being cut is disposed in a mold 500. The mold 500 has a plurality of mold core 501 and a plurality of cavities 502. Each mold core 501 simultaneously correspondingly abuts and positions a portion of the metal plate 400, thus ensuring stable abutting of the mold core 501 without easily loosening, thereby not affecting the insert-molding process.

(10) The insulating body 1 is firstly formed by insert-molding, and then the conductive member 23 is soldered. The through holes 211 and the through slots 6 are filled by the plastic material forming the insulating body 1 to enhance fixing the base portion 21. Thus, the conductive post may be easily positioned when being soldered and fixed, and the mole core 501 does not need to create specific recesses thereon to shield the conductive member 23, thus having a simple structure, and further simplifying the insert-molding process, and enhancing the manufacturing efficiency.

(11) The elastic arm 22 is firstly cut, and then the insulating body 1 is formed by insert-molding. Thus, cutting the elastic arm 22 is simple and convenient, and the insulating body 1 is not easily damaged due to cutting the elastic arm 22, thus further ensuring the manufacturing quality of the electrical connector 100.

(12) The elastic arm 22 is firstly cut, and then the conductive member 23 is soldered and fixed to the elastic arm 22. For cutting the elastic arm 22, the manufacturing process is simple, without the need to specifically avoid the conductive member 23, thus further reducing the manufacturing cost.

(13) The insulating body 1 is firstly formed by insert-molding, and then the elastic arm 22 is cut. When forming the insulating body 1, the plastic material partially fills the through holes 211 and the through slots 6 to enhance fixing of the base portion 21, such that the elastic arm 22 is stable in the cutting process without easily shaking, thus enhancing the accuracy for cutting the elastic arm 22.

(14) The conductive member 23 is firstly soldered and fixed, and then the insulating body 1 is formed by insert-molding. The conductive member 23 does not need to protrude in the accommodating slot 11 of the insulating body 1 to be soldered and fixed, thus effectively control the soldering accuracy of the conductive member 23, and reducing the defect rate thereof.

(15) Each conductive member 23 adopts a conductive post in a chamfering shape, and the conductive members 23 respectively abut the first electronic component 200 and the second electronic component 300, thereby not easily scratching the electronic components, and maintaining the stable contact status.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of manufacturing an electrical connector, the electrical connector being configured to electrically connect a first electronic component to a second electronic component, the method comprising:

step A: providing a metal plate, and cutting the metal plate to form a plurality of base portions and a plurality of pre-soldering areas, wherein each of the base portions is connected to at least one of the pre-soldering areas;

step B: after the step A, providing a plurality of conductive members, and soldering at least one of the conductive members to one of the pre-soldering areas;

step C: after the step B, cutting and forming a plurality of elastic arms correspondingly according to locations of the conductive members in the pre-soldering areas as references, wherein at least one of the elastic arms is connected to a corresponding one of the base portions, a corresponding one of the conductive members is soldered to an end of the at least one of the elastic arms away from the corresponding one of the base portions, the end of the at least one of the elastic arms away from the corresponding one of the base portions is a free end, and one of a plurality of conductive terminals comprises the corresponding one of the base portions, the at least one of the elastic arms and the at least one of the conductive members;

step D: forming an insulating body on the conductive terminals by insert-molding, wherein the corresponding one of the base portions is covered and fixed by the insulating body, and wherein the step D is performed between the step A and the step B, and the pre-soldering areas are exposed out of the insulating body; or the step D is performed between the step B and step C, and the conductive members and the pre-soldering areas are exposed out of the insulating body; or the step D is performed after the step C, and the at least one of the elastic arms and the at least one of the conductive members are exposed out of the insulating body; and step E: after the step D, forming the conductive terminals by cutting, wherein at least some of the conductive terminals are separated from each other and are not in contact with each other, thus completing manufacturing of the electrical connector, wherein each of the conductive members is configured to be electrically connected to the first electronic component, and the first electronic component abuts the conductive members to move and simultaneously drive the elastic arms to deform, thus transmitting signals of the first electronic component to the second electronic component.

2. The method according to claim 1, wherein in the step C, each of the conductive terminals comprises two of the elastic arms and two of the conductive members, the two of the elastic arms formed by cutting comprise a first elastic arm and a second elastic arm, the two of the conductive members comprise a first conductive member and a second conductive member, the first elastic arm and the second elastic arm are connected to the same corresponding one of the base portions and extend respectively along two opposite side directions of the corresponding one of the base portions, the first elastic arm of each of the conductive terminals is soldered and fixed with only the first conductive member, the second elastic arm of each of the conductive terminals is soldered and fixed with only the second conductive member, and the first conductive member and the second conductive member are provided to be staggered in the vertical direction; and in the step E, the first electronic component presses downward on the first conductive member to move and drives the first elastic arm to deform, the second electronic component abuts upward the second conductive member to move and drives the second elastic arm to deform, and moving directions of the first conductive member and the second conductive member are opposite to each other.

3. The method according to claim 1, wherein in the step C, each of the conductive terminals comprises one of the elastic arms and two of the conductive members, the one of the elastic arms formed by cutting is soldered and fixed with the two of the conductive members, the two of the conductive members comprise a first conductive member and a second conductive member, the first conductive member is soldered and fixed to a first surface of the one of the elastic arms, the second conductive member is soldered and fixed to a second surface of the one of the elastic arms, the first surface and the second surface of the one of the elastic arms are arranged opposite to each other in the vertical direction, and the first conductive member and the second conductive member are provided to be staggered in the vertical direction; and in the step E, the second electronic component firstly abuts upward the second conductive member to move and drives the one of the elastic arms to deform, the first electronic component then presses downward on the first conductive member to move and drives the one of the elastic arms to deform, and moving directions of the first conductive member and the second conductive member are opposite to each other.

4. The method according to claim 1, wherein in the step A, the metal plate is cut to further form a plurality of tail portions, and each of the tail portions is formed from an end of the corresponding one of the base portions away from a corresponding one of the pre-soldering area;

in the step C, the one of the conductive terminals comprises the corresponding one of the base portions, the at least one of the elastic arms, the at least one of the conductive members and a corresponding one of the tail portions; and in the step D, the tail portions are not covered and fixed by the insulating body.

5. The method according to claim 4, wherein in the step C, the free end of a specific one of the elastic arms and the tail portion connected to an adjacent one of the elastic arms are cut and separated, and the tail portion connected to the adjacent one of the elastic arms is formed with a reserved space to accommodate the free end of the specific one of the elastic arms.

6. The method according to claim 4, wherein a plurality of soldered bodies are provided, and each of the soldered bodies is soldered to each of the tail portions.

7. The method according to claim 1, wherein in the step D, the insulating body is formed with a plurality of reserved spaces during the insert-molding, and the elastic arms and the conductive members are exposed in the reserved spaces running vertical through the insulating body; and in the step E, the first electronic component and the second electronic component abut the elastic arms and the conductive members to deform and move vertically in the reserved spaces.

8. A method of manufacturing an electrical connector, the electrical connector being configured to electrically connect a first electronic component to a second electronic component, the method comprising:

step I: providing a metal plate, and cutting the metal plate to form a plurality of base portions and a plurality of pre-soldering areas, wherein each of the base portions is connected to at least one of the pre-soldering areas;

step II: after the step I or simultaneously in the step I, cutting the pre-soldering areas to form a plurality of elastic arms, wherein at least one of the elastic arms is connected to a corresponding one of the base portions, an end of the at least one of the elastic arms away from the corresponding one of the base portions is a free end;

step III: after the step II, providing a plurality of conductive posts, and soldering at least one of the conductive posts to the end of the at least one of the elastic arms away from the corresponding one of the base portions, wherein one of a plurality of conductive terminals comprises the corresponding one of the base portions, the at least one of the elastic arms and the at least one of the conductive posts;

step IV: forming an insulating body on the conductive terminals by insert-molding, wherein the corresponding one of the base portions is covered and fixed by the insulating body, and wherein the step IV is performed between the step I and the step II, and the pre-soldering areas are exposed out of the insulating body; or the step IV is performed between the step II and step III, and the at least one of the elastic arms are exposed out of the insulating body; or the step IV is performed after the step III, and the at least one of the elastic arms and the at least one of the conductive posts are exposed out of the insulating body; and step V: after the step IV, forming the conductive terminals by cutting, wherein at least some of the conductive terminals are separated from each other and are not in contact with each other, thus completing manufacturing of the electrical connector, wherein each of the conductive posts is configured to be electrically connected to the first electronic component, and the first electronic component abuts the conductive posts to move and simultaneously drive the elastic arms to deform, thus transmitting signals of the first electronic component to the second electronic component.

9. The method according to claim 8, wherein in the step III, each of the conductive terminals comprises two of the elastic arms and two of the conductive posts, the two of the elastic arms comprise a first elastic arm and a second elastic arm, and the first elastic arm and the second elastic arm are connected to the same corresponding one of the base portions and extend respectively along two opposite side directions of the corresponding one of the base portions, the two of the conductive posts comprise a first conductive post and a second conductive post, the first elastic arm is soldered and fixed with only the first conductive post, the second elastic arm is soldered and fixed with only the second conductive post, and the first conductive post and the second conductive post are provided to be staggered in the vertical direction; and in the step V, the first electronic component presses downward on the first conductive post to move and drives the first elastic arm to deform, the second electronic component abuts upward the second conductive post to move and drives the second elastic arm to deform, and moving directions of the first conductive post and the second conductive post are opposite to each other.

10. The method according to claim 8, wherein in the step III, each of the conductive terminals comprises one of the elastic arms and two of the conductive posts, the two of the conductive posts are soldered to a same one of the elastic arms, the two of the conductive posts comprise a first conductive post and a second conductive post, the first conductive post is soldered and fixed to a first surface of the free end of same one of the elastic arms, the second conductive post is soldered and fixed to a second surface of the free end of the same one of the elastic arms, the first surface and the second surface of the same one of the elastic arms are arranged opposite to each other in the vertical direction, and the first conductive post and the second conductive post are provided to be staggered in the vertical direction; and in the step V, the second electronic component firstly abuts upward the second conductive post to move and drives the one of the elastic arms to deform, the first electronic component then presses downward on the first conductive post to move and drives the one of the elastic arms to deform, and moving directions of the first conductive post and the second conductive post are opposite to each other.

11. The method according to claim 8, wherein in the step I, the metal plate is cut to further form a plurality of tail portions, and each of the tail portions is formed from an end of the corresponding one of the base portions away from a corresponding one of the pre-soldering area;

in the step III, the one of the conductive terminals comprises the corresponding one of the base portions, the at least one of the elastic arms, the at least one of the conductive posts and a corresponding one of the tail portions; and in the step IV, the tail portions are not covered and fixed by the insulating body.

12. The method according to claim 11, wherein in the step II, the free end of a specific one of the elastic arms and the tail portion connected to an adjacent one of the elastic arms are cut and separated, and the tail portion connected to the adjacent one of the elastic arms is formed with a reserved space to accommodate the free end of the specific one of the elastic arms.

13. The method according to claim 11, wherein a plurality of soldered bodies are provided, and each of the soldered bodies is soldered to each of the tail portions.

14. The method according to claim 8, wherein in the step IV, the insulating body is formed with a plurality of reserved spaces during the insert-molding, and the elastic arms and the conductive posts are exposed in the reserved spaces running vertical through the insulating body; and in the step V, the first electronic component and the second electronic component abut the elastic arms and the conductive posts to deform and move vertically in the reserved spaces.

15. An electrical connector, configured to electrically connect a first electronic component to a second electronic component, the electrical connector comprising:

an insulating body, having a plurality of accommodating slots, wherein each of the accommodating slots has a reserved space therein; and a plurality of conductive terminals, wherein the insulating body and the conductive terminals are formed by insert-molding; wherein each of the conductive terminals has a base portion, at least one elastic arm integrally connected to the base portion and at least one conductive post soldered to an end of the at least one elastic arm away from the base portion, the base portion is fixed in the insulating body, the at least one elastic arm and the at least one conductive post are exposed to the reserved space of a corresponding one of the accommodating slots, and the end of the at least one elastic arm away from the base portion is a free end;

wherein each of the at least one conductive post has a soldering portion and a contact portion integrally connected to the soldering portion, the soldering portion is soldered and fixed to the free end, the first electronic component is configured to abut the contact portion to move toward a direction close to the second electronic component and to drive the at least one elastic arm to deform toward the reserved space of the corresponding one of the accommodating slots.

16. The electrical connector according to claim 15, wherein each of the conductive terminals comprises two of the elastic arms and two of the conductive posts;

the two of the elastic arms comprise a first elastic arm and a second elastic arm, and the first elastic arm and the second elastic arm are connected to the same corresponding one of the base portions and extend respectively along two opposite side directions of the corresponding one of the base portions;

the two of the conductive posts comprise a first conductive post and a second conductive post, the first elastic arm is soldered and fixed with only the first conductive post, the second elastic arm is soldered and fixed with only the second conductive post, and the first conductive post and the second conductive post are provided to be staggered in the vertical direction; and the second electronic component firstly abuts upward the second conductive post to move and drives the second elastic arm to deform, the first electronic component then presses downward on the first conductive post to move and drives the first elastic arm to deform, and moving directions of the first conductive post and the second conductive post are opposite to each other.

17. The electrical connector according to claim 15, wherein each of the conductive terminals comprises one of the elastic arms and two of the conductive posts, the one of the elastic arms is soldered and fixed with the two of the conductive posts, the two of the conductive posts comprise a first conductive post and a second conductive post, the first conductive post is soldered and fixed to a first surface of the free end of the one of the elastic arms, the second conductive post is soldered and fixed to a second surface of the free end of the one of the elastic arms, the first surface and the second surface of the free end of the one of the elastic arms are arranged opposite to each other in the vertical direction, and the first conductive post and the second conductive post are provided to be staggered in the vertical direction; and the second electronic component firstly abuts upward the second conductive post to move and drives the one of the elastic arms to deform, the first electronic component then presses downward on the first conductive post to move and drives the one of the elastic arms to deform, and moving directions of the first conductive post and the second conductive posts are opposite to each other.

18. The electrical connector according to claim 15, wherein the conductive terminals comprise at least one signal terminal and at least one ground terminal adjacent to and separated from each other, an end of the base portion of each of the at least one signal terminal close to the free end of the at least one ground terminal is provided with a reserved space, and the free end of the at least one ground terminal is at least partially located in the reserved space.

19. The electrical connector according to claim 15, wherein each of the conductive terminals further has a tail portion extended from the end of the base portion away from the at least one elastic arm, the tail portion of each of the conductive terminals is soldered to a solder body, and the solder body is configured to be directly soldered downward to the second electronic component.

* * * * *